United States Patent [19]

Davis et al.

[11] Patent Number: 5,548,771

[45] Date of Patent: Aug. 20, 1996

[54] MULTI-PROCESSOR DATA PROCESSING SYSTEM HAVING MULTIPLE PORTS COUPLED TO MULTIPLE INTERFACE CIRCUITS

[75] Inventors: Jack R. Davis; Michael G. Gallup; L. Rodney Goke; Erik L. Welty, all of Austin; Michael F. Wiles, Round Rock, all of Tex.

[73] Assignee: Motorola Inc., Schaumburg, Ill.

[21] Appl. No.: 144,378

[22] Filed: Nov. 2, 1993

[51] Int. Cl.[6] .................................................. G06F 15/80
[52] U.S. Cl. .................. 395/800; 364/231.9; 364/232.8; 364/DIG. 1
[58] Field of Search ............................. 395/800, DIG. 1; 364/200, 231, 232

[56] References Cited

U.S. PATENT DOCUMENTS

| | | | |
|---|---|---|---|
| 3,287,703 | 11/1966 | Slotnick | 340/172.5 |
| 3,796,992 | 3/1974 | Nakamura et al. | 340/147 LP |
| 4,463,445 | 7/1984 | Grimes | 364/900 |
| 4,470,112 | 9/1984 | Dimmick | 364/200 |
| 4,488,218 | 12/1984 | Grimes | 364/200 |
| 4,811,201 | 3/1989 | Rau et al. | 364/200 |
| 4,933,836 | 6/1990 | Tulpule et al. | 364/200 |
| 5,067,095 | 11/1991 | Peterson et al. | 395/24 |
| 5,073,867 | 12/1991 | Murphy et al. | 395/27 |
| 5,083,285 | 1/1992 | Shima et al. | 395/24 |
| 5,086,405 | 2/1992 | Chung et al. | 364/748 |
| 5,140,670 | 8/1992 | Chua et al. | 395/24 |
| 5,146,420 | 9/1992 | Vassiliadis et al. | 364/757 |
| 5,148,515 | 9/1992 | Vassiliadis et al. | 395/27 |
| 5,151,874 | 9/1992 | Jeong et al. | 364/752 |
| 5,151,971 | 9/1992 | Jousselin et al. | 395/27 |
| 5,152,000 | 9/1992 | Hillis | 395/800 |
| 5,155,389 | 10/1992 | Furtek | 307/465 |
| 5,155,699 | 10/1992 | Chung et al. | 364/766 |
| 5,165,009 | 11/1992 | Watanabe et al. | 395/27 |
| 5,165,010 | 11/1992 | Masuda et al. | 395/27 |
| 5,167,008 | 11/1992 | Engeler | 395/27 |
| 5,168,573 | 12/1992 | Fossum et al. | 395/800 |
| 5,175,858 | 12/1992 | Hammerstrom | 395/800 |
| 5,182,794 | 1/1993 | Gasperi et al. | 395/23 |
| 5,239,654 | 8/1993 | Ing-Simmons et al. | 395/800 |

OTHER PUBLICATIONS

"Nueral Networks Primer Part IV" published in Al Expert in Aug. 1988 and written by Maureen Caudill, pp. 61 through 67.

"Neural Networks Primer Part V" published in Al Expert in Nov. 1988 and written by Maureen Caudill, pp. 57 through 65.

"Neural Networks Primer Part VI" published in Al Expert in Feb. 1989 and written by Maureen Caudill, pp. 61 through 67.

"Neural Networks Primer Part VII" published in Al Expert in May 1989 and written by Maureen Caudill, pp. 51 through 58.

"Neural Networks Primer Part VIII" published Al Expert in Aug. 1989 and written by Maureen Caudill, pp. 61 through 67.

(List continued on next page.)

*Primary Examiner*—Alyssa H. Bowler
*Assistant Examiner*—Krishna Malyala
*Attorney, Agent, or Firm*—Susan C. Hill

[57] ABSTRACT

A multi-processor data processing system (10) includes an array (12) of one or more data processors (50–65). Data processing system (10) has edge interface circuits (14,16) for transferring control and data to and from the array (12). A data bus (32), an address bus (34), and a control bus (36) each transfers information to and from the array (12), the edge interfaces (14,16), and a bus interface controller (22). In an alternate embodiment, multi-processor data processing system (210) includes an array (212) of one or more data processors (250–258). Data processing system (210) has edge interfaces (214–217) for transferring control and data to and from the array (212). A data bus (232), an address bus (234), and a control bus (236) each transfers information to and from the array (212), the edge interfaces (214–217), and a bus interface controller (222).

16 Claims, 120 Drawing Sheets

OTHER PUBLICATIONS

"Fast Spheres, Shadows, Textures, Transparencies, and Image Enhancements in Pixel Planes" by H. Fuchs et al. and published in Computer Graphics, vol. 19, No. 3, Jul. 1985, pp. 111–120.

"Pixel–Planes: Building VLSI–Based Graphic System" by J. Poulton et al. and published in the proceedings of the 1985 Chapel Hill Conference on VLSI, pp. 35–60.

"Pixel–Planes 5: A Heterogeneous Multiprocessor Graphics System using Processor–Enhanced Memories" by Fuchs et al. and published in Computer Graphics, vol. 23, No. 3, Jul. 1989, pp. 79–88.

"Parallel Processing In Pixel–Planes, a VLSI logic–enhanced memory for raster graphics" by Fuchs et al. published in the proceding of ICCD'85 held in Oct. 1985, pp. 193–197.

"Building a 512×512 Pixel–Planes System" by J. Poulton et al. and published in Advanced Research in VLSI, Proceedings of the 1987 Stanford Conference, pp. 57–71.

"Coarse–grain & fine–grain parallelism in the next generation Pixel–planes graphic sys." by Fuchs et al. and published in Parallel Processing for Computer Vision and Display, pp. 241–253.

"Pixel Planes: A VLSI–Oriented Design for 3–D Raster Graphics" by H. Fuchs et al. and publ. in the proc. of the 7th Canadian Man–Computer Comm. Conference, pp. 343–347.

"The Torus Routing Chip" published in Journal of Distributed Computing, vol. 1, No. 3, 1986, and written by W. Dally et al. pp. 1–17.

"A Microprocessor–based Hypercube Supercomputer" written by J. Hayes et al. and published in IEEE MICRO in Oct. 1986, pp. 6–17.

"ILLIAC IV Software and Application Programming" written by David J. Kuck and published in IEEE Transactions on Computers, vol. C–17, No. 8, Aug. 1968, pp. 758–770.

"An Introduction to the ILLIAC IV Computer" written by D. McIntyre and published in Datamation, Apr. 1970, pp. 60–67.

"The ILLIAC IV Computer" written by G. Barnes et al. and published in IEEE Transactions on Computers, vol. C–17, No. 8, Aug. 1968, pp. 746–757.

The ILLIAC IV The First Supercomputer written by R. Michael Hord and published by Computer Science Press, pp. 1–69.

MC68000 8–/16–/32–Bit Microprocessor User's Manual, Eighth Edition, pp. 4–1 through 4–4; 4–8 through 4–12.

MC68020 32–Bit Microprocessor User's Manual, Fourth Edition, pp. 3–12 through 3–23.

Introduction to Computer Architecture written by Harold S. Stone et al. and published by Science Research Associates, Inc. in 1975, pp. 326 through 355.

"A VLSI Architecture for High–Performance, Low–Cost, On–chip Learning" by D. Hammerstrom for Adaptive Solutions, Inc. Feb. 28, 1990, pp. II–537 through II–544.

"CNAPS–1064 Preliminary Data CNAPS–1064 Digital Neural Processor" published by Adaptive Solutions, Inc. pp. 1–8.

DSP56000/DSP56001 Digital Signal Processor User's Manual, Rev. 1, published by Motorola, Inc. pp. 2–9 through 2–14, 5–1 through 5–21, 7–18.

"M–Structures: Ext. a Parallel, Non–strict, Functional Lang. with State" by Barth et al., Comp. Struct. Group Memo 327 (MIT), Mar. 18, 1991, pp. 1–21.

"A Pipelined, Shared Resource MIMD Computer" by B. Smith et al. and published in the Proceedings of the 1978 International Conference on Parallel Processing, pp. 6–8.

M68000 Family Programmer's Reference Manual published by Motorola, Inc. in 1989, pp. 2–71 through 2–78.

"The DSP is being reconfigured" by Chappell Brown and published in Electronic Engineering Times, Monday, Mar. 22, 1993, Issue 738, p. 29.

DSP56000/56001 Digital Signal Processor User's Manual published by Motorola, Inc. pp. 2–4 and 2–5, 4–6 and 4–7.

MC68340 Integrated Processor User's Manual published by Motorola, Inc. in 1990, pp. 6–1 through 6–22.

Transputer Architecture Technical Overview published by INMOS in Sep. 1985.

Product Description of the IMS T414 Transputer published by INMOS in Sep. 1985.

Product Description of the IMS T212 Transputer published by INMOS in Sep. 1985.

Proceedings from the INMOS Transputer Seminar tour conducted in 1986, published in Apr. 1986.

"Control Data STAR–100 Processor Design" written by R. G. Hintz et al. and published in the Innovative Architecture Digest of Papers for COMPCOM 72 in 1972, pp. 1 through 4.

"Neural Networks Primer Part I" published in AI Expert in Dec. 1987 and written by Maureen Caudill, pp. 46 through 52.

"Neural Networks Primer Part II" published in AI Expert in Feb. 1988 and written by Maureen Caudill, pp. 55 through 61.

"Neural Networks Primer Part III" published in AI Expert in Jun. 1988 and written by Maureen Caudill, pp. 53 through 59.

"Computer Architecture and Parallel Processing" Hwang & Briggs, QA 76.9.A73 H88, 1984 Multiple DSP Enviornment for Intelligent Signs Processing, GASS, Proc. of the IEEE, vol. 75, No. 9, Sep. 1987.

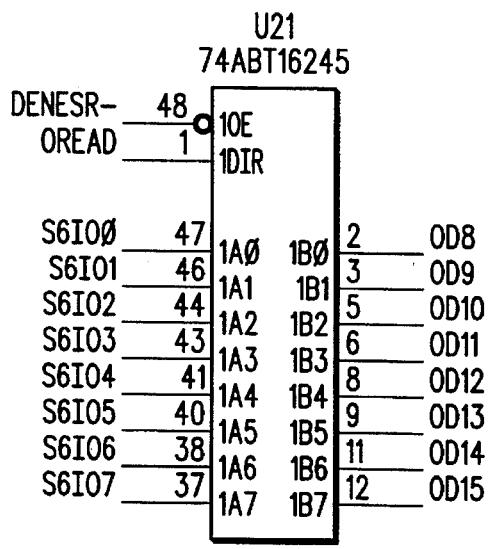
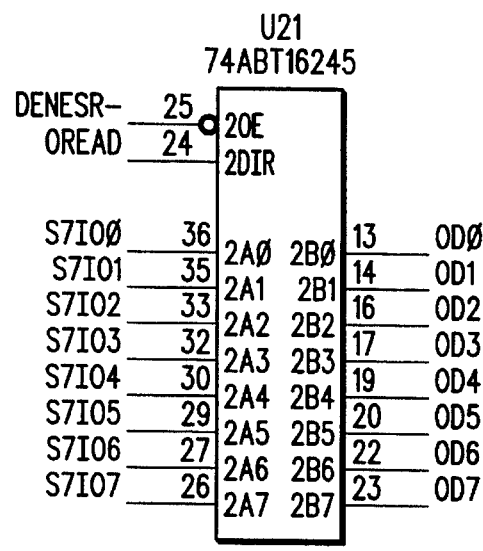
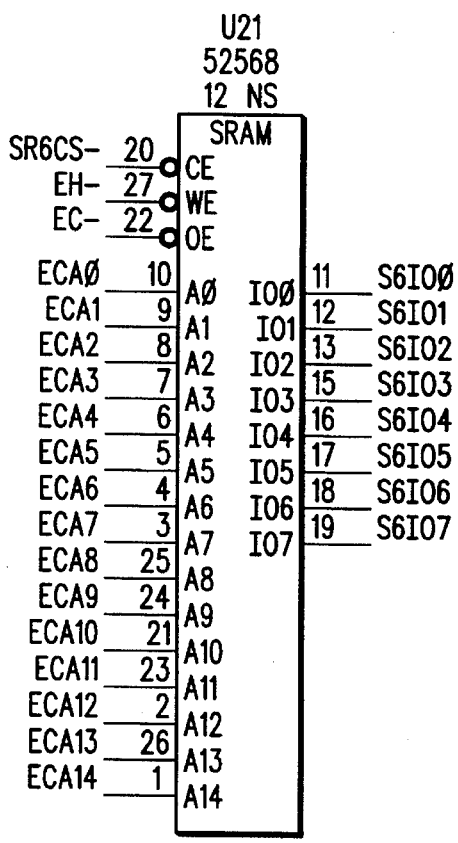
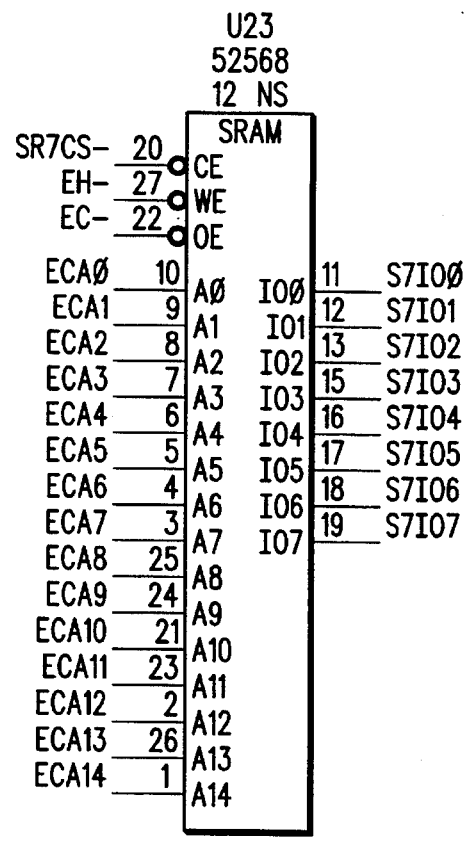
*FIG.16-3*

FIG.17-1

FIG. 17-2
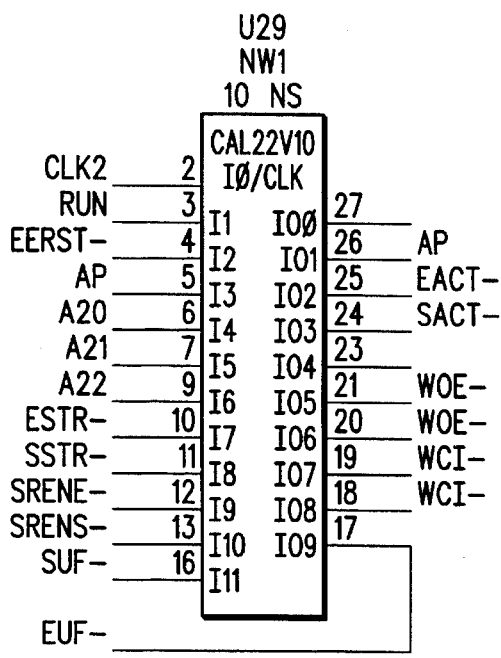
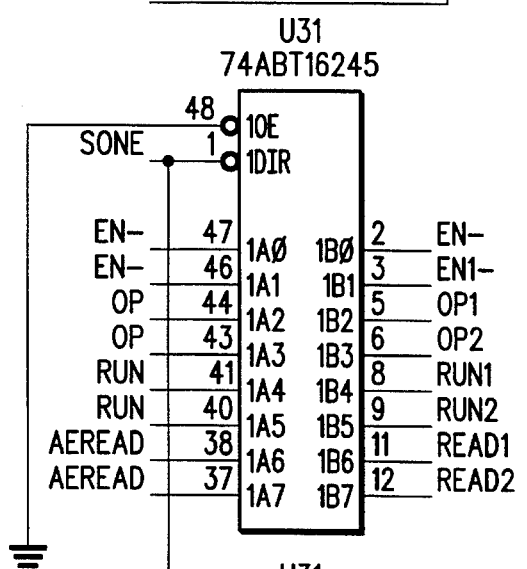
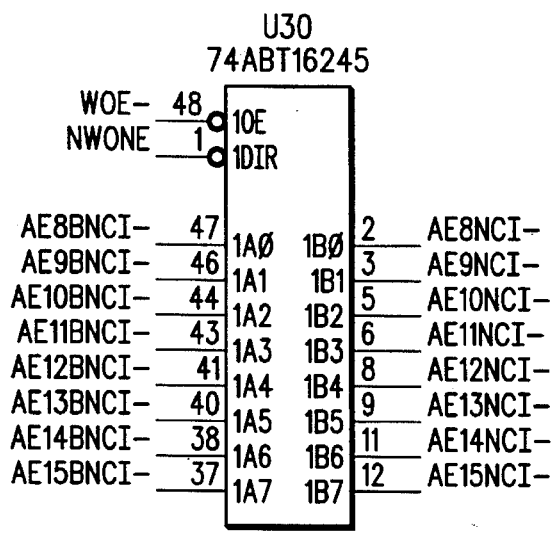
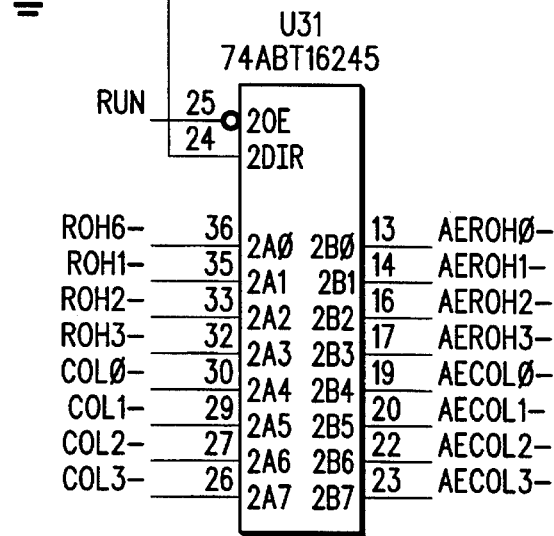
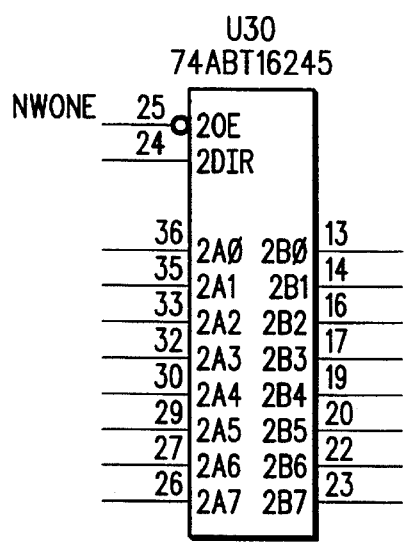

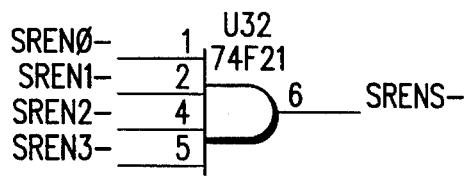
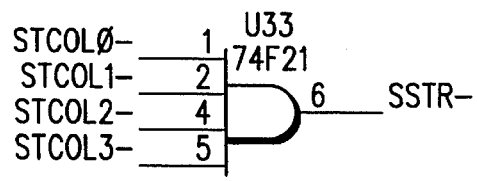
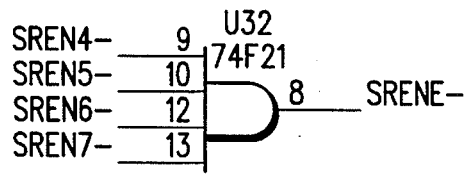
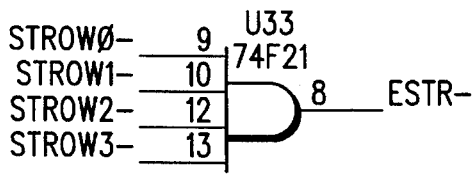
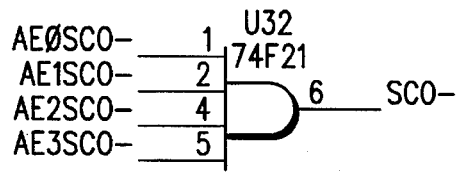
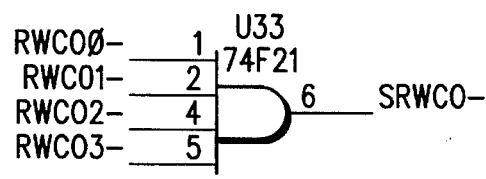
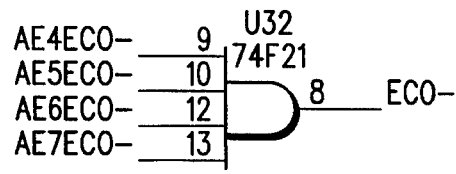
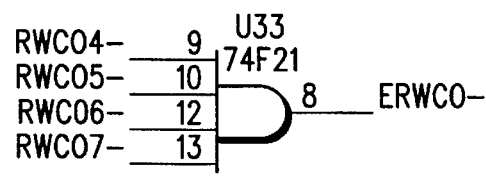
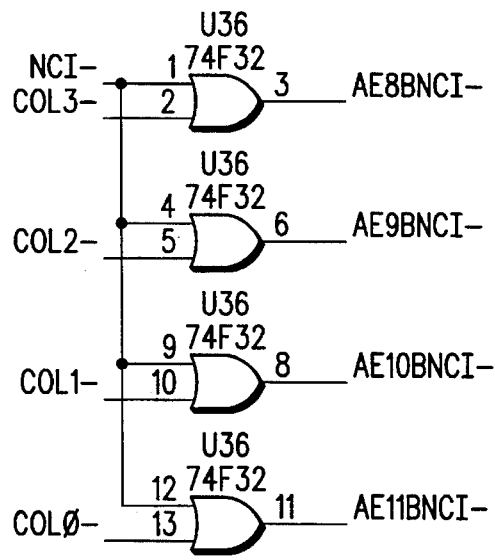
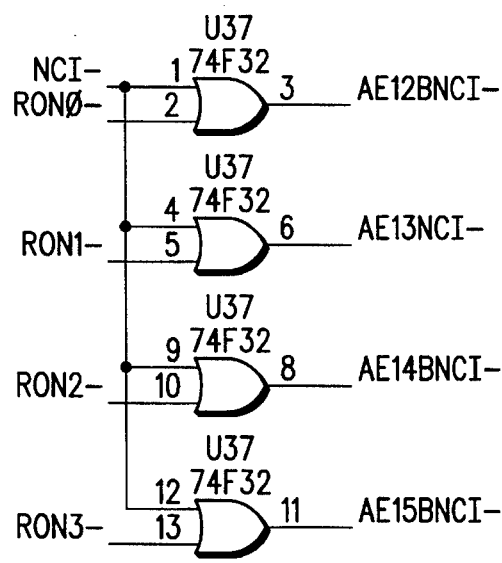
*FIG.17-3*

*FIG.18-3*

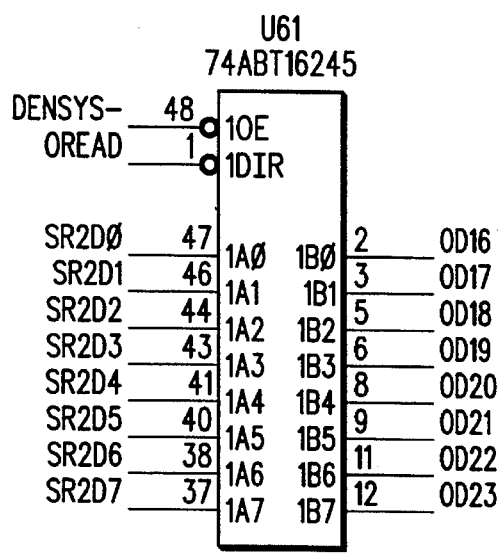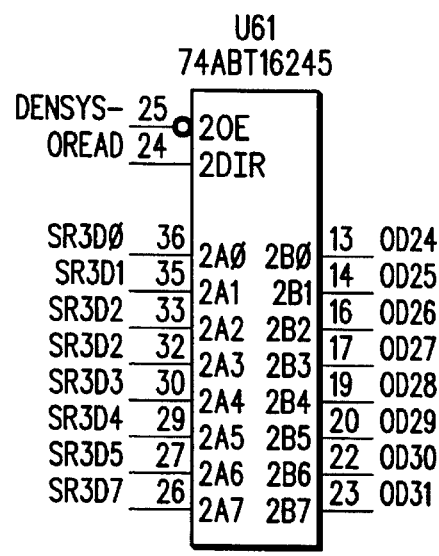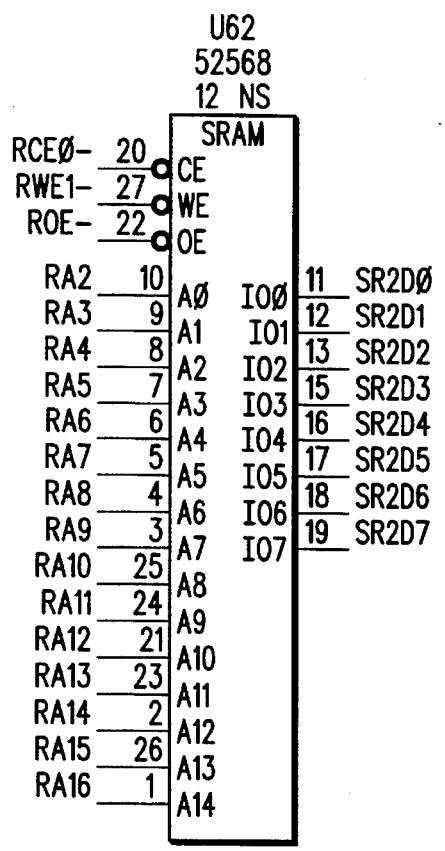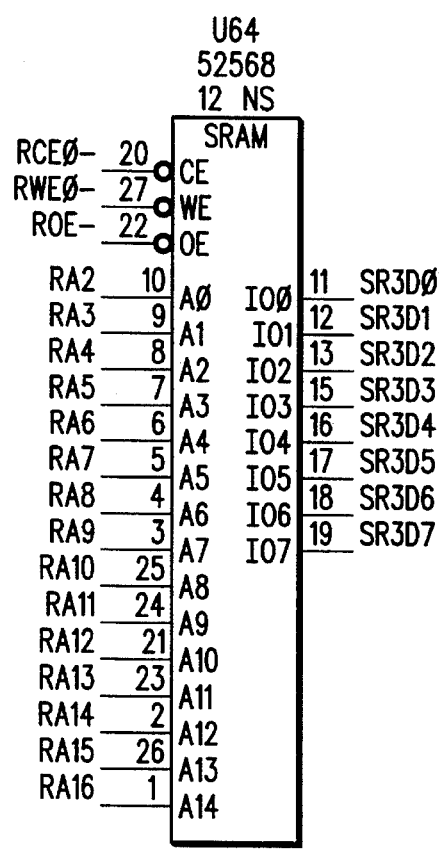
FIG.20-3

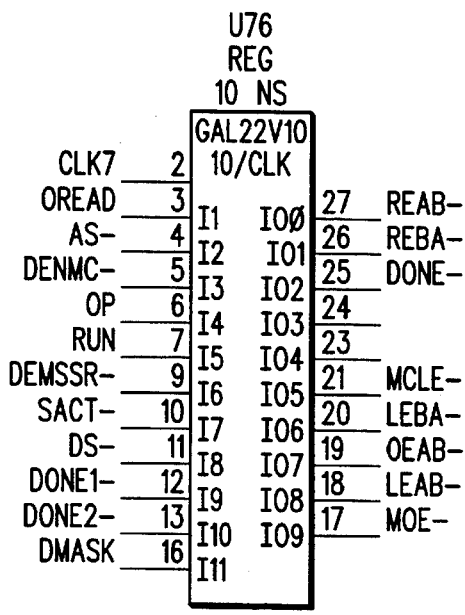
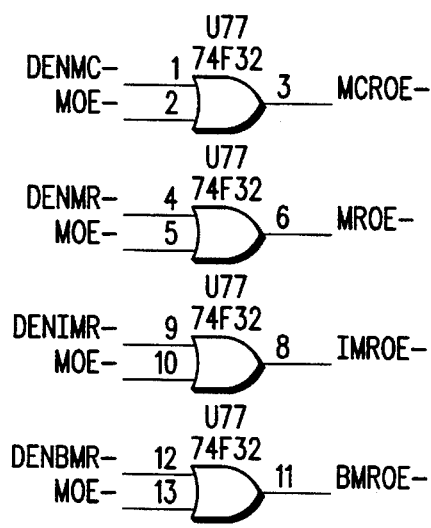
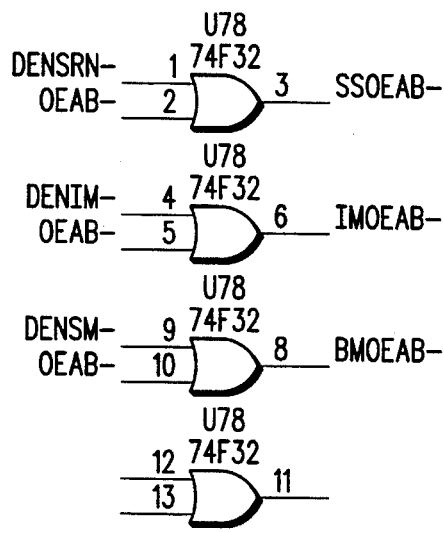
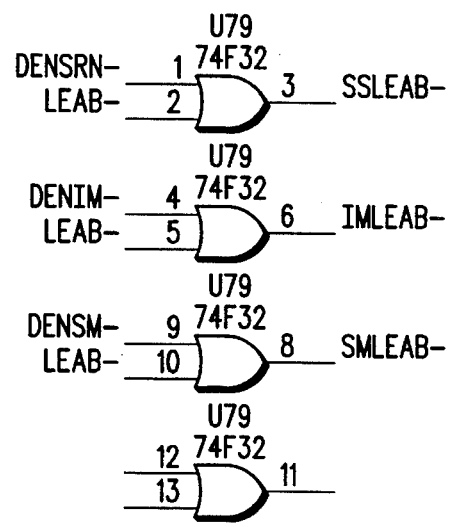
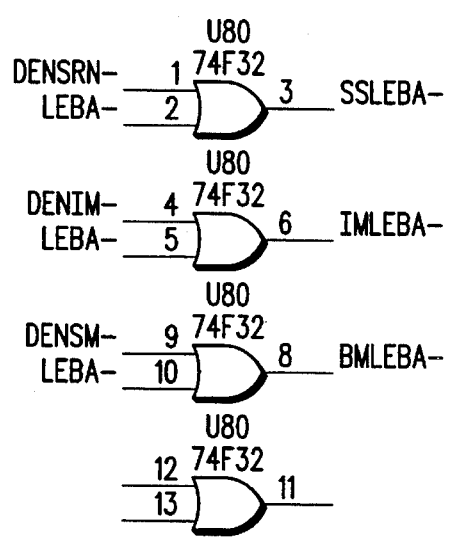
*FIG.24-1*

PARTS LIST FOR SCHEMATIC DIAGRAM OF DATA PROCESSING SYSTEM 10 (SEE FIG.13 THROUGH FIG.30B)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 2 | XXX007-YYY | EPROM, 32K X 8 | BOOT1* | 70 NS | | | | | DIP6 | MCC | U69, U68 |
| 1 | MC68340FESS | SYSTEM INTEGRATION MODULE | 68340 | 25 MHZ | | | | | QFP | MOT | U67 |
| 28 | SN74ABT16245DL | 16-BIT BUS XCEIVER | 74ABT16245 | | | | | | SSOP | TI | U94, U89, U71, U70, U61, U55, U54, U50, U5, U49, U48, U47, U4, U31, U30, U28, U27, U26, U25, U24, U21, U18, U15, U14, U11, U101, U10, U1 |
| 4 | | 16-BIT D FLIP-FLOP OCTAL REGISTER | 74ABT16373 | | | | | | SSOP | TI | U93, U92, U91, U90 |
| 5 | SN74ABT16543DL | XCEIVER | 74ABT16543 | | | | | | SSOP | TI | U86, U85, U81, U8, U2 |
| 32 | C1206C104Z5UAC | CAPACITOR, CER | | | .1 | +/-20% | 50V | | 1206 | KEM | C83, C82, C81, C80, C79, C78, C77, C76, C75, C74, C73, C72, C71, C70, C69, C68, C67, C66, C65, C64, C63, C62, C61, C60, C59, C58, C57, C56, C55, C54, C53, C52 |

PARTS LIST FOR SCHEMATIC DIAGRAM OF DATA PROCESSING SYSTEM 10 (SEE FIG.13 THROUGH FIG.30B)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 41 | C1206C104Z5UAC | CAPACITOR, CER | | | .1 | +/-20% | 50V | | 1206 | KEM | C51, C50, C49, C48, C47, C46, C45, C44, C43, C42, C41, C40, C39, C38, C37, C36, C36, C35, C34, C33, C32, C31, C30, C29, C28, C27, C26, C25, C24, C22, C21, C20, C19, C18, C17, C16, C15, C14, C13, C12, C11 |
| 9 | C1206CVVVZ5UAC | CAPACITOR, CER | | | .01 | +/-20% | 50V | | 1206 | KEM | C98, C97, C96, C95, C94, C93, C92, C91, C90 |
| 4 | C1206CVVVZ5UAC | CAPACITOR, CER | | | .1 PF | +/-20% | 50V | | 1206 | KEM | C89, C88, C87, C106 |
| 1 | C1206CVVVZ5UAC | CAPACITOR, CER | | | 10 PF | +/-20% | 50V | | 1206 | KEM | C99 |
| 1 | C1206CVVVZ5UAC | CAPACITOR, CER | | | 22 PF | +/-20% | 50V | | 1206 | KEM | C105 |
| 1 | C1206CVVVZ5UAC | CAPACITOR, CER | | | 47 PF | +/-20% | 50V | | 1206 | KEM | C100 |
| 2 | T491AVVVM016AS | CAPACITOR, TANT | | | 1.0 | +/-20% | 16V | | 3216 | KEM | C85, C84 |
| 2 | T491AVVVM016AS | CAPACITOR, TANT | | | 10 | +/-20% | 16V | | 3216 | KEM | C104, C103 |
| 2 | T491BVVVM016AS | CAPACITOR, TANT | | | 4.7 | +/-20% | 16V | | 3528 | KEM | C102, C101 |

PARTS LIST FOR SCHEMATIC DIAGRAM OF DATA PROCESSING SYSTEM 10 (SEE FIG.13 THROUGH FIG.30B)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 16 | MT5C2568DJ-SS | STATIC RAM 32K X 8 | 52568 | 30 NS* | | | | | SOICJ | MT | U9, U7, U65, U64, U63, U62, U59, U58, U57, U56, U3, U23, U22, U17, U16, U13 |
| 1 | 153C720-208QFP | PROCESSOR, SCSI I/O | 53C720 | | | | | | QFP 6032 | NCR | U51 |
| 12 | T491CVVM016AS | CAPACITOR, TANT | | | 10 | +/-20% | 16V | | | KEM | C9, C86, C8, C7, C6, C5, C4, C3, C2, C107, C10, C1 |
| 21 | 102944-8 | HEADER ASSY, UNSHD, 2 ROW, 16 POS | | | | | | | | AMP | J9, J8, J27, J26, J25, J24, J23, J22, J21, J20, J19, J18, J17, J16, J15, J14, J13, J12, J11, J10, J1 |
| 1 | ESQ-136-23-T-D | SOCKET STRIP,.535"HT, 2 ROW, 72 POS | | | | | | | | SAM | J28 |
| 1 | 350760-4 | HEADER ASSY, PWB, PIN, 4 POS | | | | | | | | AMP | J3 |
| 2 | 745781-5 | RECP, SUB D, PWB, RT A | | | | | | | | AMP | J5, J4 |
| 2 | | | | | | | | | | TB | J7, J6 |

FIG.31C

PARTS LIST FOR SCHEMATIC DIAGRAM OF DATA PROCESSING SYSTEM 10 (SEE FIG.13 THROUGH FIG.30B)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 2 | PN | DIODE, SWITCHING | | | | | | | AXIAL | TI | D2, D1 |
| 1 | N74F04D | HEX INVERTER | 74F04 | | | | | | SOICN | SIG | U41 |
| 2 | MC74F138D | 1-OF-8 DECODER | 74F138 | | | | | | SOICN | MOT | U46, U45 |
| 7 | N74F21D | DUAL 4-INPUT AND | 74F21 | | | | | | SOICN | MOT | U75, U74, U73, U35, U34, U33, U32 |
| 6 | N74F32D | QUAD 2-INPUT OR | 74F32 | | | | | | SOICN | SIG | U80, U79, U78, U77, U37, U36 |
| 2 | MC74F521DW | 8-BIT COMPARATOR | 74F521 | | | | | | SOICW | MOT | U88, U87 |
| 8 | N74F579D | COUNTER, BIN, 8-BIT, BIDIR | 74F579 | | | | | | SOICW | SIG | U98, U97, U96, U95, U105, U104, U103, U102 |
| 1 | IDT49FCT805ASO | BUFFER/CLOCK DRIVER | 49FCT805A | | | | | | SOICW | IDT | U84 |
| 2 | IDT74FCT845SO | LATCH, OCTAL, 8-BIT | 74FCT845 | | | | | | SOICW | IDT | U83, U82 |
| 1 | 3.686MHZ-FPX | CRYSTAL, SER, VVV OHMS | | | 3.686MH | | | | FPX-S | FOX | Y1 |
| 16 | XXX007-YYY | EPLD, GAL22V10 | SE1* | 10 NS | | | | | PLCC | MCC | U99, U76, U60, U6, U44, U43, U42, U40, U39, U38, U29, U20, U19, U123, U12, U100 |
| 5 | TSW-114-07-T-S | 2 POSITION JUMPER | SE1* | 10 NS | | | | | .1 | SAM | JP6, JP5, JP4, JP2, JP1 |

FIG.31D

PARTS LIST FOR SCHEMATIC DIAGRAM OF DATA PROCESSING SYSTEM 10 (SEE FIG.13 THROUGH FIG.30B)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 1 | XXXXX | HEADER ASSY, UNSHD, 2 ROW, 5 POS | | | | | | | | AMP | JP3 |
| 1 | TL7705AD | SUPPLY VOLTAGE SUPERVISOR | TL7705A | | | | | | SOICN | TI | U122 |
| 7 | HLMP-6X20 | LED, INTERNAL RESISTOR, COLOR | | | | | | | TT | HP | CR8, CR6, CR5, CR4, CR3, CR2, CR1 |
| 1 | LT1086CT | REGULATOR, 1.5AMP, 3 TERM | LT1086 | | | | | | TO220 | LNT | U53 |
| 1 | MAX238CWG | QUAD RS-232 XMITTER AND RECEIVER | MAX238 | | | | | | SOICW | MAX | U72 |
| 16 | | NATURAL NET PROCESSOR (ASSOCIATION ENGINE) | MC AE | 25 MHZ | | | | | PLCC | MOT | U121, U120, U119, U118, U117, U116, U115, U114, U113, U112, U111, U110, U109, U108, U107, U106 |
| 1 | MOT-004 | PWB, MOTOROLA, AE ODYSSEY BOARD | | | | | | | | MOT | A1 |
| 3 | CRCW1206VVVJB02 | RESISTOR, THICK FILM | | | 1K | 5% | 200V | .125W | 1206 | DAL | R3, R20, R1 |
| 5 | CRCW1206VVVJB02 | RESISTOR, THICK FILM | | | 10K | 5% | 200V | .125W | 1206 | DAL | R9, R4, R2, R19, R10 |
| 1 | CRCW1206VVVJB02 | RESISTOR, THICK FILM | | | 10M | 5% | 200V | .125W | 1206 | DAL | R21 |

FIG.31E

PARTS LIST FOR SCHEMATIC DIAGRAM OF DATA PROCESSING SYSTEM 10 (SEE FIG.13 THROUGH FIG.30B)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 9 | CRCW1206VVVJB02 | RESISTOR, THICK FILM | | | 100 | 5% | 200V | .125W | 1206 | DAL | R8, R18, R17, R16, R15, R14, R13, R12, R11 |
| 3 | CRCW1206VVVJB02 | RESISTOR, THICK FILM | | | 470 | 5% | 200V | .125W | 1206 | DAL | R6, R5, R22 |
| 1 | CRCW1206VVVJB02 | RESISTOR, THICK FILM | | | 75 | 5% | 200V | .125W | 1206 | DAL | R7 |
| 9 | SOMC1601VVVG | RNET, 16 PIN, 15 RES | | | 10K | 2% | 50V | .125W | SOICM | DAL | RP9, RP8, RP7, RP6, RP5, RP4, RP11, RP10, RP1 |
| 2 | SOMC1601VVVG | RNET, 16 PIN, 15 RES | | | 110 | 2% | 50V | .125W | SOICM | DAL | RP3, RP2 |
| 1 | 749649-5 | HDR, RCPT, 50 POS, 0.050, RT 1 | AMPLIMITE 50 | | | | | | | AMP | J2 |
| 1 | 2-641605-1 | SOCKET, DIP6, 28 POS | | | | | | | | AMP | XU68 |
| 2 | 2-641605-5 | SOCKET, DIP6, 28 POS | | | | | | | | AMP | XU69 |
| 16 | 822151-1 | SOCKET, PLCC, 84 POS, SMT | | | | | | | | AMP | XU121, XU120, XU119, XU118, XU117, XU116, XU115, XU114, XU113, XU112, XU111, XU110, XU109, XU108, XU107, XU106 |
| 2 | ET01-S-D1-C-B-E | SWITCH, SPDT, TOGGLE | | | | | | | SW3 | C&K | SW2, SW1 |

FIG.31F

| PARTS LIST FOR SCHEMATIC DIAGRAM OF DATA PROCESSING SYSTEM 10 (SEE FIG.13 THROUGH FIG.30B) | | | |
|---|---|---|---|
| SCHEMATIC REFERENCE DESIGNATOR | TP9, TP8, TP7, TP6, TP5, TP4, TP3, TP2, TP10, TP1, BTP9, BTP8, BTP7, BTP6, BTP5, BTP4, BTP3, BTP2, BTP1 | U66 | U52 |
| MANUFACTURER | | FOX | FOX |
| PACKAGE TYPE | | C4F31 | C4F31 |
| WATTAGE | | | |
| VOLTAGE | | | |
| TOLERANCE | | .05% | .05% |
| VALUE | | 25 MHZ | 50 MHZ |
| SPEED | | | |
| SCHEMATIC NAME | | | |
| DESCRIPTION | TEST POINT | OSC, XTAL, 4 PIN, SMT | OSC, XTAL, 4 PIN, SMT |
| PART NUMBER | (REF ONLY) | 1F3160-VVVMHZ | 1F3160-VVVMHZ |
| QUANTITY | 19 | 1 | 1 |

*FIG.31G*

UNLESS OTHERWISE NOTED, ALL RESISTOR VALUES ARE IN OHMS.
UNLESS OTHERWISE NOTED, ALL CAPACITOR VALUES ARE IN MICROFARADS.
ALL RESISTORS ARE RATED AT 1/4 WATT WITH A TOLERANCE OF +/- 5%.
ALL SINGLE -IN-LINE RESISTORS ARE RATED AT 1/8 WATT WITH A TOLERANCE OF +/- 5%.

U = INTEGRATED CIRCUIT
C = CAPACITOR
R = RESISTOR
RP = RESISTOR PACKAGE

FIG. 39-2
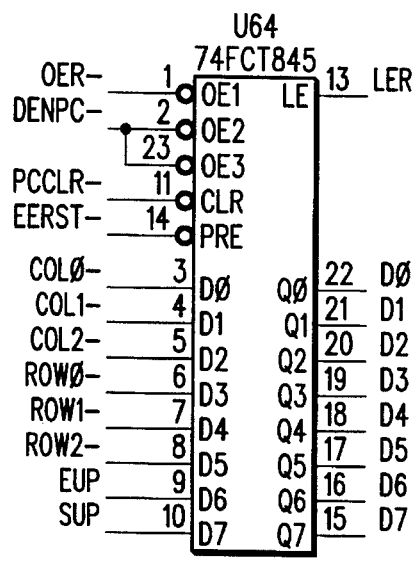
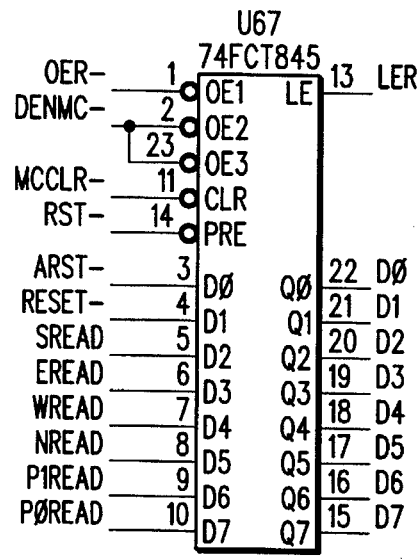
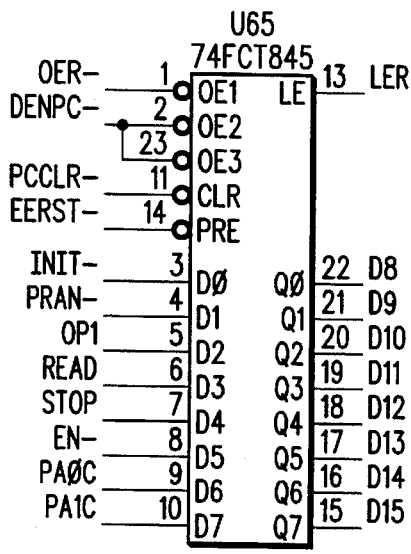
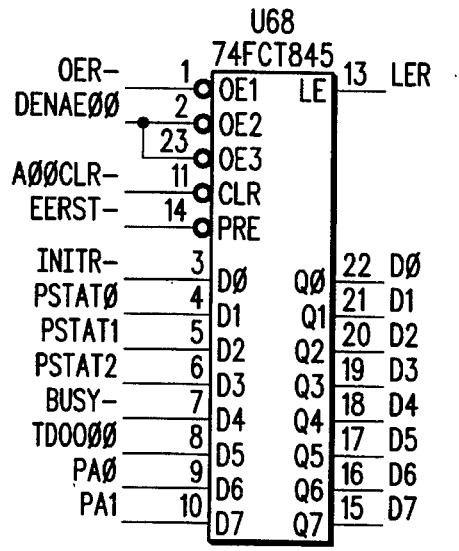
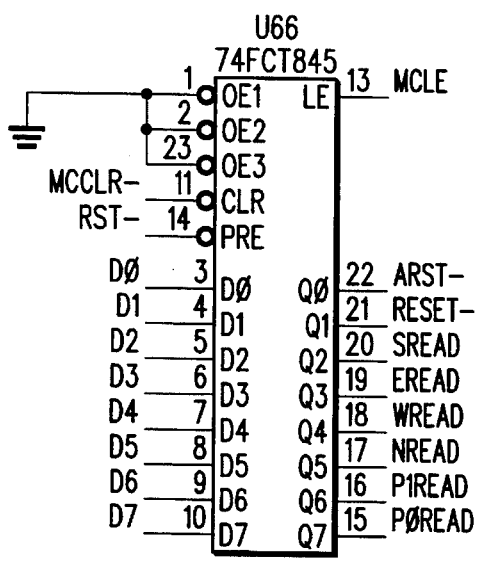
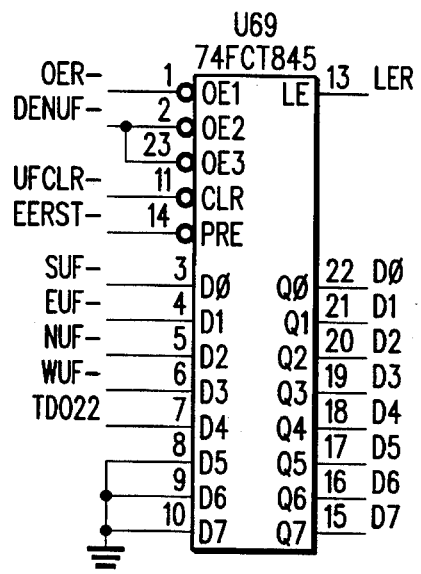

```
        U77                              U79
       NNED2                             EED2
       10 NS                            10 NS
      ┌─────────┐                      ┌─────────┐
      │CAL22V10 │                      │CAL22V10 │
CLK4  2│IØ/CLK  │              CLK5   2│IØ/CLK  │
RUN   3│I1   IOØ│ 27           RUN    3│I1   IOØ│ 27
CREAD 4│I2   IO1│ 26           CREAD  4│I2   IO1│ 26
NREAD 5│I3   IO2│ 25 TACKD-    NREAD  5│I3   IO2│ 25
OP1   6│I4   IO3│ 24 TACK-     OP1    6│I4   IO3│ 24
NUF-  7│I5   IO4│ 23 EERST-    EUF-   7│I5   IO4│ 23
CLK4  9│I6   IO5│ 21           CLK5   9│I6   IO5│ 21
PRAN- 10│I7   IO6│ 20 NAP      EN-   10│I7   IO6│ 20 TACKD-
EN-   11│I8   IO7│ 19 NAN-     SLT-  11│I8   IO7│ 19 EAN-
SLT-  12│I9   IO8│ 18 NC-      AS-   12│I9   IO8│ 18 EC-
AS-   13│I10  IO9│ 17 NSN-     INIT- 13│I10  IO9│ 17 ESN-
INIT- 16│I11     │              TACK- 16│I11     │
       └─────────┘                      └─────────┘

U78                              U80
       NNED2                            SED2
       10 NS                            10 NS
      ┌─────────┐                      ┌─────────┐
      │CAL22V10 │                      │CAL22V10 │
CLK2  2│IØ/CLK  │              CLK8   2│IØ/CLK  │
RUN   3│I1   IOØ│ 27           RUN    3│I1   IOØ│ 27
CREAD 4│I2   IO1│ 26           READ   4│I2   IO1│ 26 TACKD-
NREAD 5│I3   IO2│ 25 TACKD-    SREAD  5│I3   IO2│ 25 TACK-
OP1   6│I4   IO3│ 24 TACK-     OP1    6│I4   IO3│ 24 EERST-
NUF-  7│I5   IO4│ 23 EERST-    SUF-   7│I5   IO4│ 23 INIT-
CLK2  9│I6   IO5│ 21           CLK8   9│I6   IO5│ 21
PRAN- 10│I7   IO6│ 20 NAP      PRAN- 10│I7   IO6│ 20 SDP
EN-   11│I8   IO7│ 19 NAN-     EN-   11│I8   IO7│ 19 SAN-
SLT-  12│I9   IO8│ 18 NC-      SLT-  12│I9   IO8│ 18 SC-
AS-   13│I10  IO9│ 17 NSN-     CREAD 13│I10  IO9│ 17 SSN-
INIT- 16│I11     │              AS-   16│I11     │
       └─────────┘                      └─────────┘
```

U93 CNN1 10 NS — CAL22V10
- 2 I0/CLK — CLK4
- 3 I1 — RUN
- 4 I2 — ROW0-
- 5 I3 — READ
- 6 I4 — NREAD
- 7 I5 — OP1
- 9 I6 — SREN11-
- 10 I7 — PRAN-
- 11 I8 — INIT-
- 12 I9 — DENSR11-
- 13 I10 — SLT-
- 16 I11 — CREAD
- 27 IO0
- 26 IO1 — EN-
- 25 IO2 — NYLD110E-
- 24 IO3 — NCI110E-
- 23 IO4 — SDB110ET-
- 21 IO5 — SDB110ER-
- 20 IO6 — SDS110ET-
- 19 IO7 — SDS110ER-
- 18 IO8 — ABI110E1-
- 17 IO9 — ABH110E1-

U96 CNN1 10 NS — CAL22V10
- 2 I0/CLK — CLK1
- 3 I1 — RUN
- 4 I2 — COL0-
- 5 I3 — READ
- 6 I4 — NREAD
- 7 I5 — OP1
- 9 I6 — SREN0-
- 10 I7 — PRAN-
- 11 I8 — INIT-
- 12 I9 — DENSR0-
- 13 I10 — SLT-
- 16 I11 — CREAD
- 27 IO0
- 26 IO1 — EN-
- 25 IO2 — NYLD00E-
- 24 IO3 — NCI00E-
- 23 IO4 — SDB00ET-
- 21 IO5 — SDB00ER-
- 20 IO6 — SDS00ET-
- 19 IO7 — SDS00ER-
- 18 IO8 — ABI00E1-
- 17 IO9 — ABH00E1-

U94 CNN1 10 NS — CAL22V10
- 2 I0/CLK — CLK4
- 3 I1 — RUN
- 4 I2 — ROW1-
- 5 I3 — READ
- 6 I4 — NREAD
- 7 I5 — OP1
- 9 I6 — SREN10-
- 10 I7 — PRAN-
- 11 I8 — INIT-
- 12 I9 — DENSR10-
- 13 I10 — SLT-
- 16 I11 — CREAD
- 27 IO0
- 26 IO1 — EN-
- 25 IO2 — NYLD100E-
- 24 IO3 — NCI100E-
- 23 IO4 — SDB100ET-
- 21 IO5 — SDB100ER-
- 20 IO6 — SDS100ET-
- 19 IO7 — SDS100ER-
- 18 IO8 — ABI100E1-
- 17 IO9 — ABH100E1-

U97 CNN1 10 NS — CAL22V10
- 2 I0/CLK — CLK1
- 3 I1 — RUN
- 4 I2 — COL1-
- 5 I3 — READ
- 6 I4 — NREAD
- 7 I5 — OP1
- 9 I6 — SREN1-
- 10 I7 — PRAN-
- 11 I8 — INIT-
- 12 I9 — DENSR1-
- 13 I10 — SLT-
- 16 I11 — CREAD
- 27 IO0
- 26 IO1 — EN-
- 25 IO2 — NYLD10E-
- 24 IO3 — NCI10E-
- 23 IO4 — SDB10ET-
- 21 IO5 — SDB10ER-
- 20 IO6 — SDS10ET-
- 19 IO7 — SDS10ER-
- 18 IO8 — ABI10E1-
- 17 IO9 — ABH10E1-

U95 CNN1 10 NS — CAL22V10
- 2 I0/CLK — CLK7
- 3 I1 — RUN
- 4 I2 — ROW2-
- 5 I3 — READ
- 6 I4 — NREAD
- 7 I5 — OP1
- 9 I6 — SREN9-
- 10 I7 — PRAN-
- 11 I8 — INIT-
- 12 I9 — DENSR9-
- 13 I10 — SLT-
- 16 I11 — CREAD
- 27 IO0
- 26 IO1 — EN-
- 25 IO2 — NYLD9OE-
- 24 IO3 — NCI9OE-
- 23 IO4 — SDB9OET-
- 21 IO5 — SDB9OER-
- 20 IO6 — SDS9OET-
- 19 IO7 — SDS9OER-
- 18 IO8 — ABI9OE1-
- 17 IO9 — ABH9OE1-

U98 CNN1 10 NS — CAL22V10
- 2 I0/CLK — CLK2
- 3 I1 — RUN
- 4 I2 — COL2-
- 5 I3 — READ
- 6 I4 — NREAD
- 7 I5 — OP1
- 9 I6 — SREN2-
- 10 I7 — PRAN-
- 11 I8 — INIT-
- 12 I9 — DENSR2-
- 13 I10 — SLT-
- 16 I11 — CREAD
- 27 IO0
- 26 IO1 — EN-
- 25 IO2 — NYLD20E-
- 24 IO3 — NCI20E-
- 23 IO4 — SDB20ET-
- 21 IO5 — SDB20ER-
- 20 IO6 — SDS20ET-
- 19 IO7 — SDS20ER-
- 18 IO8 — ABI20E1-
- 17 IO9 — ABH20E1-

FIG. 42-2

U99 CE1 10 NS — CAL22V10

| Pin | In | | Pin | Out |
|---|---|---|---|---|
| 2 | CLK5 | I0/CLK | | |
| 3 | RUN | I1 | 27 | IO0 |
| 4 | ROW0- | I2 | 26 | IO1 |
| 5 | READ | I3 | 25 | IO2 SLT- |
| 6 | EREAD | I4 | 24 | IO3 EYLD30E- |
| 7 | OP1 | I5 | 23 | IO4 ECI30E- |
| 9 | SREN3- | I6 | 21 | IO5 SDB30ET- |
| 10 | PRAN- | I7 | 20 | IO6 SDB30ER- |
| 11 | INIT- | I8 | 19 | IO7 SDS30ET- |
| 12 | DENSR3- | I9 | 18 | IO8 SDS30ER- |
| 13 | SLT- | I10 | 17 | IO9 ABI30E1- |
| 16 | CREAD | I11 | | |

U102 CS1 10 NS — CAL22V10

| Pin | In | | Pin | Out |
|---|---|---|---|---|
| 2 | CLK8 | I0/CLK | 27 | IO0 SYLD60E- |
| 3 | RUN | I1 | 26 | IO1 SCI60E- |
| 4 | COL2- | I2 | 25 | IO2 SLT- |
| 5 | READ | I3 | 24 | IO3 BDS60ET- |
| 6 | SREAD | I4 | 23 | IO4 SDB60ET- |
| 7 | OP1 | I5 | 21 | IO5 SDB60ER- |
| 9 | SREN6- | I6 | 20 | IO6 SDS60ET- |
| 10 | PRAN- | I7 | 19 | IO7 SDS60ER- |
| 11 | INIT- | I8 | 18 | IO8 ABI60E1- |
| 12 | DENSR6- | I9 | 17 | IO9 BDS60ER- |
| 13 | SLT- | I10 | | |
| 16 | CREAD | I11 | | |

U100 CE1 10 NS — CAL22V10

| Pin | In | | Pin | Out |
|---|---|---|---|---|
| 2 | CLK6 | I0/CLK | | |
| 3 | RUN | I1 | 27 | IO0 |
| 4 | ROW1- | I2 | 26 | IO1 |
| 5 | READ | I3 | 25 | IO2 SLT- |
| 6 | EREAD | I4 | 24 | IO3 EYLD40E- |
| 7 | OP1 | I5 | 23 | IO4 ECI40E- |
| 9 | SREN4- | I6 | 21 | IO5 SDB40ET- |
| 10 | PRAN- | I7 | 20 | IO6 SDB40ER- |
| 11 | INIT- | I8 | 19 | IO7 SDS40ET- |
| 12 | DENSR4- | I9 | 18 | IO8 SDS40ER- |
| 13 | SLT- | I10 | 17 | IO9 ABI40E1- |
| 16 | CREAD | I11 | | |

U103 CS1 10 NS — CAL22V10

| Pin | In | | Pin | Out |
|---|---|---|---|---|
| 2 | CLK8 | I0/CLK | 27 | IO0 SYLD70E- |
| 3 | RUN | I1 | 26 | IO1 SCI70E- |
| 4 | COL1- | I2 | 25 | IO2 SLT- |
| 5 | READ | I3 | 24 | IO3 BDS70ET- |
| 6 | SREAD | I4 | 23 | IO4 SDB70ET- |
| 7 | OP1 | I5 | 21 | IO5 SDB70ER- |
| 9 | SREN7- | I6 | 20 | IO6 SDS70ET- |
| 10 | PRAN- | I7 | 19 | IO7 SDS70ER- |
| 11 | INIT- | I8 | 18 | IO8 ABI70E1- |
| 12 | DENSR7- | I9 | 17 | IO9 BDS70ER- |
| 13 | SLT- | I10 | | |
| 16 | CREAD | I11 | | |

U101 CE1 10 NS — CAL22V10

| Pin | In | | Pin | Out |
|---|---|---|---|---|
| 2 | CLK6 | I0/CLK | | |
| 3 | RUN | I1 | 27 | IO0 |
| 4 | ROW2- | I2 | 26 | IO1 |
| 5 | READ | I3 | 25 | IO2 SLT- |
| 6 | EREAD | I4 | 24 | IO3 EYLD50E- |
| 7 | OP1 | I5 | 23 | IO4 ECI50E- |
| 9 | SREN5- | I6 | 21 | IO5 SDB50ET- |
| 10 | PRAN- | I7 | 20 | IO6 SDB50ER- |
| 11 | INIT- | I8 | 19 | IO7 SDS50ET- |
| 12 | DENSR5- | I9 | 18 | IO8 SDS50ER- |
| 13 | SLT- | I10 | 17 | IO9 ABI50E1- |
| 16 | CREAD | I11 | | |

U104 CS1 10 NS — CAL22V10

| Pin | In | | Pin | Out |
|---|---|---|---|---|
| 2 | CLK7 | I0/CLK | 27 | IO0 SYLD80E- |
| 3 | RUN | I1 | 26 | IO1 SCI80E- |
| 4 | COL0- | I2 | 25 | IO2 SLT- |
| 5 | READ | I3 | 24 | IO3 BDS80ET- |
| 6 | SREAD | I4 | 23 | IO4 SDB80ET- |
| 7 | OP1 | I5 | 21 | IO5 SDB80ER- |
| 9 | SREN8- | I6 | 20 | IO6 SDS80ET- |
| 10 | PRAN- | I7 | 19 | IO7 SDS80ER- |
| 11 | INIT- | I8 | 18 | IO8 ABI80E1- |
| 12 | DENSR8- | I9 | 17 | IO9 BDS80ER- |
| 13 | SLT- | I10 | | |
| 16 | CREAD | I11 | | |

U111 CE2 10 NS — CAL22V10

| Pin | Signal | Pin | Signal |
|---|---|---|---|
| 2 | CLK5 (I0/CLK) | 27 | IO0 |
| 3 | RUN (I1) | 26 | IO1 |
| 4 | ROW0- (I2) | 25 | IO2 |
| 5 | AE3ECO- (I3) | 24 | IO3 |
| 6 | INIT- (I4) | 23 | IO4 — EREAD |
| 7 | OP1 (I5) | 21 | IO5 — EYLD30E- |
| 9 | SR3YLD- (I6) | 20 | IO6 — SR3YLD- |
| 10 | SREN3- (I7) | 19 | IO7 — AE3ECI- |
| 11 | EN- (I8) | 18 | IO8 — N3S1 |
| 12 | DENSR3- (I9) | 17 | IO9 — N3S0 |
| 13 | EUF- (I10) | | |
| 16 | ECI3OE- (I11) | | |

U114 CS2 10 NS — CAL22V10

| Pin | Signal | Pin | Signal |
|---|---|---|---|
| 2 | CLK6 (I0/CLK) | 27 | IO0 |
| 3 | RUN (I1) | 26 | IO1 |
| 4 | COL2- (I2) | 25 | IO2 — SREAD |
| 5 | SR6YLD- (I3) | 24 | IO3 — READ |
| 6 | OP1 (I4) | 23 | IO4 — INIT- |
| 7 | SCI6OE- (I5) | 21 | IO5 — SUF- |
| 9 | SREN6- (I6) | 20 | IO6 — SR6YLD- |
| 10 | PRAN- (I7) | 19 | IO7 — AE6SCI- |
| 11 | EN- (I8) | 18 | IO8 — N6S1 |
| 12 | SYLD6OE- (I9) | 17 | IO9 — N6S0 |
| 13 | DENSR6- (I10) | | |
| 16 | AE6SCO- (I11) | | |

U112 CE2 10 NS — CAL22V10

| Pin | Signal | Pin | Signal |
|---|---|---|---|
| 2 | CLK6 (I0/CLK) | 27 | IO0 |
| 3 | RUN (I1) | 26 | IO1 |
| 4 | ROW1- (I2) | 25 | IO2 |
| 5 | AE4ECO- (I3) | 24 | IO3 |
| 6 | INIT- (I4) | 23 | IO4 — EREAD |
| 7 | OP1 (I5) | 21 | IO5 — EYLD4OE- |
| 9 | SR4YLD- (I6) | 20 | IO6 — SR4YLD- |
| 10 | SREN4- (I7) | 19 | IO7 — AE4ECI- |
| 11 | EN- (I8) | 18 | IO8 — N4S1 |
| 12 | DENSR4- (I9) | 17 | IO9 — N4S0 |
| 13 | EUF- (I10) | | |
| 16 | ECI4OE- (I11) | | |

U115 CS2 10 NS — CAL22V10

| Pin | Signal | Pin | Signal |
|---|---|---|---|
| 2 | CLK7 (I0/CLK) | 27 | IO0 |
| 3 | RUN (I1) | 26 | IO1 |
| 4 | COL1- (I2) | 25 | IO2 — SREAD |
| 5 | SR7YLD- (I3) | 24 | IO3 — READ |
| 6 | OP1 (I4) | 23 | IO4 — INIT- |
| 7 | SCI7OE- (I5) | 21 | IO5 — SUF- |
| 9 | SREN7- (I6) | 20 | IO6 — SR7YLD- |
| 10 | PRAN- (I7) | 19 | IO7 — AE7SCI- |
| 11 | EN- (I8) | 18 | IO8 — N7S1 |
| 12 | SYLD7OE- (I9) | 17 | IO9 — N7S0 |
| 13 | DENSR7- (I10) | | |
| 16 | AE7SCO- (I11) | | |

U113 CE2 10 NS — CAL22V10

| Pin | Signal | Pin | Signal |
|---|---|---|---|
| 2 | CLK6 (I0/CLK) | 27 | IO0 |
| 3 | RUN (I1) | 26 | IO1 |
| 4 | ROW2- (I2) | 25 | IO2 |
| 5 | AE5ECO- (I3) | 24 | IO3 |
| 6 | INIT- (I4) | 23 | IO4 — EREAD |
| 7 | OP1 (I5) | 21 | IO5 — EYLD5OE- |
| 9 | SR5YLD- (I6) | 20 | IO6 — SR5YLD- |
| 10 | SREN5- (I7) | 19 | IO7 — AE5ECI- |
| 11 | EN- (I8) | 18 | IO8 — N5S1 |
| 12 | DENSR5- (I9) | 17 | IO9 — N5S0 |
| 13 | EUF- (I10) | | |
| 16 | ECI5OE- (I11) | | |

U116 CS2 10 NS — CAL22V10

| Pin | Signal | Pin | Signal |
|---|---|---|---|
| 2 | CLK7 (I0/CLK) | 27 | IO0 |
| 3 | RUN (I1) | 26 | IO1 |
| 4 | COL0- (I2) | 25 | IO2 — SREAD |
| 5 | SR8YLD- (I3) | 24 | IO3 — READ |
| 6 | OP1 (I4) | 23 | IO4 — INIT- |
| 7 | SCI8OE- (I5) | 21 | IO5 — SUF- |
| 9 | SREN8- (I6) | 20 | IO6 — SR8YLD- |
| 10 | PRAN- (I7) | 19 | IO7 — AE8SCI- |
| 11 | EN- (I8) | 18 | IO8 — N8S1 |
| 12 | SYLD8OE- (I9) | 17 | IO9 — N8S0 |
| 13 | DENSR8- (I10) | | |
| 16 | AE8SCO- (I11) | | |

FIG.46-2
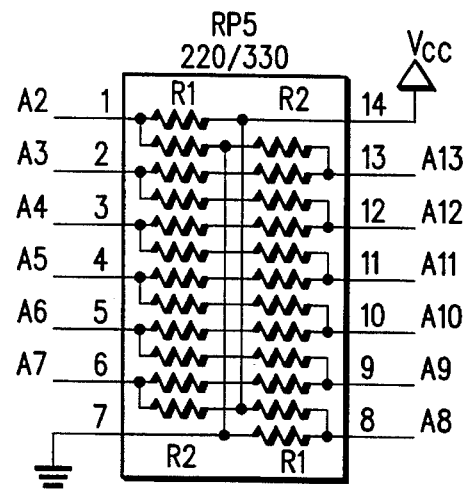
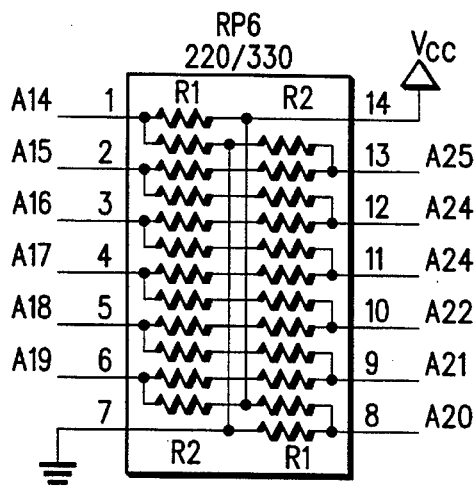
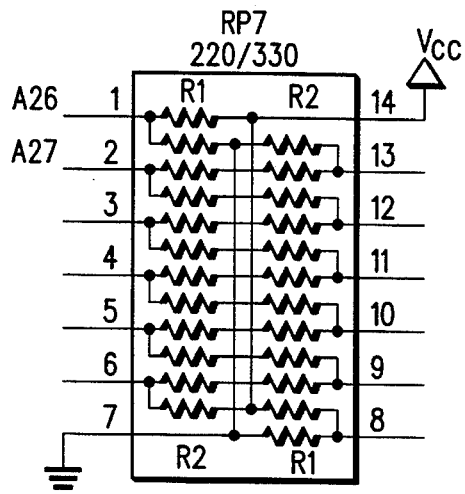
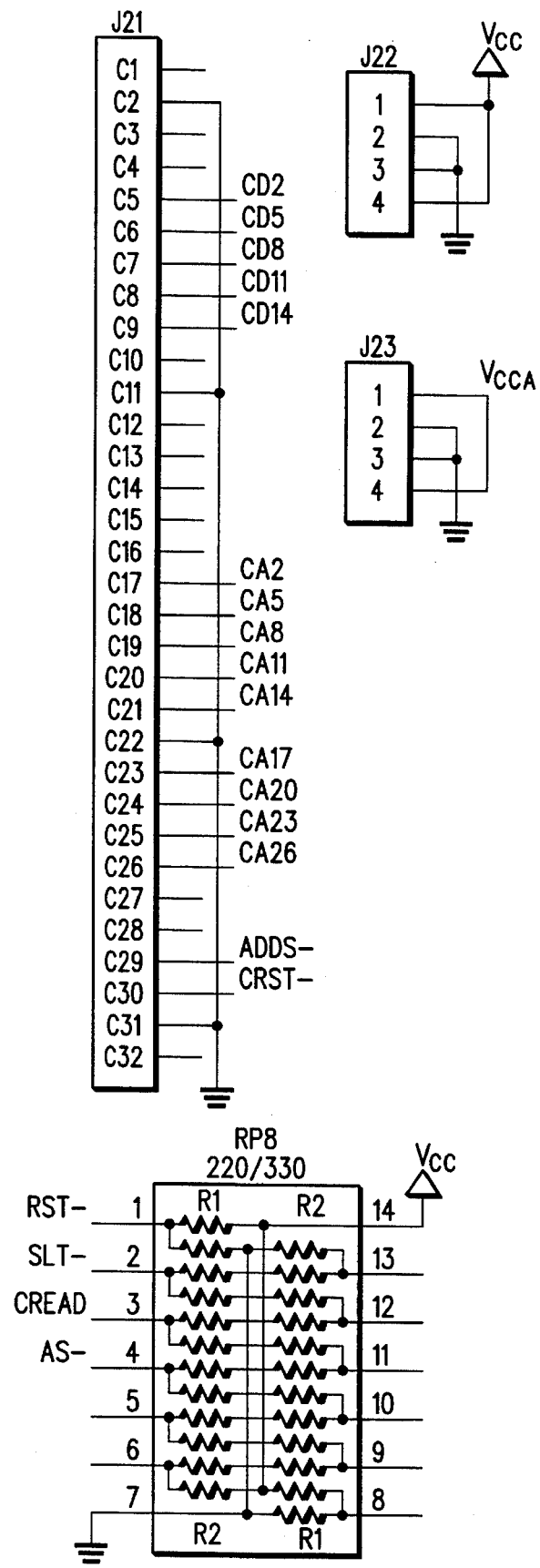

PARTS LIST FOR SCHEMATIC DIAGRAM OF DATA PROCESSING SYSTEM 210 (SEE FIG.32 THROUGH FIG.49-2)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 1 | TC74AC125FN | QUAD BUS BUFFER | 74AC125 | | | | | | SOIC N | TOS | U76 |
| 2 | C0805C220Z5UAC | CAPACITOR, CER | | | 22PF | +/-20% | 50V | | 0805 | KEM | C84, C85, C86, C87, C88 |
| 75 | C1206C104Z5UAC | CAPACITOR, CER | | | .1 | +/-20% | 50V | | 1206 | KEM | C83, C82, C79, C78, C75, C74, C71, C70, C67, C66, C63, C62, C59, C58, C55, C54, C51, C50, C47, C46, C43, C42, C39, C38, C35, C34, C31, C30, C27, C26, C23, C22, C19, C18, C15, C14, C81, C80, C77, C76, C73, C72, C69, C68, C65, C64, C61, C60, C57, C56, C53, C52, C49, C48, C45, C44, C41, C40, C37, C36, C33, C32, C29, C28, C25, C24, C21, C20, C17, C16, C13, C12, C11 |

FIG.50A

PARTS LIST FOR SCHEMATIC DIAGRAM OF DATA PROCESSING SYSTEM 210 (SEE FIG.32 THROUGH FIG.49-2)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 1 | C1206C106Z5UAC | CAPACITOR, CER | | | 10 | +/-20% | 50V | | 1206 | KEM | C86 |
| 8 | C1206CVVVZ5UAC | CAPACITOR, CER | | | .01 | +/-20% | 50V | | 1206 | KEM | C96, C95, C94, C93, C92, C91, C90, C89 |
| 9 | T491C106M016AS | CAPACITOR, TANT | | | 10 | +/-20% | 16V | | 6032 | KEM | C9, C8, C7, C4, C5, C3, C2, C10, C1 |
| 12 | MCM62950AFN-17 | STATIC RAM 32K x 9 | 62950 | 17 NS | | | | | PLCC | MOT | U8, U55, U50, U45, U40, U35, U30, U3, U26, U22, U18, U13 |
| 20 | 102944-8 | HEADER ASSY, UNSHD, 2 ROW, 16 POS | | | | | | | | AMP | J9, J8, J7, J6, J5, J4, J3, J20, J2, J19, J18, J17, J16, J15, J14, J13, J12, J11, J10, J1 |
| 2 | 641737-1 | HEADER ASSY, PWB, PIN, 4 POS, RT A | | | | | | | | AMP | J23, J22 |
| 1 | MC096-012-2 | | | | | | | | | TB | J21 |
| 4 | MC74F138D | 1-OF-8 DECODER | 74F138 | | | | | | SOICN | MOT | U89, U88, U87, U86 |
| 1 | MC74F139D | DUAL 1-OF-4 DECODER | 74F139 | | | | | | SOICN | MOT | U85 |
| 6 | N74F579D | COUNTER, BIN, 8-BIT, BIDIR | 74F579 | | | | | | SOICW | MOT | U144, U143, U140, U139, U137, U136 |

PARTS LIST FOR SCHEMATIC DIAGRAM OF DATA PROCESSING SYSTEM 210 (SEE FIG.32 THROUGH FIG.49-2)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 10 | N74F579D | COUNTER, BIN, 8-BIT, BIDIR | 74F579 | | | | | | SOICW | MOT | U133, U132, U130, U129, U126, U125, U123, U122, U119, U118 |
| 14 | IDT74FCT16244CT | 16-BIT BUFFER/LINE DRIVER, INVERT | 74FCT16244 | | | | | | SSOP | IDT | U91, U90, U6, U53, U48, U43, U38, U33, U28, U24, U20, U16, U11, U1 |
| 9 | IDT74FCT16245CT | 16-BIT BUS XCEIVER | 74FCT16245 | | | | | | SSOP | IDT | U92, U142, U138, U135, U131, U128, U124, U121, U117 |
| 1 | IDT49FCT805ASO | BUFFER/CLOCK DRIVER | 49FCT805A | | | | | | SOICW | IDT | U157 |
| 6 | IDT74FCT827ASO | 10-BIT BUFFER | 74FCT827A | | | | | | SOICW | IDT | U9, U56, U51, U46, U4, U14 |
| 18 | IDT74FCT845SO | LATCH, OCTAL, 8 BIT | 74FCT845 | | | | | | SOICW | IDT | U75, U74, U73, U72, U71, U70, U69, U68, U67, U66, U65, U64, U63, U62, U61, U60, U59, U58 |

PARTS LIST FOR SCHEMATIC DIAGRAM OF DATA PROCESSING SYSTEM 210 (SEE FIG. 32 THROUGH FIG. 49-2)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 27 | AM29C863ASC | 9-BIT XCEIVER | 74FCT863A | | | | | | SOICW | AMD | U7, U57, U54, U52, U5, U49, U47, U44, U42, U41, U39, U37, U36, U34, U32, U31, U29, U27, U25, U23, U21, U2, U19, U17, U15, U12, U10 |
| 3 | | EPLD, GAL22V10 | CE1 | 10 NS | | | | | PLCC | MOT | U99, U101, U100 |
| 3 | | EPLD, GAL22V10 | CE2 | 10 NS | | | | | PLCC | MOT | U113, U112, U111 |
| 6 | | EPLD, GAL22V10 | CNW1 | 10 NS | | | | | PLCC | MOT | U98, U97, U96, U95, U94, U93 |
| 6 | | EPLD, GAL22V10 | CNW2 | 10 NS | | | | | PLCC | MOT | U110, U109, U108, U107, U106, U105 |
| 3 | | EPLD, GAL22V10 | CS1 | 10 NS | | | | | PLCC | MOT | U104, U103, U102 |
| 3 | | EPLD, GAL22V10 | CS2 | 10 NS | | | | | PLCC | MOT | U116, U115, U114 |
| 2 | | EPLD, GAL22V10 | EED1* | 10 NS | | | | | PLCC | MOT | U79, U134 |
| 1 | | EPLD, GAL22V10 | G1 | 10 NS | | | | | PLCC | MOT | U81 |
| 1 | | EPLD, GAL22V10 | G2 | 10 NS | | | | | PLCC | MOT | U82 |
| 1 | | EPLD, GAL22V10 | G3 | 10 NS | | | | | PLCC | MOT | U83 |
| 1 | | EPLD, GAL22V10 | G4 | 10 NS | | | | | PLCC | MOT | U84 |

FIG. 50D

PARTS LIST FOR SCHEMATIC DIAGRAM OF DATA PROCESSING SYSTEM 210 (SEE FIG.32 THROUGH FIG.49-2)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 4 | NWED2 | EPLD, GAL22V10 | NWED1* | 10 NS | | | | | PLCC | MOT | U78, U77, U127, U120 |
| 2 | SED2 | EPLD, GAL22V10 | CE2 | 10 NS | | | | | PLCC | MOT | U80, U141 |
| 1 | MM18M1C3A-2.0 | CRYSTAL, SER, 300 OHMS | | | 2 MHZ | | | | HC18U | MON | Y1 |
| 16 | HLMP-1620 | LED, INTERNAL RESISTOR, GREEN | | | | | | | T1 | HP | CR9, CR8, CR7, CR6, CR5, CR4, CR3, CR2, CR16, CR15, CR14, CR13, CR12, CR11, CR10, CR1 |
| 1 | MC88916DW | PLL CLOCK DRIVER | MC88916 | | | | | | SOICW | MOT | U156 |
| 9 | | NEUTRAL NET PROCESSOR (ASSOCIATION ENGINE) | MC AE | | | | | | PLCC | MOT | U153, U152, U151, U150, U149, U148, U147, U146, U145 |
| 1 | MOT-004 | PWB, MOTOROLA, AE TEST CARD | | | | | | | | MOT | A1 |
| 1 | CRCW0805470JB02 | RESISTOR, THICK FILM | | | 47 | 5% | 100V | .063W | 0805 | DAL | R5 |
| 8 | CRCW1206101JB02 | RESISTOR, THICK FILM | | | 100 | 5% | 200V | .125W | 1206 | DAL | R17, R16, R15, R14, R13, R12, R11, R10 |
| 2 | CRCW1206103JB02 | RESISTOR, THICK FILM | | | 10K | 5% | 200V | .125W | 1206 | DAL | R2, R1 |
| 1 | CRCW1206105JB02 | RESISTOR, THICK FILM | | | 1M | 5% | 200V | .125W | 1206 | DAL | R3 |
| 1 | CRCW1206331JB02 | RESISTOR, THICK FILM | | | 330 | 5% | 200V | .125W | 1206 | DAL | R8 |

FIG.50E

PARTS LIST FOR SCHEMATIC DIAGRAM OF DATA PROCESSING SYSTEM 210 (SEE FIG.32 THROUGH FIG.49-2)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 1 | CRCW120647OJB02 | RESISTOR, THICK FILM | | | 47 | 5% | 200V | .125W | 1206 | DAL | R6 |
| 1 | CRCW1206472JB02 | RESISTOR, THICK FILM | | | 4.7K | 5% | 200V | .125W | 1206 | DAL | R9 |
| 1 | CRCW1206474JB02 | RESISTOR, THICK FILM | | | 470K | 5% | 200V | .125W | 1206 | DAL | R7 |
| 1 | CRCW1206501JB02 | RESISTOR, THICK FILM | | | 500 | 5% | 200V | .125W | 1206 | DAL | R4 |
| 4 | SOMC1601I103G | RNET, 16 PIN, 15 RES | | | 10K | 2% | 50V | .125W | SOICM | DAL | RP4, RP3, RP2, RP1 |
| 2 | SOMC1601VVVG | RNET, 16 PIN, 15 RES | | | 1K | 2% | 50V | .125W | SOICM | DAL | RP11, RP10 |
| 4 | 4814P003220-330 | RNET, 14 PIN, TERM | | | 220/330 | 2% | 100V | .120W | SOICM | BOU | RP8, RP7, PR6, RP5 |
| 36 | 213-028-602 | SOCKET, PLCC, 28 POS, SMT, W/O PEGS | | | | | | | | MET | XU212, CU211, XU210, XU209, XU208, XU207, XU206, XU205, XU204, XU169, XU159, XU155, XU145, XU132, XU131, XU130, XU129, XU128, XU127, XU126, XU125, XU124, XU123, XU122, XU121, XU120, XU119, XU118, XU117, XU116, XU115, XU114, XU113, XU112, XU111, XU110 |

FIG.50F

PARTS LIST FOR SCHEMATIC DIAGRAM OF DATA PROCESSING SYSTEM 210 (SEE FIG.32 THROUGH FIG.49-2)

| QUANTITY | PART NUMBER | DESCRIPTION | SCHEMATIC NAME | SPEED | VALUE | TOLERANCE | VOLTAGE | WATTAGE | PACKAGE TYPE | MANUFACTURER | SCHEMATIC REFERENCE DESIGNATOR |
|---|---|---|---|---|---|---|---|---|---|---|---|
| 9 | PLCC-84-1.27-01 | SOCKET, PLCC, 84 POS, THRU | | | | | | | | DAI | XU192, XU191, XU190, XU189, XU188, XU187, XU186, XU185, XU184 |
| 1 | 916091-3 | SOCKET, DIP, 84 POS, OPEN | | | | | | | | AMP | XU200 |
| 1 | PROM | PROM 32K X 1 | PROM | | | | | | DIP3 | MOT | U154 |
| 1 | XC2064-70PC68C | LOGIC CELL ARRAY | XC2064 | 70 MHZ | | | | | PLCC | XIL | U155 |

*FIG.50G*

MULTI-PROCESSOR DATA PROCESSING SYSTEM HAVING MULTIPLE PORTS COUPLED TO MULTIPLE INTERFACE CIRCUITS

REFERENCE TO RELATED APPLICATIONS

The present application is related to the following U.S. patent applications:

Ser. No. 08/506,257, titled "A METHOD FOR COMPLEX DATA MOVEMENT IN A MULTI-PROCESSOR DATA PROCESSING SYSTEM", filed Jul. 24, 1995, invented by Michael F. Wiles et al; and Ser. No. 08/270,981, titled "METHOD AND APPARATUS FOR PROVIDING BUS PROTOCOL SIMULATION", filed Jul. 5, 1994, invented by Michael F. Wiles et al.

FIELD OF THE INVENTION

The present invention relates in general to a data processing system, and more particularly to a multi-processor data processing system.

BACKGROUND OF THE INVENTION

Fuzzy logic, neural networks, and other parallel, array oriented applications are becoming very popular and important in data processing. Most digital data processing systems today have not been designed with fuzzy logic, neural networks, and other parallel, array oriented applications specifically in mind. Thus there are considerable performance and cost benefits to be gained in designing digital data processing systems which are especially adapted and designed to meet the requirements of fuzzy logic, neural networks, and other parallel, array oriented applications.

SUMMARY OF THE INVENTION

The previously mentioned needs are fulfilled and other advantages achieved with the present invention. In one form, the present invention is a multi-processor data processing system. In one embodiment, the present invention is a multi-processor data processing system which has a processor array. The processor array has a plurality of processors, a north array port, an east array port, a south array port, and a west array port. The multi-processor data processing system also has first interface circuitry which is coupled to the east array port, and second interface circuitry which is coupled to the south array port.

The multi-processor data processing system has an address bus which is coupled to the first interface circuitry, to the second interface circuitry, to the north array port, and to the west array port. The multi-processor data processing system has a data bus which is coupled to the first interface circuitry and to the second interface circuitry. The multi-processor data processing system has a control bus which is coupled to the first interface circuitry, to the second interface circuitry, to the north array port, and to the west array port. The multi-processor data processing system also has a bus interface controller which is coupled to the address bus, to the data bus, and to the control bus. The bus interface controller initiates a first transfer of information in the multi-processor data processing system.

The present invention will be understood by one skilled in the art from the detailed description below in conjunction with the accompanying drawings.

BRIEF DESCRIPTION OF THE DRAWINGS

FIG. 12-1 illustrates, in block diagram form, bus protocol simulation logic (BPS) of FIG. 11 in accordance with one embodiment of the present invention;

FIG. 12-2 illustrates, in block diagram form, a portion of memory 290 of FIG. 12-1 in accordance with one embodiment of the present invention;

FIG. 12-3 illustrates, in block diagram form, a transpose data movement pattern in accordance with one embodiment of the present invention;

FIG. 12-4 illustrates, in block diagram form, a ping-pong data movement pattern in accordance with one embodiment of the present invention;

FIG. 12-5 illustrates, in block diagram form, a checkerboard data movement pattern in accordance with one embodiment of the present invention;

FIGS. 13 through 30B illustrate, in schematic diagram form, a data processing system 10 of FIG. 1 in accordance with one embodiment of the present invention;

FIGS. 31A through 31G illustrate, in tabular form, a parts list for the schematic diagram of data processing system 10 of FIGS. 13 through 30B in accordance with one embodiment of the present invention;

FIGS. 32 through 49-2 illustrate, in schematic diagram form, a data processing system 210 of FIG. 9 in accordance with one embodiment of the present invention; and FIGS. 50A through 50G illustrate, in tabular form, a parts list for the schematic diagram of data processing system 210 of FIGS. 32 through 49-2 in accordance with one embodiment of the present invention.

DESCRIPTION OF THE PREFERRED EMBODIMENTS

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. The symbol "%" preceding a number indicates that the number is represented in its binary or base two form. The symbol "$" preceding a number indicates that the number is represented in its hexadecimal or base sixteen form.

FIGS. 1 through 8 illustrate a high level block diagram of one embodiment of data processing system 10. For more detail, refer to the complete board level schematic of data processing system 10 illustrated in FIGS. 13 through 31G. FIGS. 9 through 12-2 illustrate a high level block diagram of one embodiment of data processing system 210. For more detail, refer to the complete board level schematic of data processing system 210 illustrated in FIGS. 32 through 50G.

Figure 1:
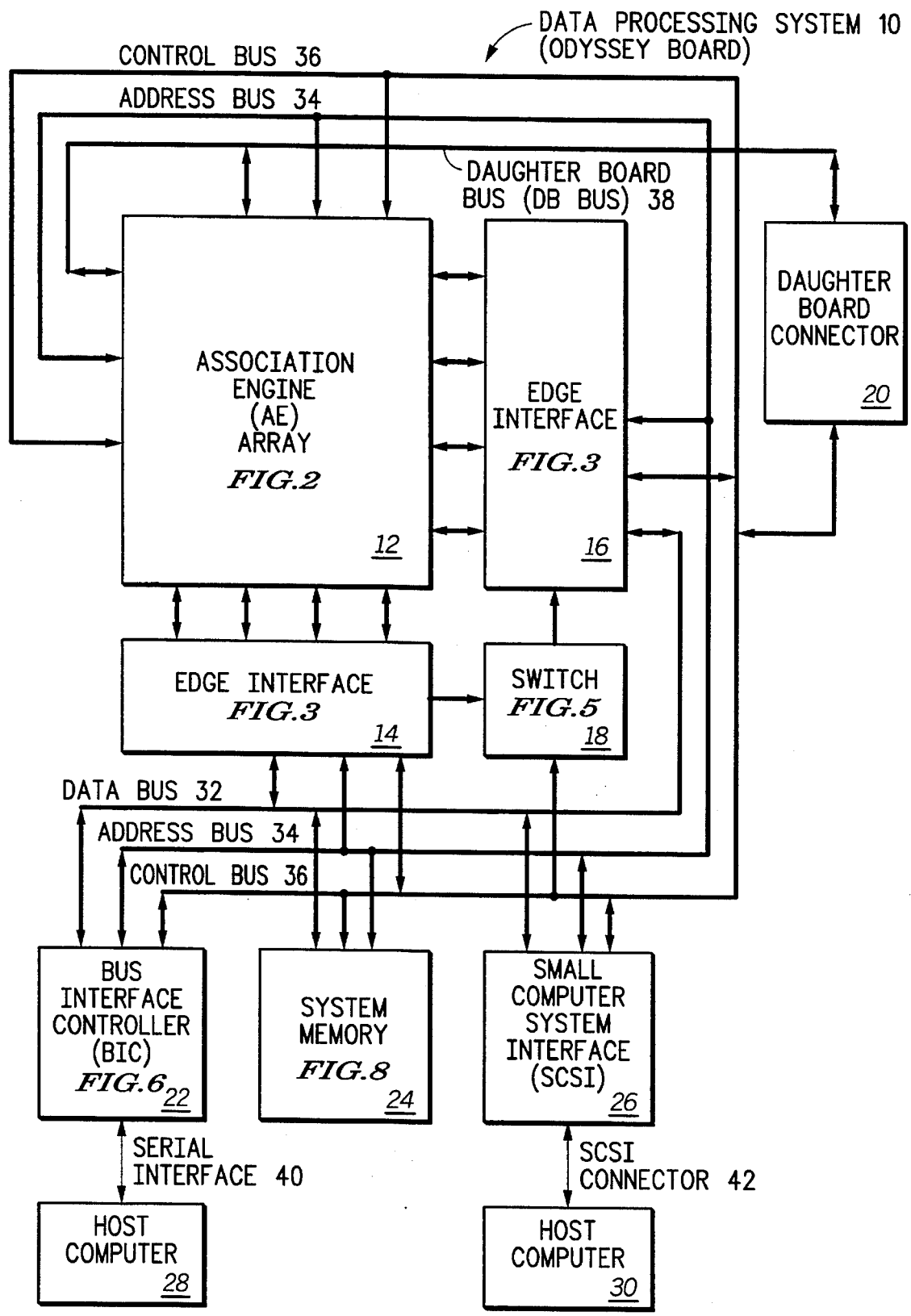
FIG. 1 illustrates, in block diagram form, a data processing system 10 in accordance with one embodiment of the present invention.

FIG. 1 illustrates one embodiment of a data processing system 10. Data processing system 10 has an Association Engine (AE) array 12, an edge interface circuit 14, an edge interface circuit 16, a switch circuit 18, a daughter board electrical connector 20, a system memory circuit 24, a host computer 28 coupled to a bus interface controller (BIC) circuit 22 by way of serial interface 40, and a host computer 30 coupled to a small computer system interface (SCSI) circuit 26 by way of SCSI connector 42.

The north and west ports of the AE array 12 are coupled to a control bus 36, an address bus 34, and a daughter board connector 20. Edge interface 14 is bi-directionally coupled to the south port of AE array 12. Edge interface 16 is bi-directionally coupled to the east port of AE array 12. Edge interface 14 is bi-directionally coupled to data bus 32 and to control bus 36, and is coupled to receive information from address bus 34. Edge interface 16 is bi-directionally coupled to data bus 32 and to control bus 36, and is coupled to receive information from address bus 34. Daughter board connector 20 is bi-directionally coupled to daughter board bus (DB bus) 38 and to control bus 36.

Bus interface controller 22 is bi-directionally coupled to data bus 32, address bus 34, and control bus 36. System memory 24 is bi-directionally coupled to data bus 32, and is coupled to receive information from address bus 34 and control bus 36. The SCSI circuit 26 is bi-directionally coupled to data bus 32, address bus 34, and control bus 36. Switch 18 receives control information from control bus 36, receives data from edge interface 14, and provides information to edge interface 16.

Host computer 30 includes a hard disk drive with a SCSI interface (not shown). In an alternate embodiment of the present invention, bus interface controller 22 and SCSI circuit 26 may be coupled to the same host computer 30. In yet other embodiments of the present invention, only one of host computer 28 and host computer 30 may be present.

In one embodiment of the present invention, bus interface controller 22 is a data processor which is capable of executing software instructions. The software instructions are used to control the transfer of information across the data bus 32, the address bus 34, and the control bus 36. Instructions and/or data may be downloaded to the bus interface controller 22 from the host computer 28 by way of serial interface 40. Data may then be transferred back to the host computer 28 from the bus interface controller 22 by way of the serial interface 40. The system memory 24 may be used to store software instructions and/or data. The SCSI circuit 26 may be used to transfer software instructions and/or data from the host computer 30 by way of SCSI connector 42. Data may then be transferred back to the host computer 30 from the SCSI circuit 26 by way of the SCSI connector 42.

Daughter board connector 20 may be used to input and output data to and from a daughter board (not shown). The configuration of the optional daughter board will be determined by the particular application in which data processing system 10 is being used. Edge interfaces 14 and 16 provide the ability to interface two different bus types operating at potentially different frequencies. The AE array 12 requires a particular bus protocol in order to communicate information between the AE array 12 and the edge interfaces 14 and 16. The data bus 32, the address bus 34, and the control bus 36 require a different protocol from the AE array 12 in order to communicate information between the busses 32, 34, and 36 and the edge interfaces 14 and 16. The edge interfaces 14 and 16 therefore must be able to communicate using the two different bus protocols.

Figure 2:
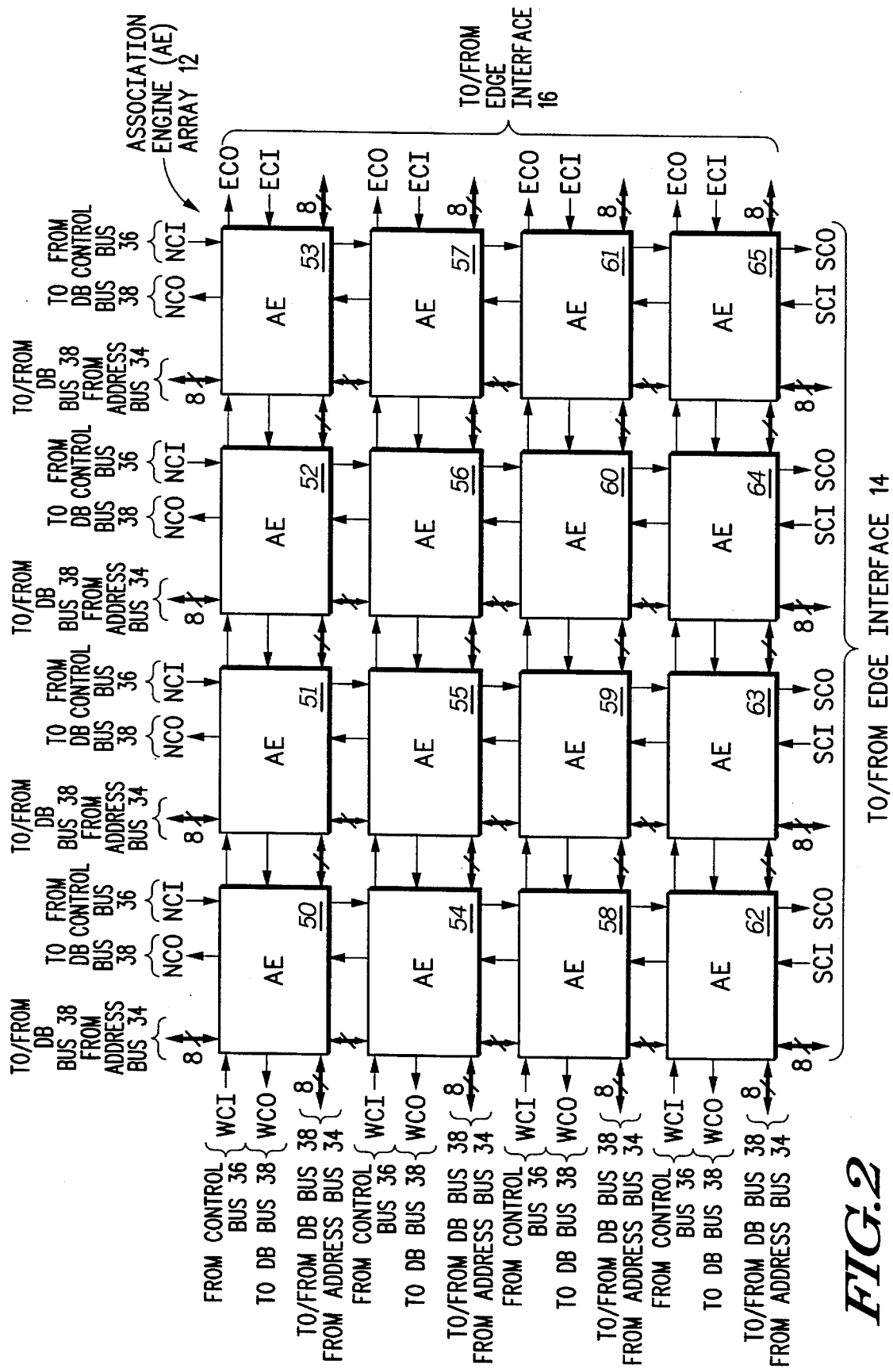
FIG. 2 illustrates, in block diagram form, an array of processors (AEs) of FIG. 1 in accordance with one embodiment of the present invention.

FIG. 2 illustrates one embodiment of an array of processors (AEs) 12 of FIG. 1. Each Association Engine integrated circuit 50–65 is merely one embodiment of a data processor which may be used to form array 12. Other data processors may be used to form array 12 in FIG. 1. A detailed description of the structure and operation of the Association Engine data processor is described in a related, copending application entitled "A Data Processing System And Method Thereof", invented by Michael G. Gallup et al., having Ser. No. 08/040,779, filed Mar. 31, 1993, and assigned to the assignee hereof, which is expressly incorporated by this reference.

The combined north ports of AE processors 50–53 form a north array port of AE array 12. The combined south ports of AE processors 62–65 form a south array port of AE array 12. The combined west ports of AE processors 50, 54, 58, and 62 form a west array port of AE array 12. The combined east ports of AE processors 53, 57, 61, and 65 form an east array port of AE array 12. Although the illustrated embodiment of AE array 12 illustrates a four column by four row array of AE processors 50–65, an alternate embodiment of the present invention may use any number of rows and any number of columns.

Note that each AE processor 50–65 provides a busy signal, $\overline{BUSY}$ (not shown), and an interrupt signal, $\overline{INTR}$ (not shown), to the edge interfaces 14 and 16. The busy signal and the interrupt signal are not wire-ORed together. Also, each AE processor 50–65 has an enable pin, $\overline{EN}$ (not shown), all of which are wired-ORed together and coupled to edge interfaces 14 and 16. Each AE processor 50–65 has an access type pin, $\overline{OP}$ (not shown), all of which are wired-ORed together and coupled to edge interfaces 14 and 16. Each AE processor 50–65 has a read/write control pin, $R/\overline{W}$ (not shown), all of which are wired-ORed together and coupled to edge interfaces 14 and 16. And each AE processor 50–65 has a run/stop pin, $R/\overline{S}$ (not shown), all of which are wired-ORed together and coupled to edge interfaces 14 and 16.

Figure 3:
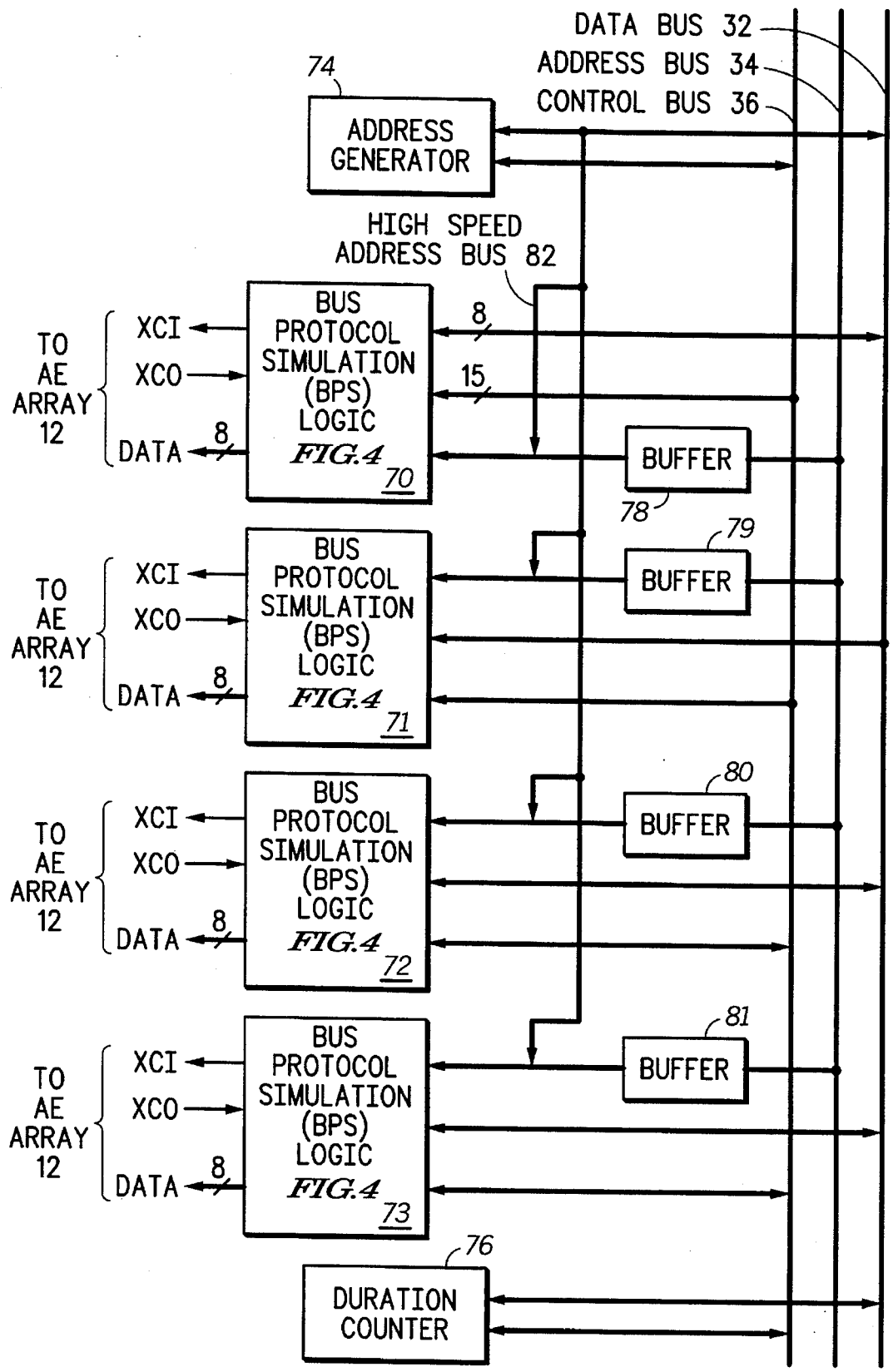
FIG. 3 illustrates, in block diagram form, an edge interface of FIG. 1 in accordance with one embodiment of the present invention.

FIG. 3 illustrates one embodiment of edge interface circuits 14 and 16 of FIG. 1. Edge interface circuits 14 and 16 each have bus protocol simulation logic circuits 70–73, address generator circuit 74, duration counter circuit 76, buffer circuit 78–81, and high speed address bus 82, which are coupled as illustrated in FIG. 3. Note that the term "X" in signal names "XCI" and "XCO" is used as a variable. For edge interface 14, which is coupled to the south array port, "XCI" represents "SCI", and for edge interface 16, which is coupled to the east array port, "XCI" represent "ECI". Likewise, for edge interface 14, which is coupled to the south array port, "XCO" represents "SCO", and for edge interface 16, which is coupled to the east array port, "XCO" represent "ECO". Also note that in one embodiment of the present invention, the "XCI" and "XCO" signals are active low.

Figure 4:
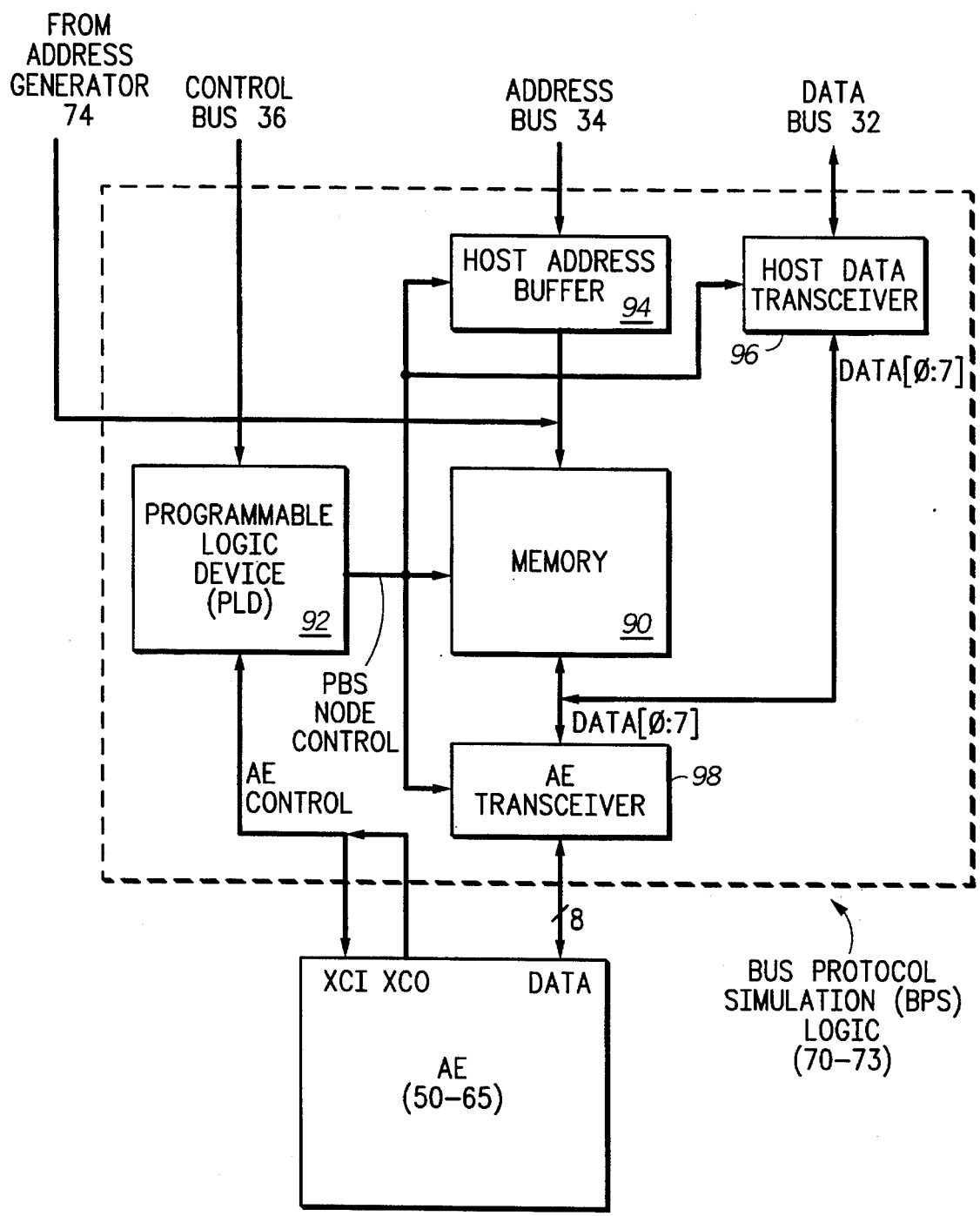
FIG. 4 illustrates, in block diagram form, bus protocol simulation logic (BPS) of FIG. 3 in accordance with one embodiment of the present invention.

FIG. 4 illustrates one embodiment of bus protocol simulation logic circuits 70–73 of FIG. 3. Bus protocol simulation logic circuits 70–73 each have a memory circuit 90, a programmable logic device circuit (PLD) 92, a host address buffer circuit 94, a host data transceiver circuit 96, and an AE transceiver circuit 98, which are coupled as illustrated in FIG. 4. Note that in one embodiment of the present invention, the memory 90 is a byte wide memory storing data bits[0:7], which is the same width as the data path between each AE processor 50–65. Note that each bus protocol simulation logic circuit 70–73 is coupled to one port of a corresponding one of the AE processors 50–65.

Figure 5:
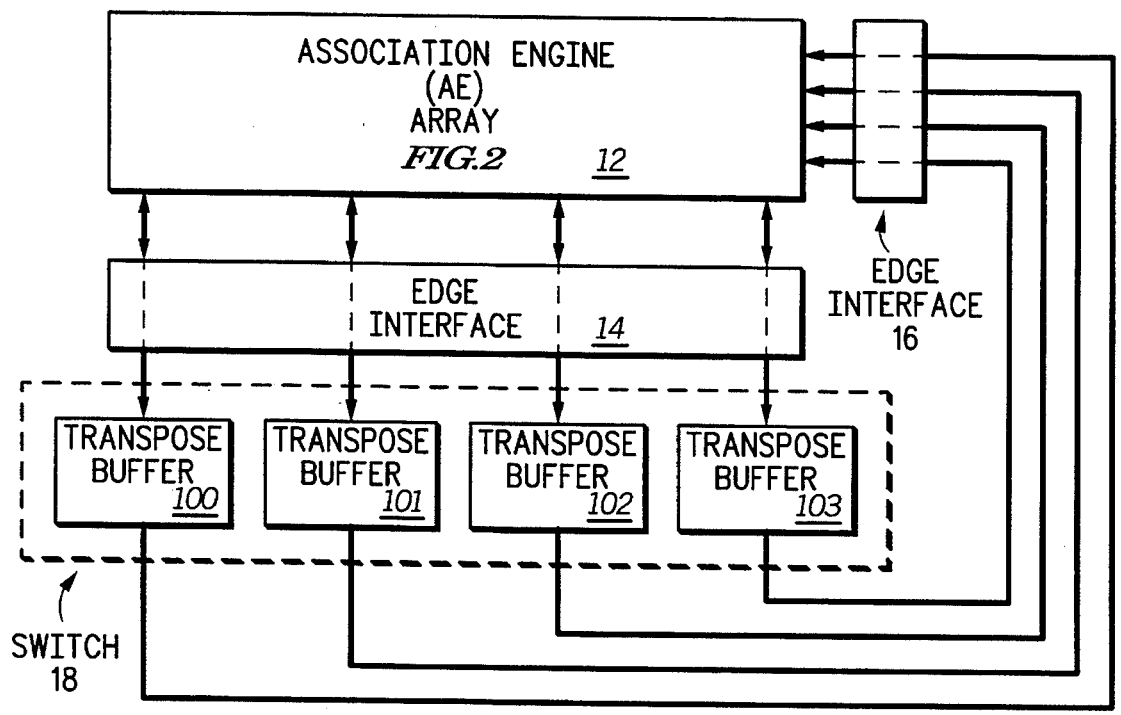
FIG. 5 illustrates, in block diagram form, a portion of data processing system 10 of FIG. 1.

FIG. 5 illustrates one embodiment of switch 18 of FIG. 1. Switch 18 has a plurality of transpose buffer circuits 100–103, which are coupled to edge interface 14 and edge interface 16.

Figure 6:
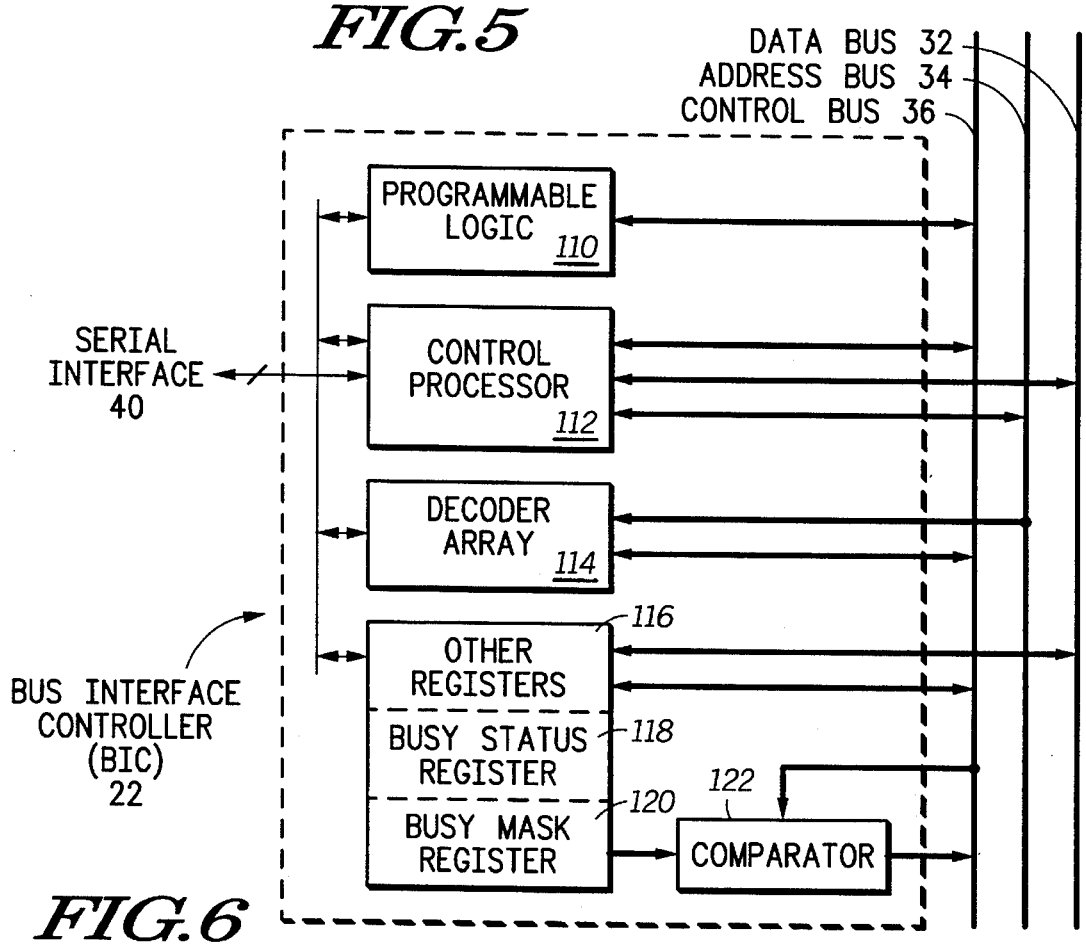
FIG. 6 illustrates, in block diagram form, a bus interface controller (BIC) of FIG. 1 in accordance with one embodiment of the present invention.

FIG. 6 illustrates one embodiment of bus interface controller 22 of FIG. 1. Bus interface controller 22 has a programmable logic circuit 110, a control processor 112, a decoder array 114, and a plurality of registers, including other registers 116, busy status register 118, busy mask register 120, and comparator 122, which are coupled as illustrated in FIG. 6.

Figure 7:
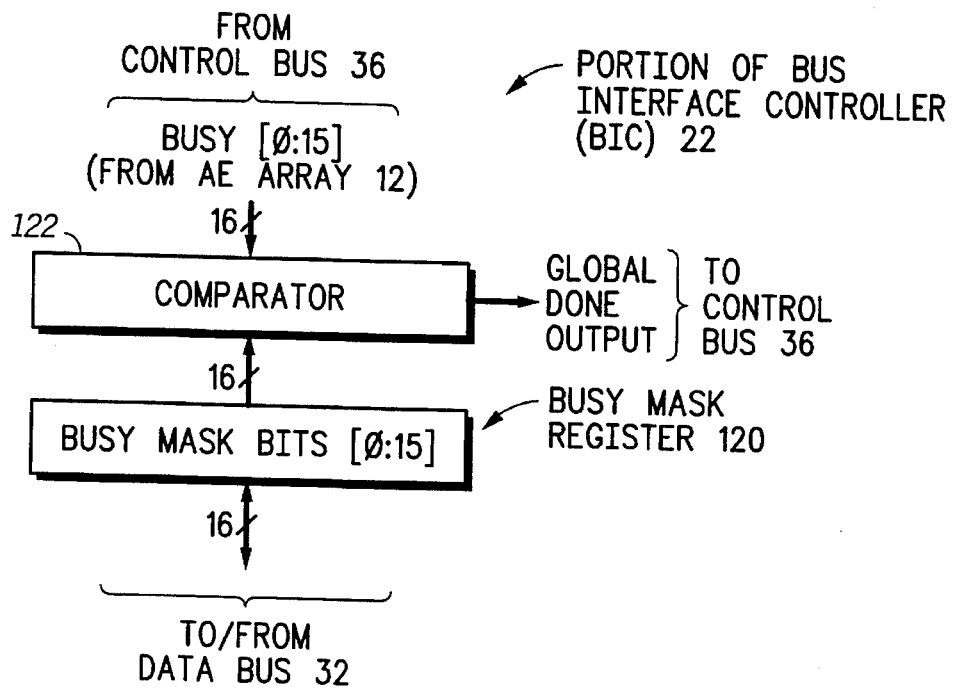
FIG. 7 illustrates, in block diagram form, a portion of the bus interface controller (BIC), the control bus, and the data bus of FIG. 6 in accordance with one embodiment of the present invention.

FIG. 7 illustrates one embodiment of a portion of bus interface controller 22 of FIG. 6. Busy mask register 120 stores a plurality of busy mask bits[0:15]. Each AE processor 50–65 provides one busy signal to comparator 122. If the busy mask bit for the corresponding AE processor 50–65 is negated, then the busy signal for that AE processor 50–65 is excluded from the comparison. Comparator 122 compares the non-excluded busy signals and asserts the global done output signal when all non-excluded busy signals have been negated, indicating that all of the non-excluded AE processors have completed operation.

Figure 8:
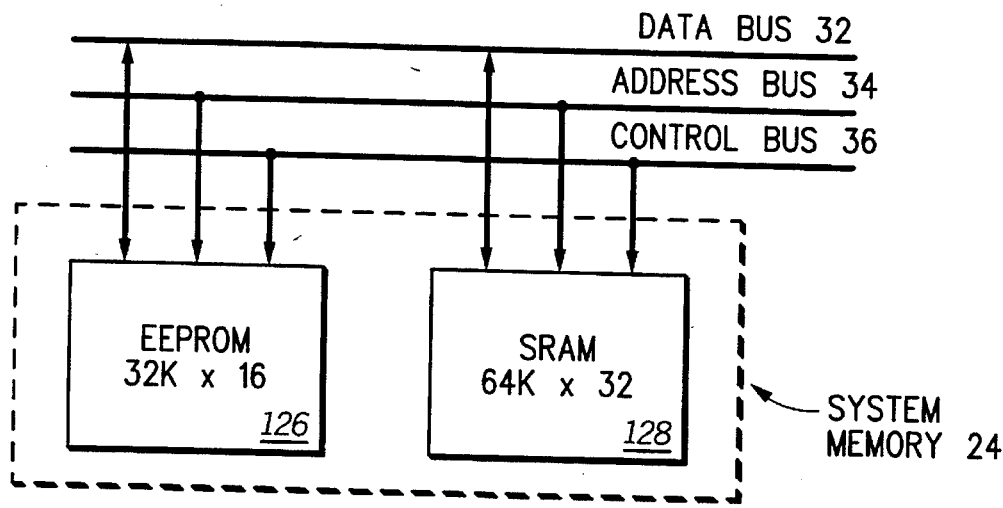
FIG. 8 illustrates, in block diagram form, a system memory of FIG. 1 in accordance with one embodiment of the present invention.

FIG. 8 illustrates one embodiment of system memory 24 of FIG. 1. In one embodiment, system memory 24 is implemented using an EEPROM (Electrically Erasable Programmable Read Only Memory) 126, and a SRAM (Static Random Access Memory). Alternate embodiments of the present invention may use any type of memory for system memory 24.

FIGS. 9 through 12-2 illustrate a high level block diagram of one embodiment of data processing system 210. For more detail, refer to the complete board level schematic of data processing system 210 illustrated in FIGS. 32 through 50-2.

Figure 9:
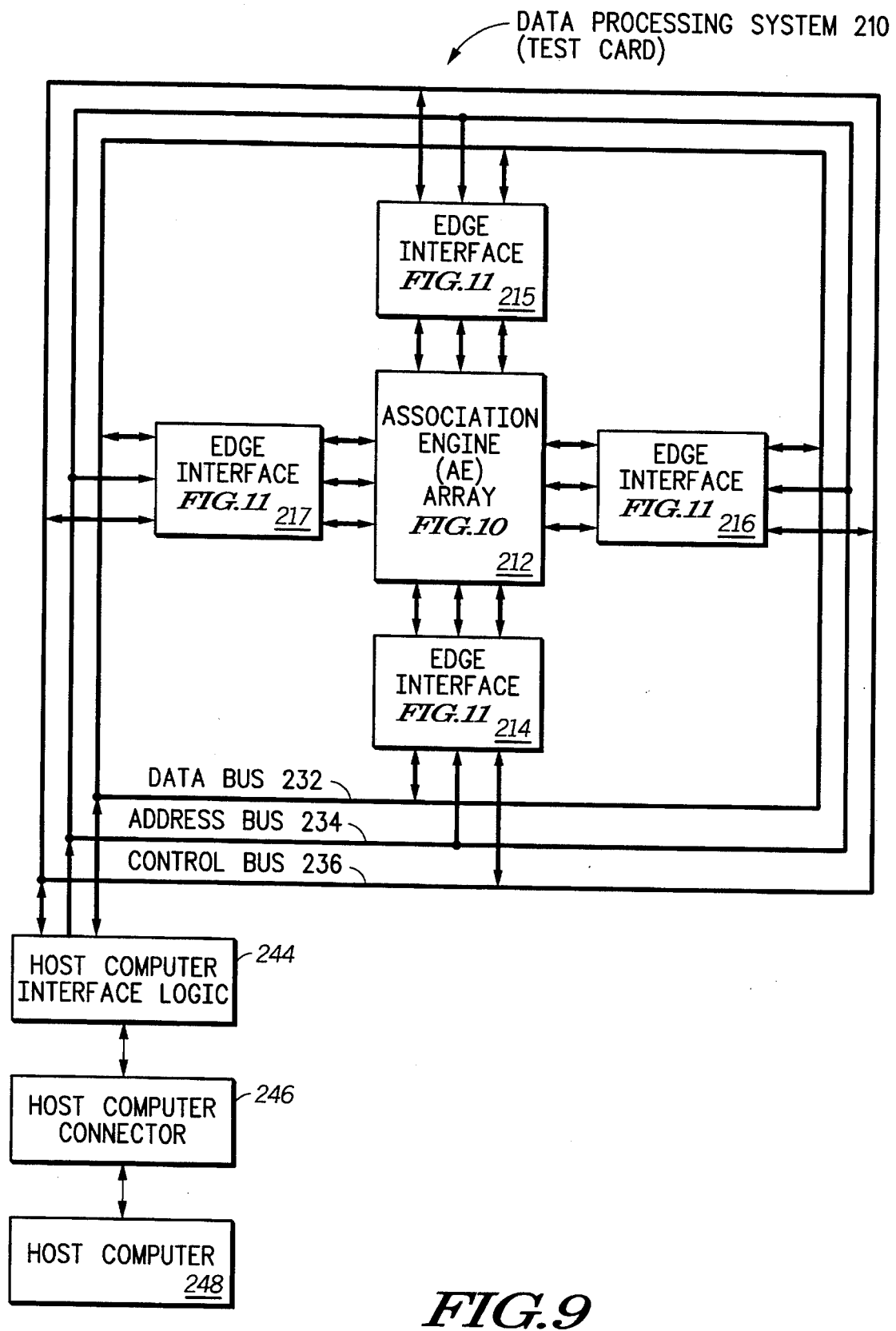
FIG. 9 illustrates, in block diagram form, a data processing system 210 in accordance with one embodiment of the present invention.

FIG. 9 illustrates one embodiment of a data processing system 210. Data processing system 210 has an Association Engine (AE) array 212, an edge interface circuit 214, an edge interface circuit 215, an edge interface circuit 216, an edge interface circuit 217, a host computer interface logic circuit 244, a host computer connector 246, and a host computer 248.

Edge interface 214 is bi-directionally coupled to the south port of AE array 212. Edge interface 215 is bi-directionally coupled to the north port of AE array 212. Edge interface 216 is bi-directionally coupled to the east port of AE array 212. And, edge interface 217 is bi-directionally coupled to the west port of AE array 212. Edge interface 214 is bi-directionally coupled to data bus 232 and to control bus 236, and is coupled to receive information from address bus 234. Edge interface 215 is bi-directionally coupled to data bus 232 and to control bus 236, and is coupled to receive information from address bus 234. Edge interface 216 is bi-directionally coupled to data bus 232 and to control bus 236, and is coupled to receive information from address bus 234. Edge interface 217 is bi-directionally coupled to data bus 232 and to control bus 236, and is coupled to receive information from address bus 234.

Host computer interface logic 244 is bi-directionally coupled to data bus 232 and control bus 236, and is coupled to provide information to address bus 234. Host computer interface logic 244 is bi-directionally coupled to host computer connector 246. Host computer connector 246 is bi-directionally coupled to host computer 248.

Figure 10:
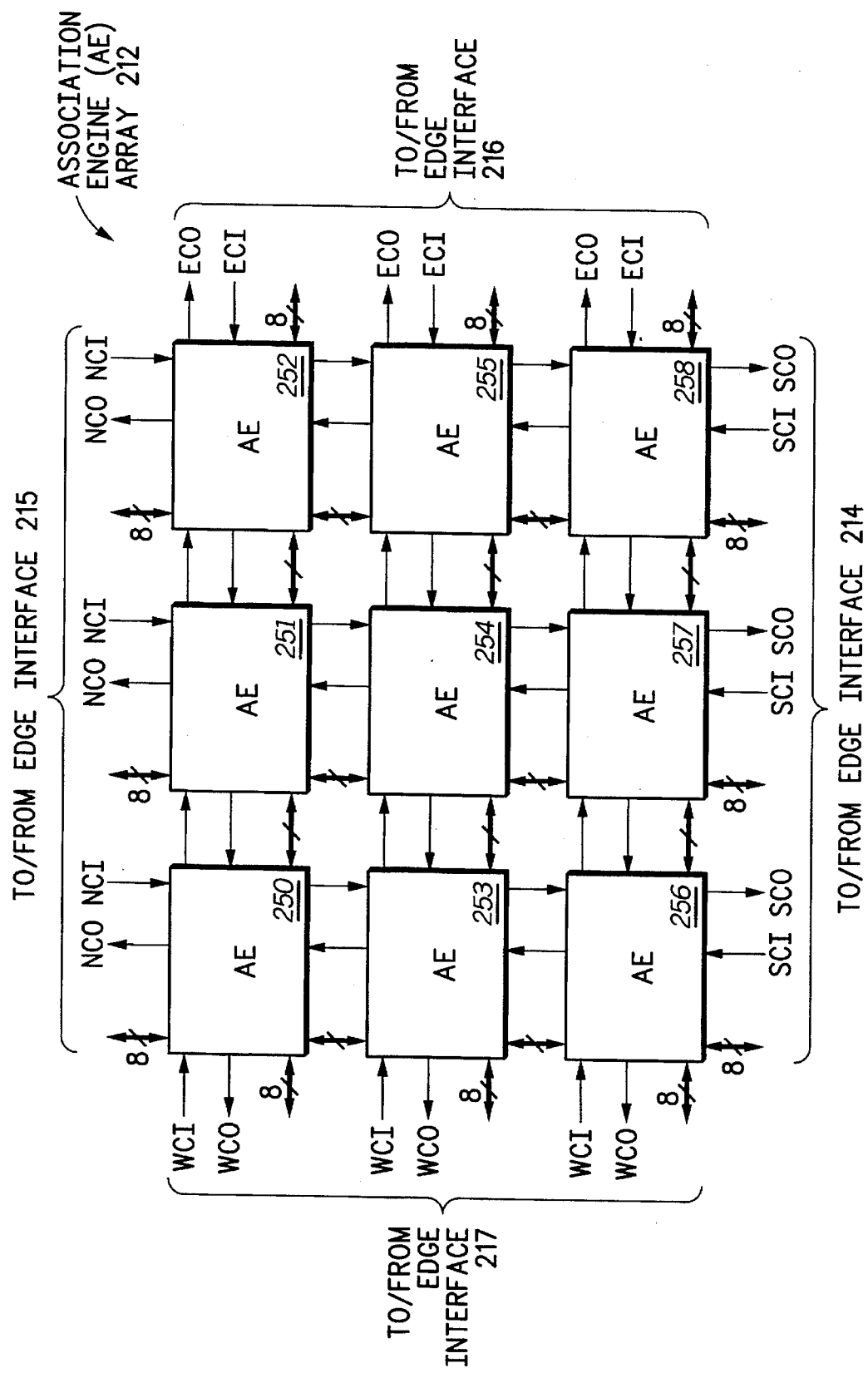
FIG. 10 illustrates, in block diagram form, an array of processors (AEs) of FIG. 9 in accordance with one embodiment of the present invention.

FIG. 10 illustrates one embodiment of an array of processors (AEs) 212 of FIG. 9. Each Association Engine integrated circuit 250–258 is merely one embodiment of a data processor which may be used to form array 212. Other data processors may be used to form array 212 in FIG. 9. Although the illustrated embodiment of AE array 212 illustrates a three column by three row array of AE processors 250–258, an alternate embodiment of the present invention may use any number of rows and any number of columns.

The combined north ports of AE processors 250–252 form a north array port of AE array 212. The combined south ports of AE processors 256–258 form a south array port of AE array 212. The combined west ports of AE processors 250, 253, and 256 form a west array port of AE array 212. The combined east ports of AE processors 252, 255, and 258 form an east array port of AE array 212.

Figure 11:
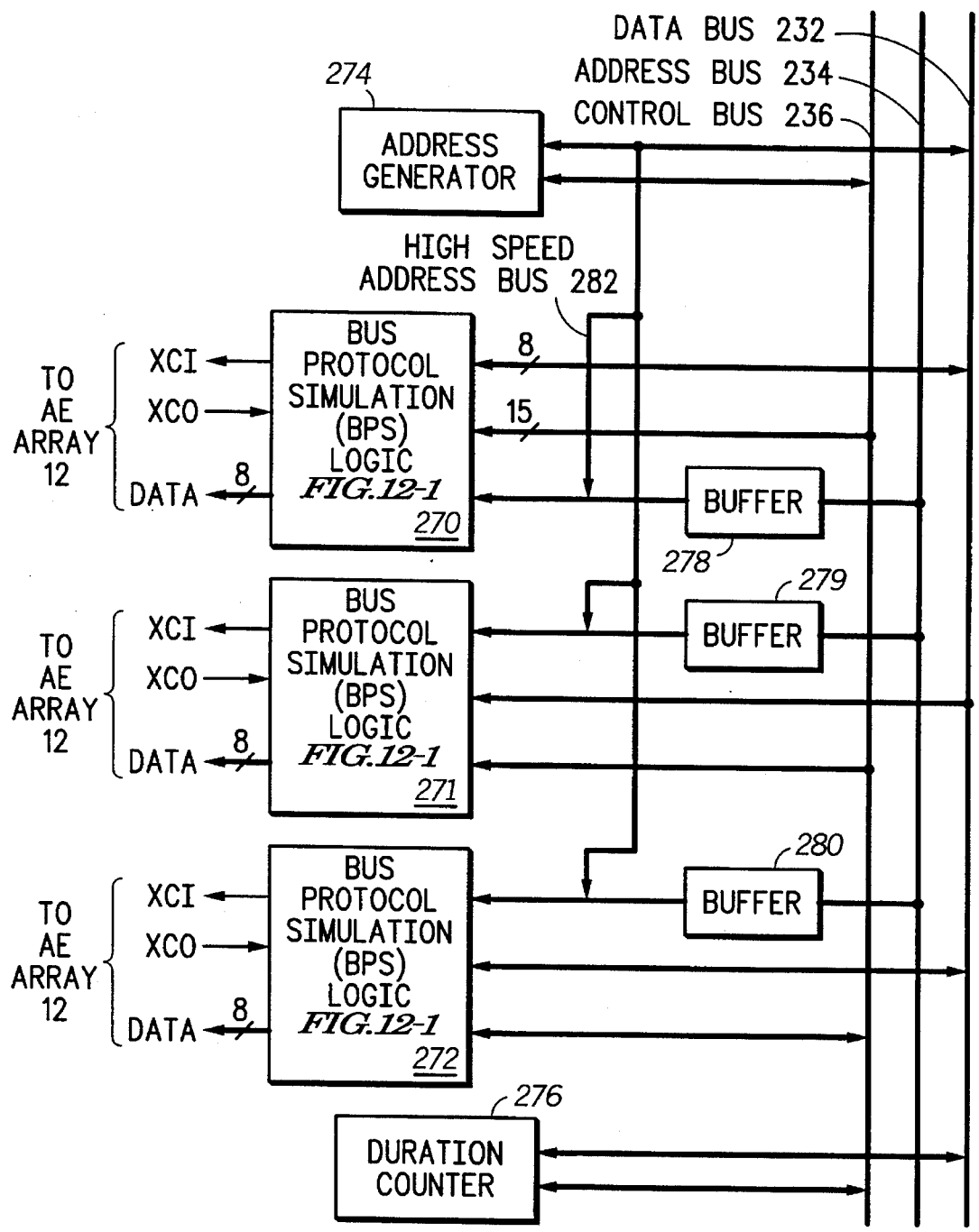
FIG. 11 illustrates, in block diagram form, an edge interface of FIG. 9 in accordance with one embodiment of the present invention.

FIG. 11 illustrates one embodiment of edge interface circuits 214–217 of FIG. 9. Edge interface circuits 214–217 each have bus protocol simulation logic circuits 270–272, address generator circuit 274, duration counter circuit 276, buffer circuit 278–280, and high speed address bus 282, which are coupled as illustrated in FIG. 11. Note that the term "X" in signal names "XCI" and "XCO" is used as a variable. For example, for edge interface 214, which is coupled to the south array port, "XCI" represents "SCI", and "XCO" represents "SCO".

Figures 1, 12:
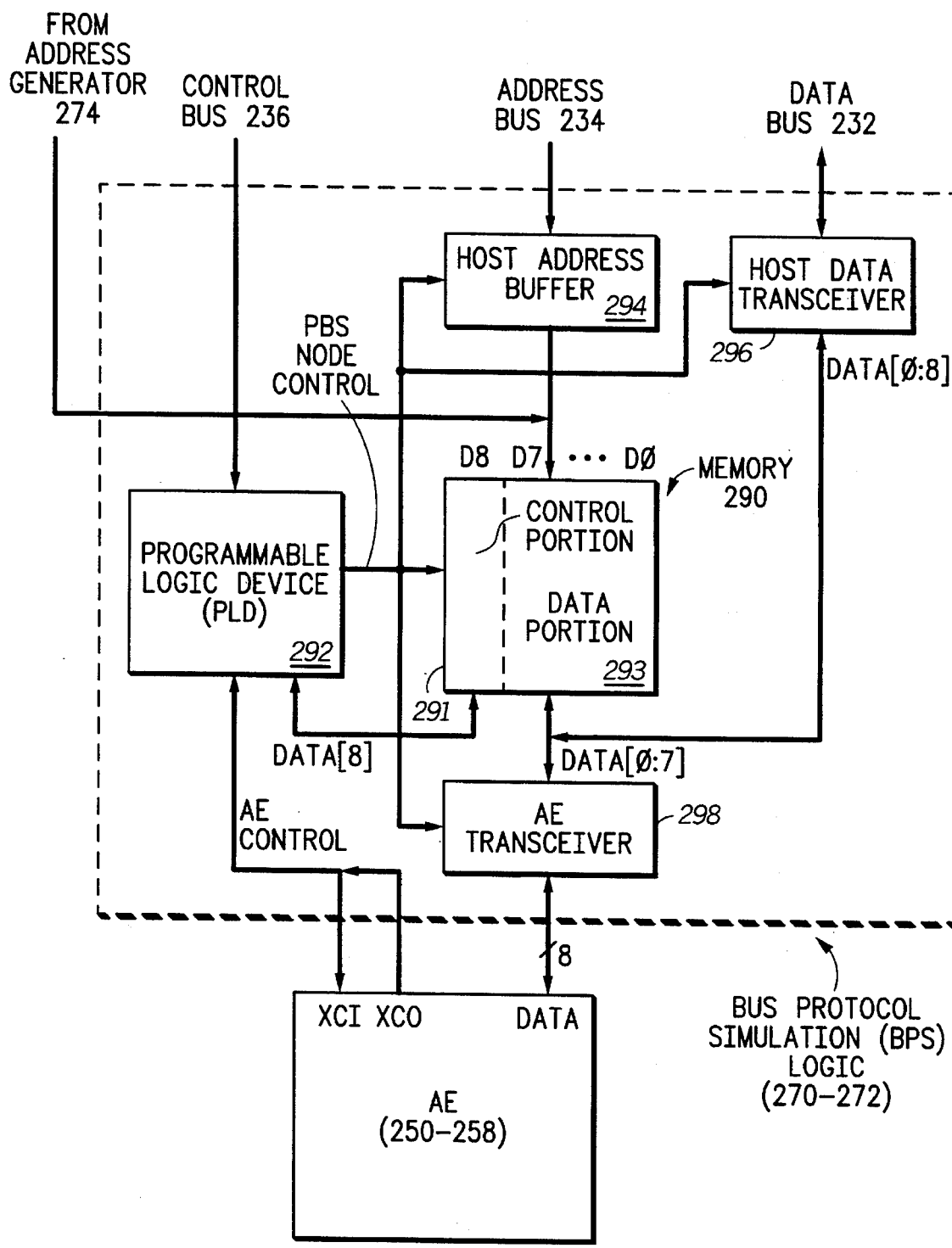
Figures 2, 12:
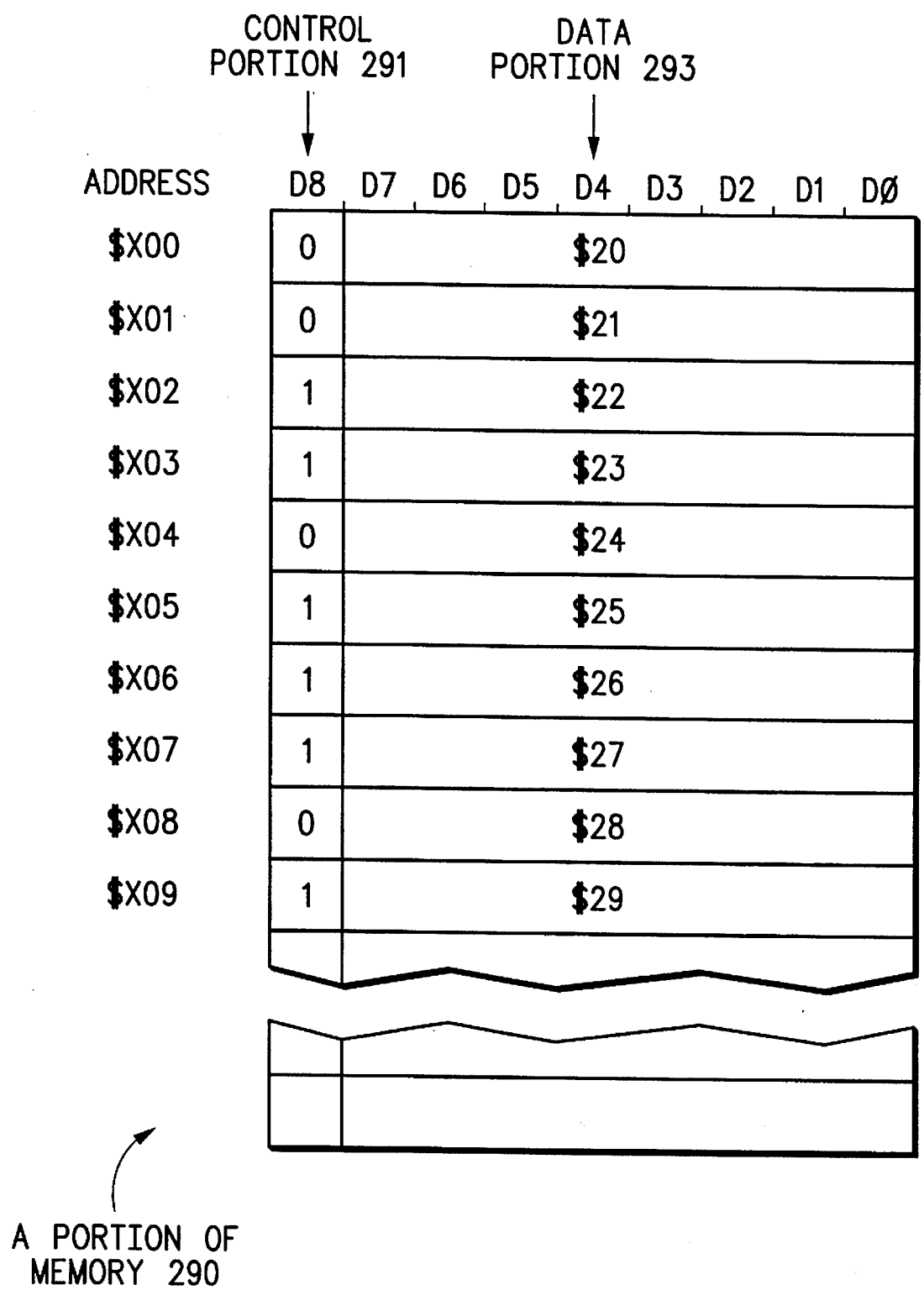
Figures 3, 12:
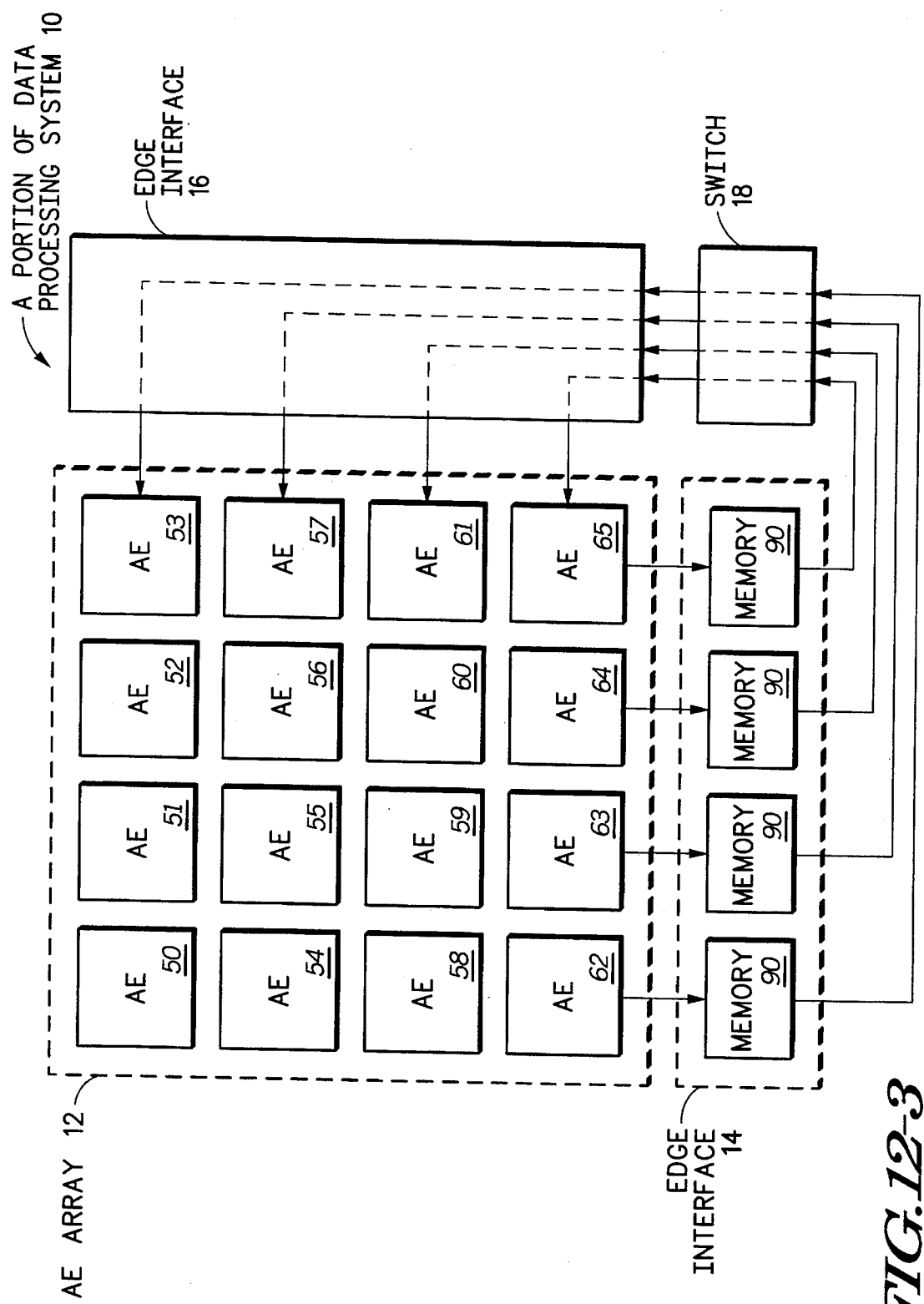
Figures 4, 12:
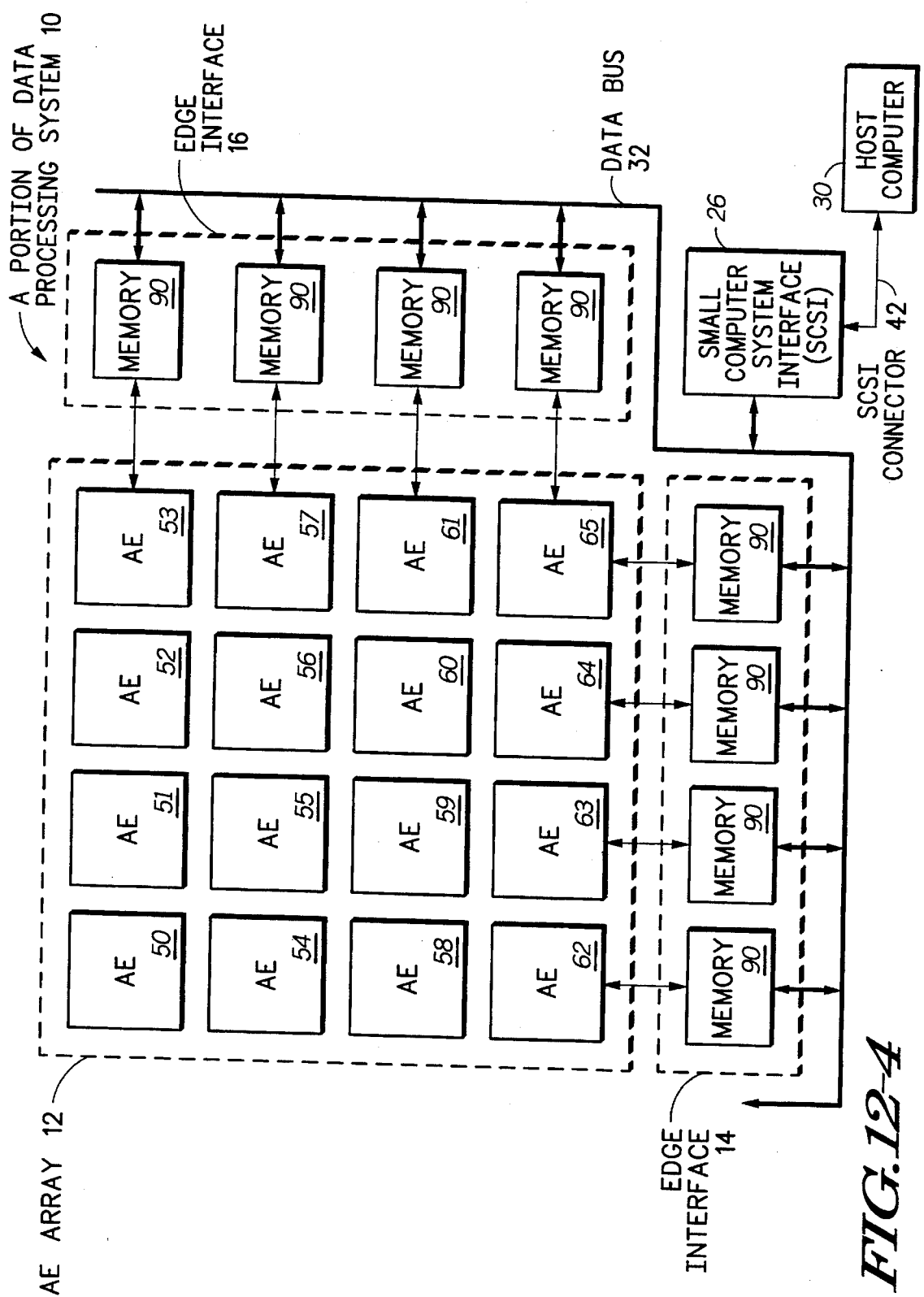
Figures 5, 12:
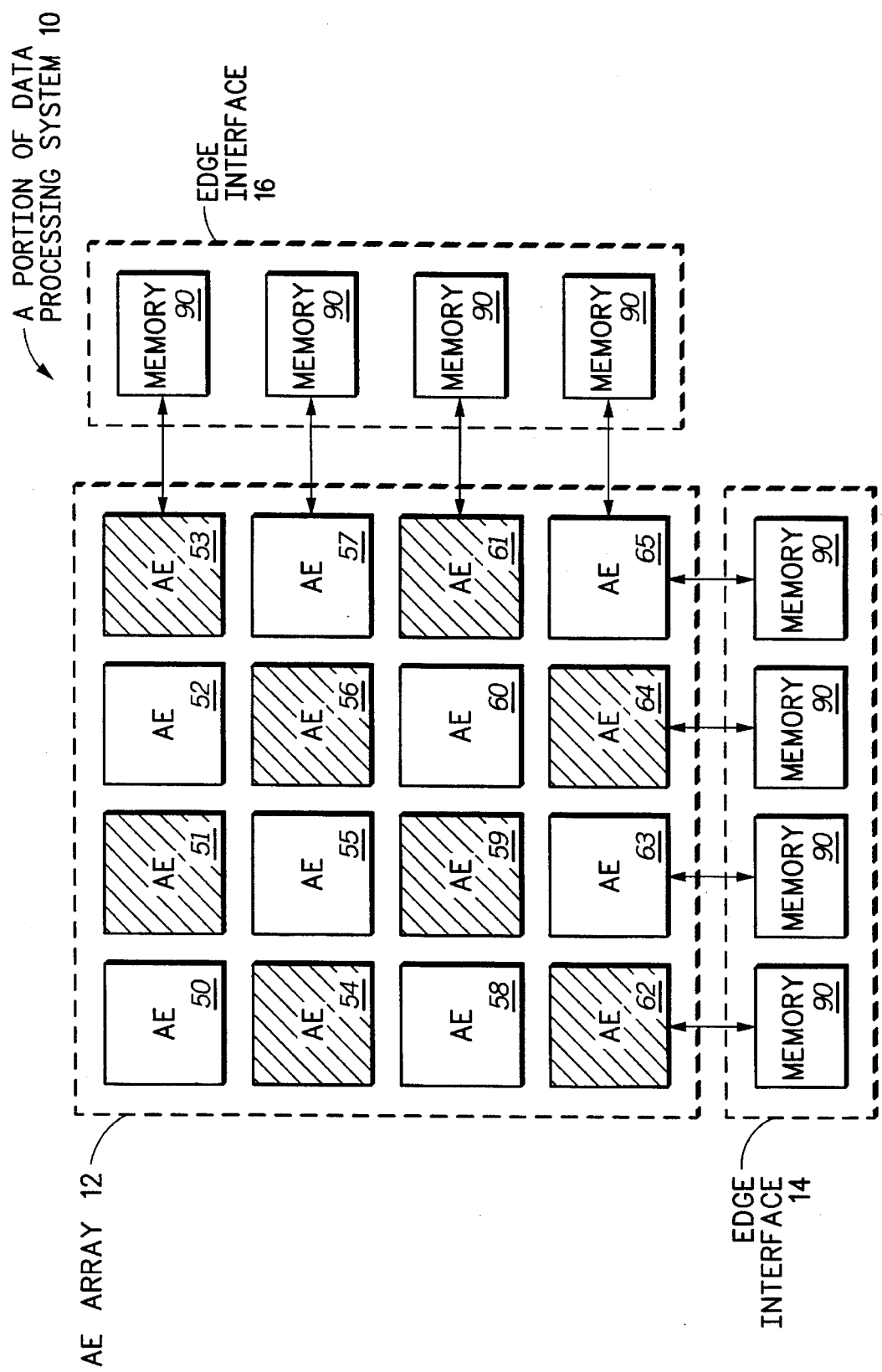
Figure 13:
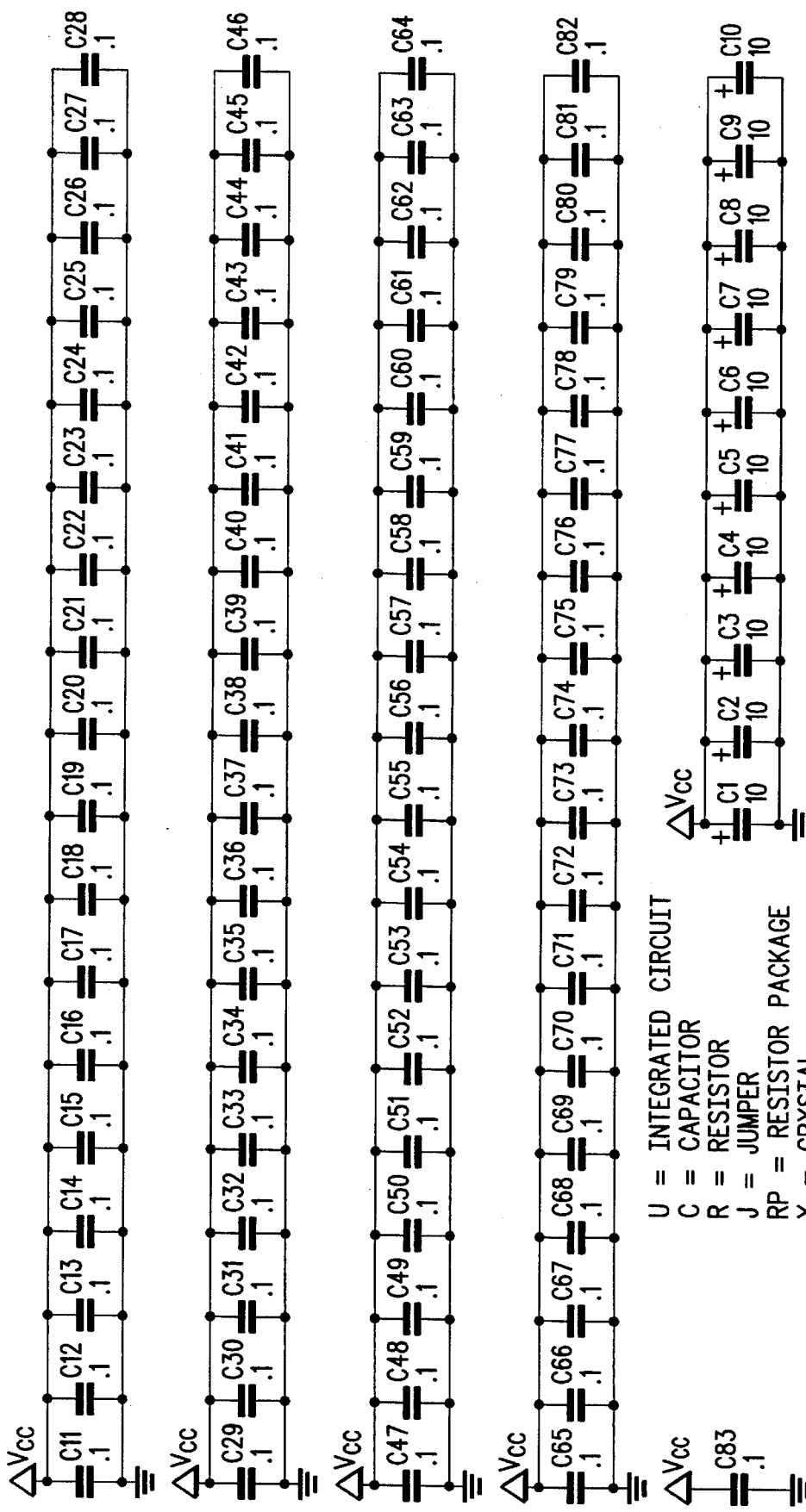
Figures 1, 14:
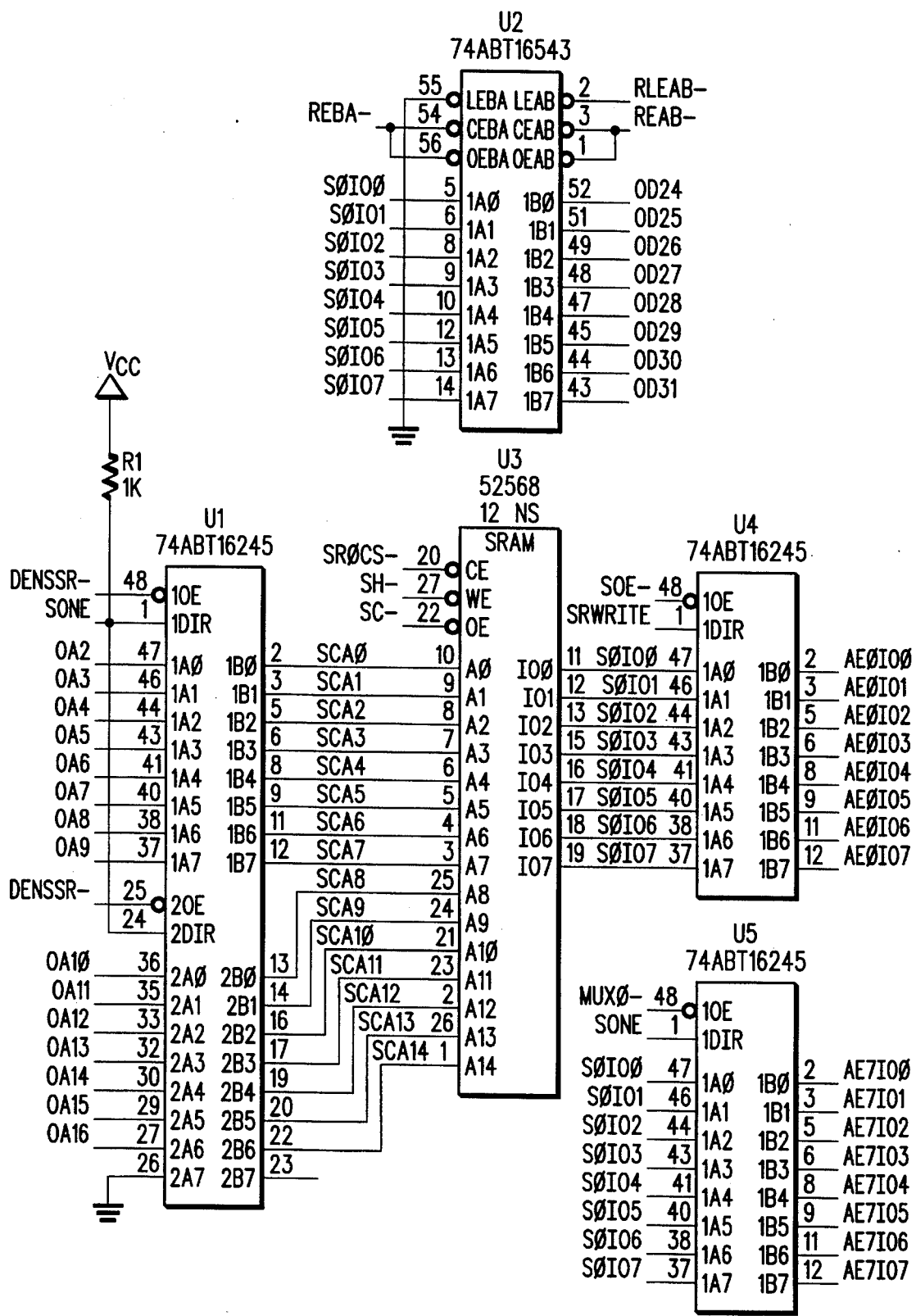
Figures 2, 14:
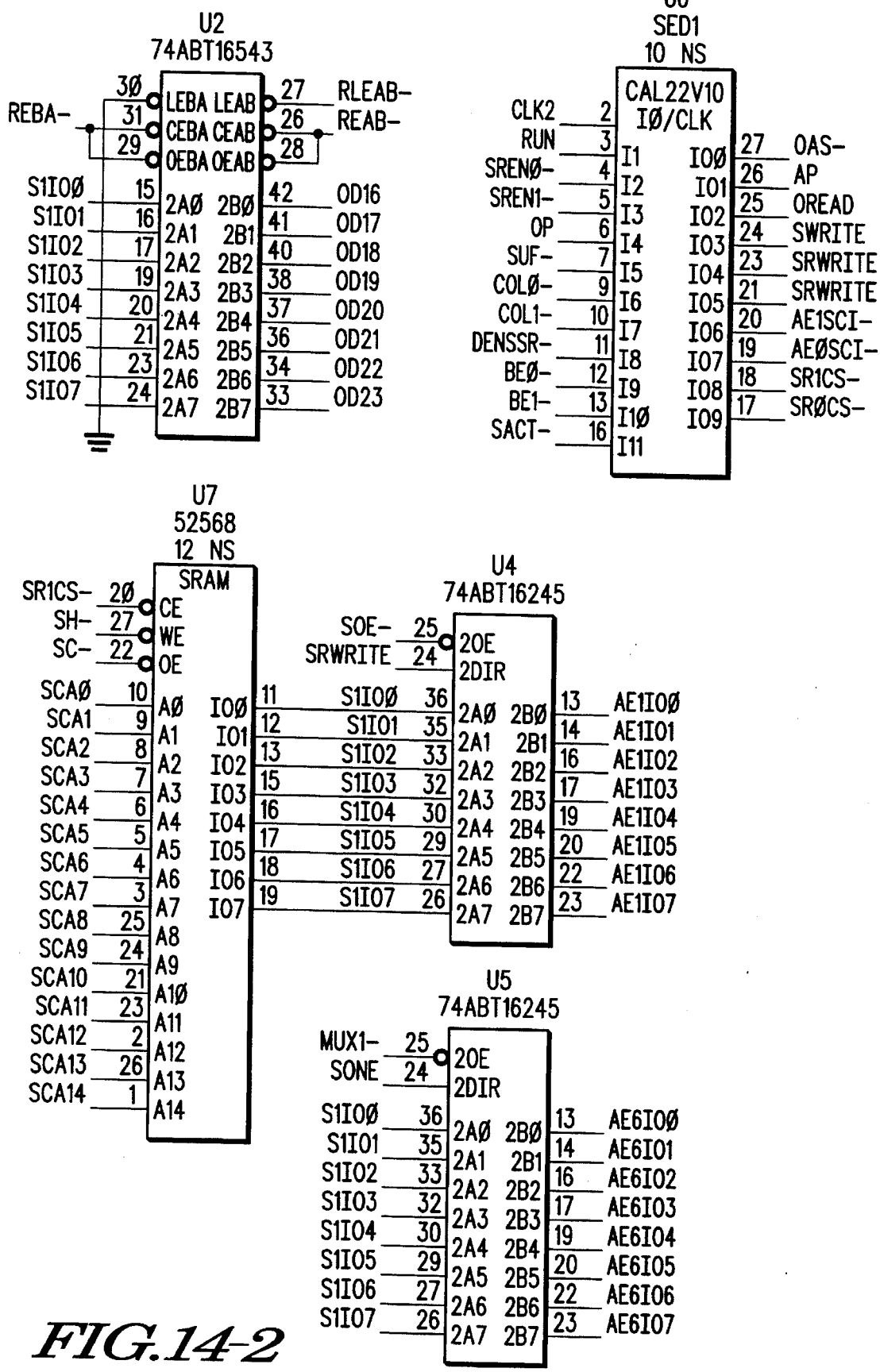
Figures 1, 15:
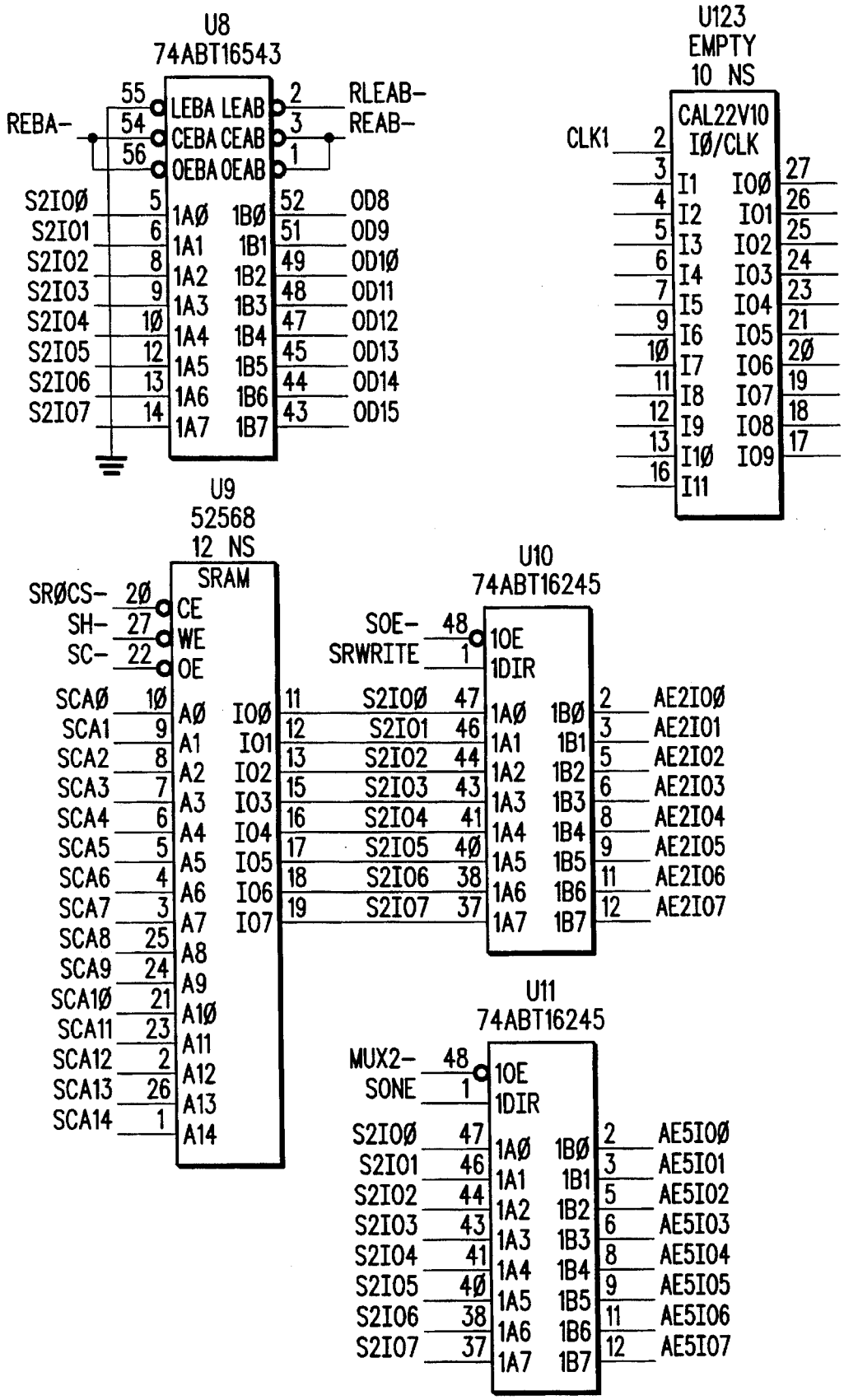
Figures 2, 15:
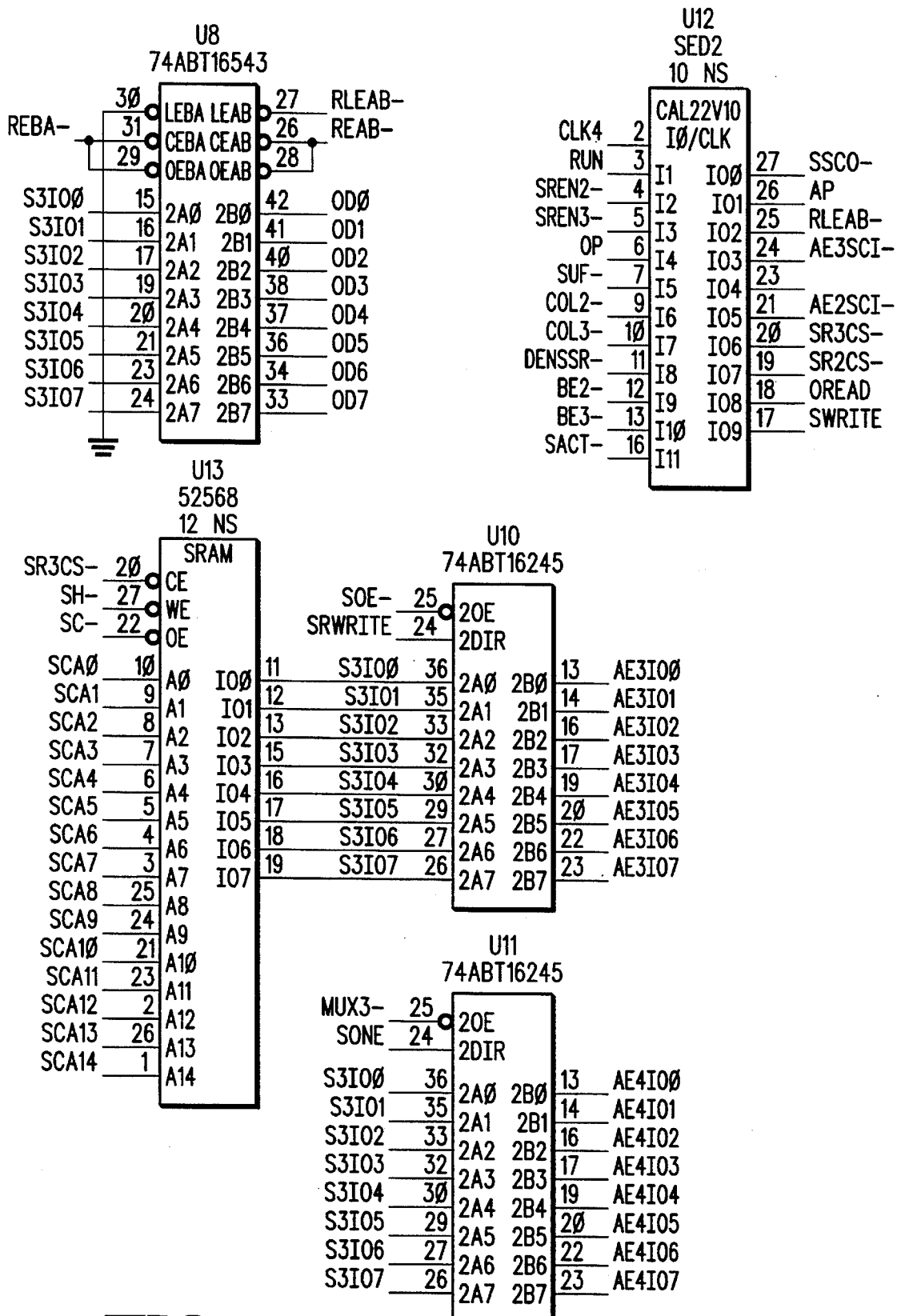
Figures 1, 16:
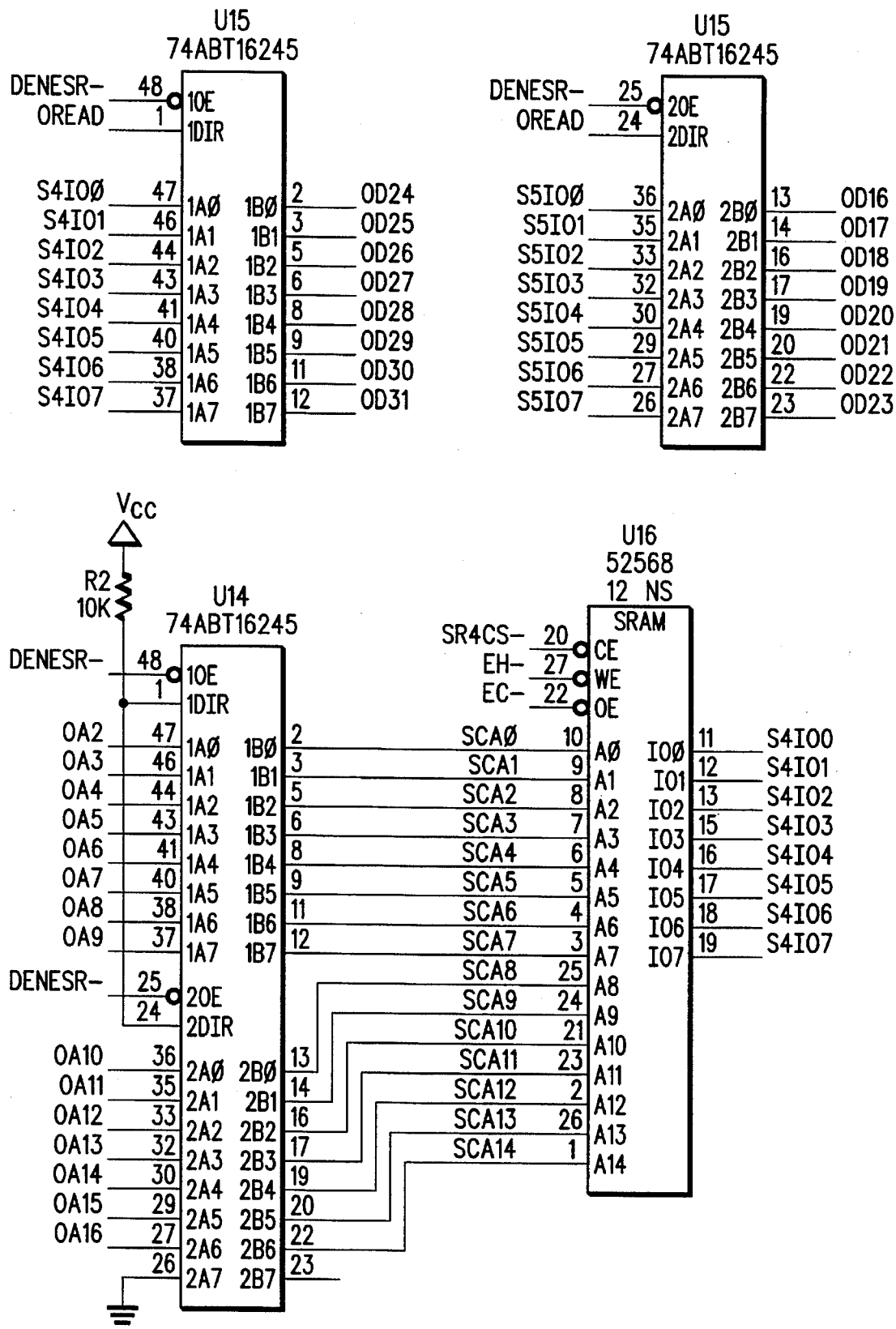
Figures 2, 16:
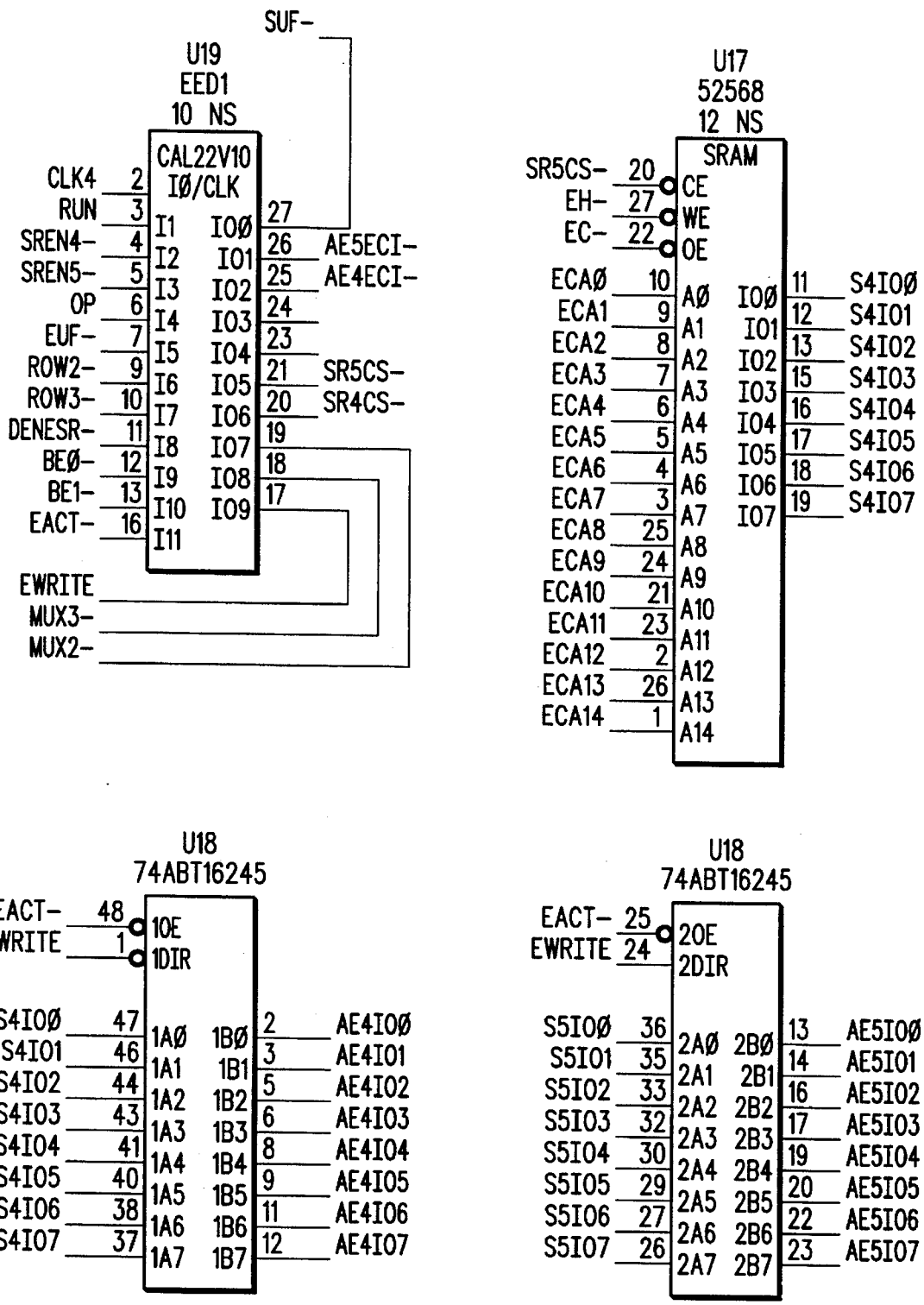
Figures 4, 16:
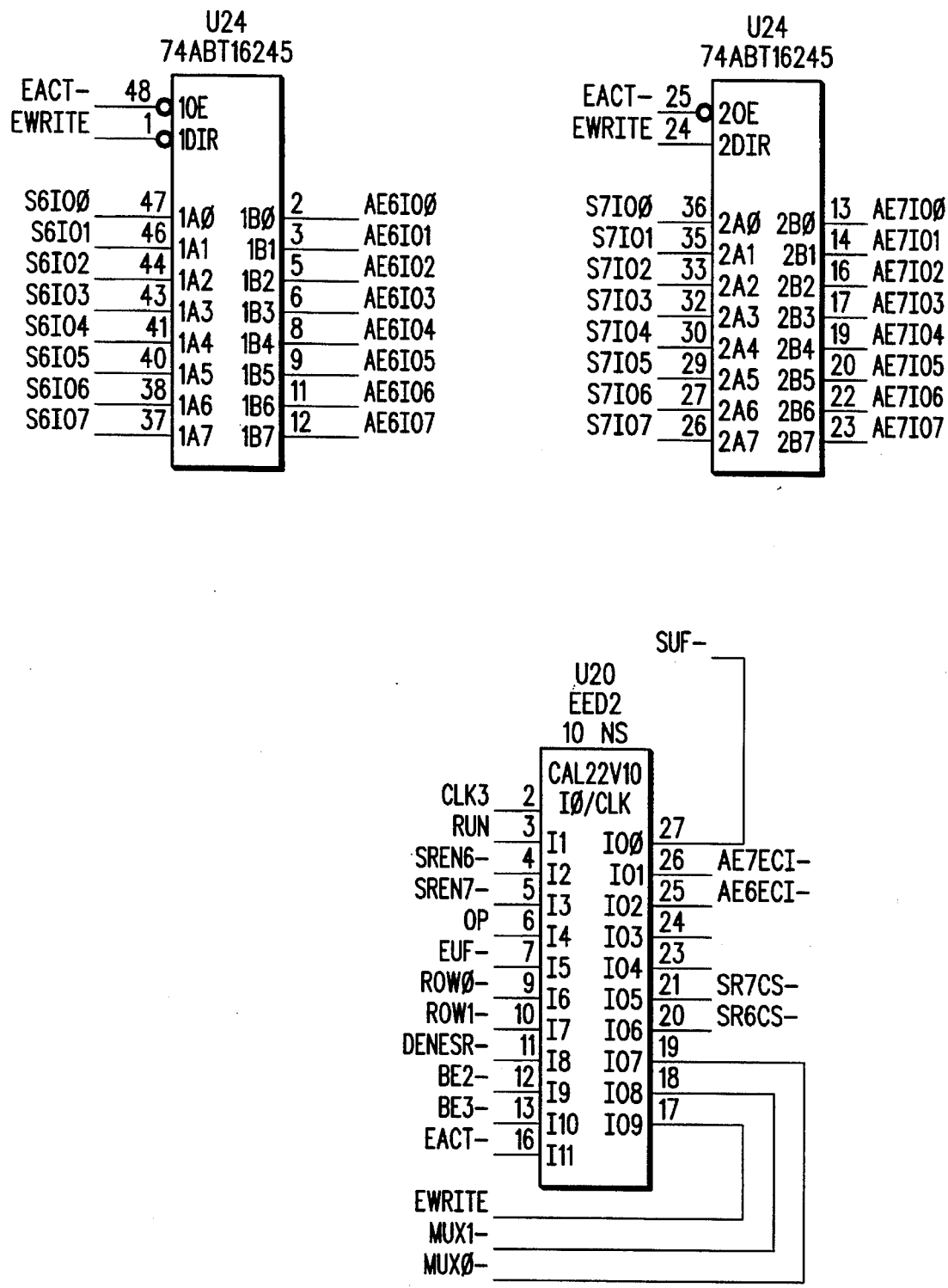
Figures 1, 18:
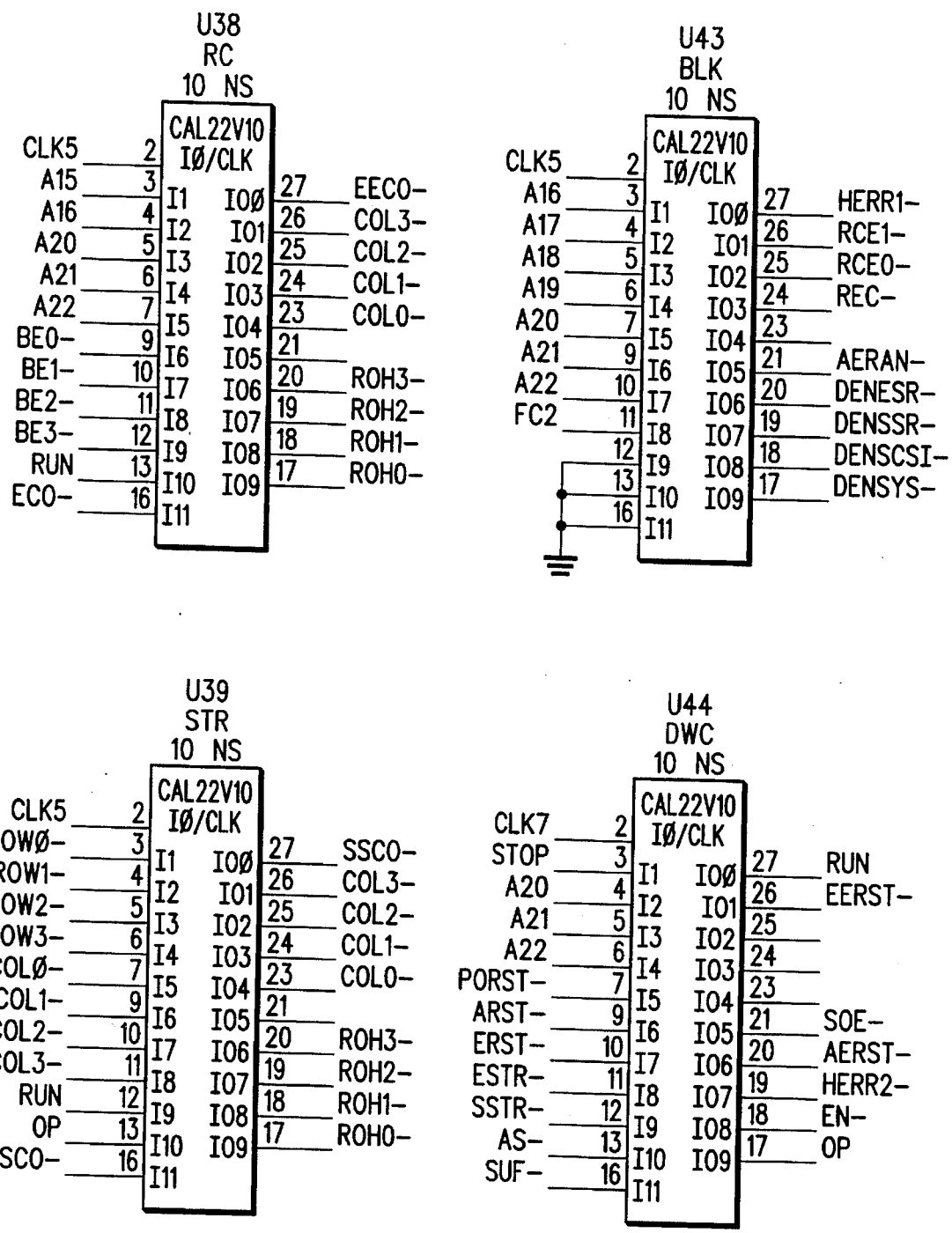
Figures 2, 18:
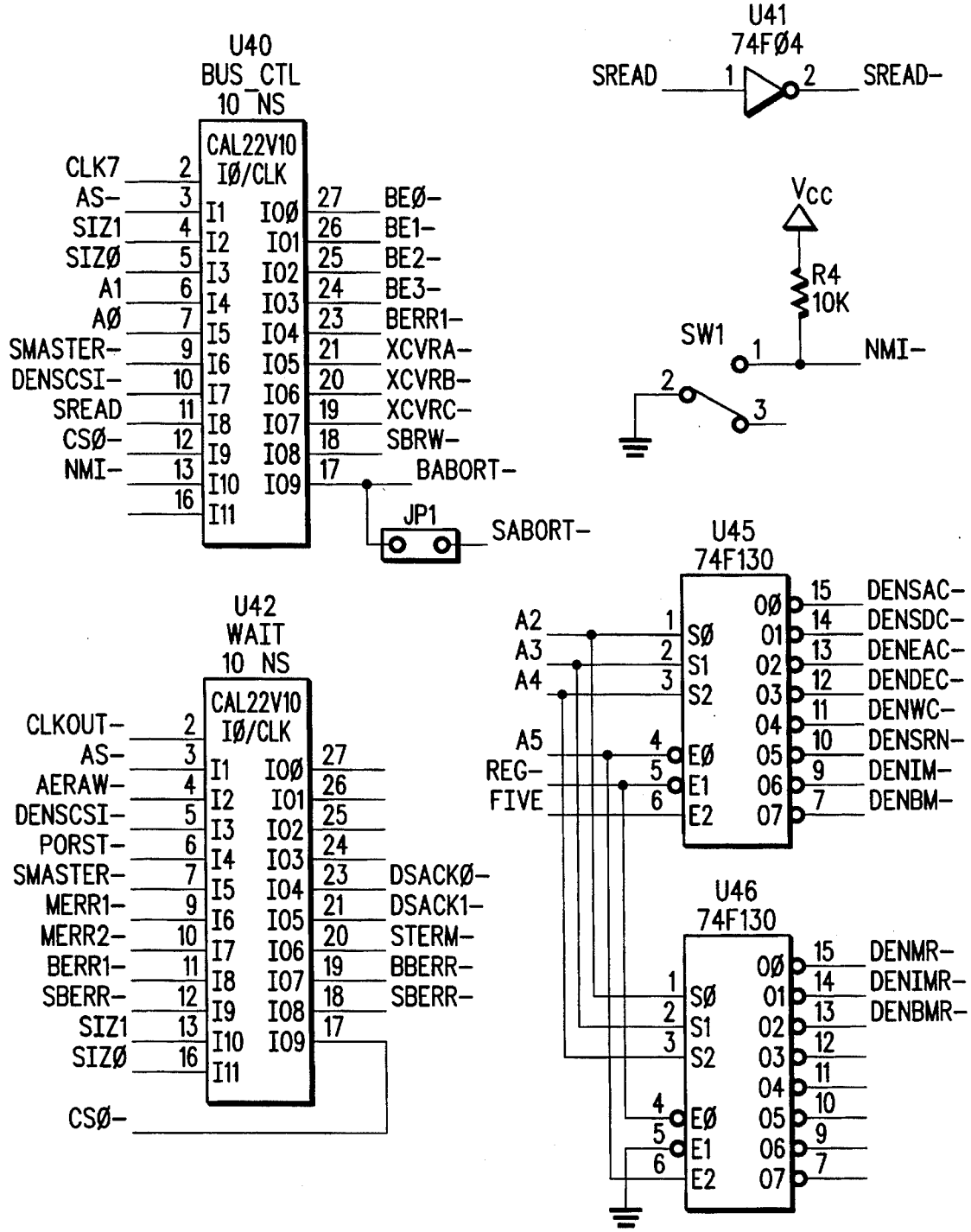
Figures 1A, 19:
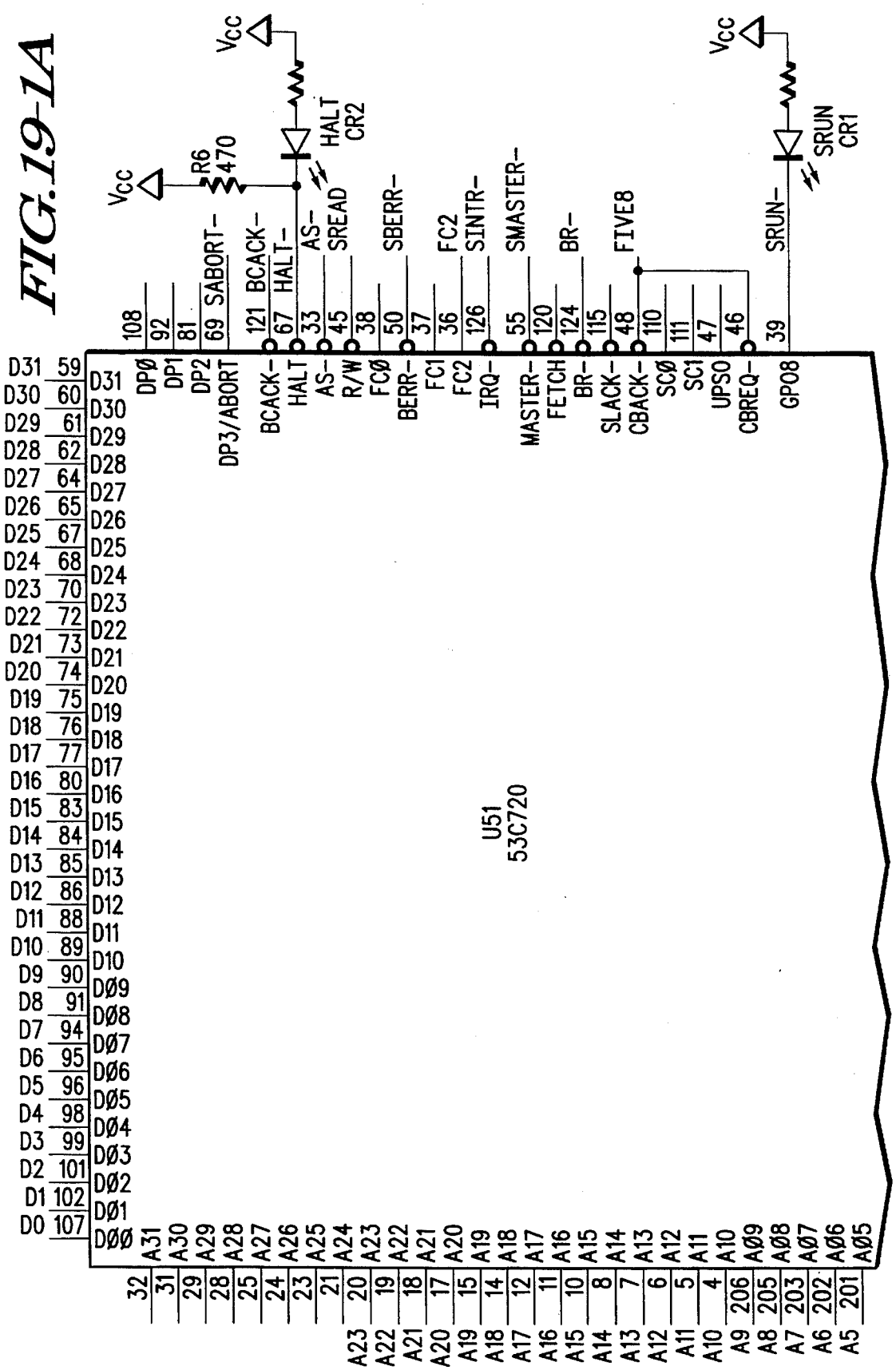
Figures 1B, 19:
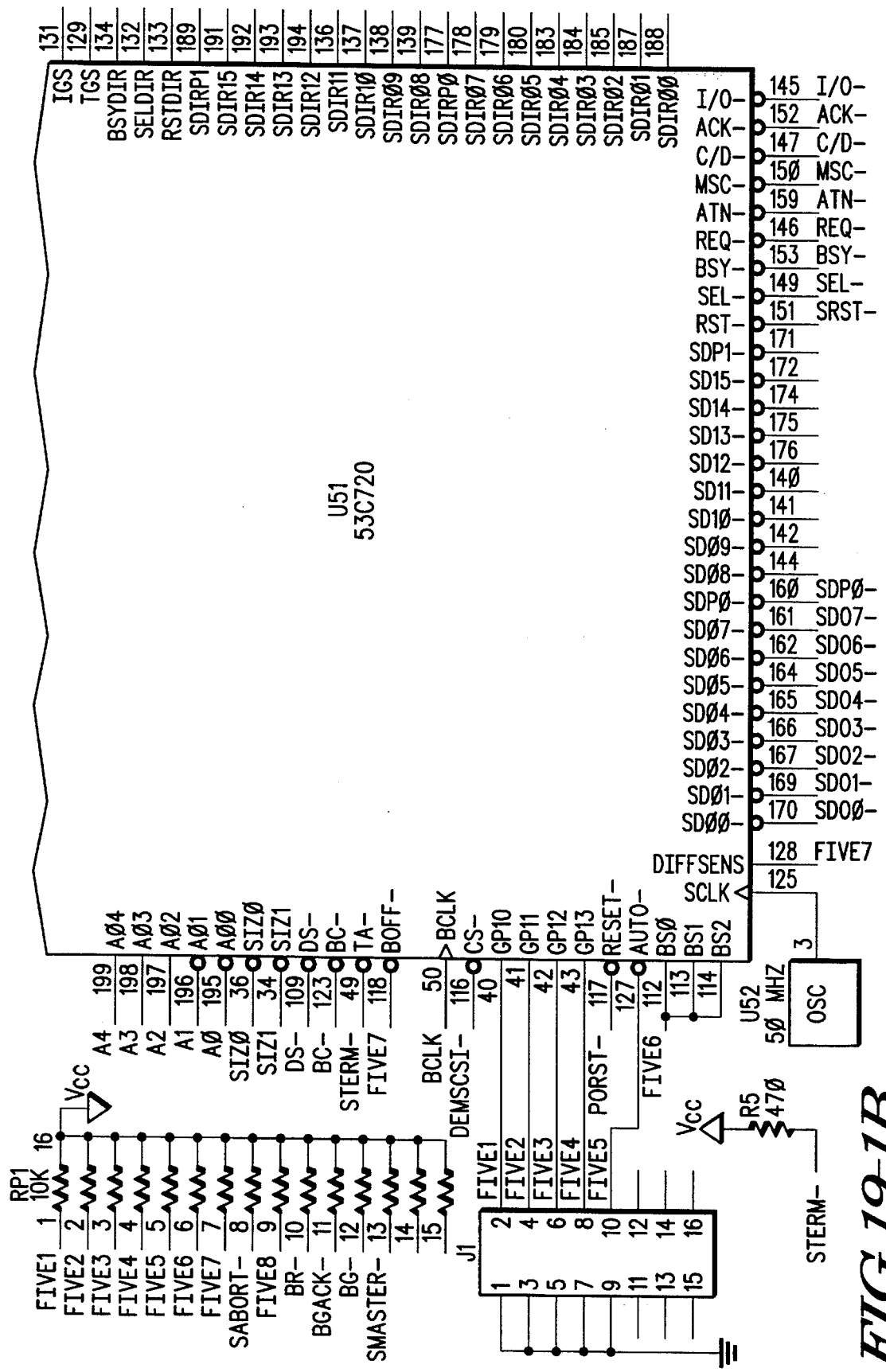
Figures 3, 19:
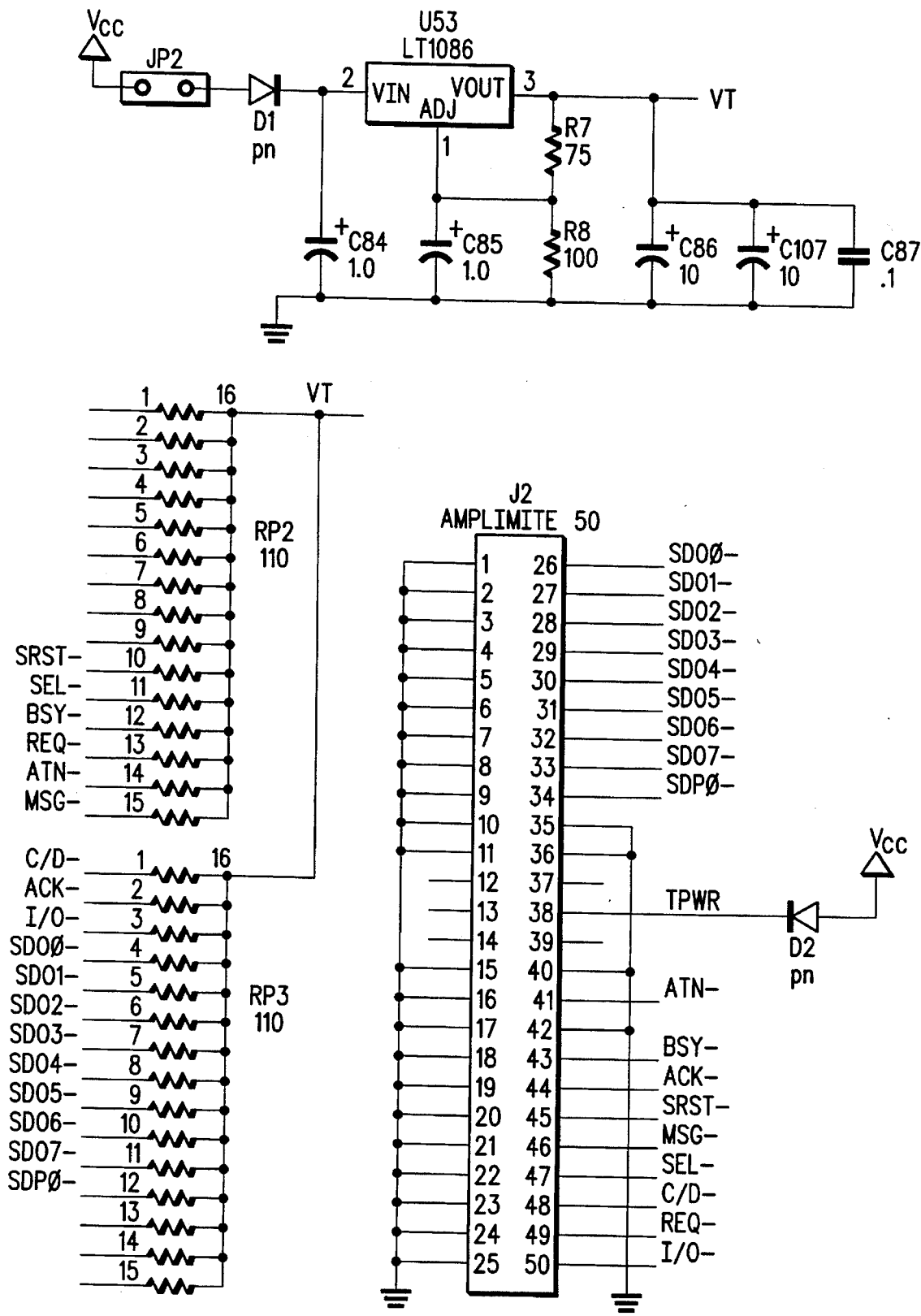
Figure 20:
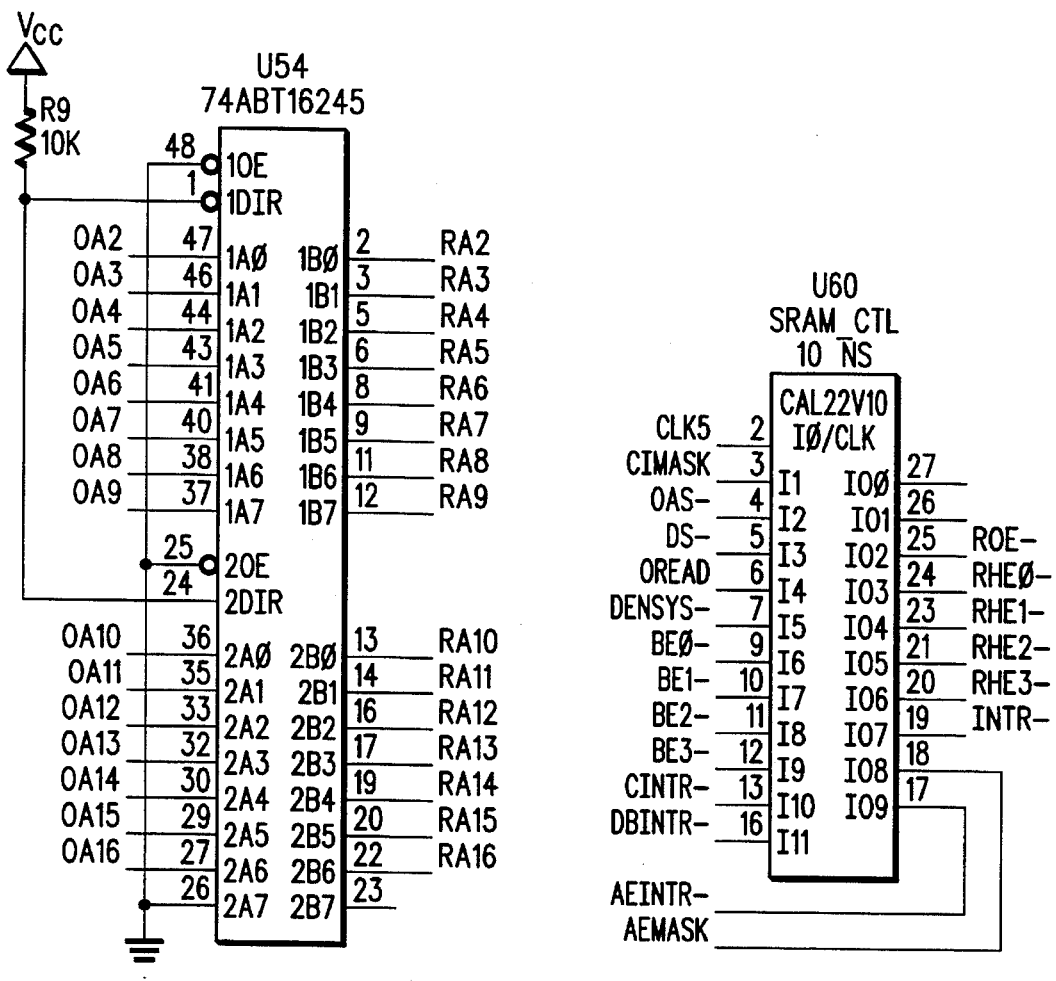
Figure 1:
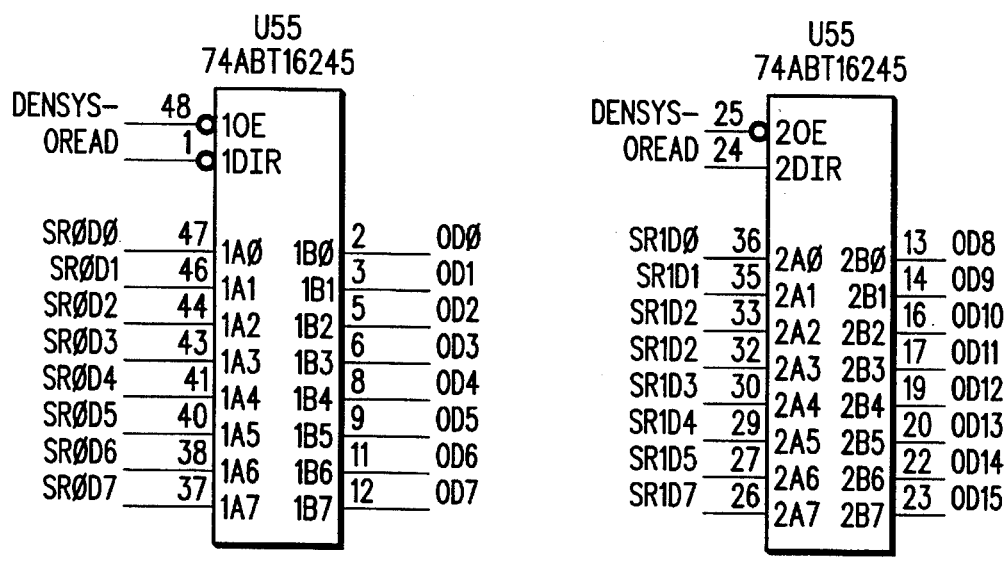
Figures 2, 20:
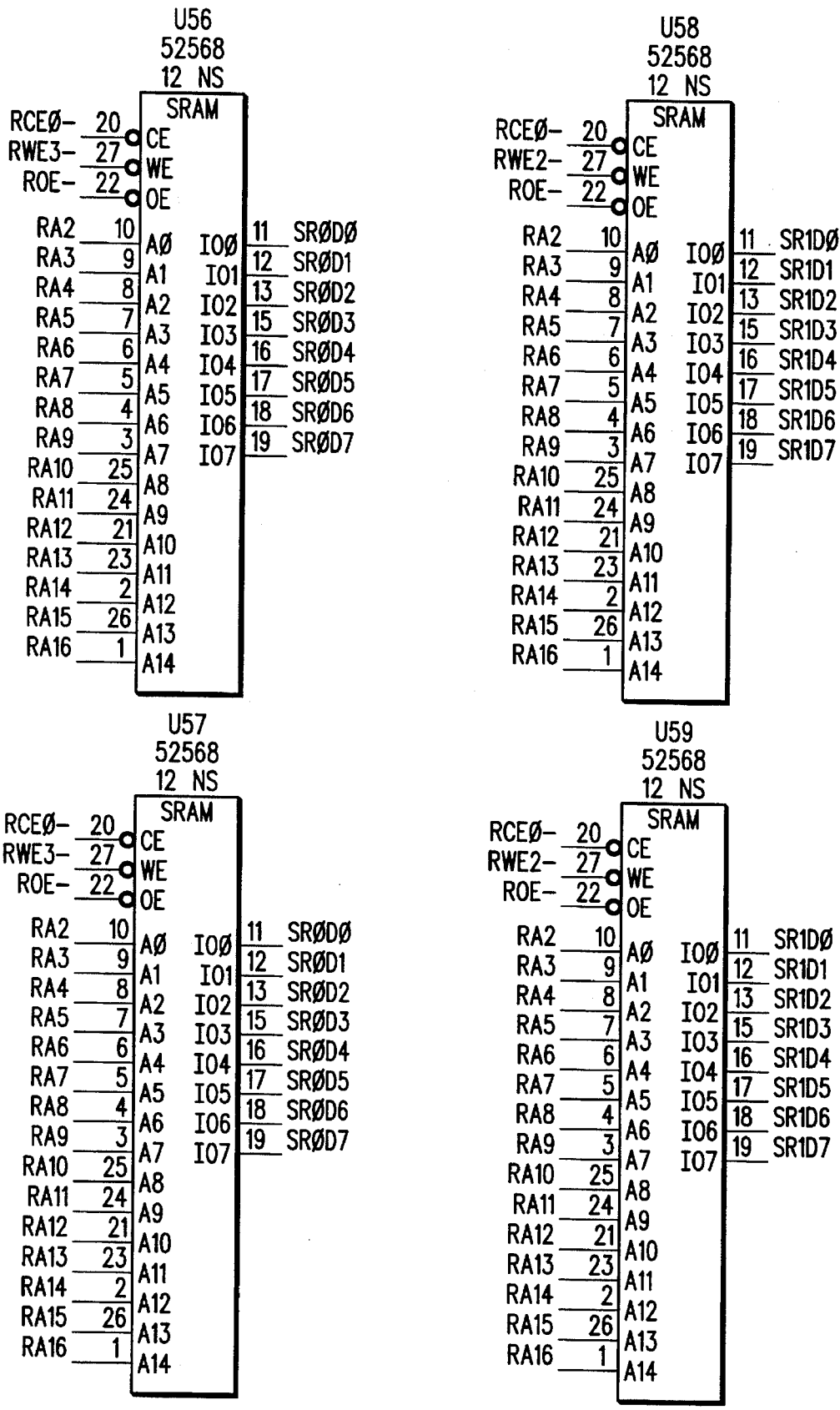
Figures 4, 20:
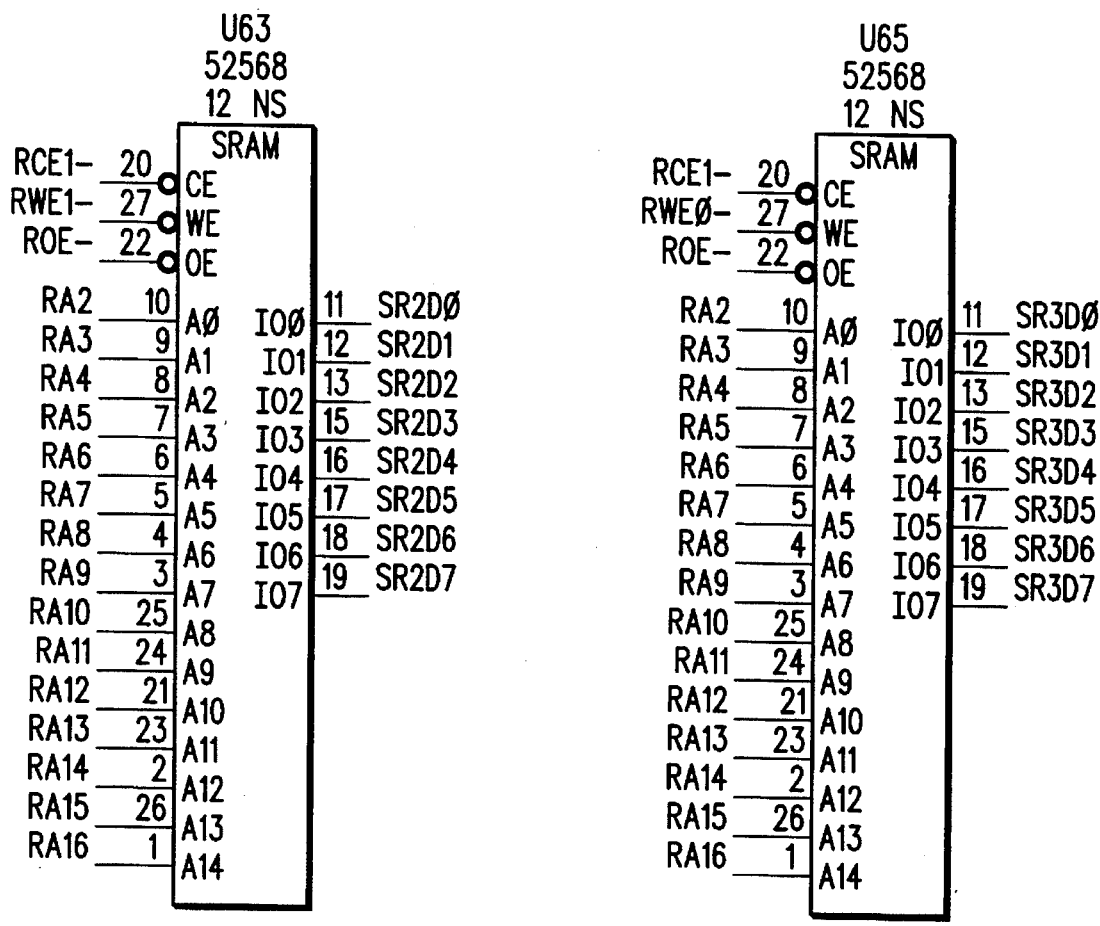
Figure 21A:
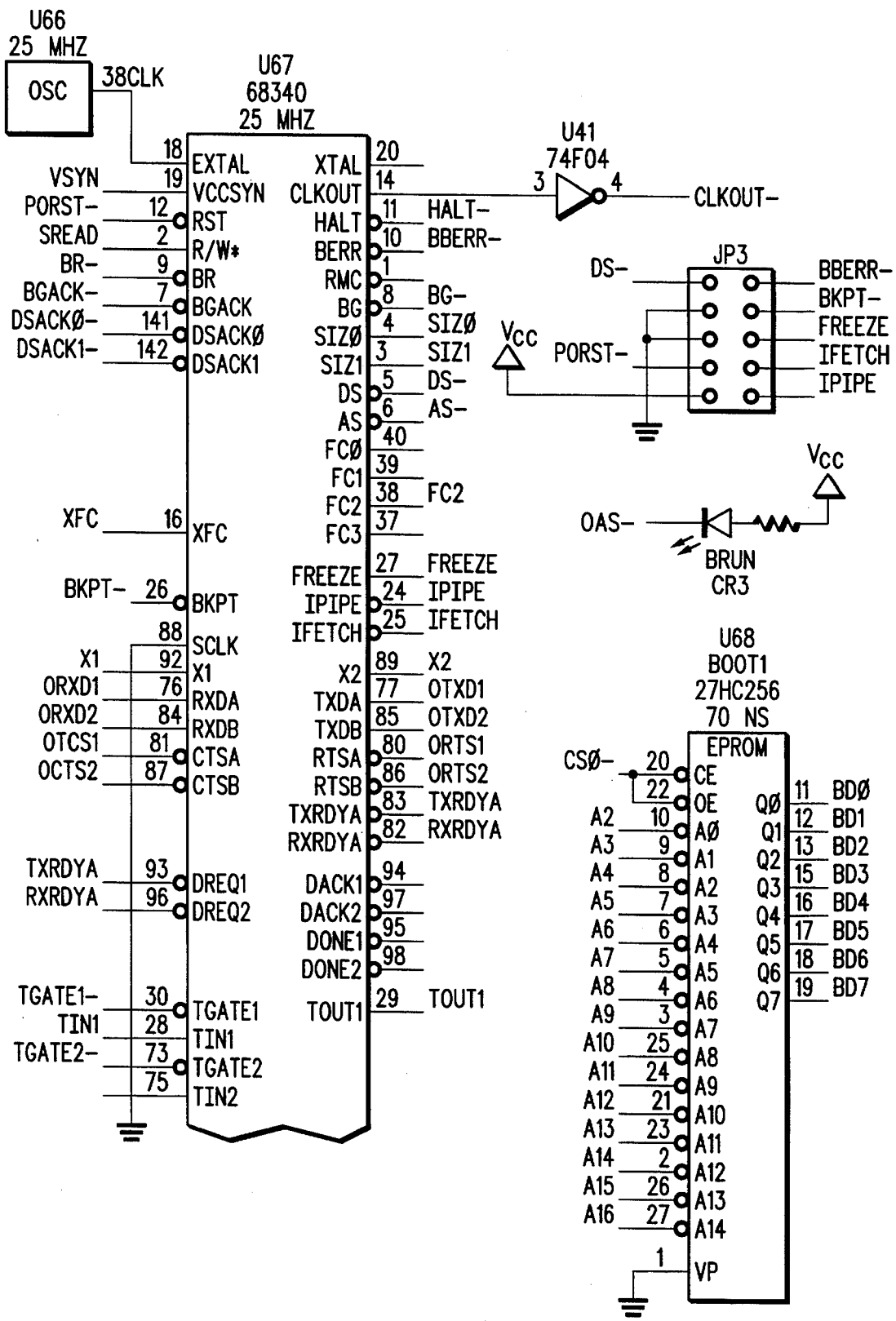
Figure 21B:
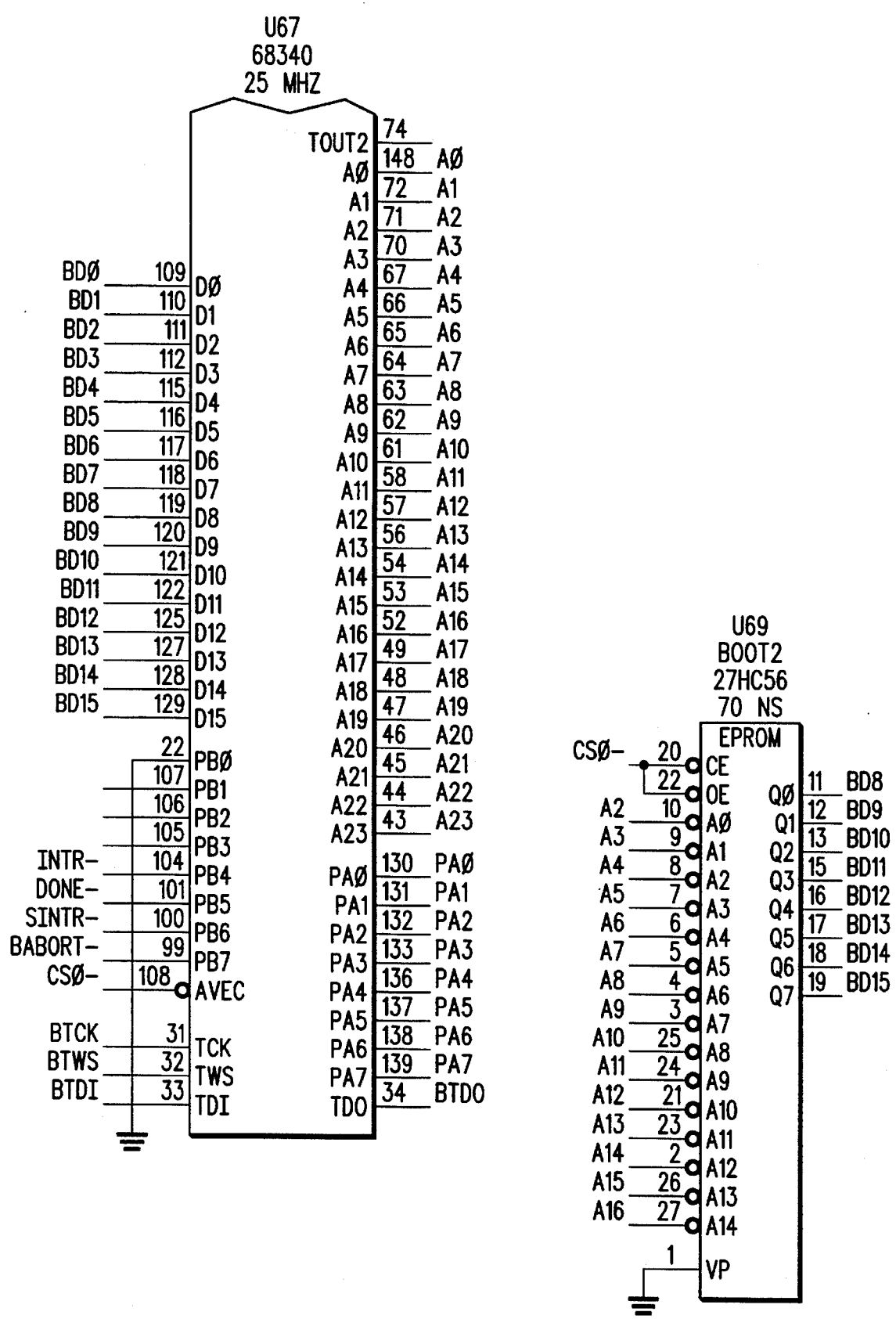
Figures 2, 21:
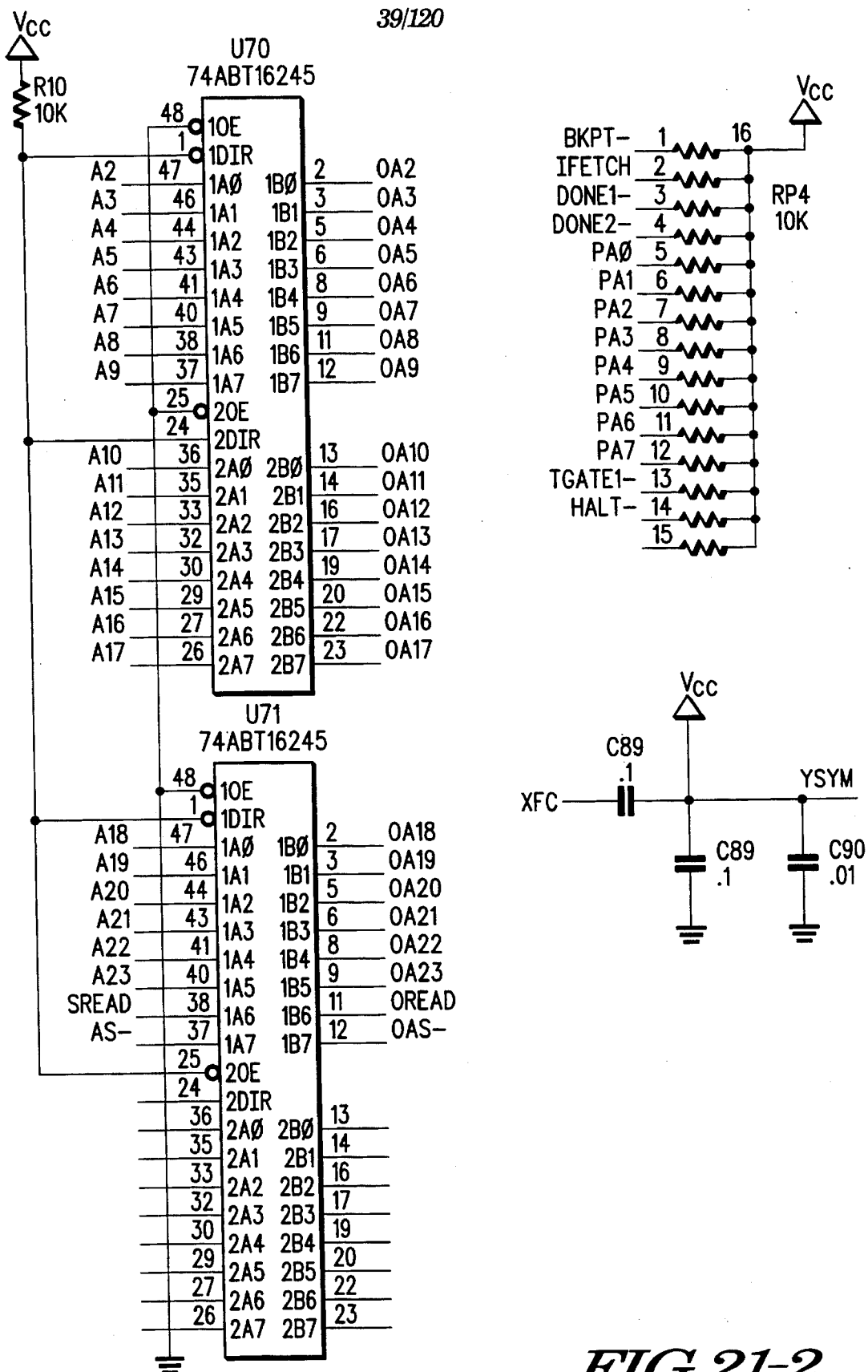
Figures 1, 22:
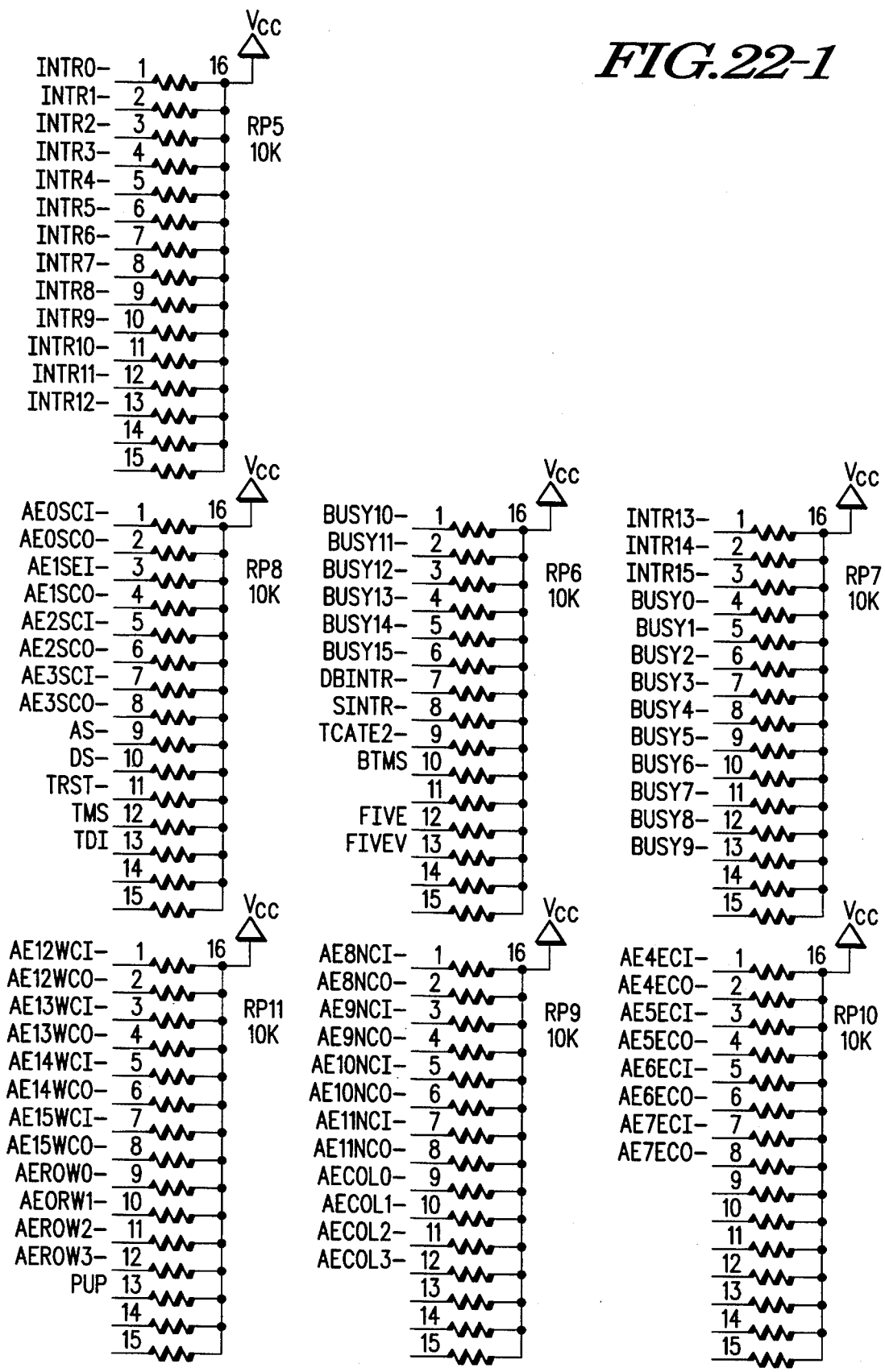
Figures 2, 22:
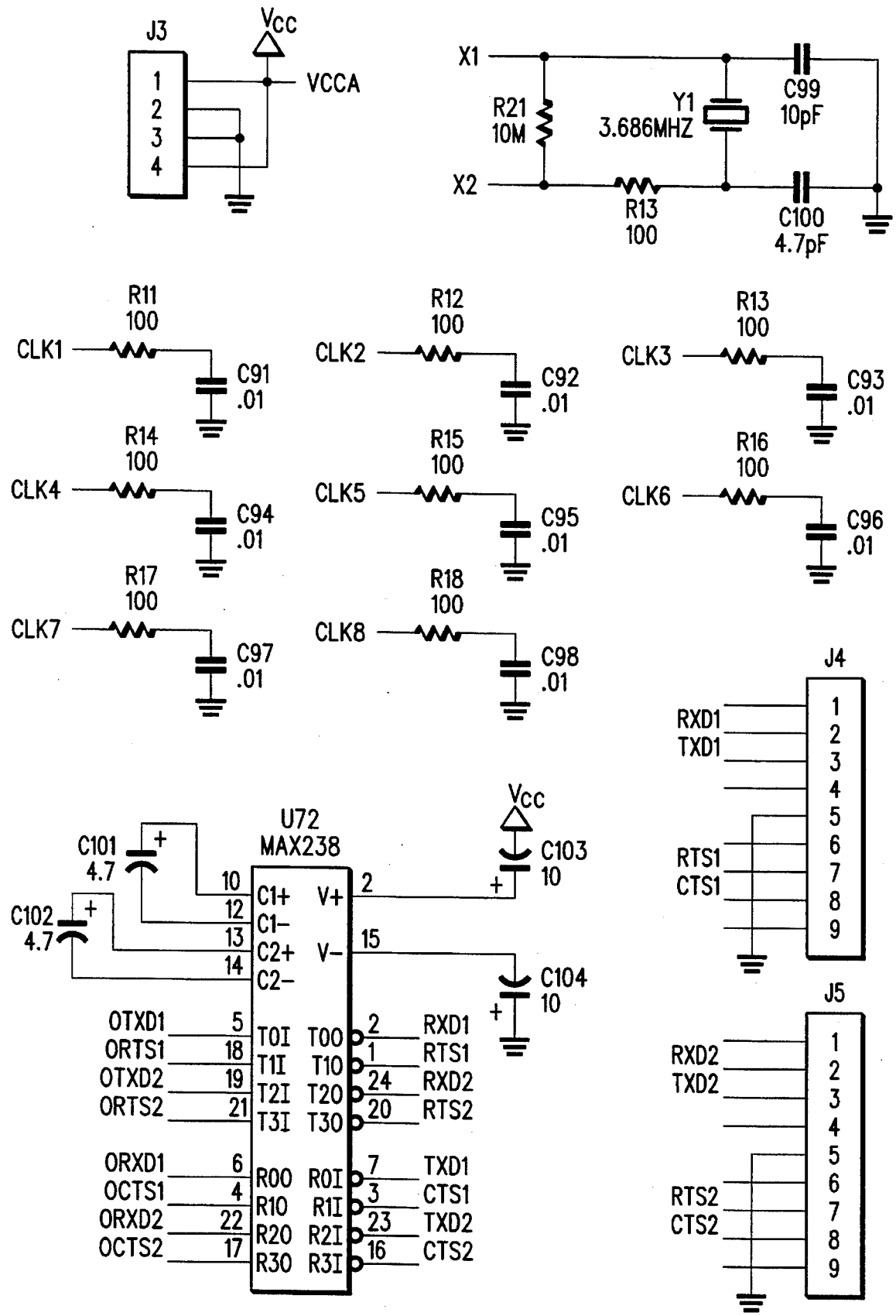
Figures 1, 23:
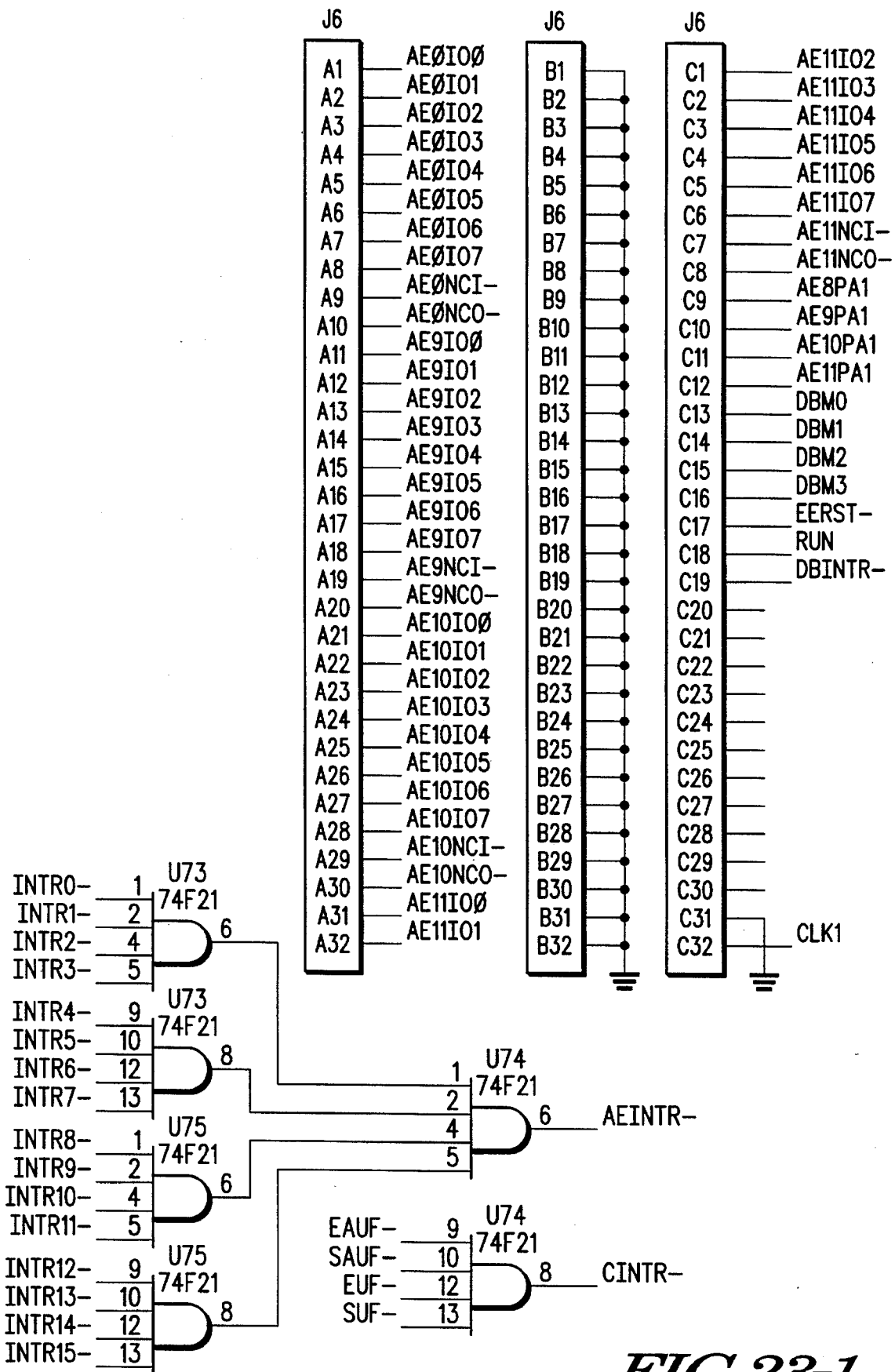
Figures 2, 23:
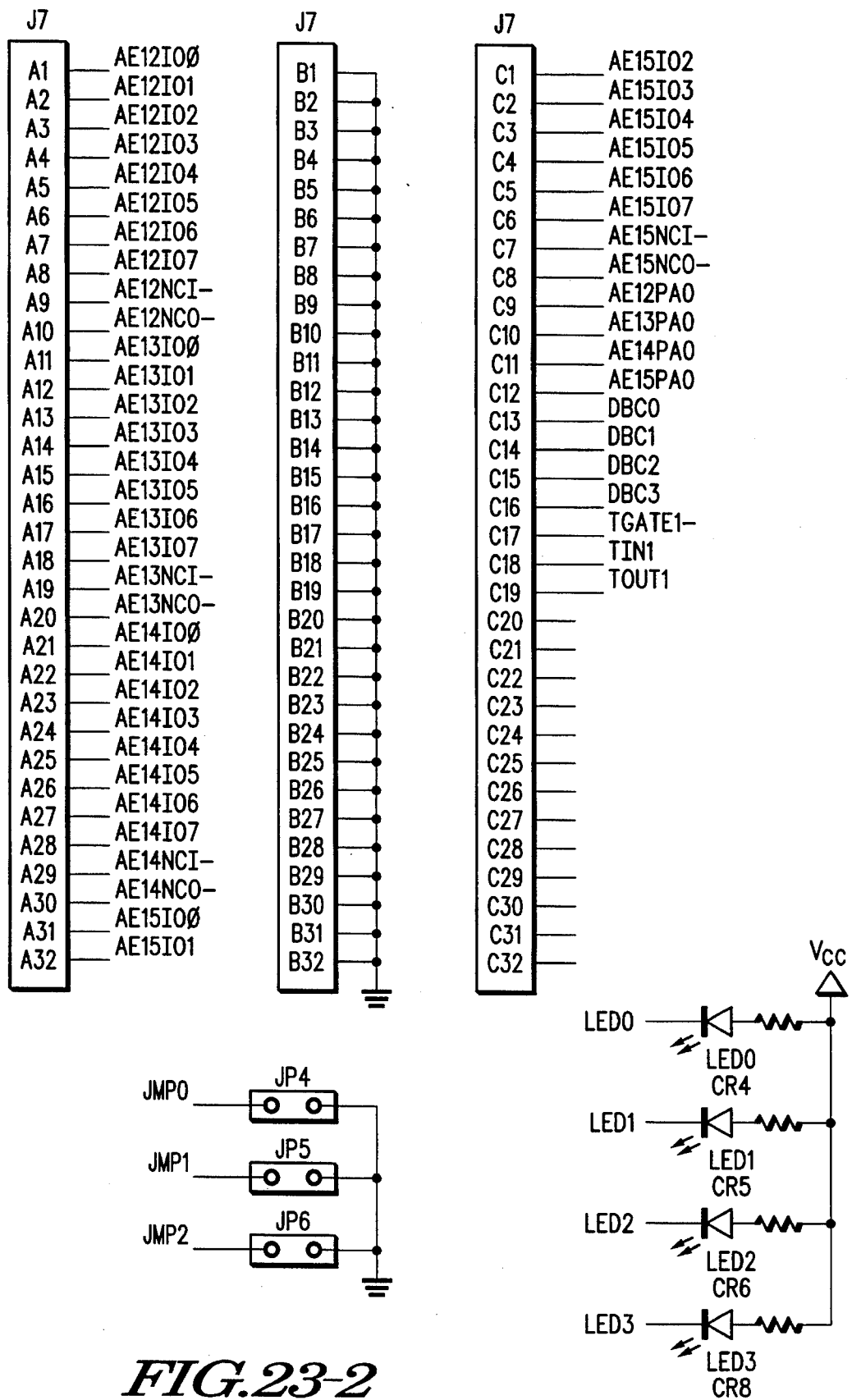
Figures 3, 23:
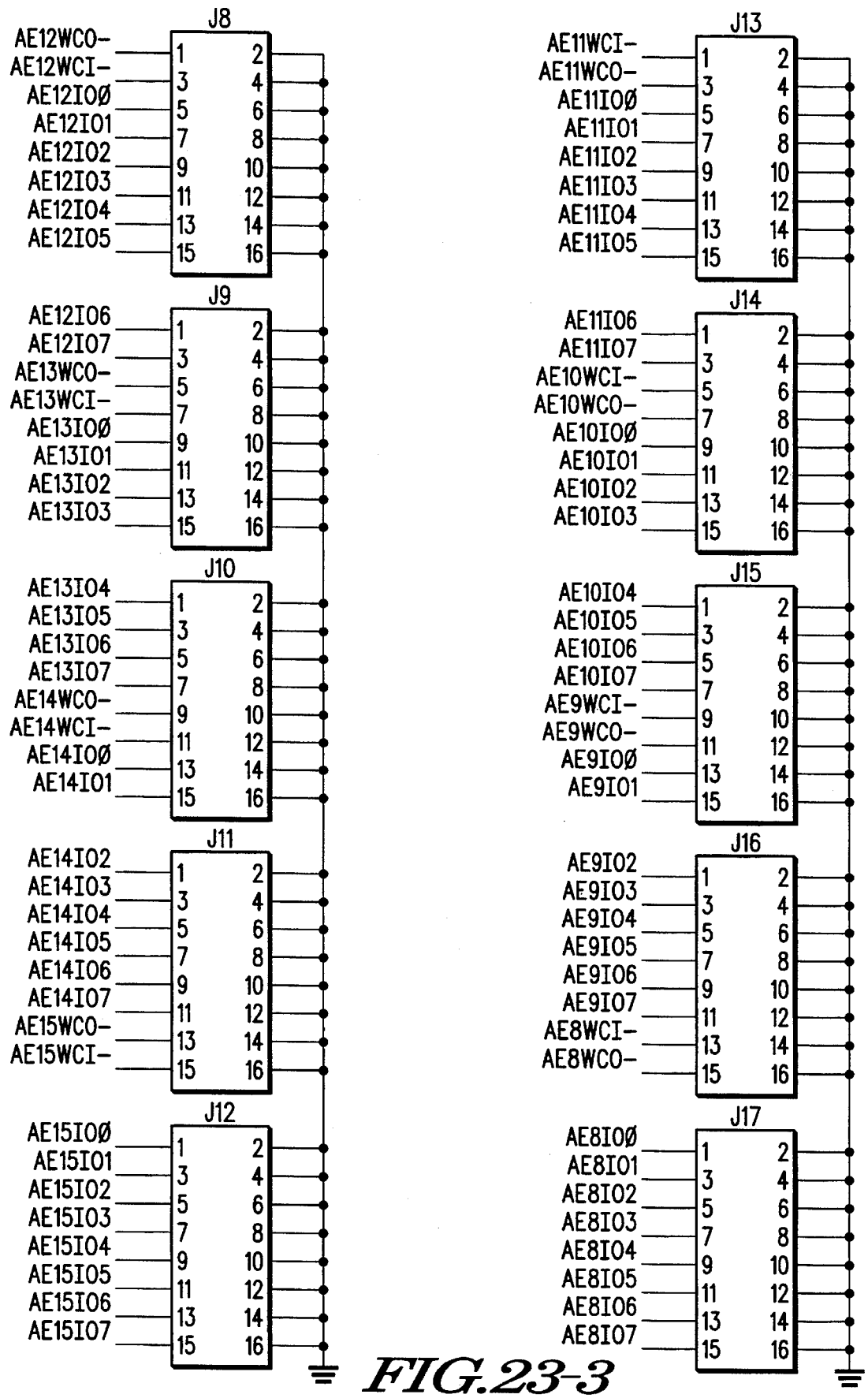
Figures 2, 24:
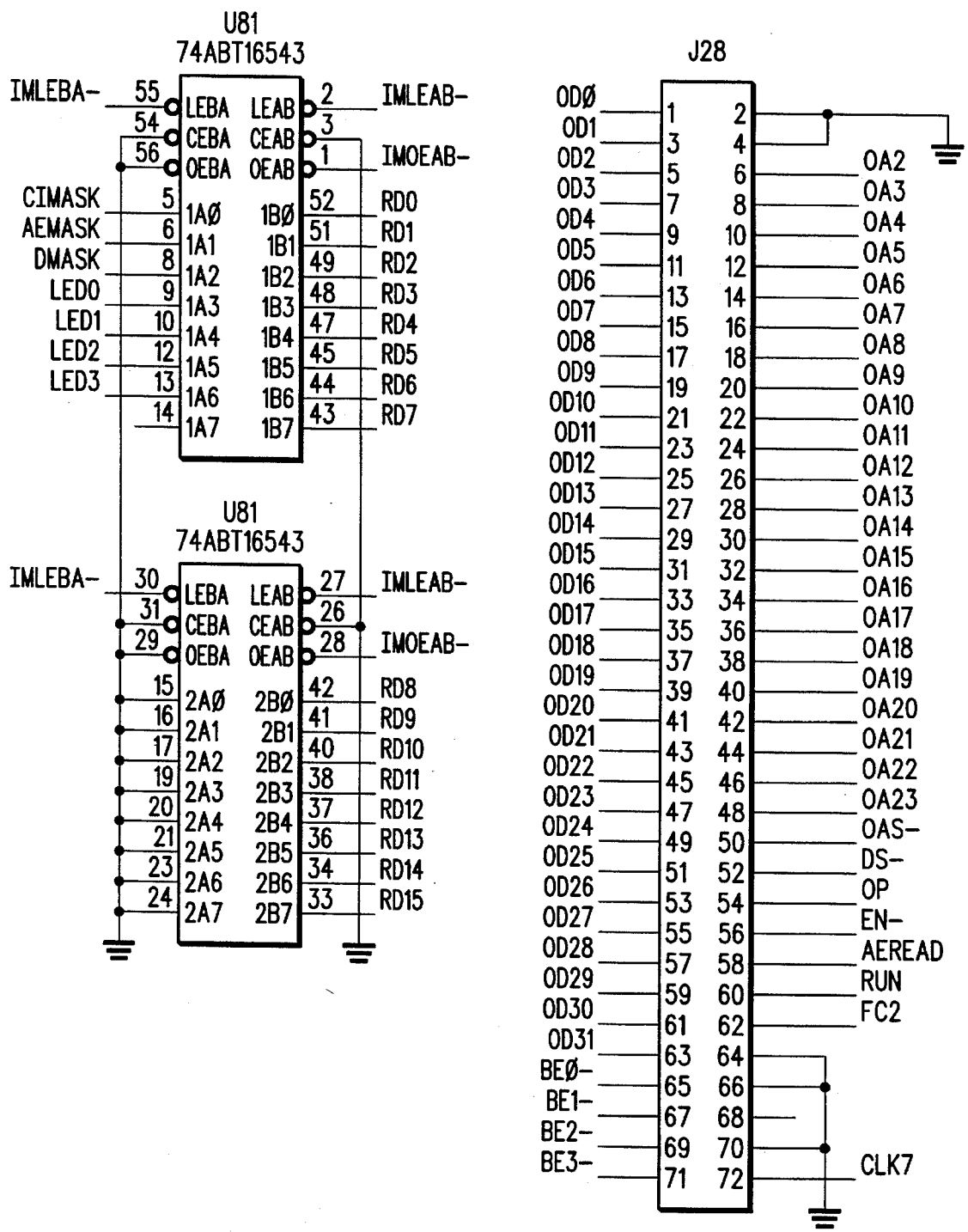
Figures 3, 24:
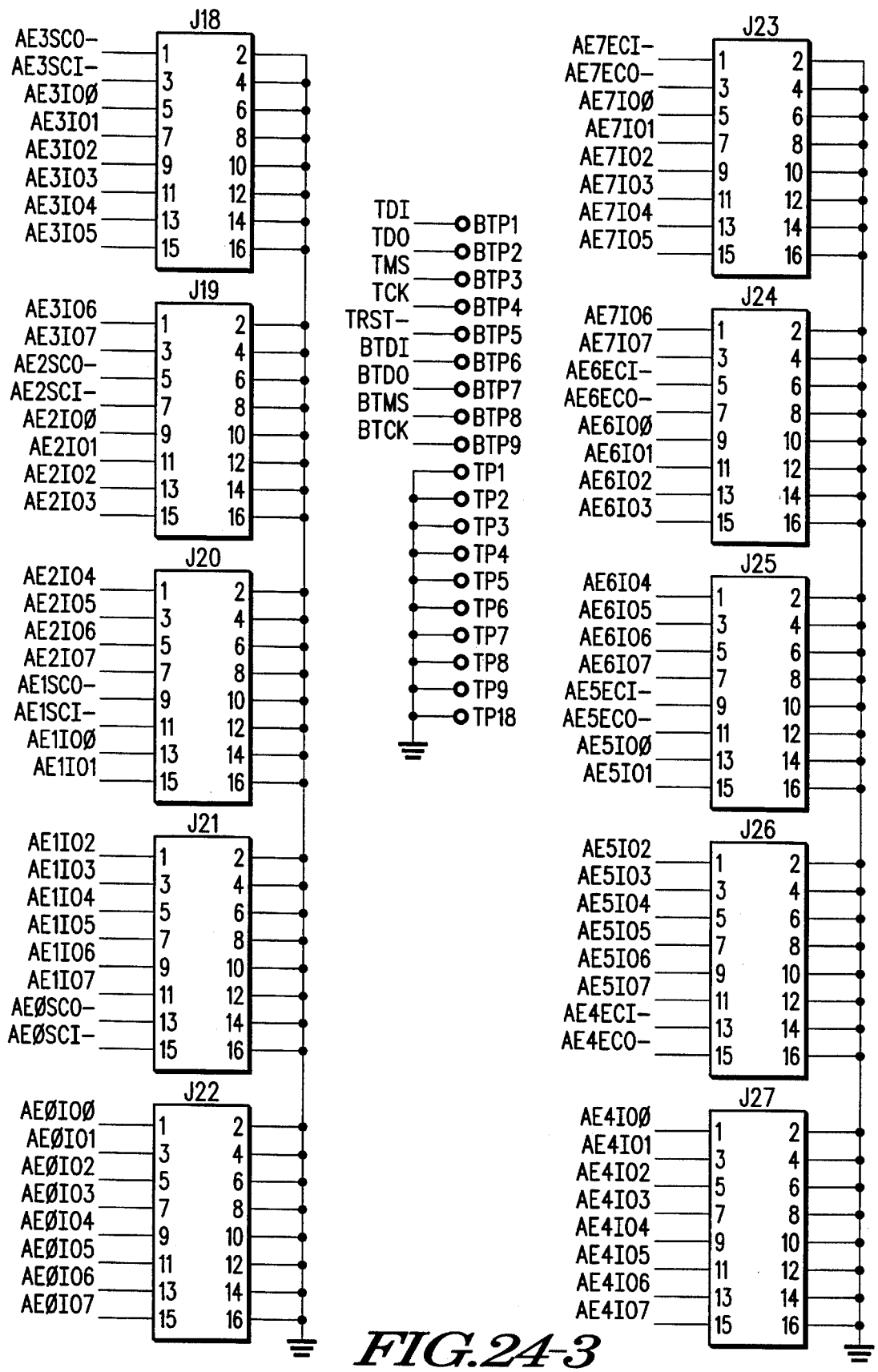
Figures 1, 25:
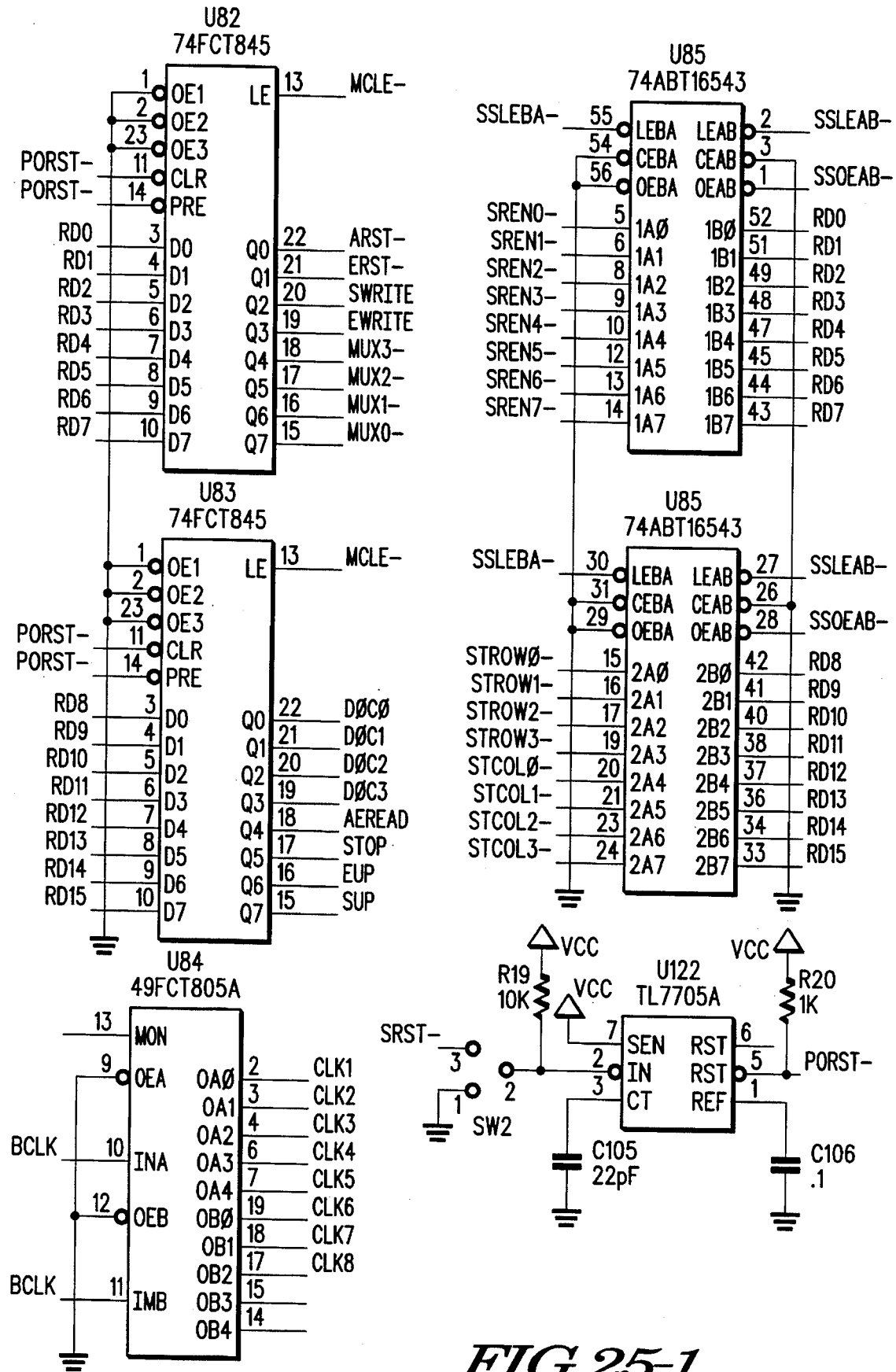
Figures 2, 25:
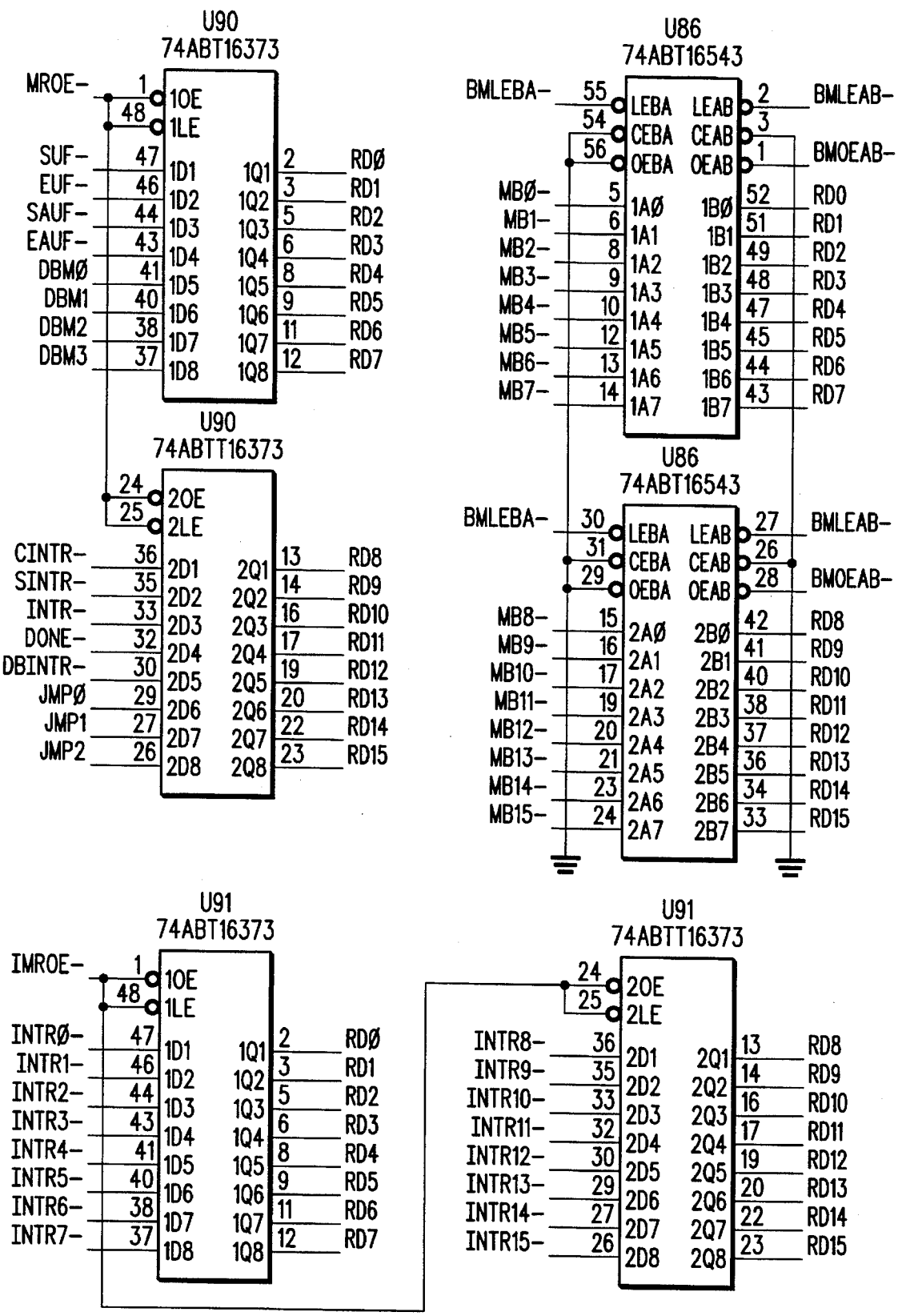
Figures 3, 25:
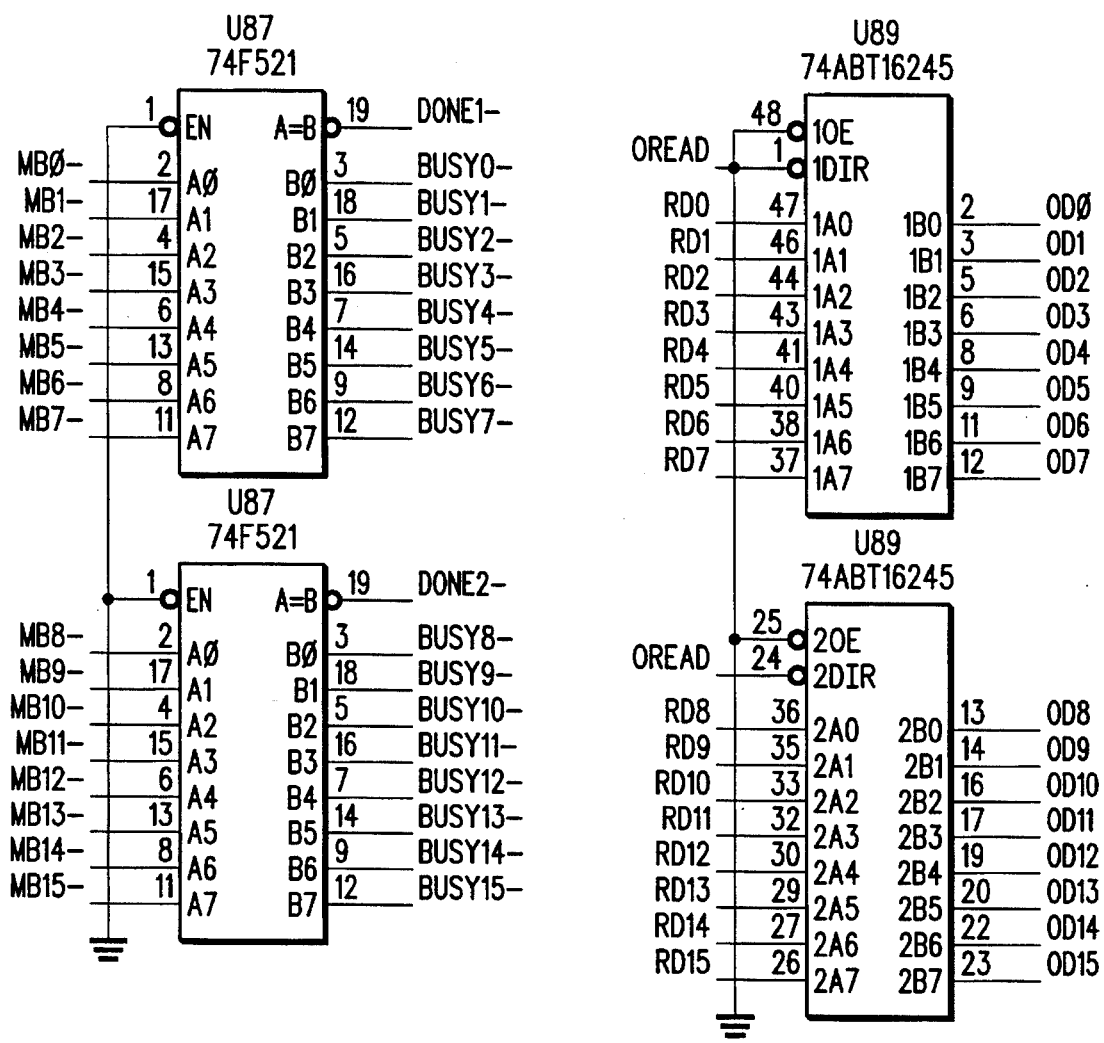
Figures 4, 25:
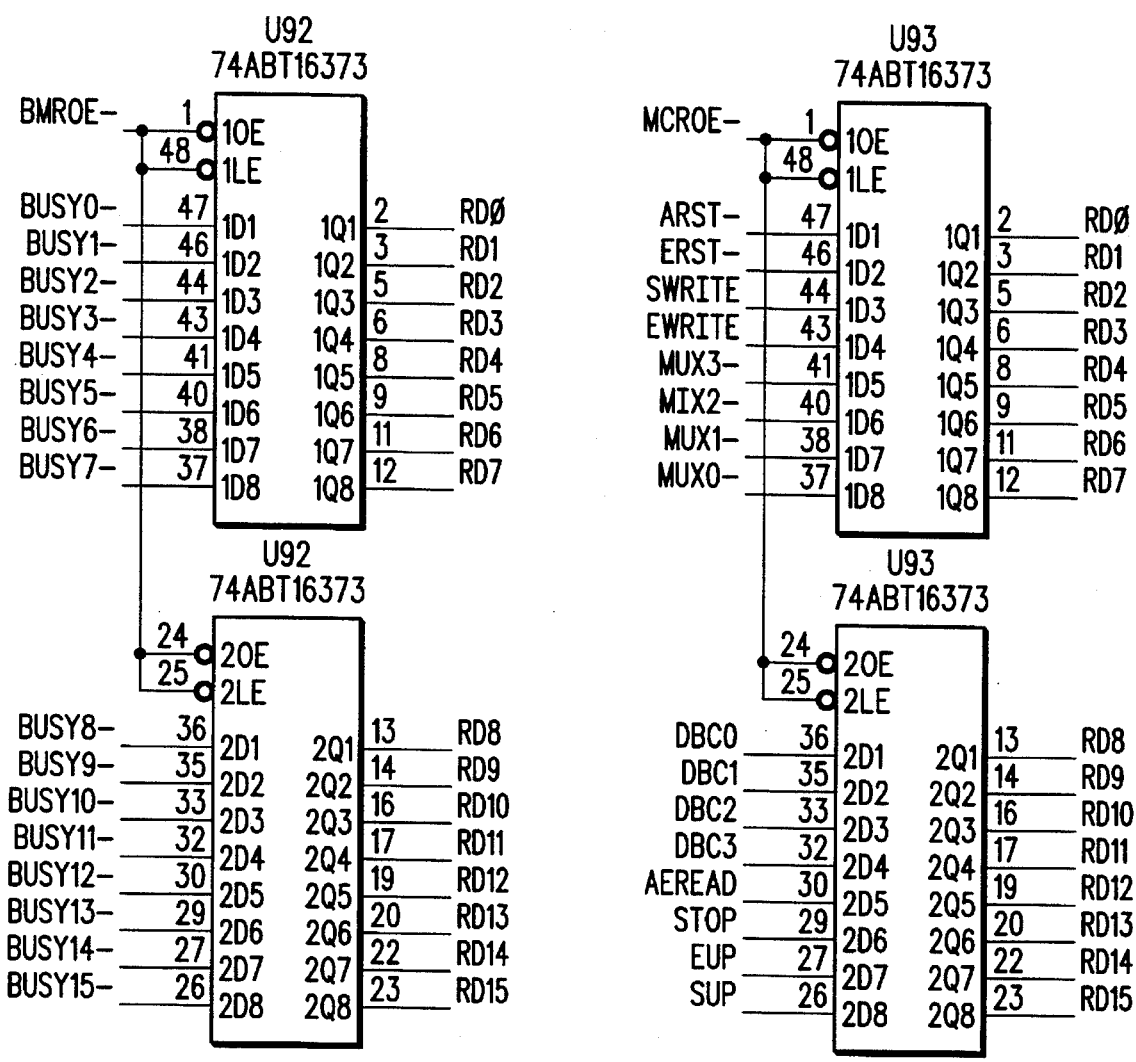
Figures 1, 26:
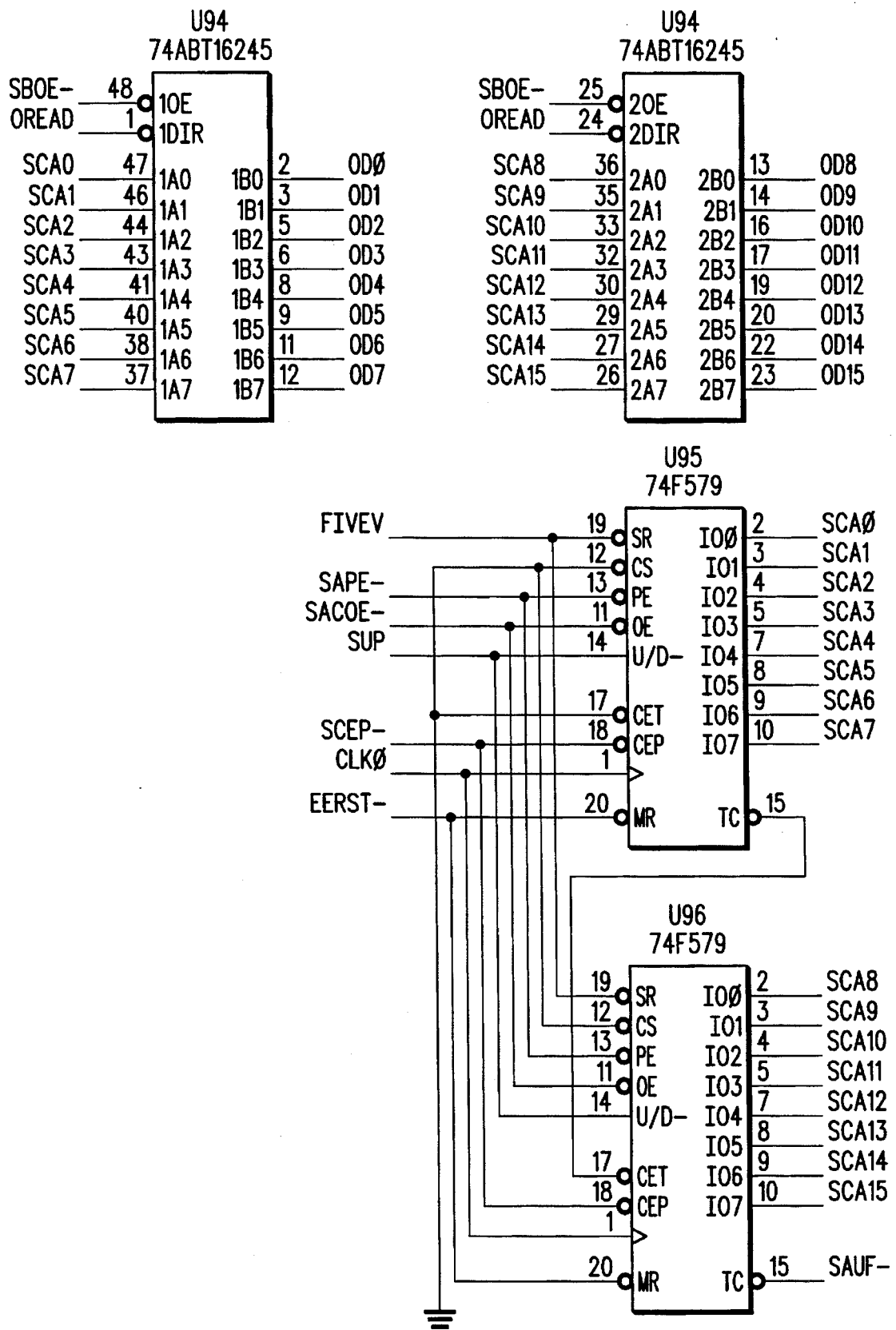
Figures 2, 26:
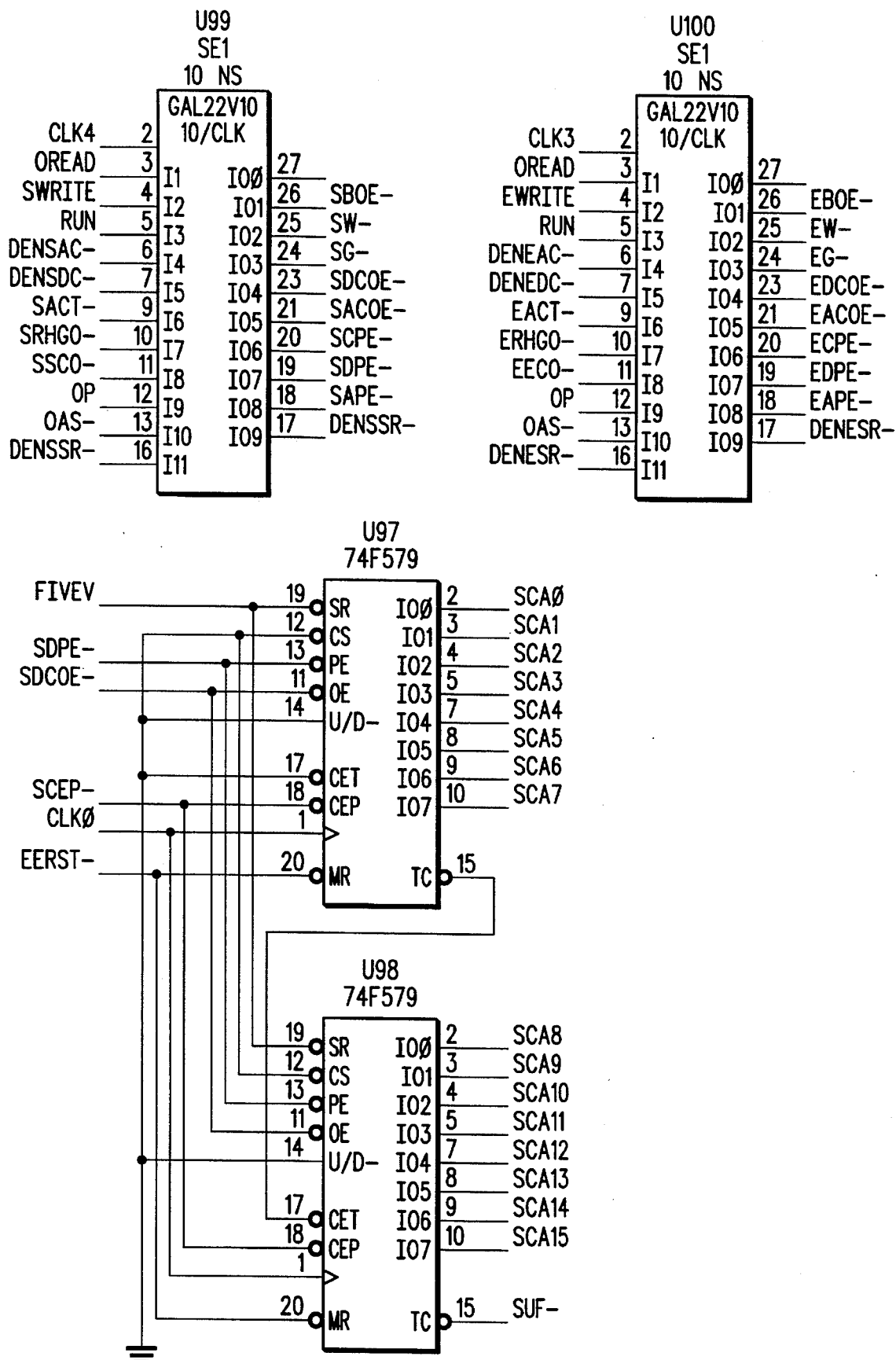
Figures 3, 26:
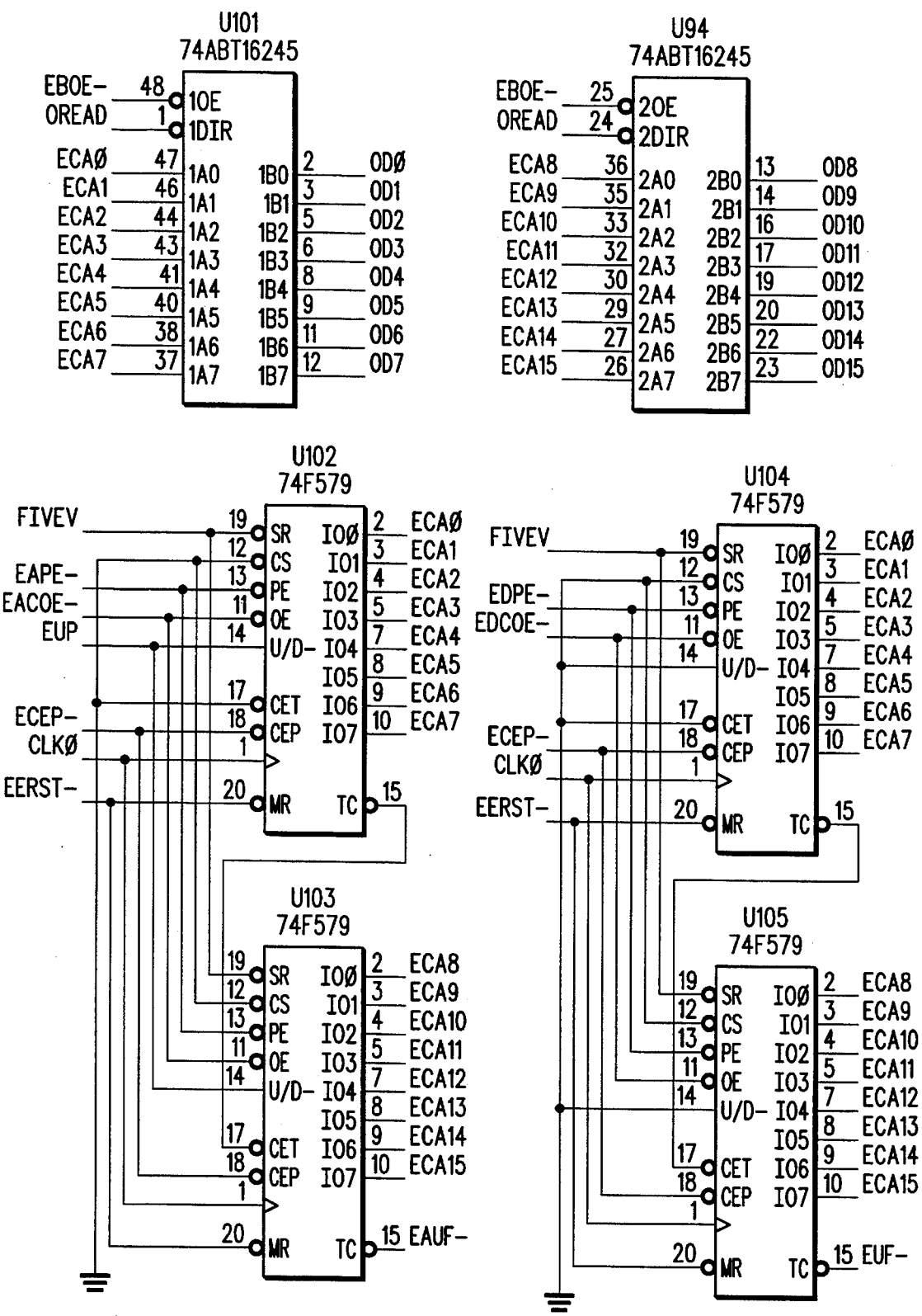
Figure 27A:
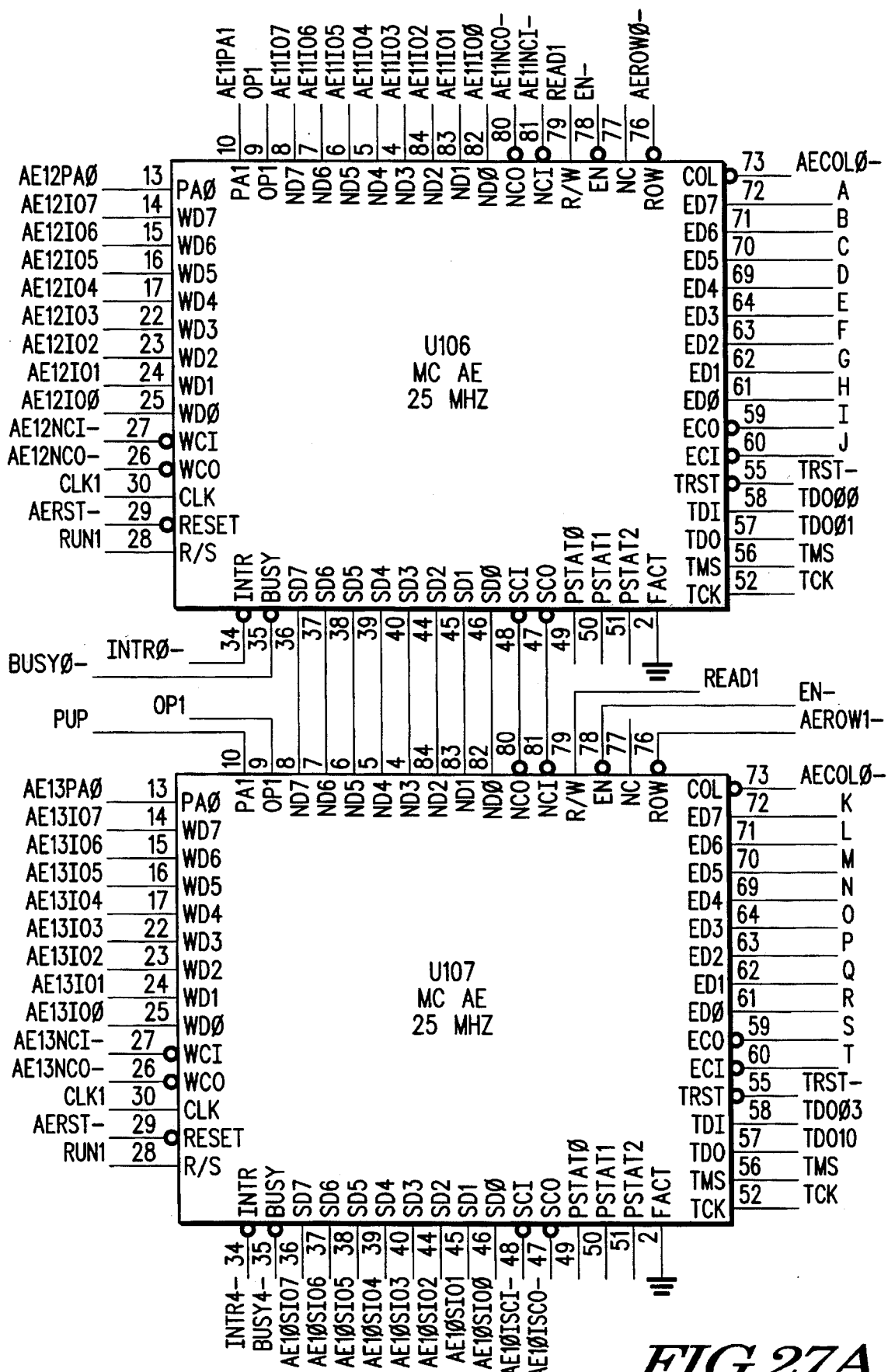
Figure 27B:
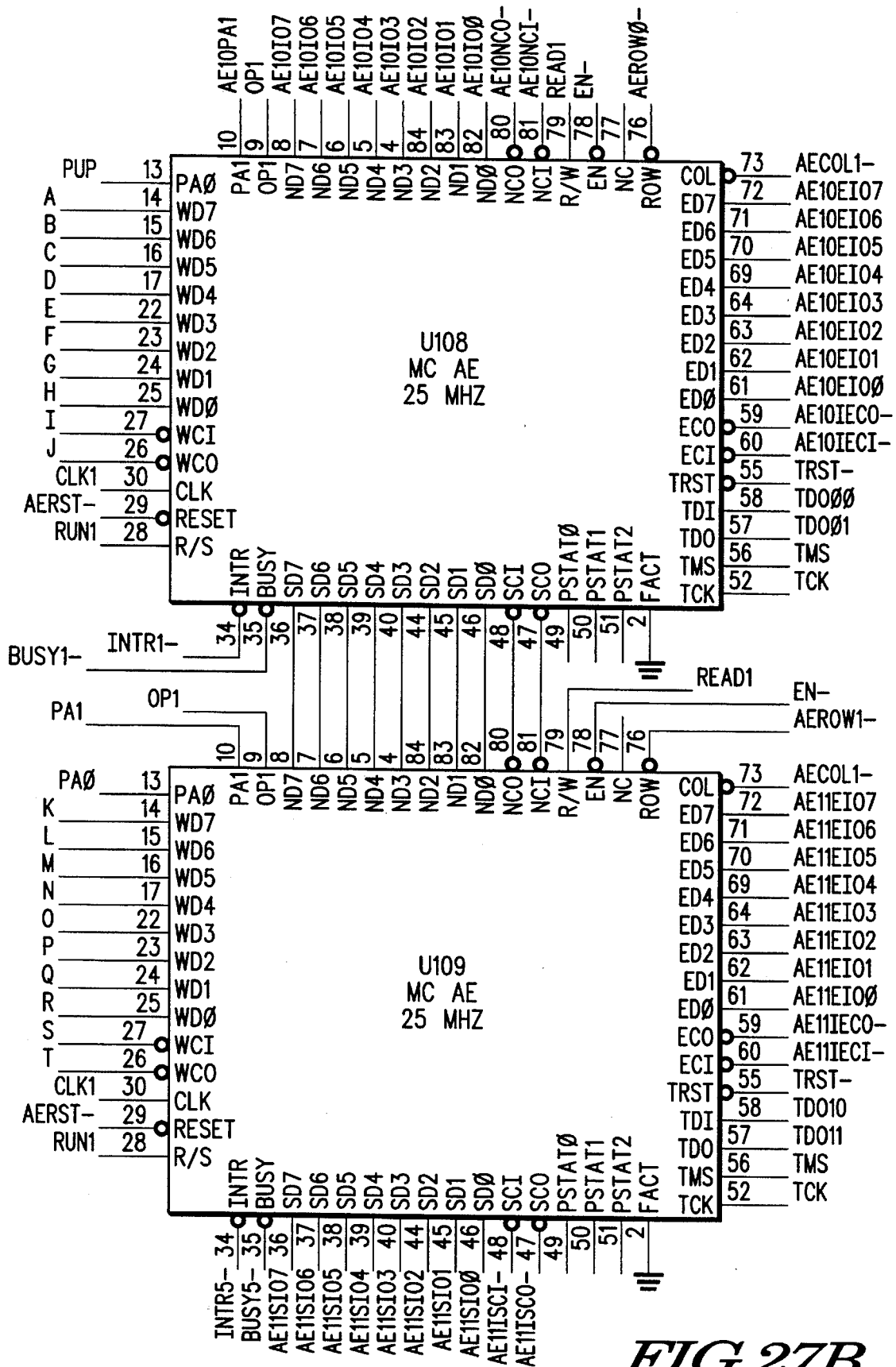
Figure 28A:
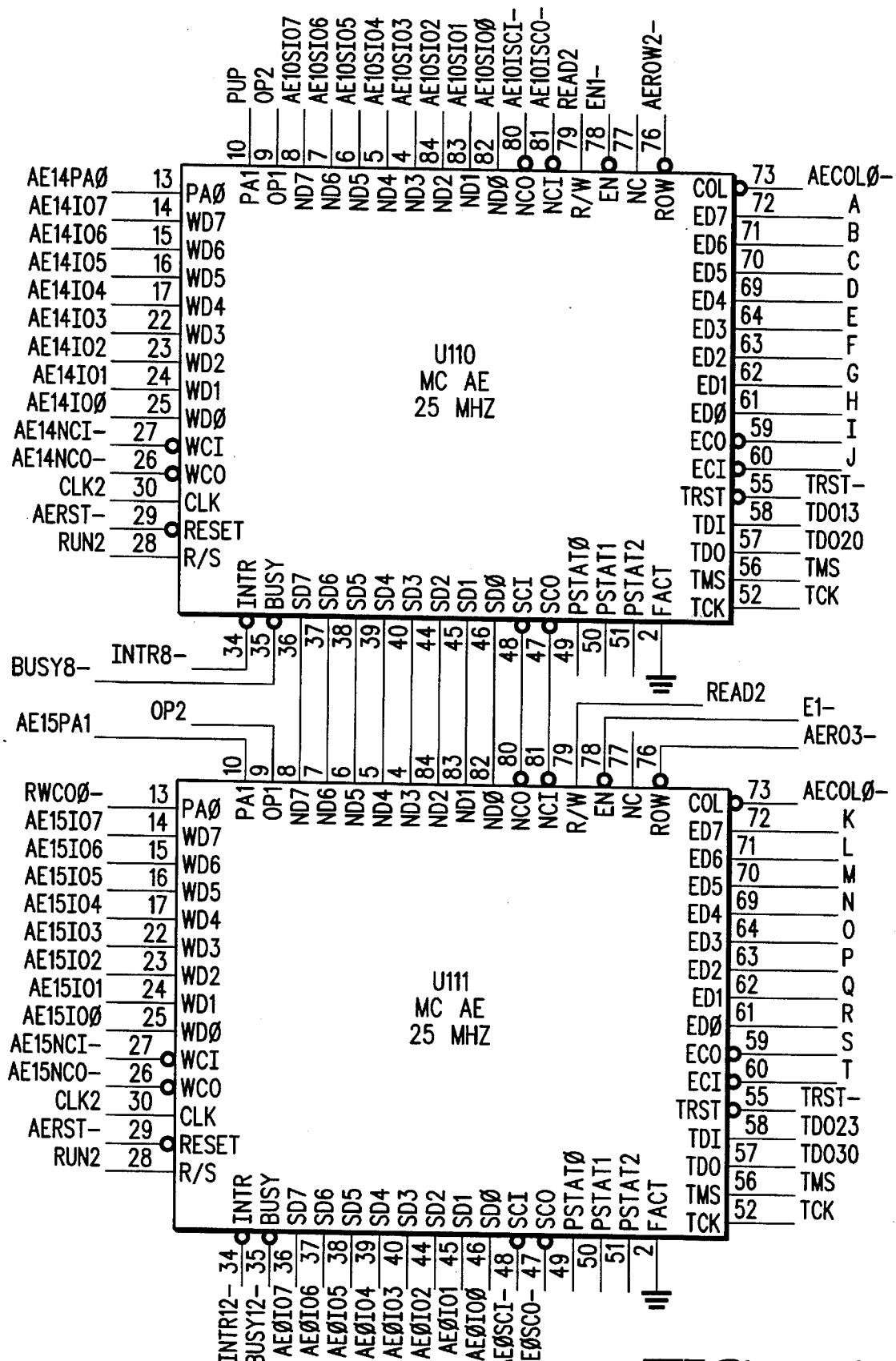
Figure 28B:
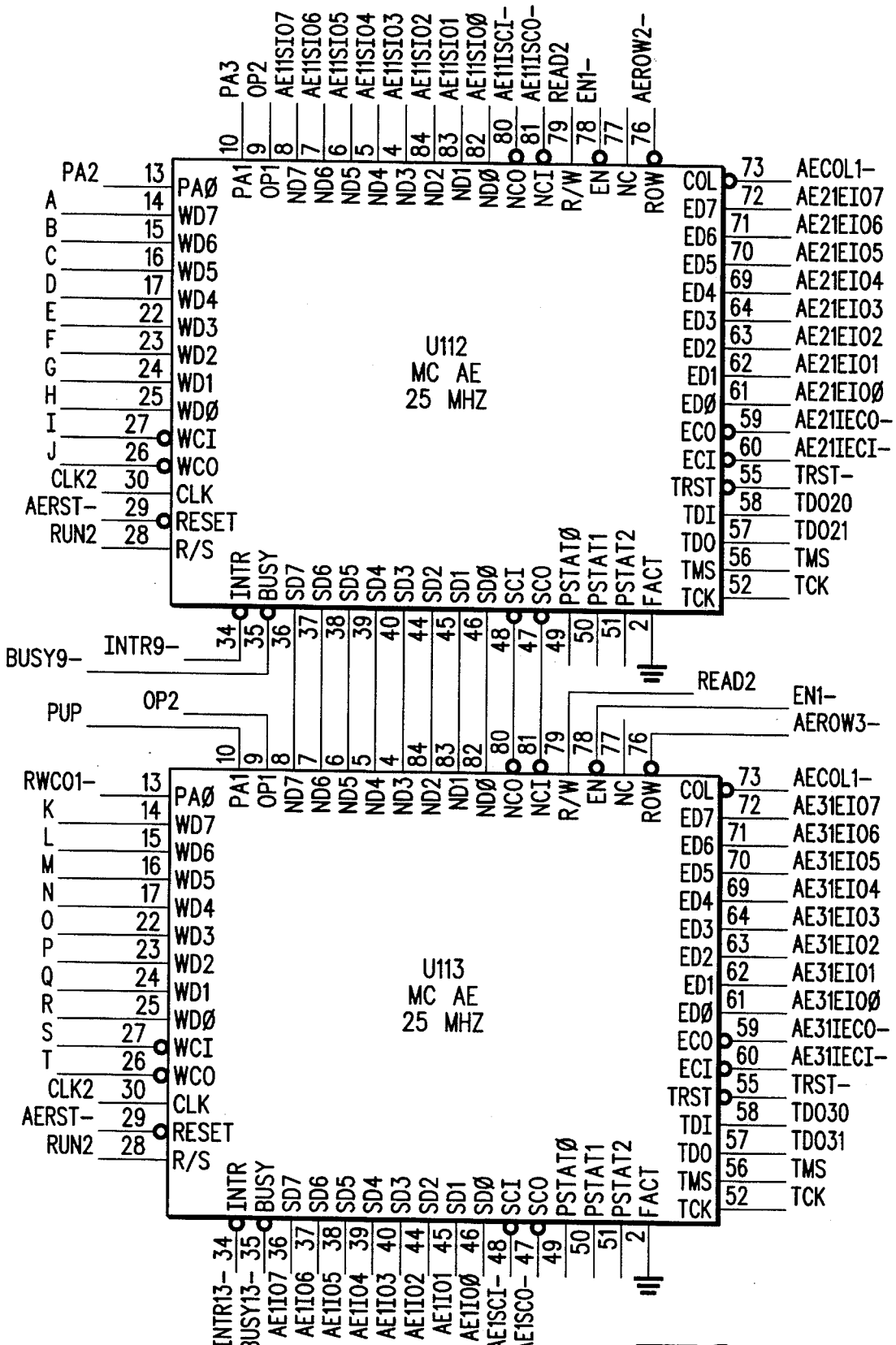
Figure 29A:
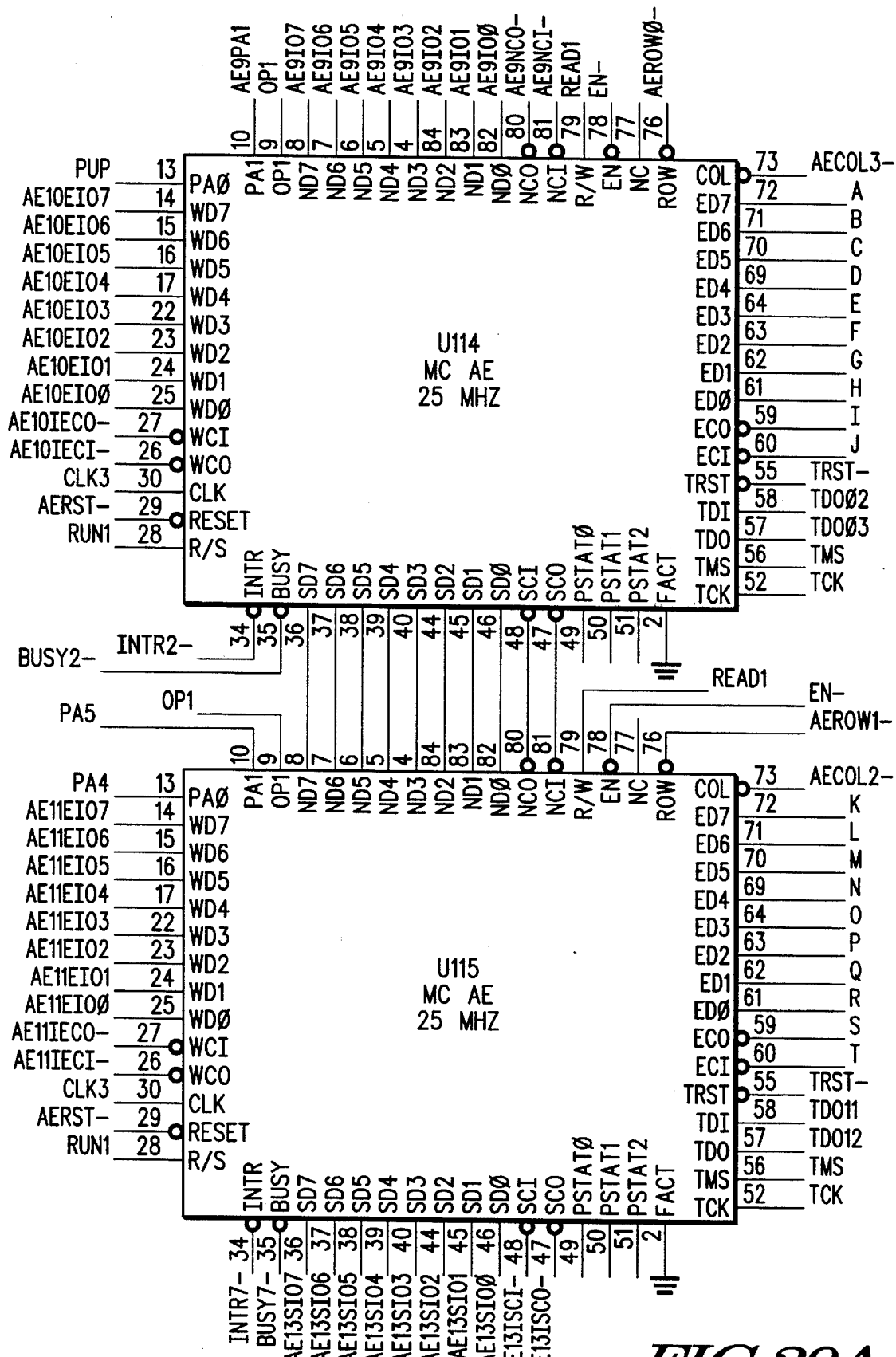
Figure 29B:
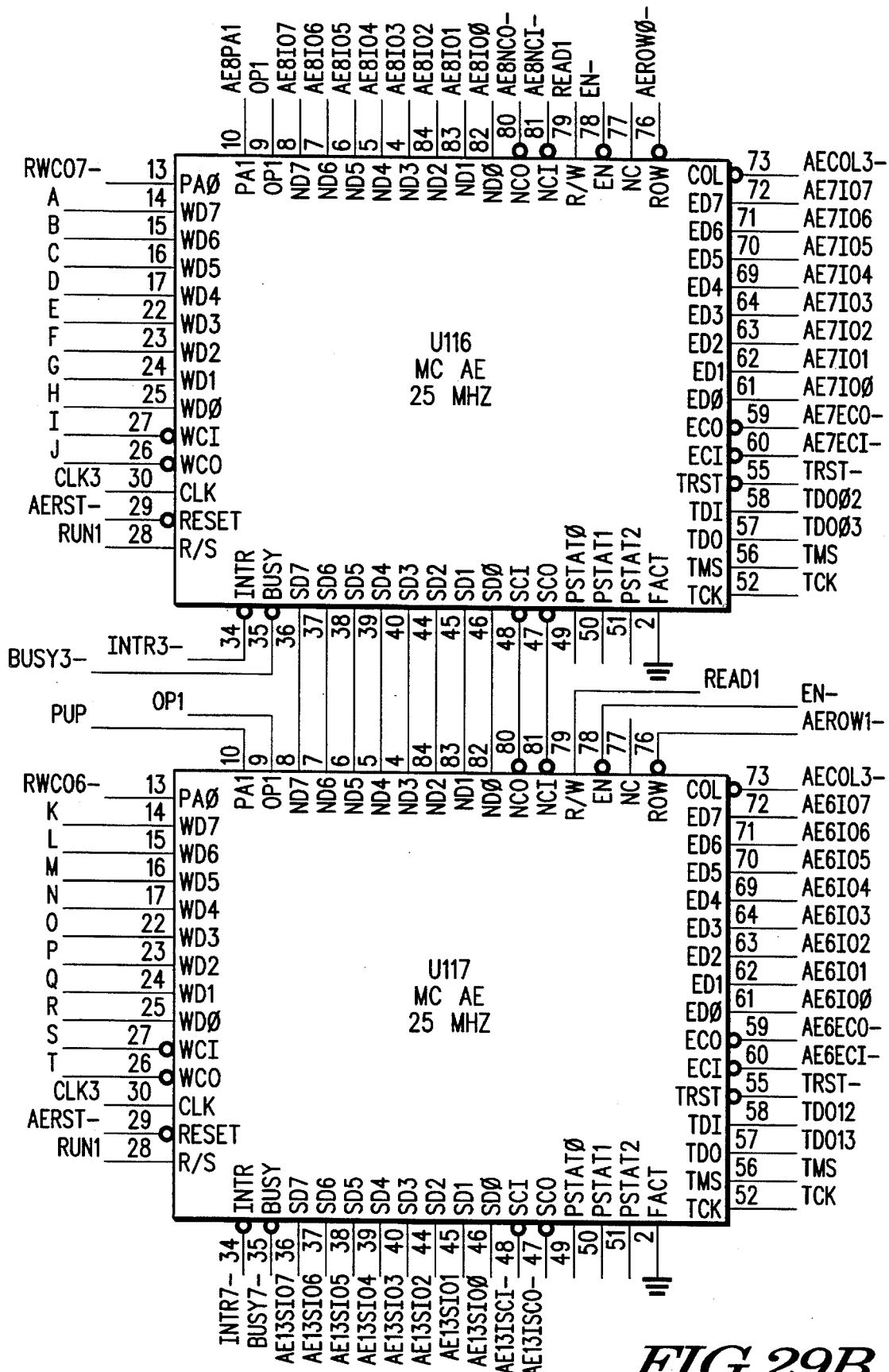
Figure 30A:
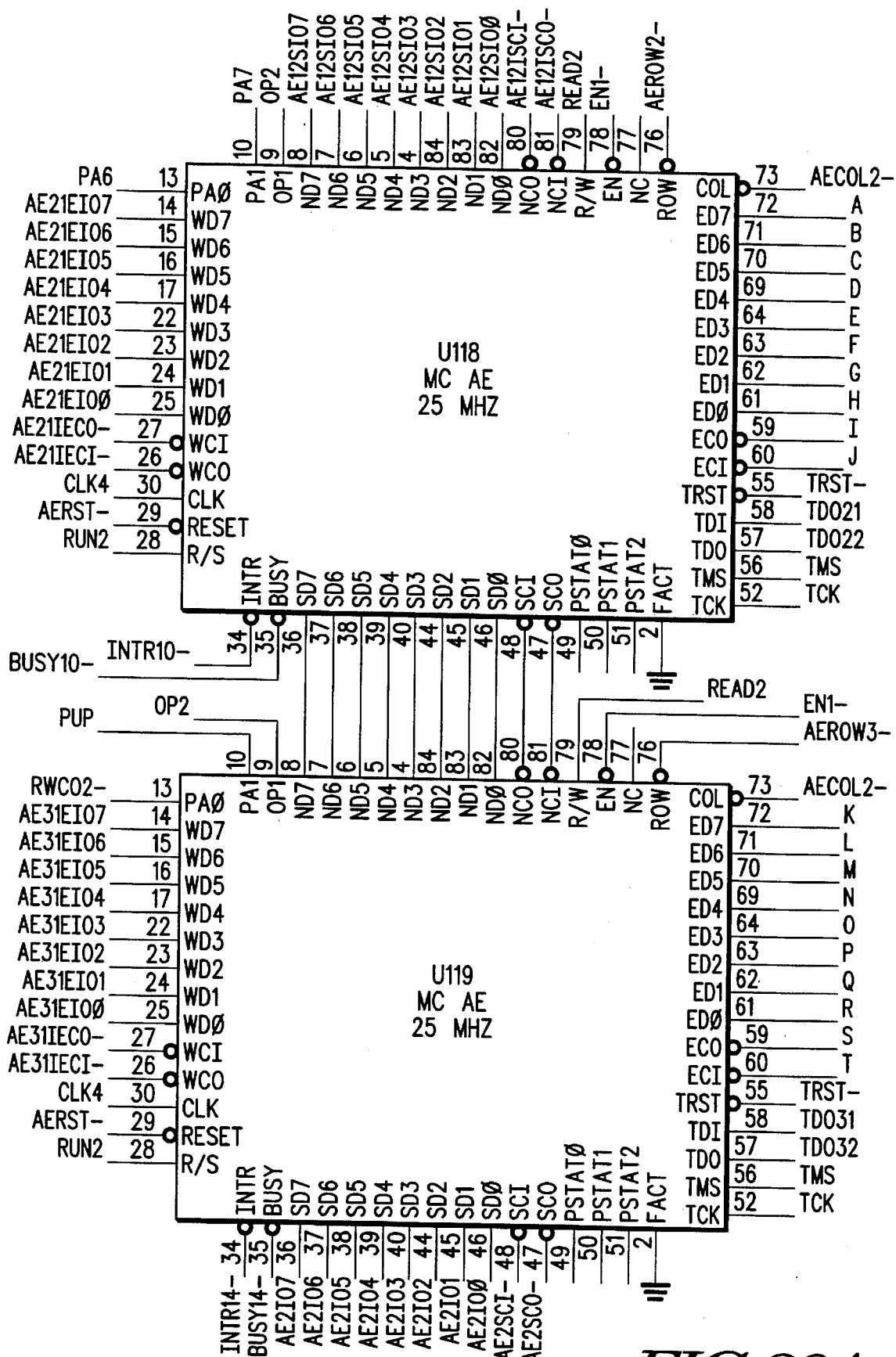
Figure 30B:
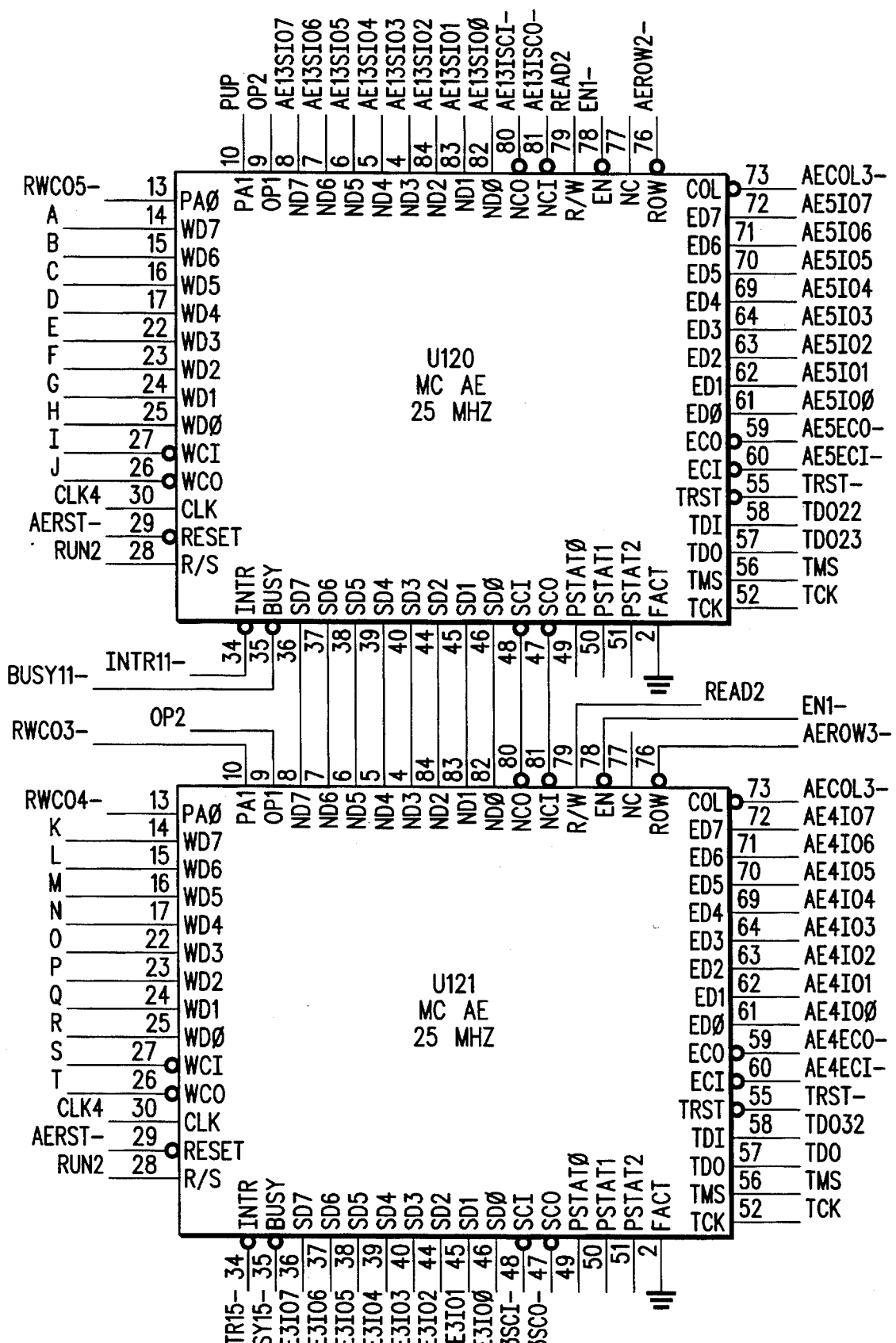
Figure 32:
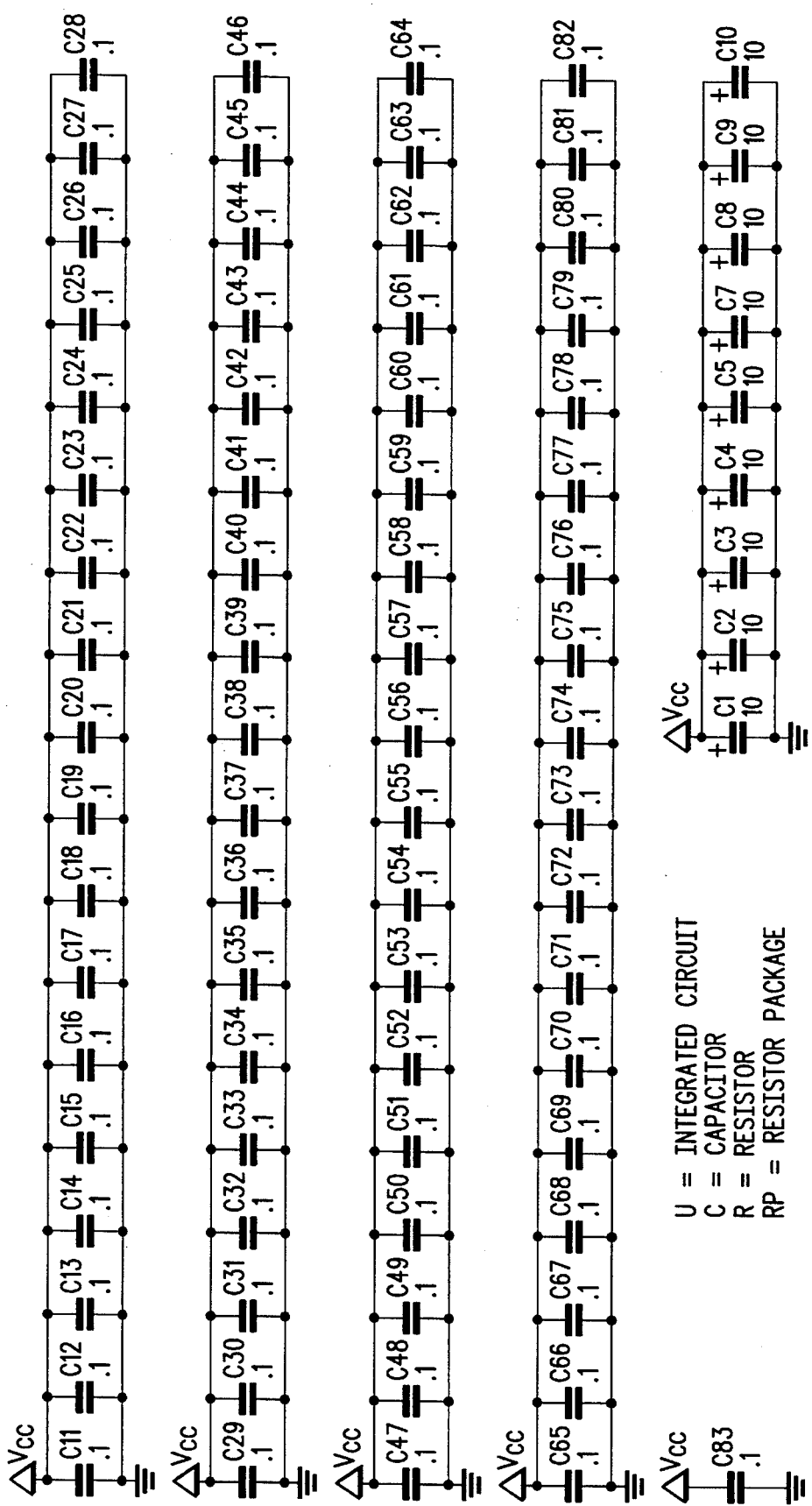
Figures 1, 33:
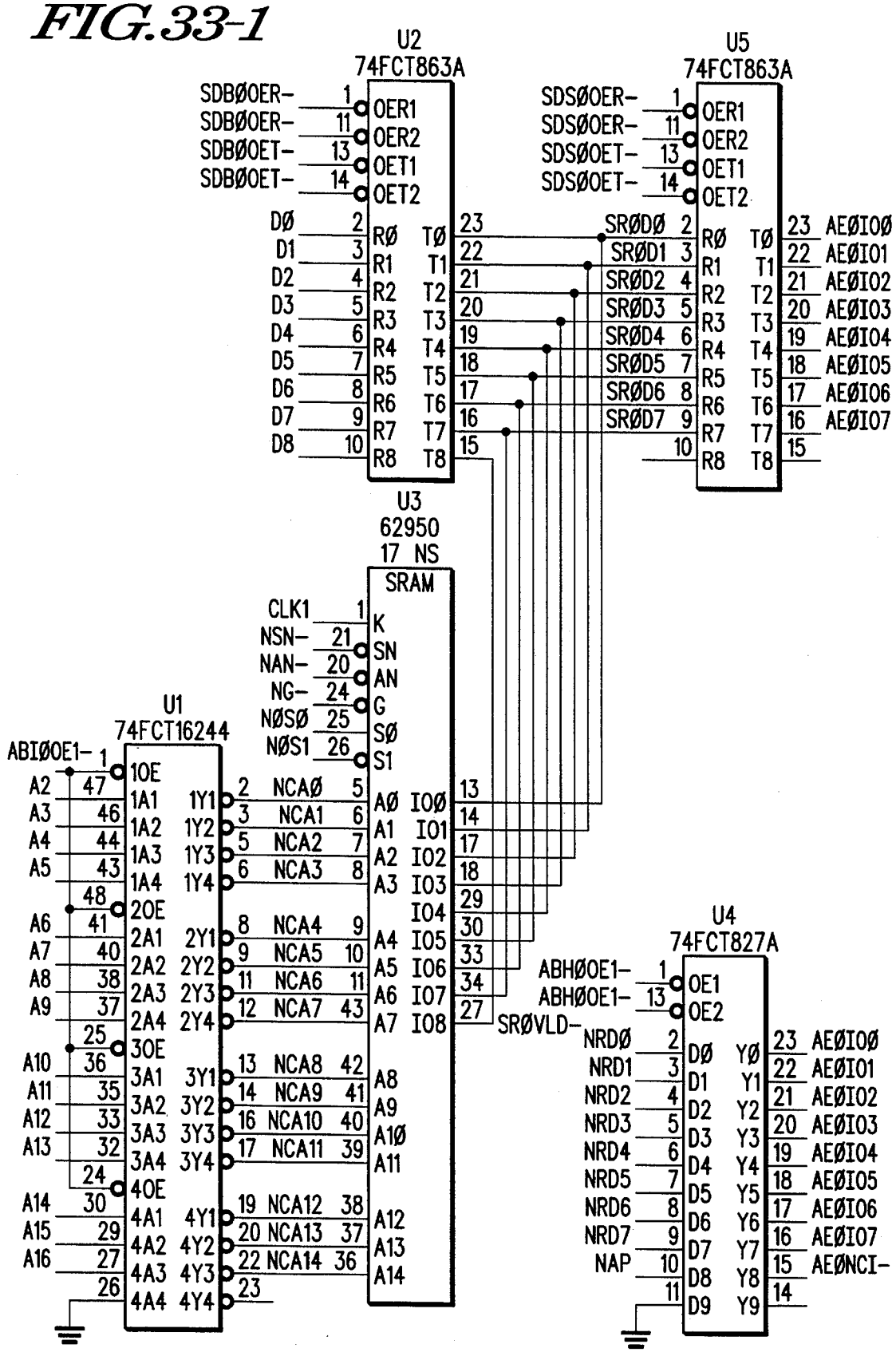
Figures 2, 33:
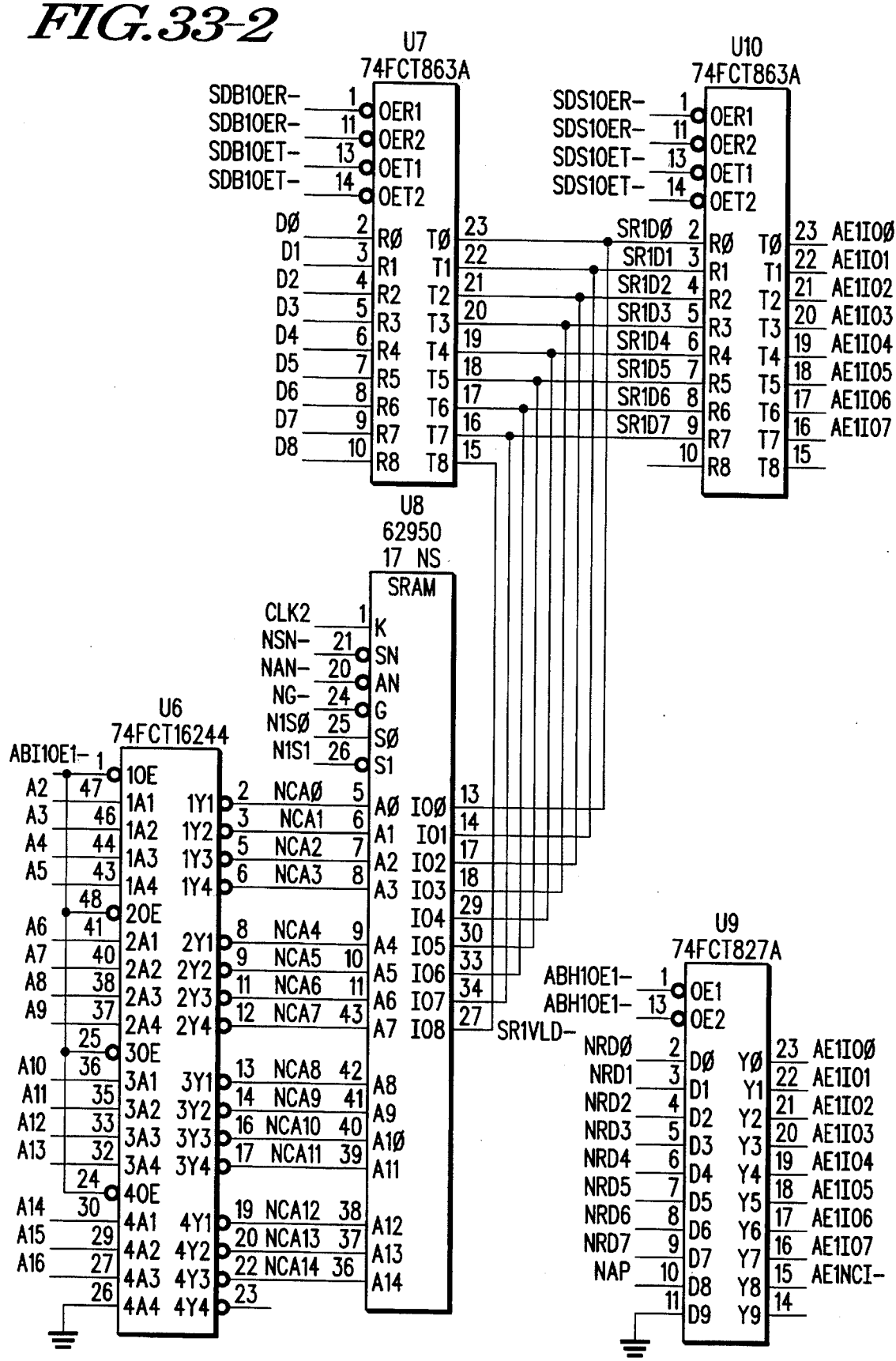
Figures 1, 34:
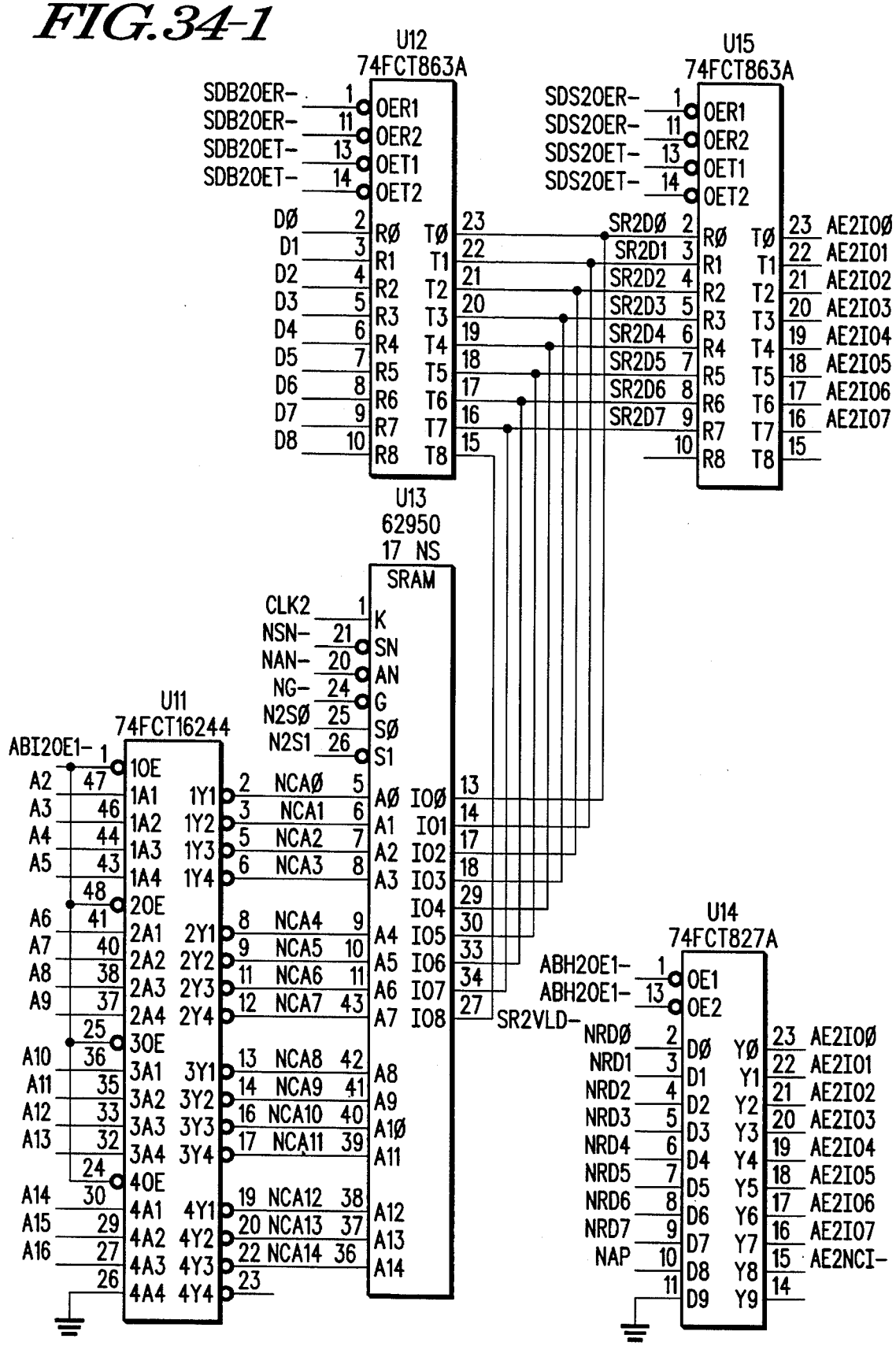
Figures 2, 34:
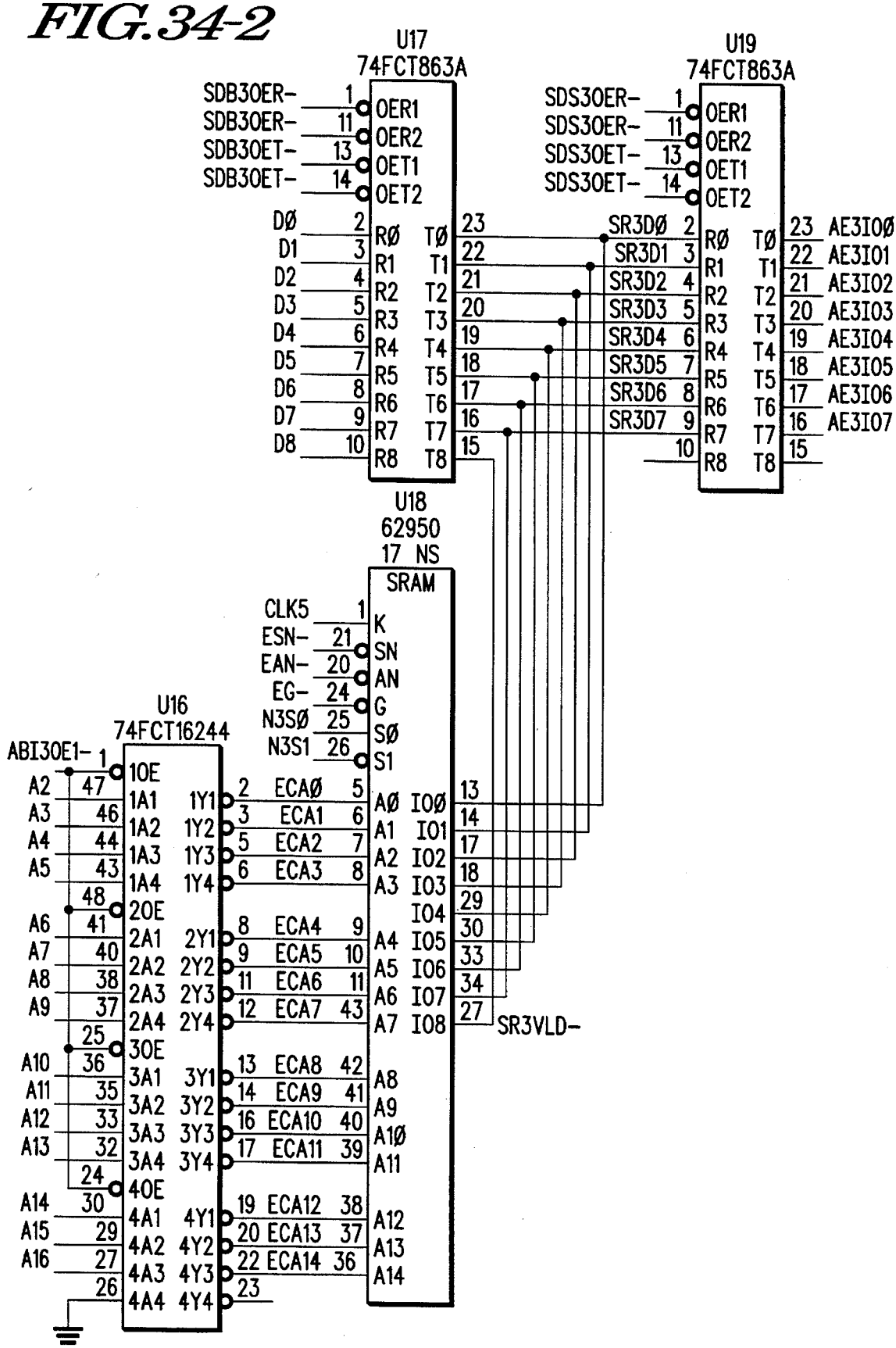
Figures 1, 35:
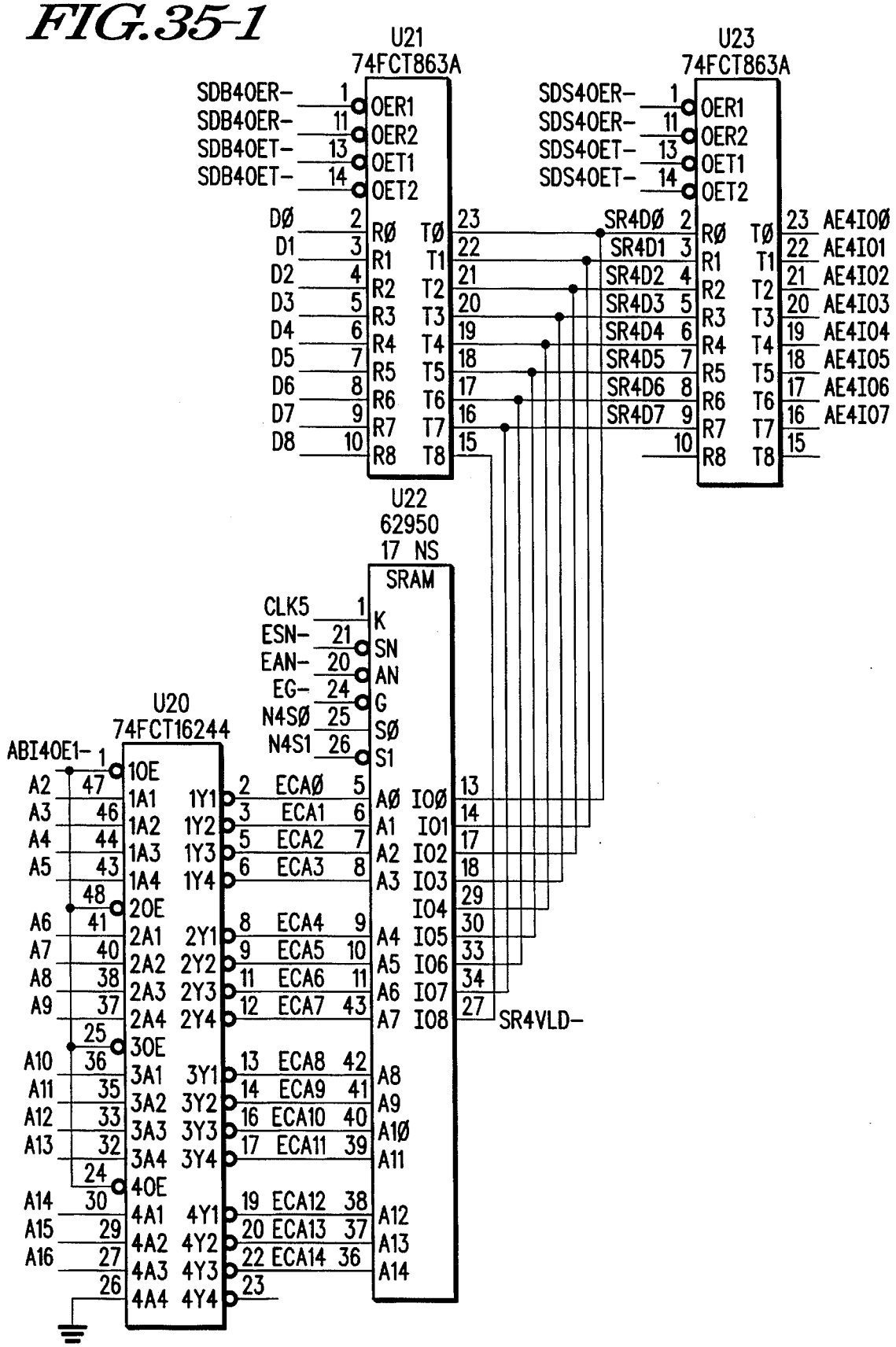
Figures 2, 35:
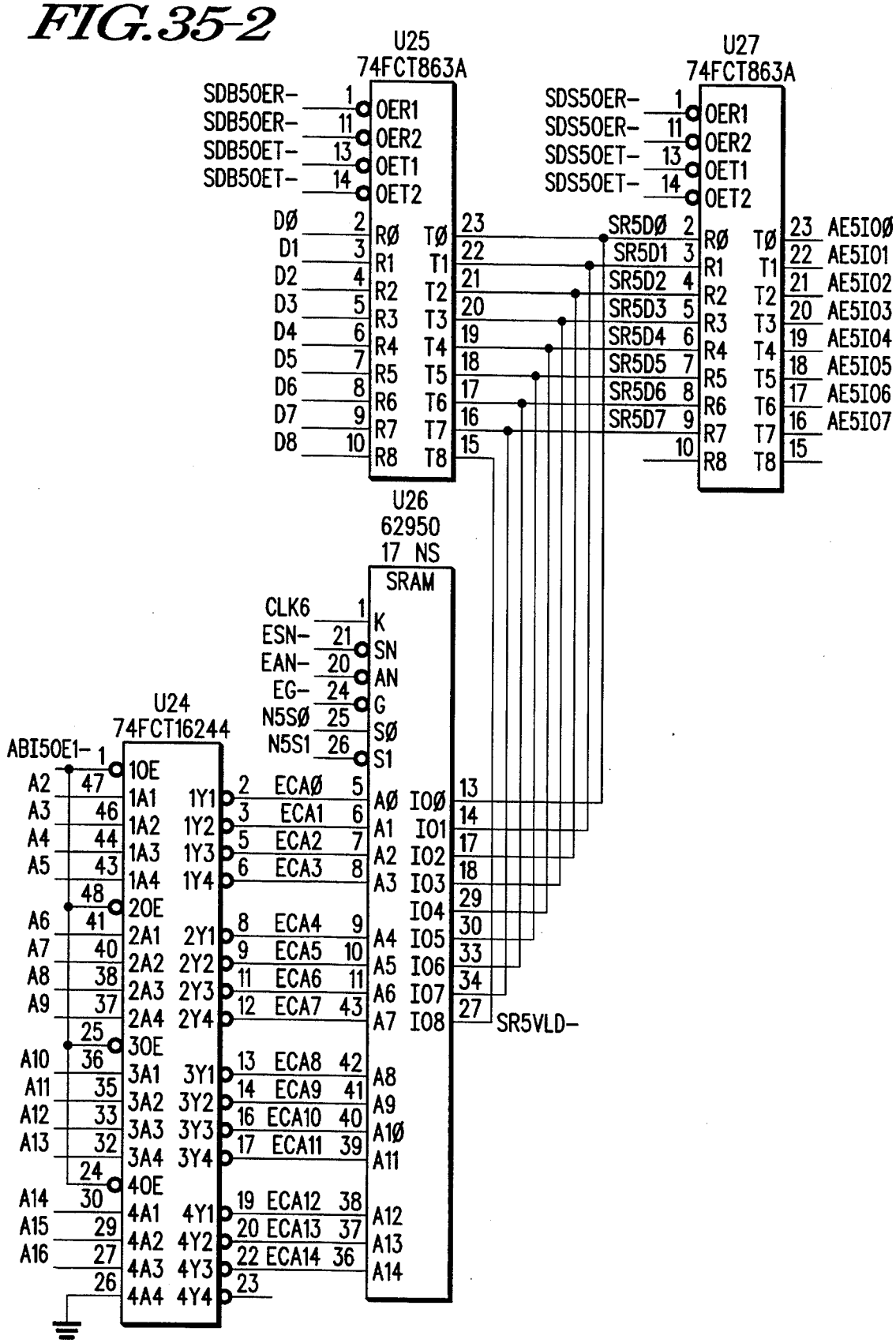
Figures 1, 36:
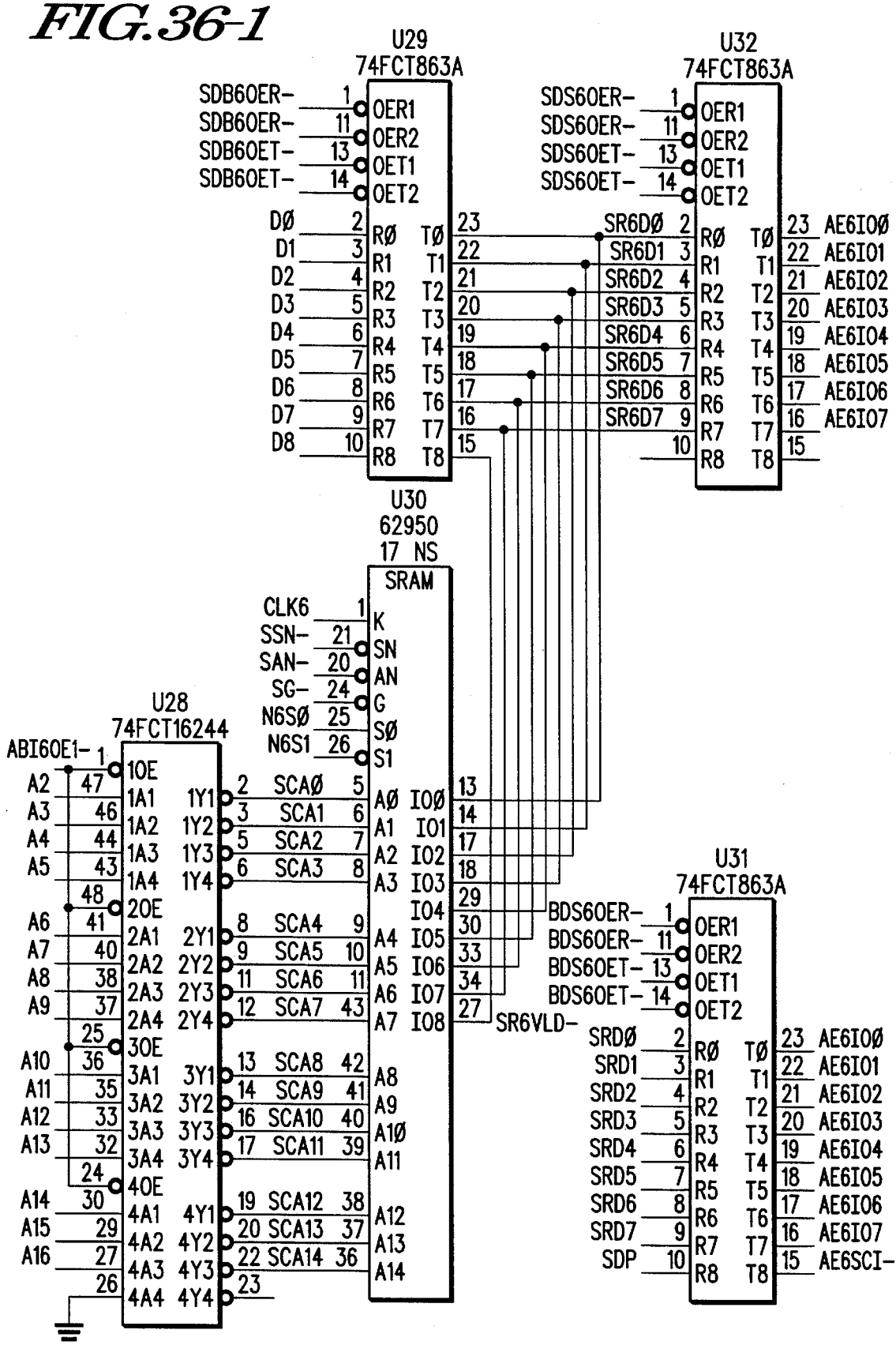
Figures 2, 36:
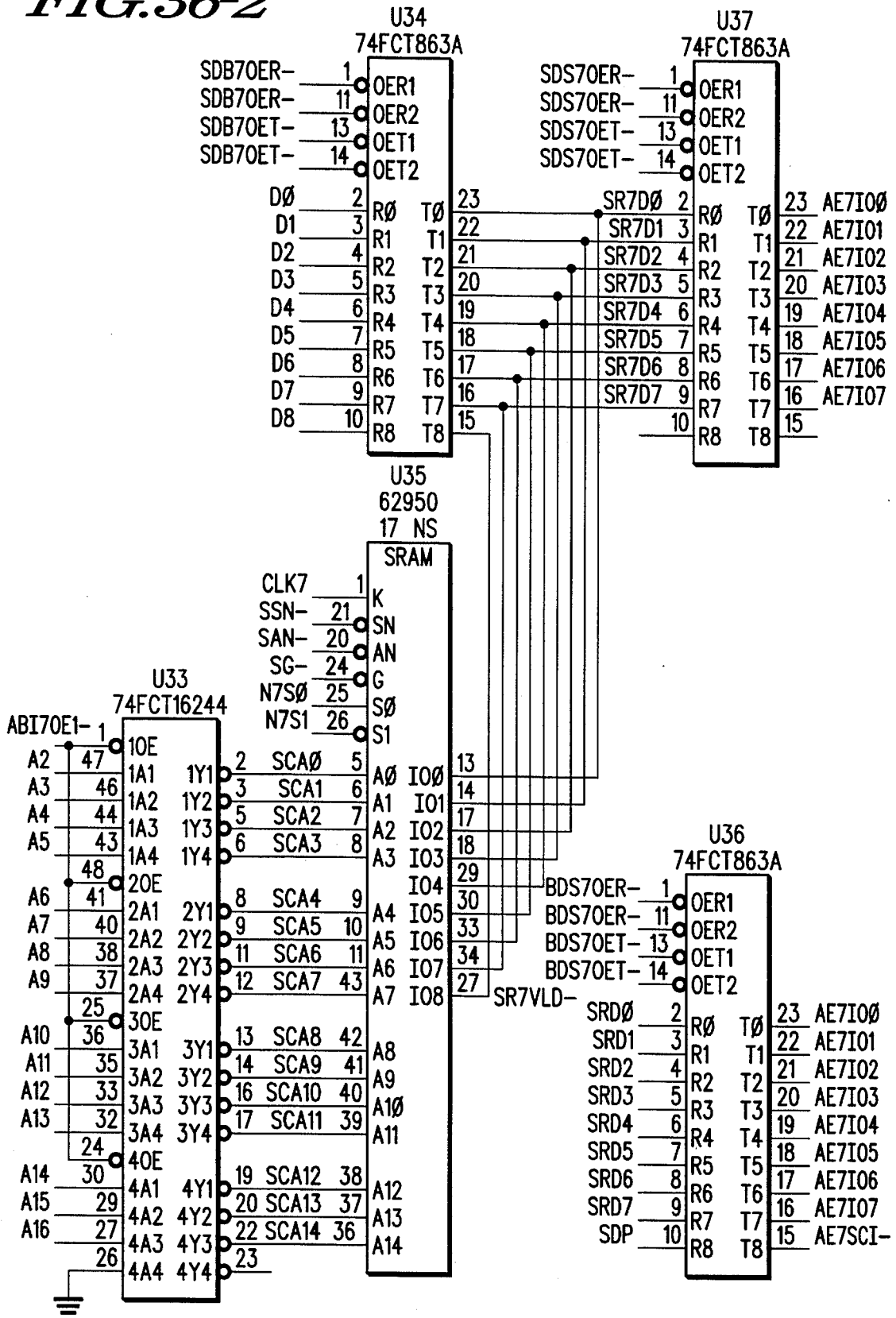
Figures 1, 37:
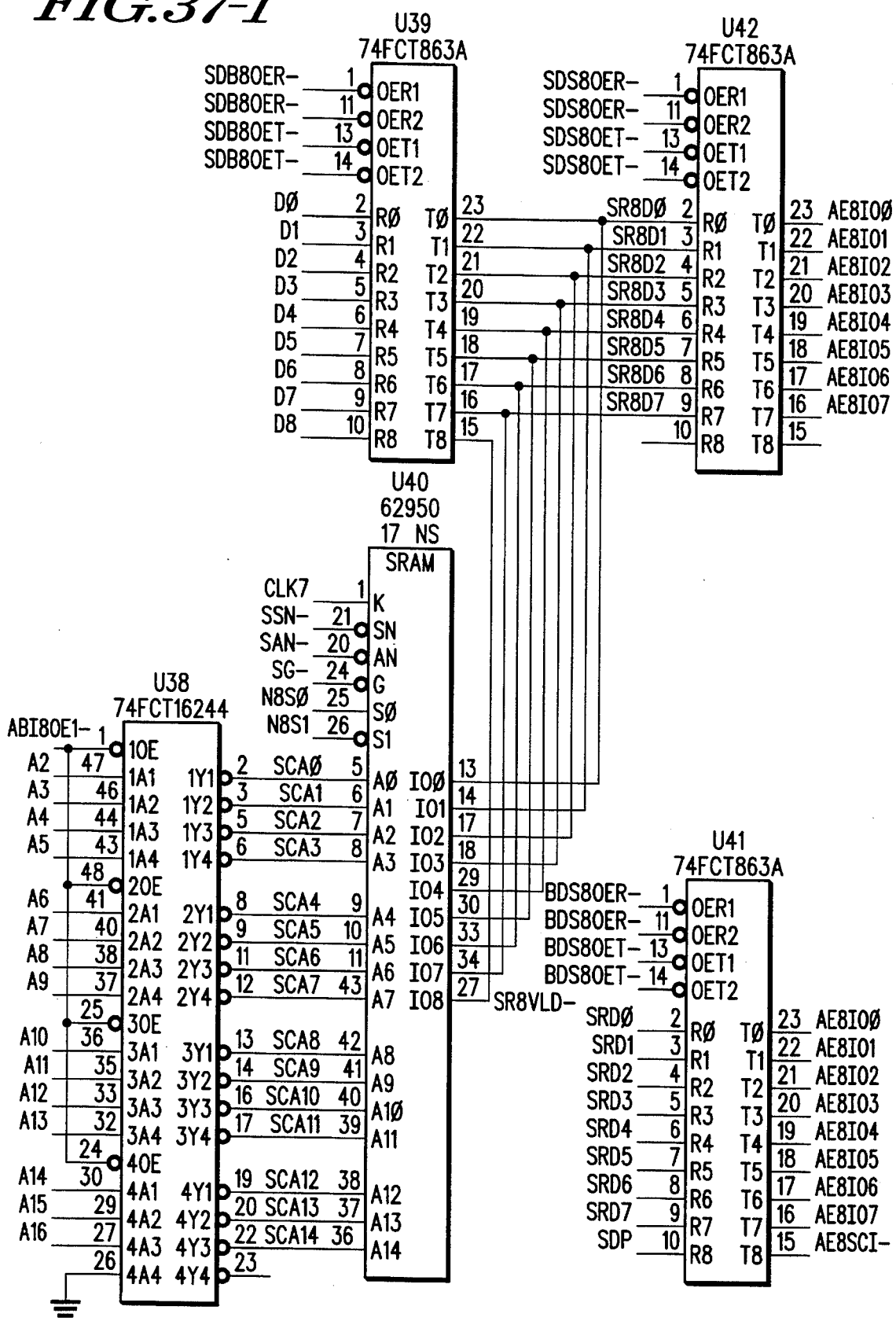
Figures 2, 37:
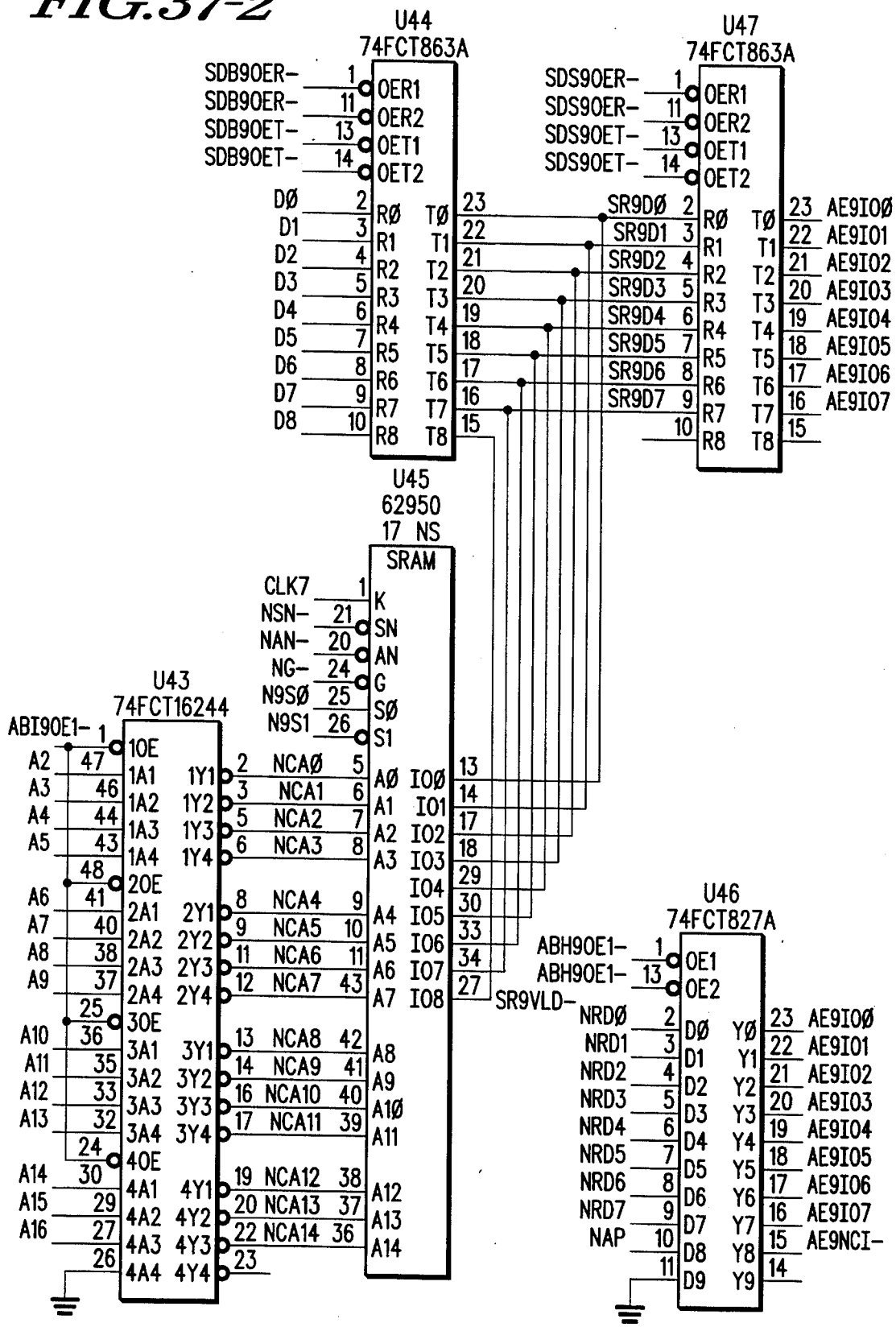
Figures 1, 38:
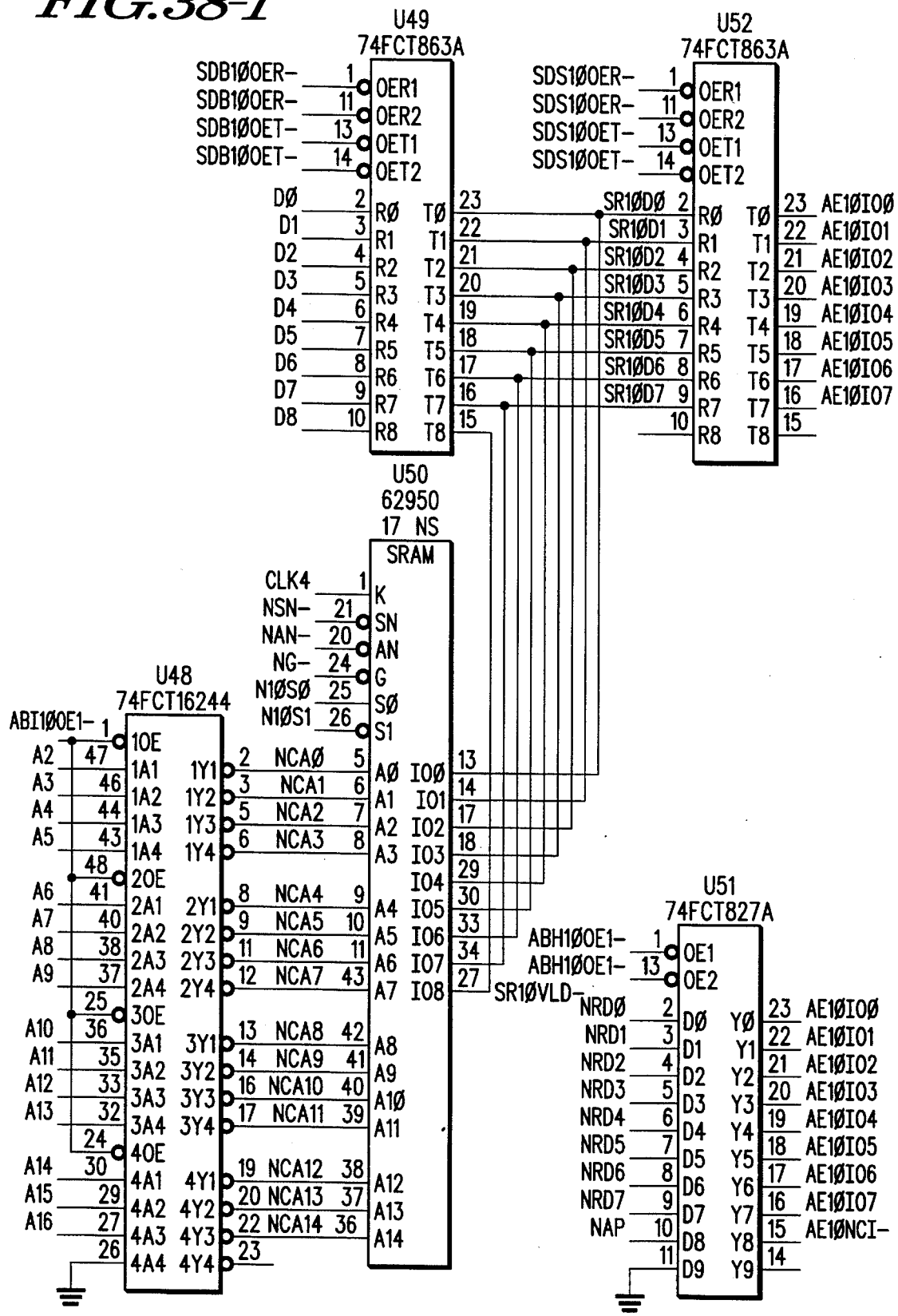
Figures 2, 38:
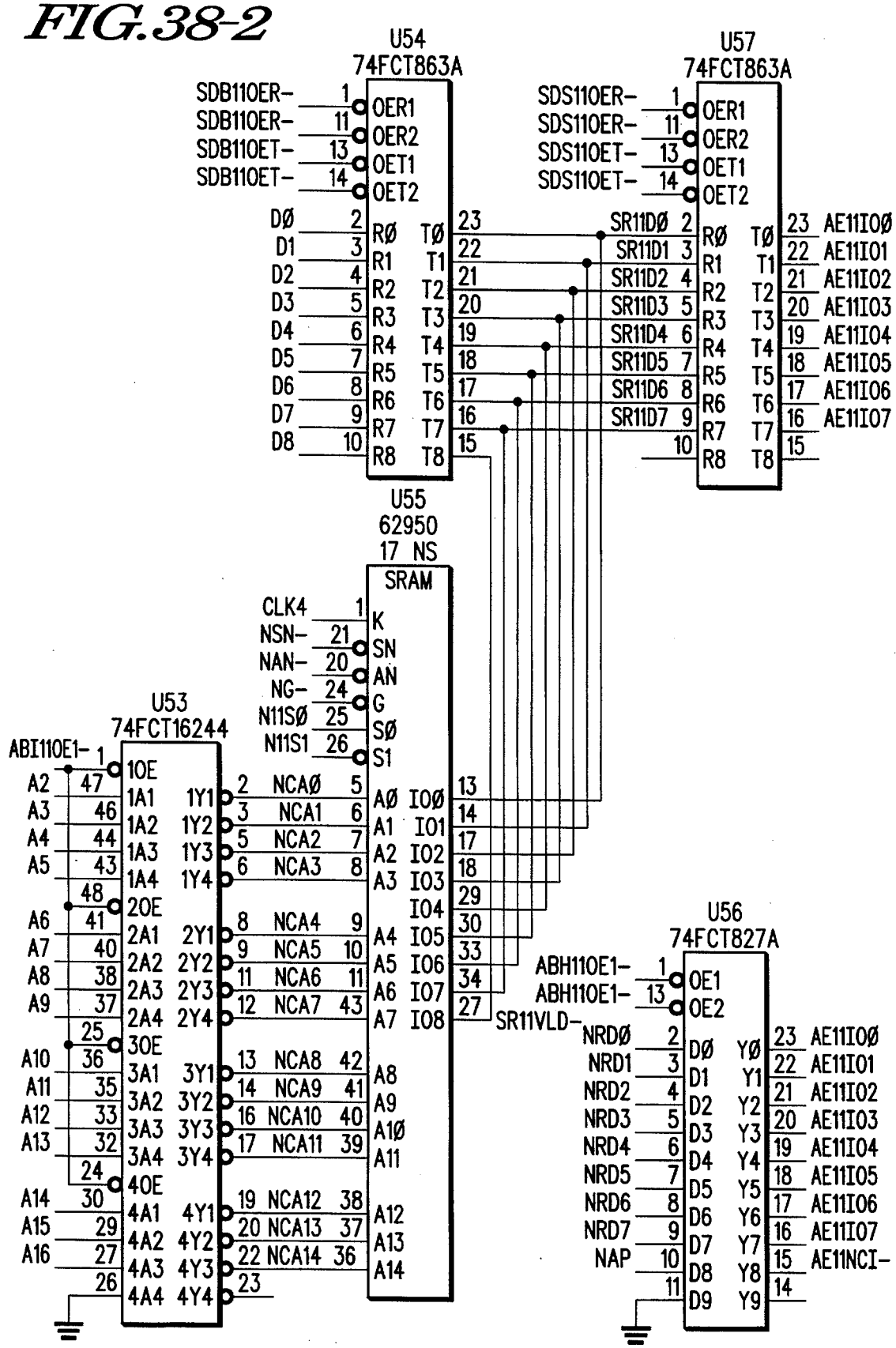
Figures 1, 39:
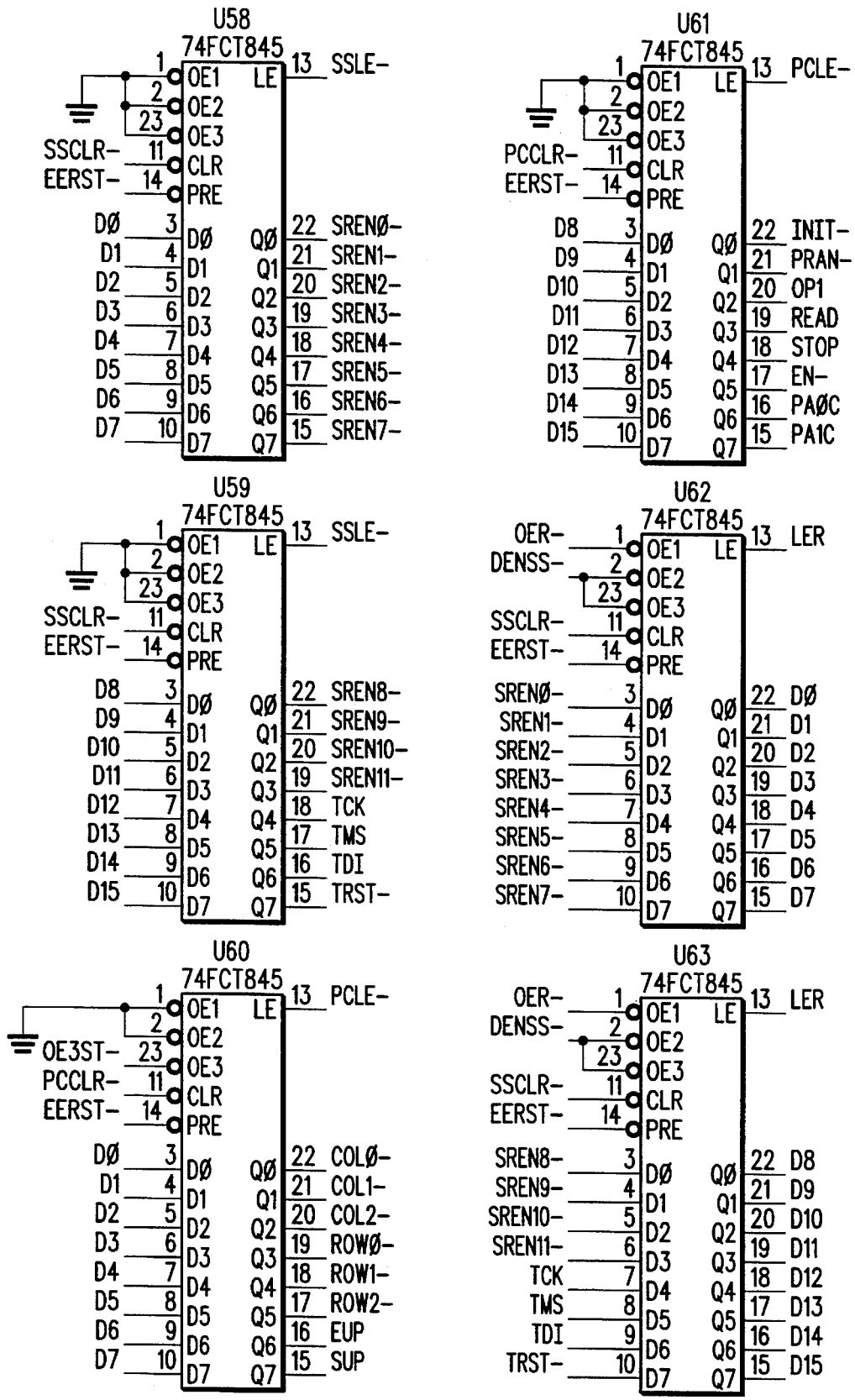
Figures 3, 39:
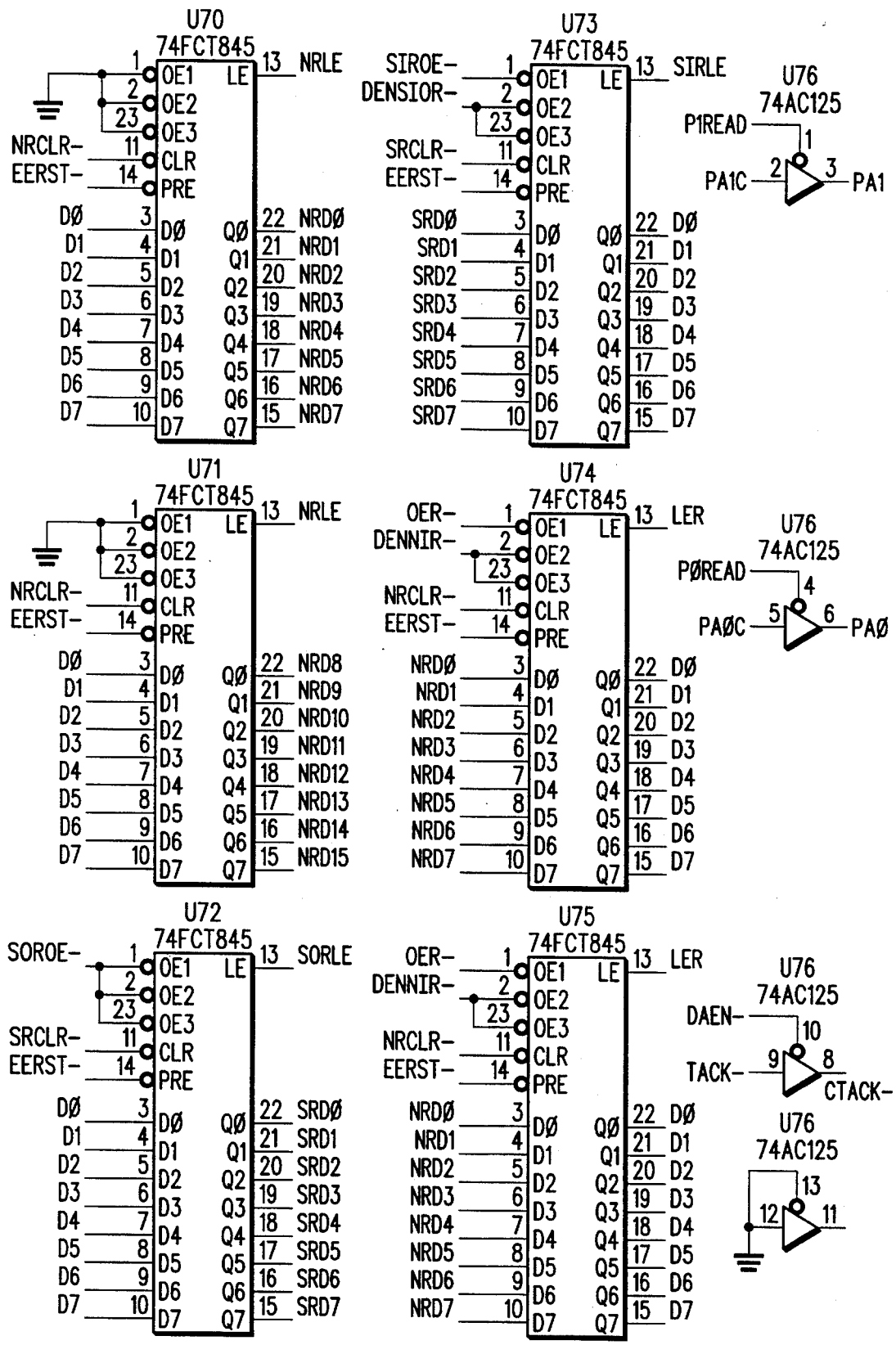
Figures 2, 40:
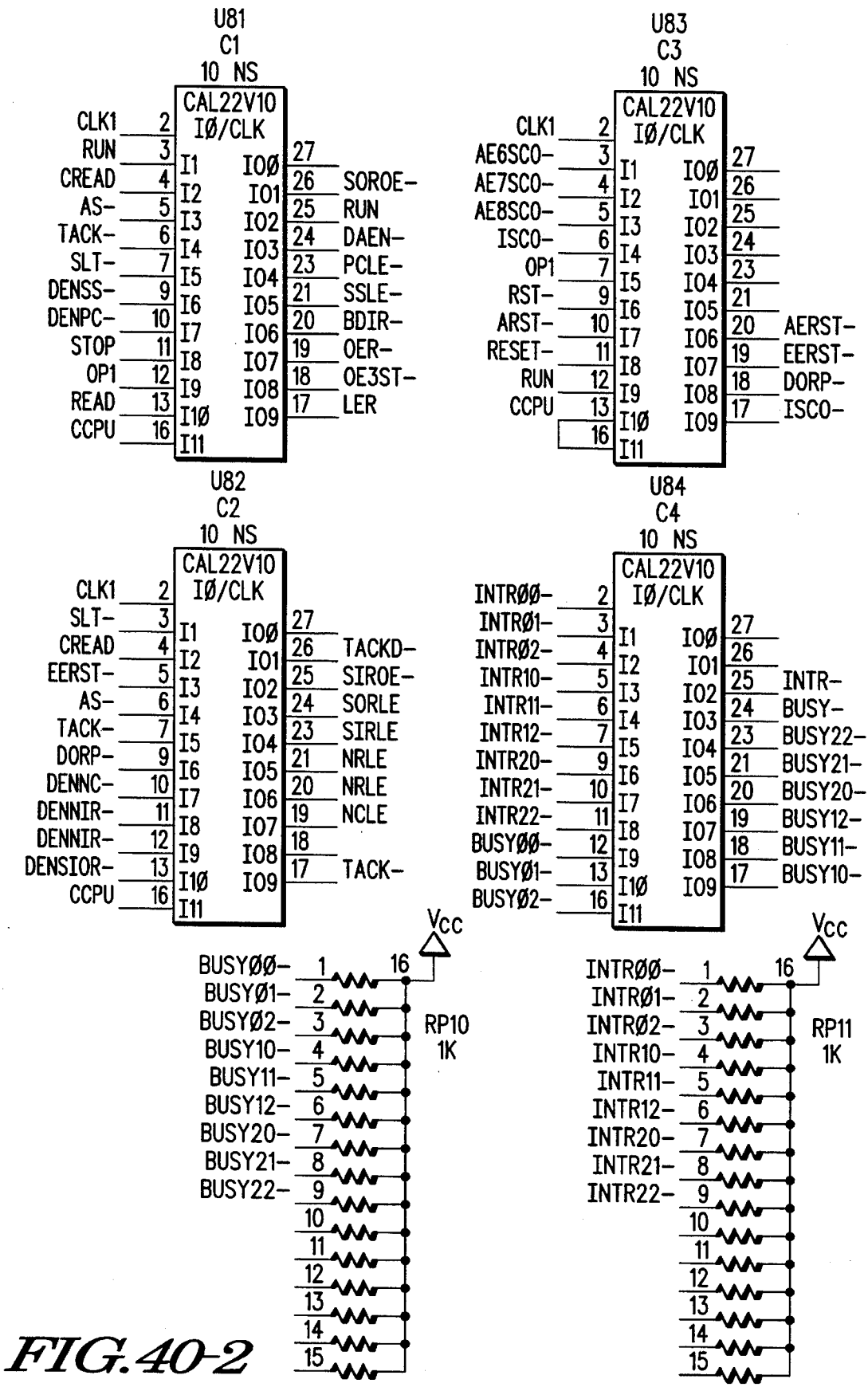
Figures 3, 40:
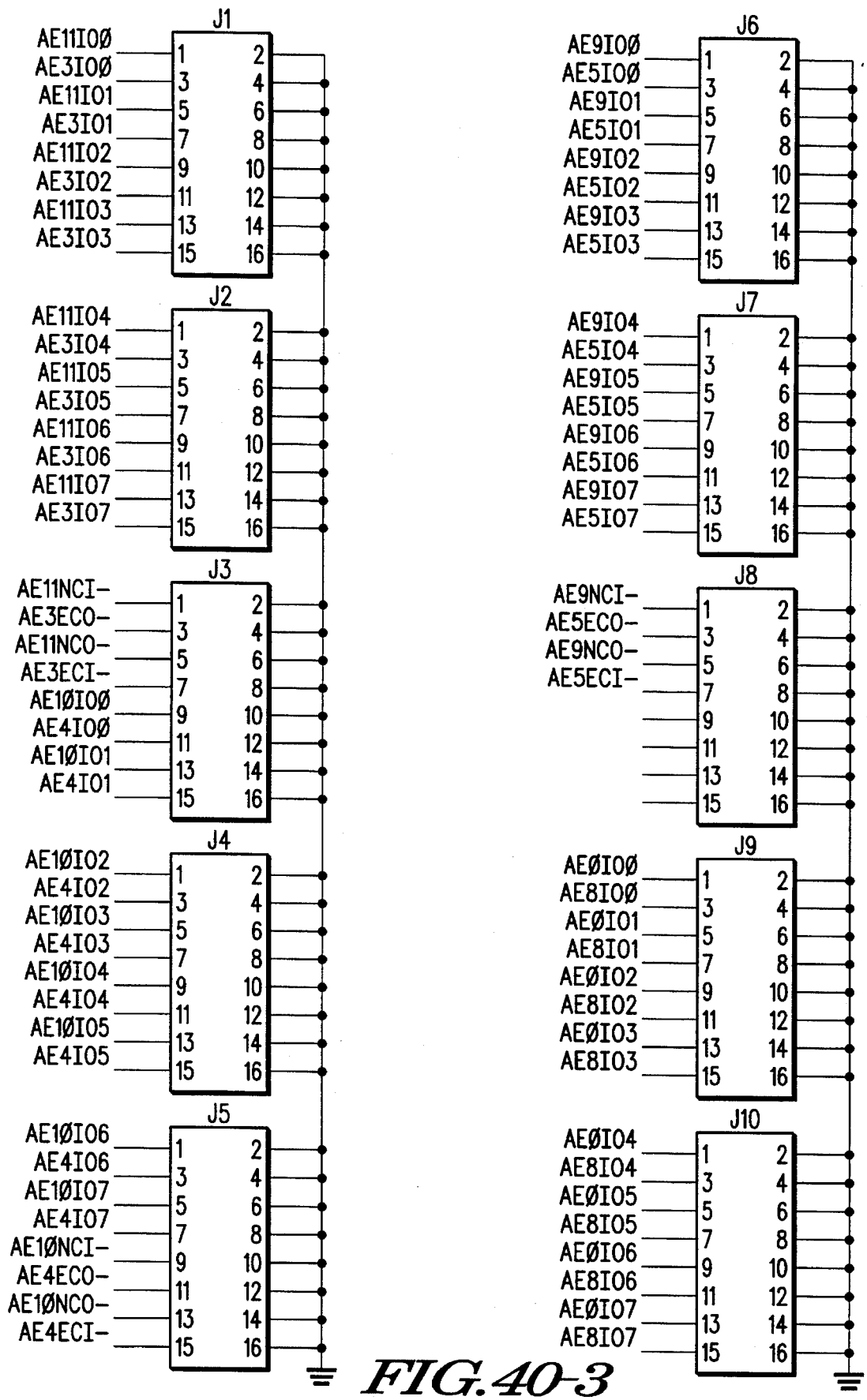
Figures 4, 40:
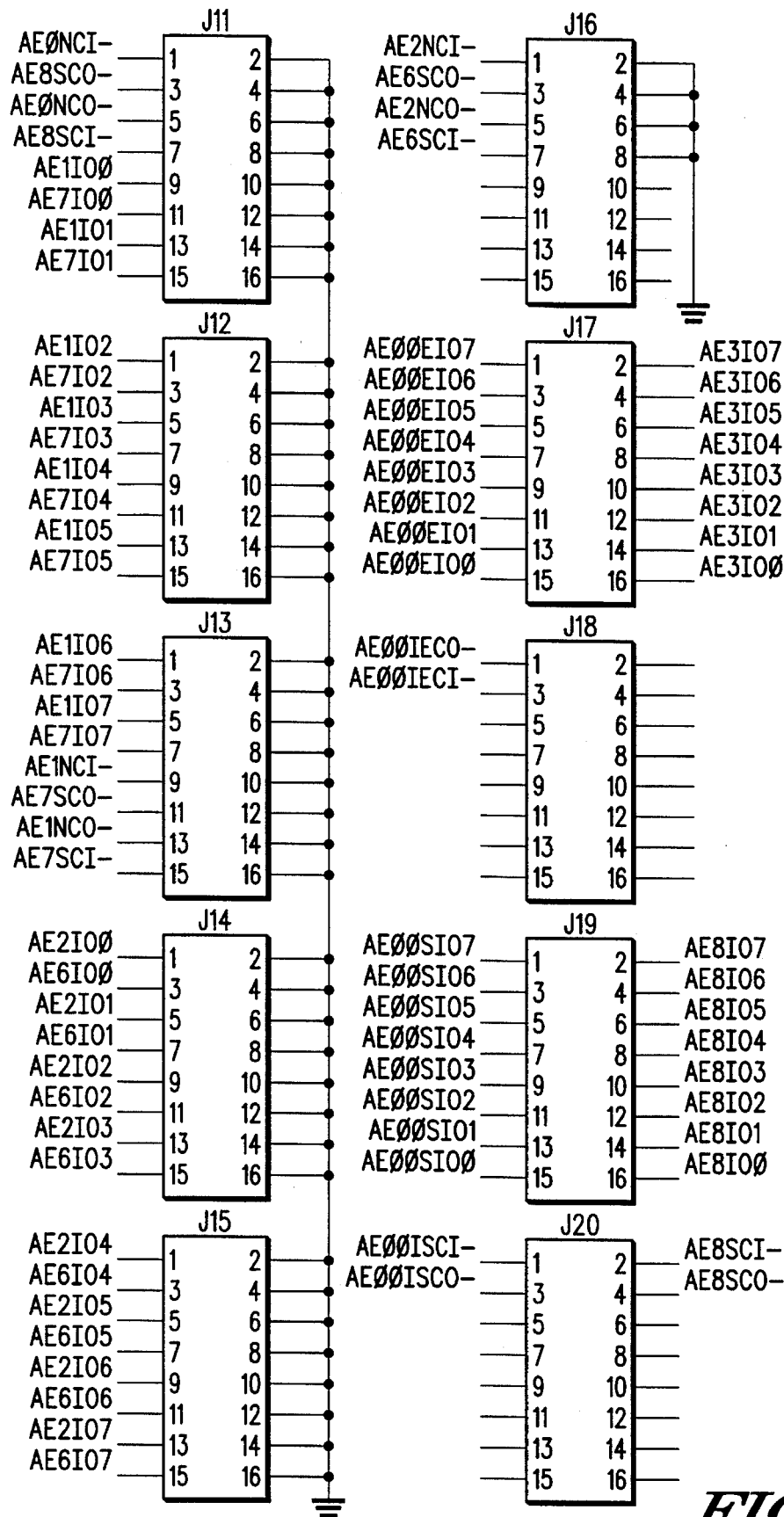
Figures 1, 41:
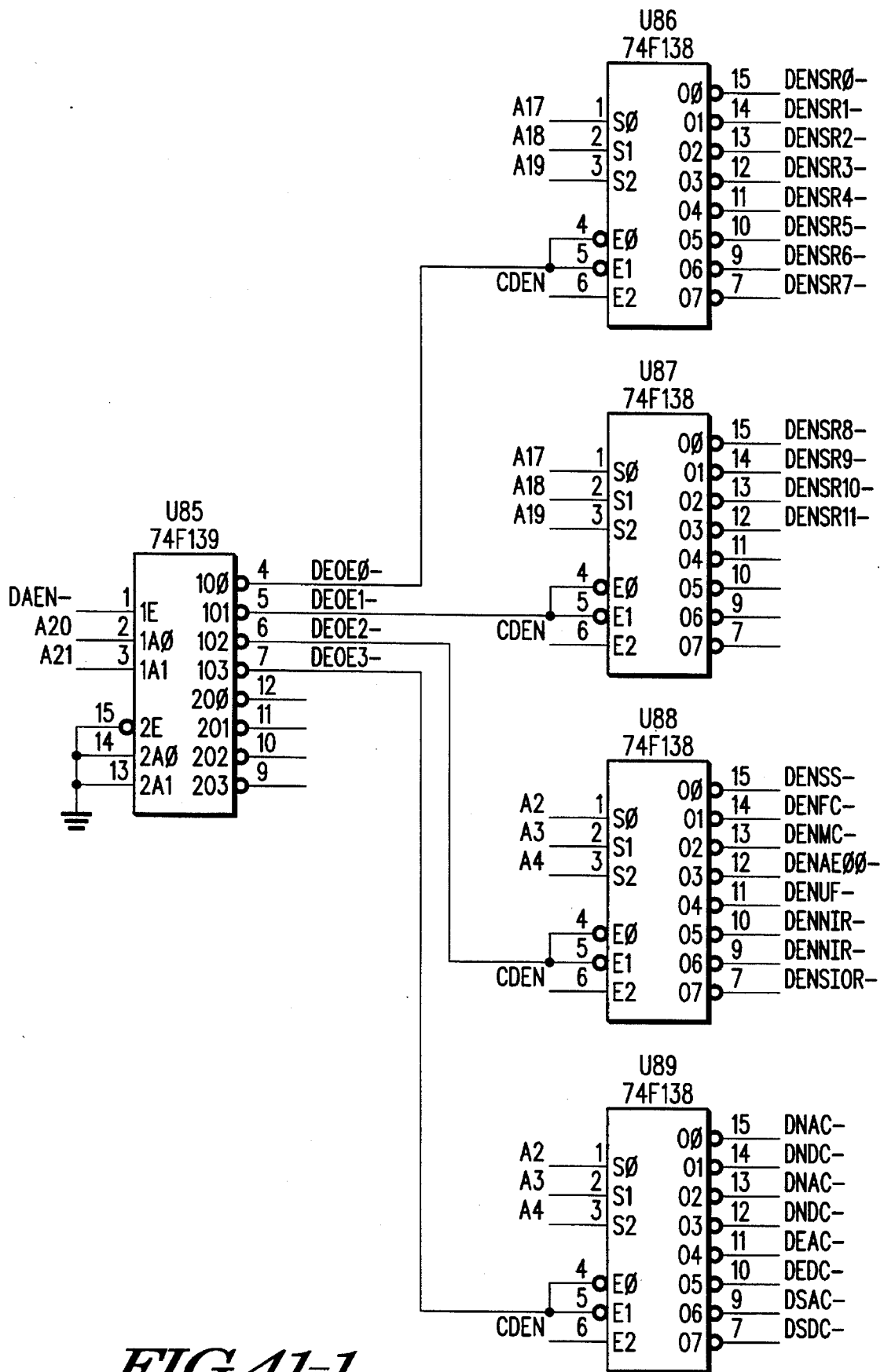
Figures 2, 41:
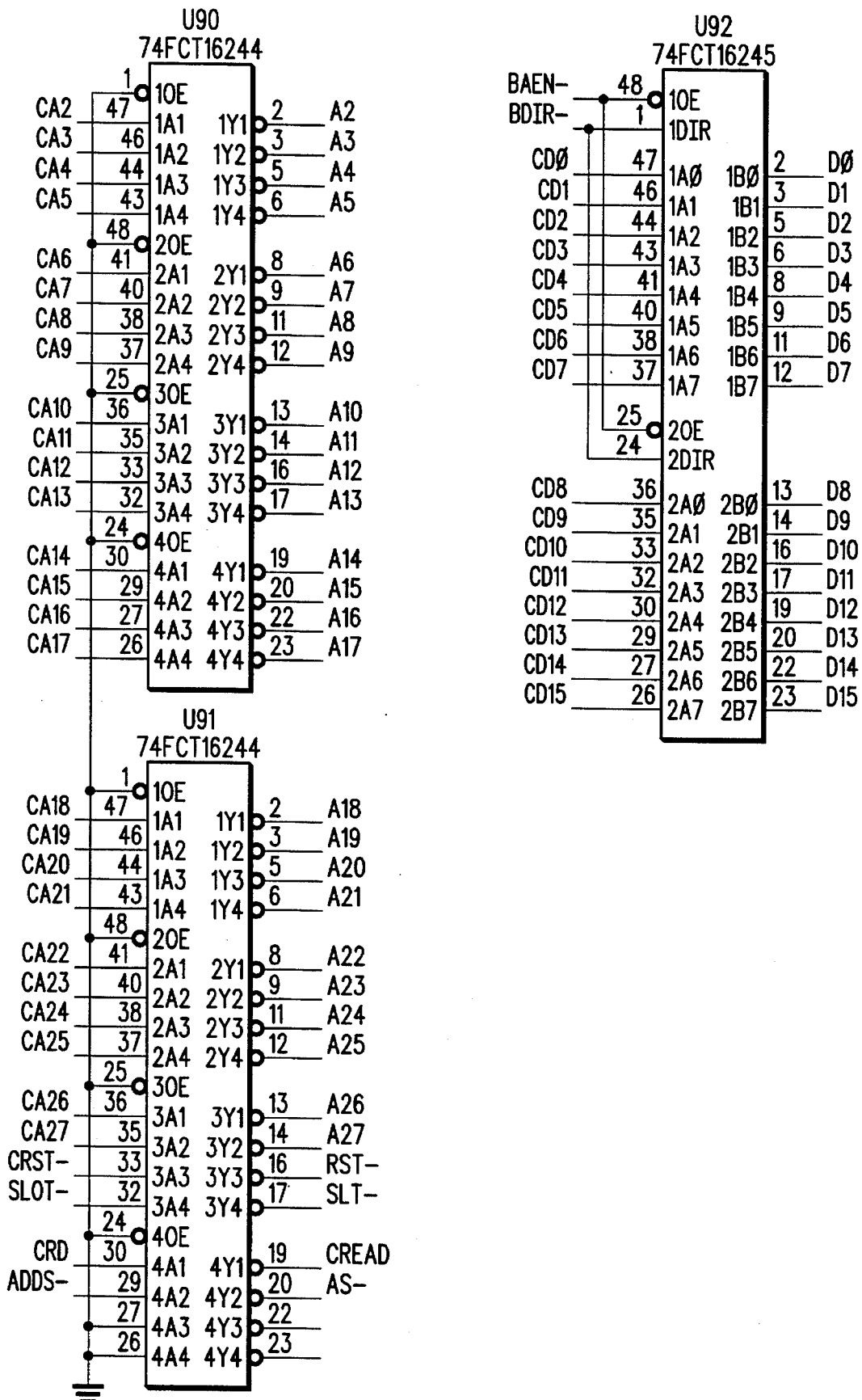
Figures 1, 44:
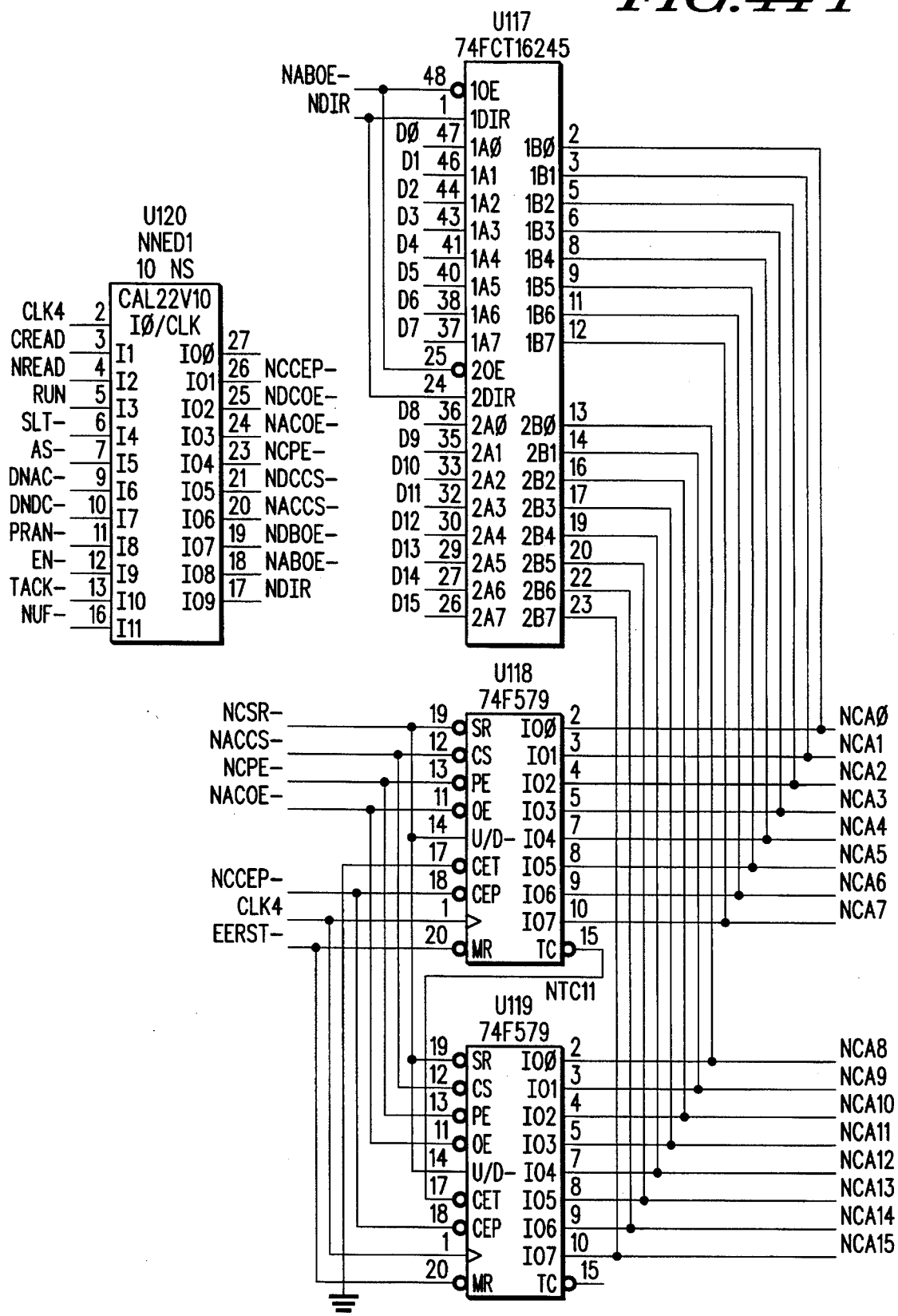
Figures 2, 44:
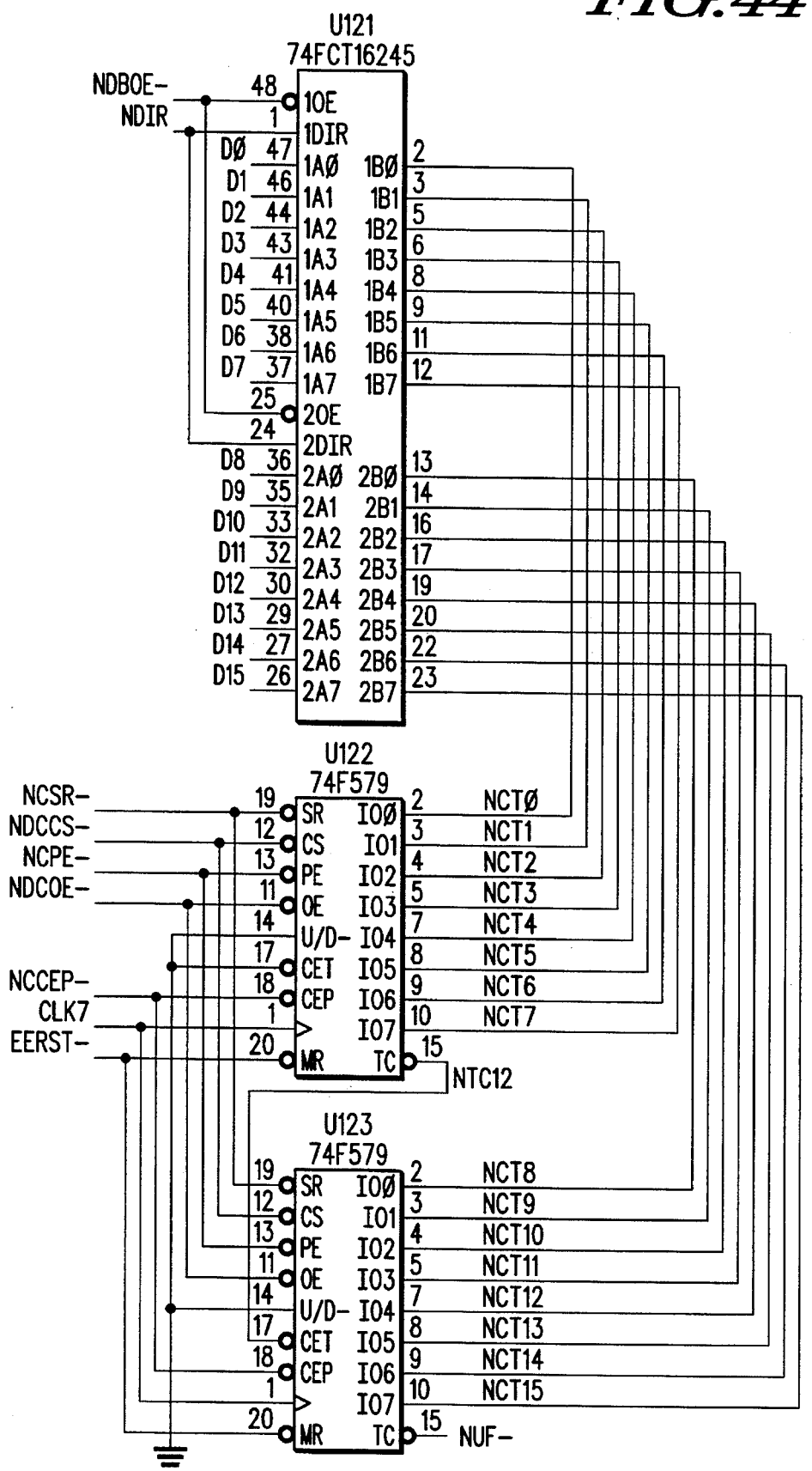
Figures 3, 44:
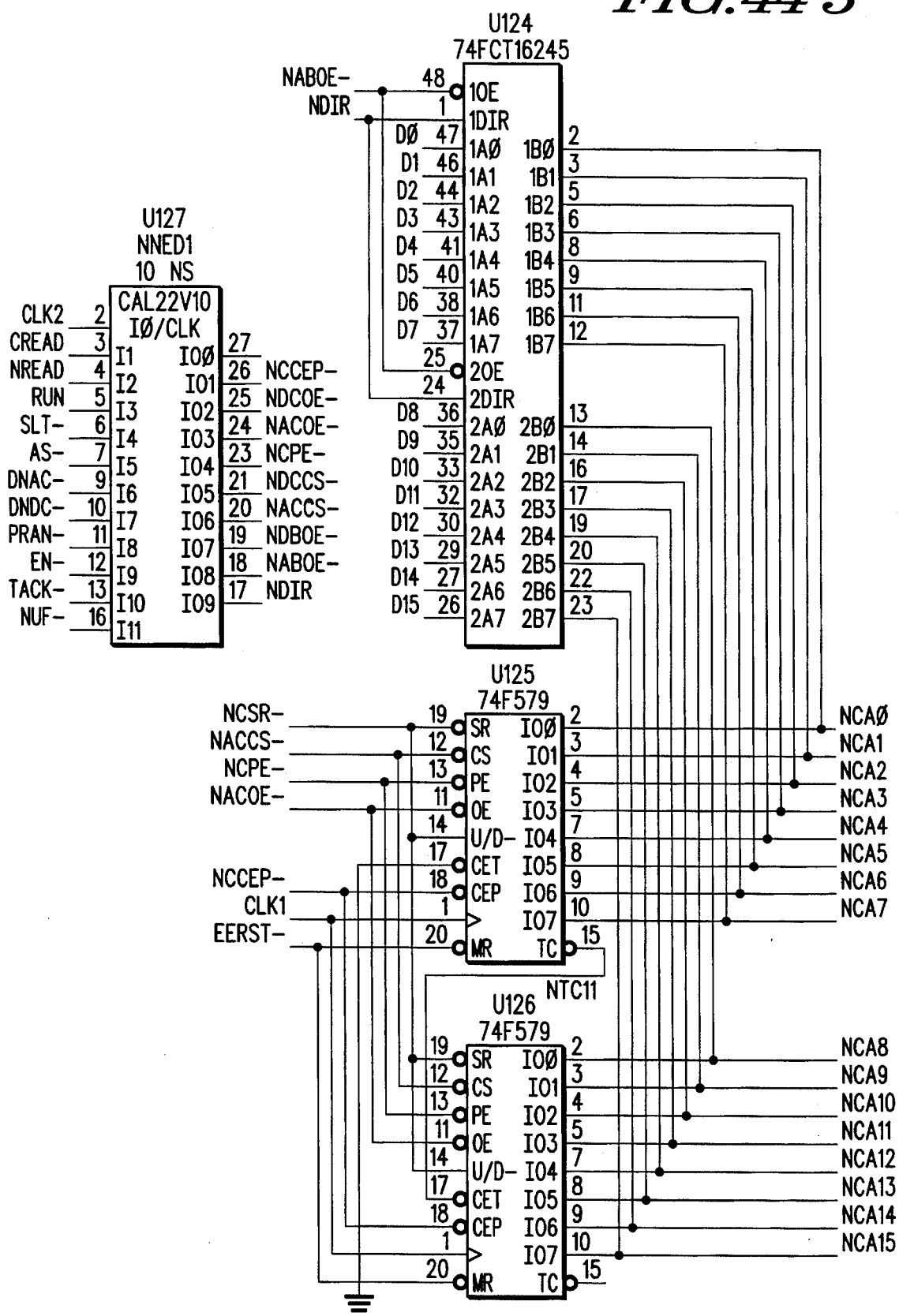
Figures 4, 44:
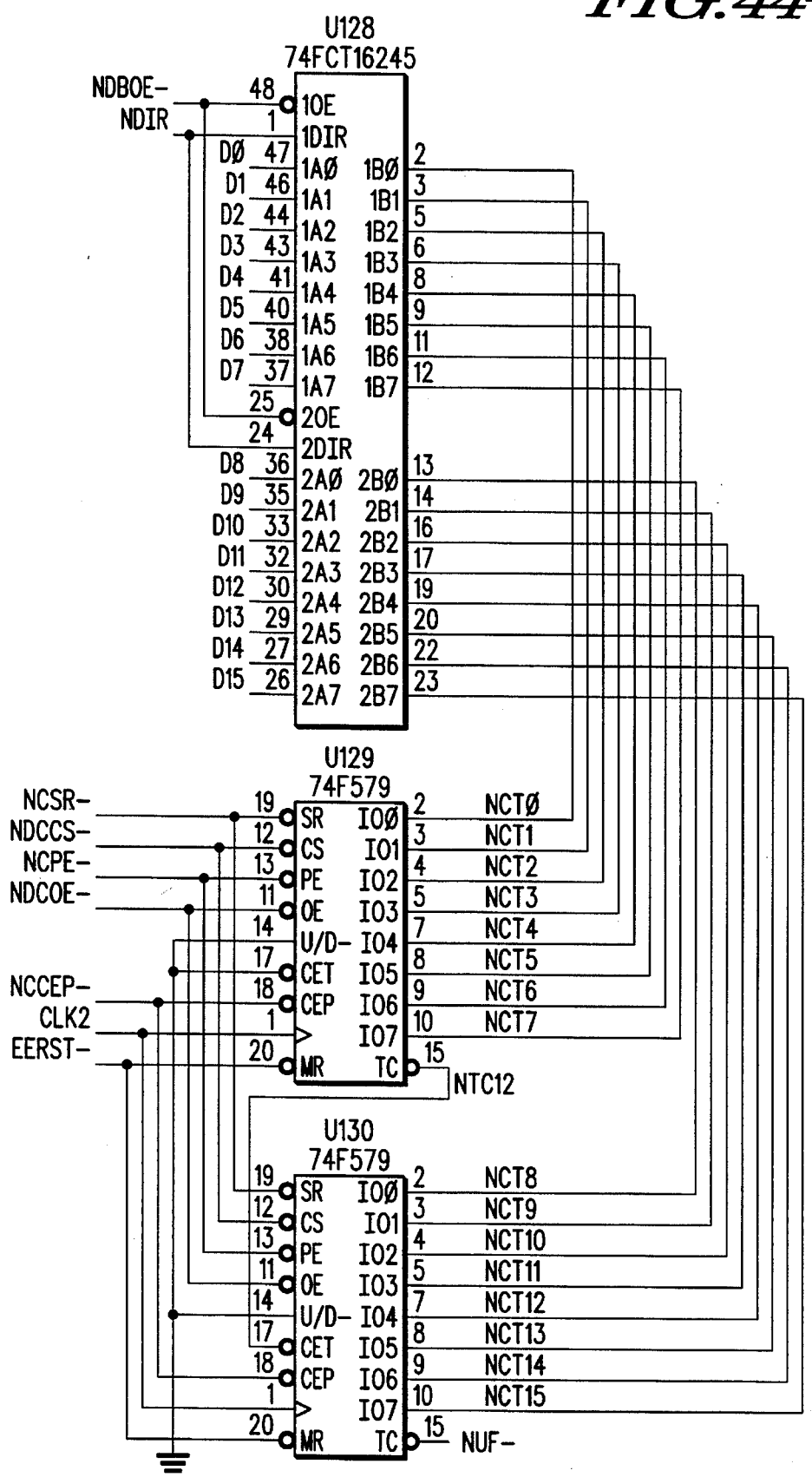
Figures 1, 45:
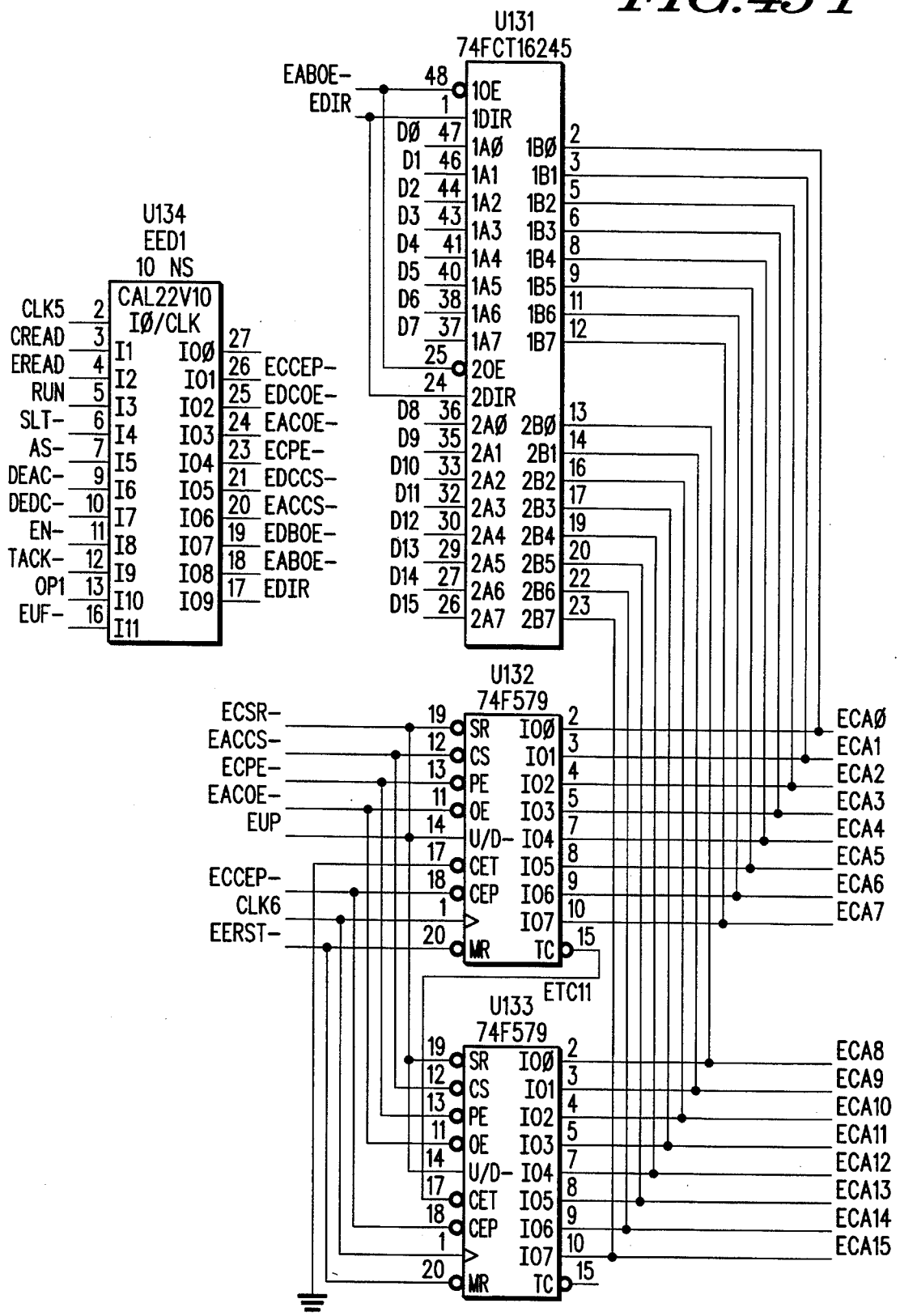
Figures 2, 45:
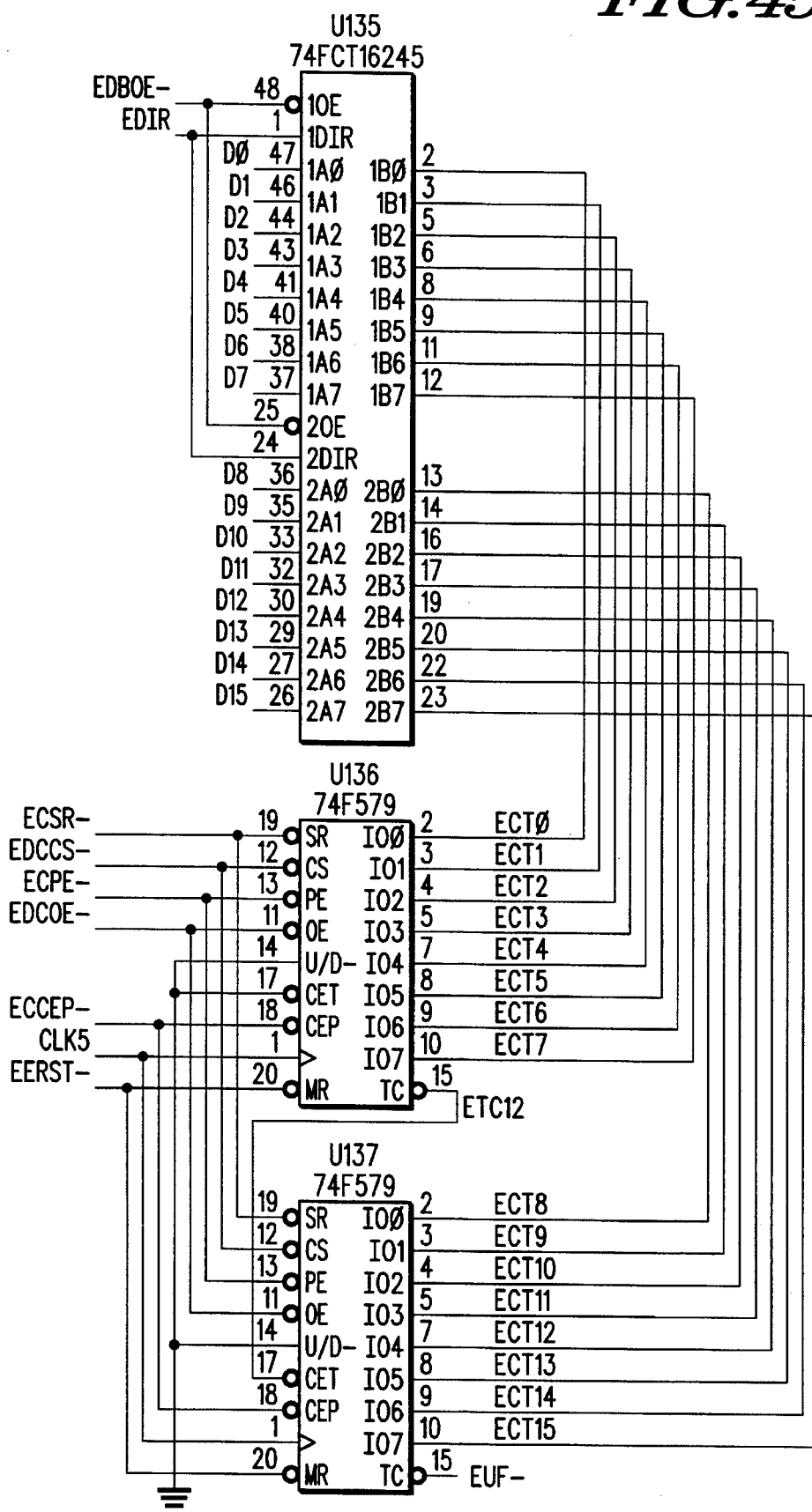
Figures 3, 45:
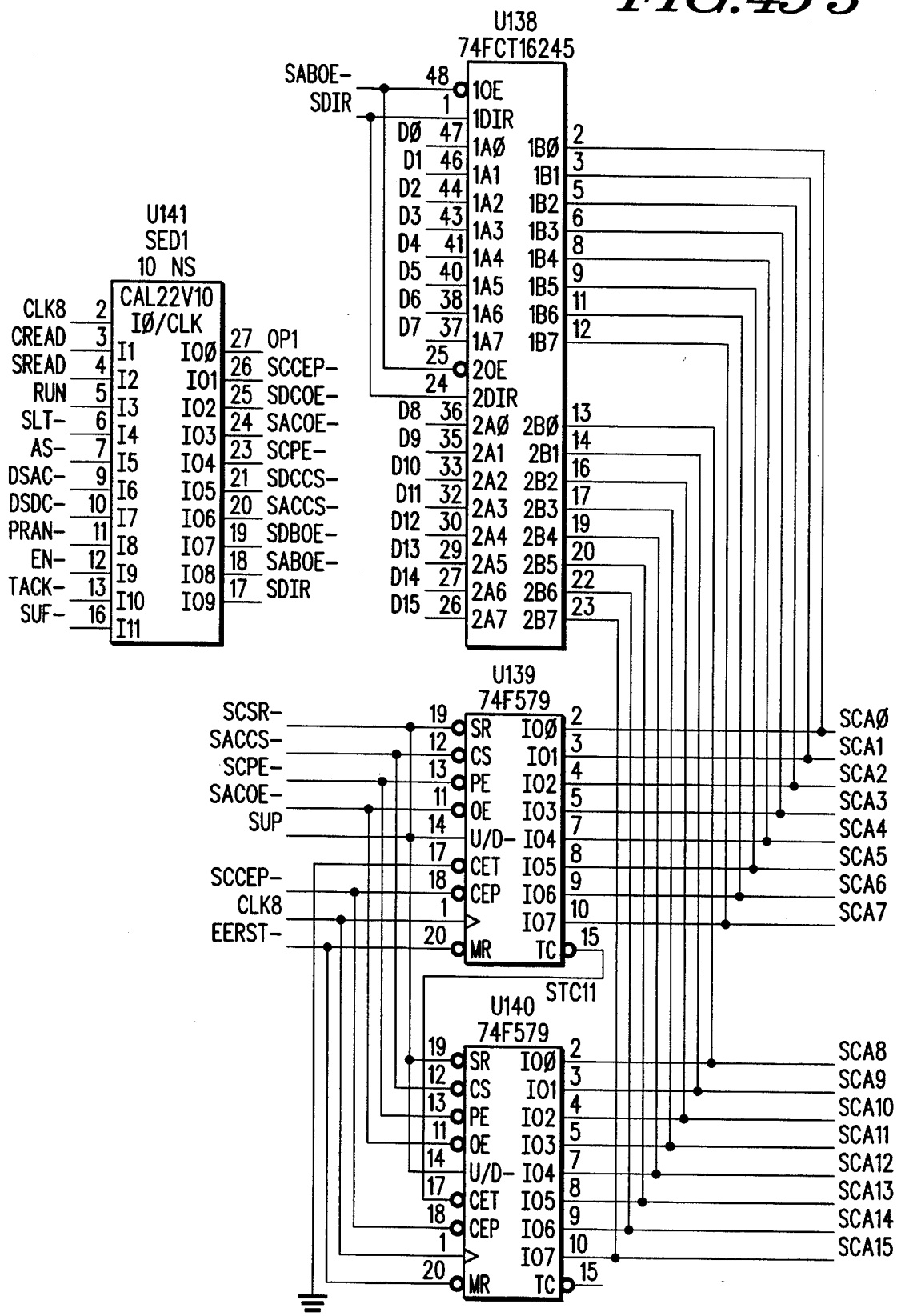
Figures 4, 45:
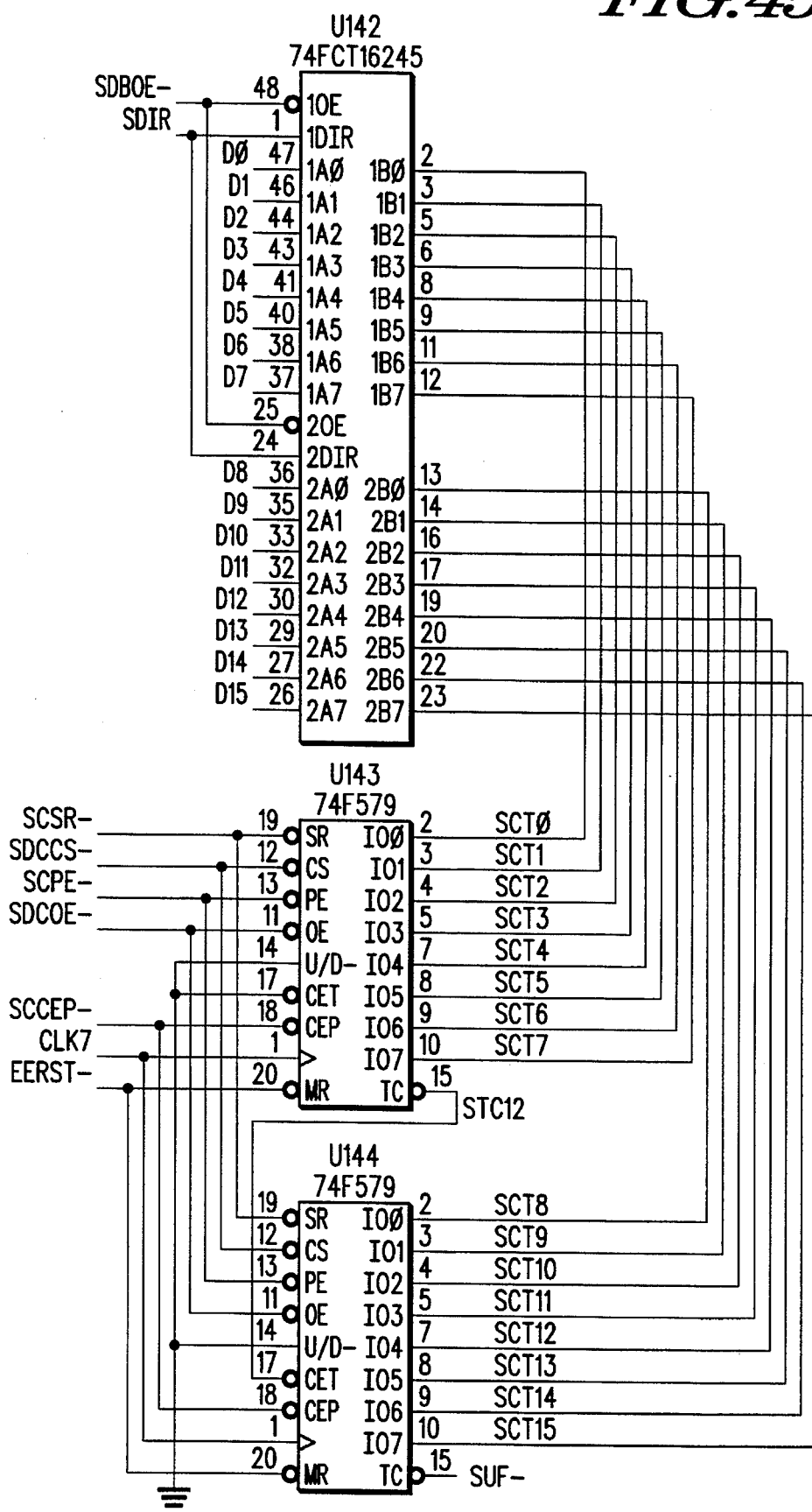
Figures 1, 46:
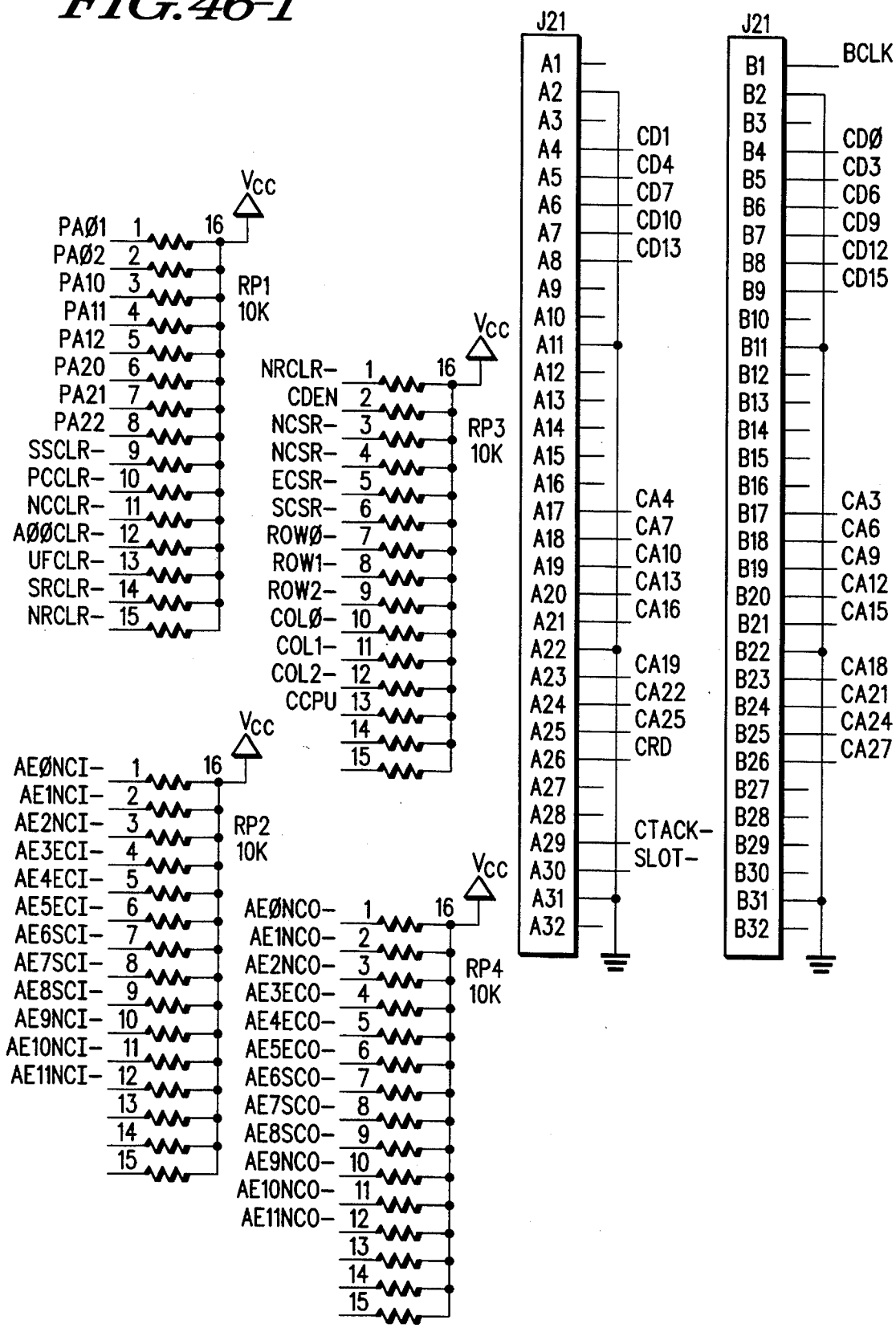
Figure 47A:
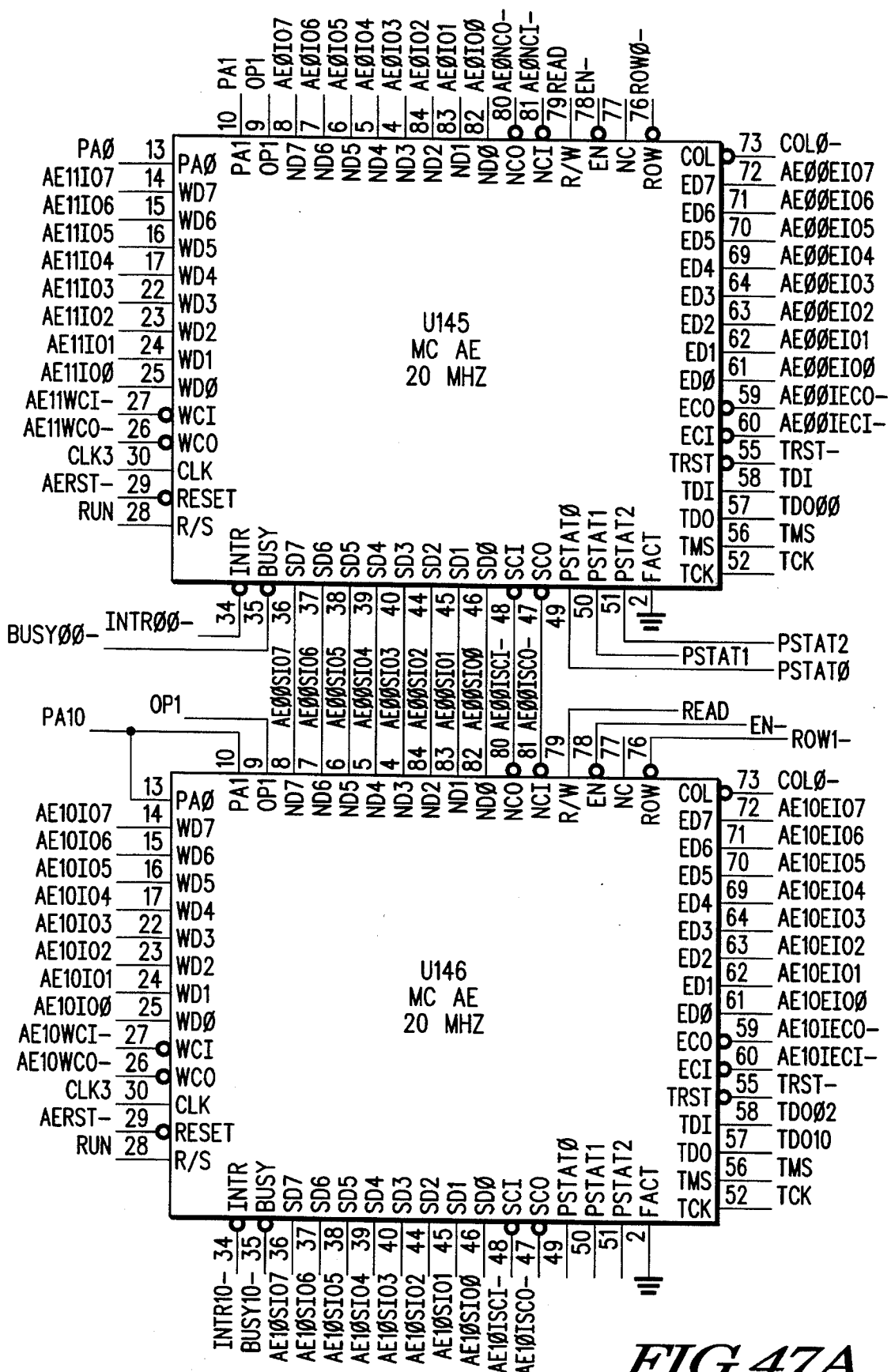
Figure 47B:
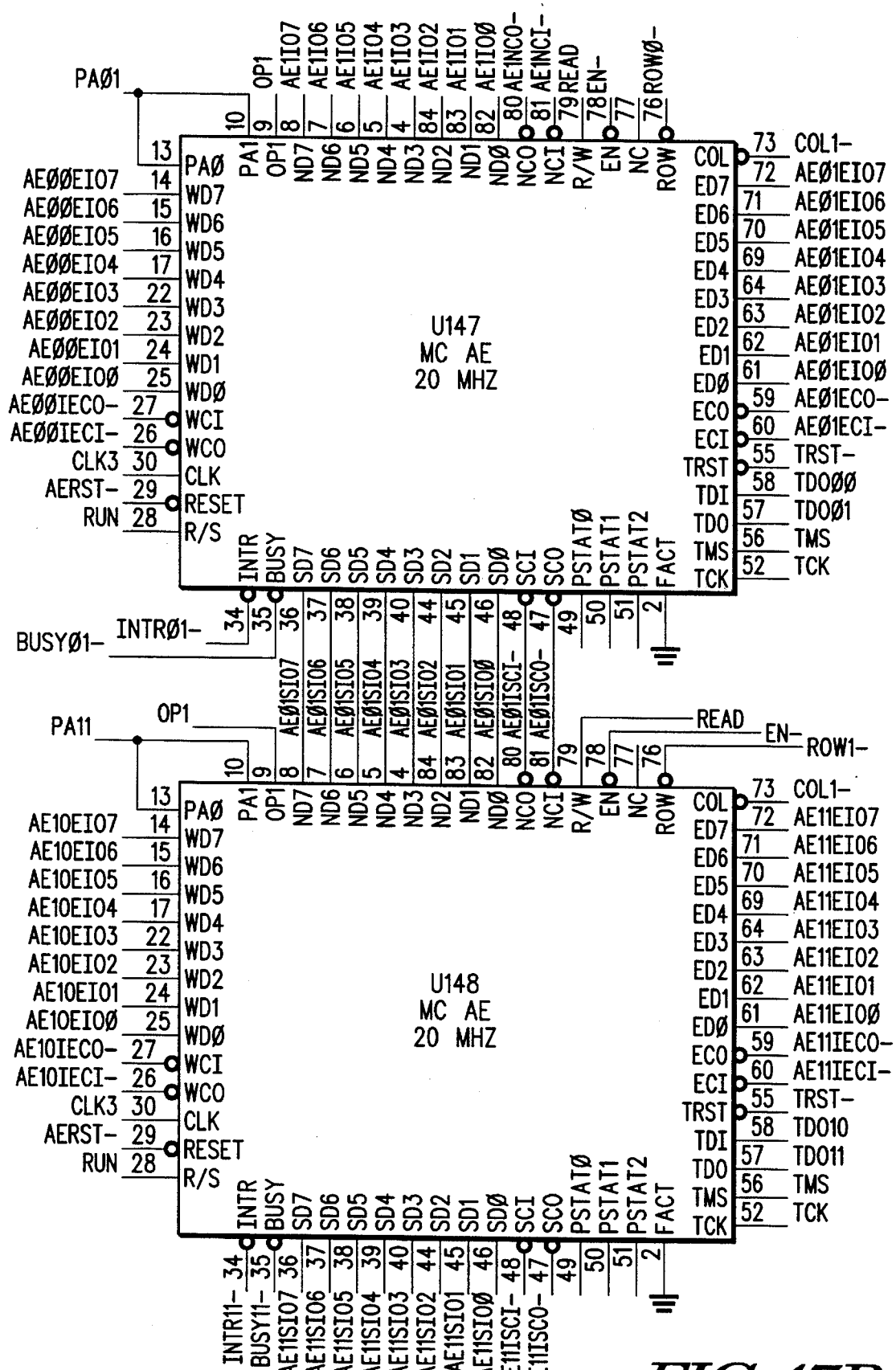
Figure 47C:
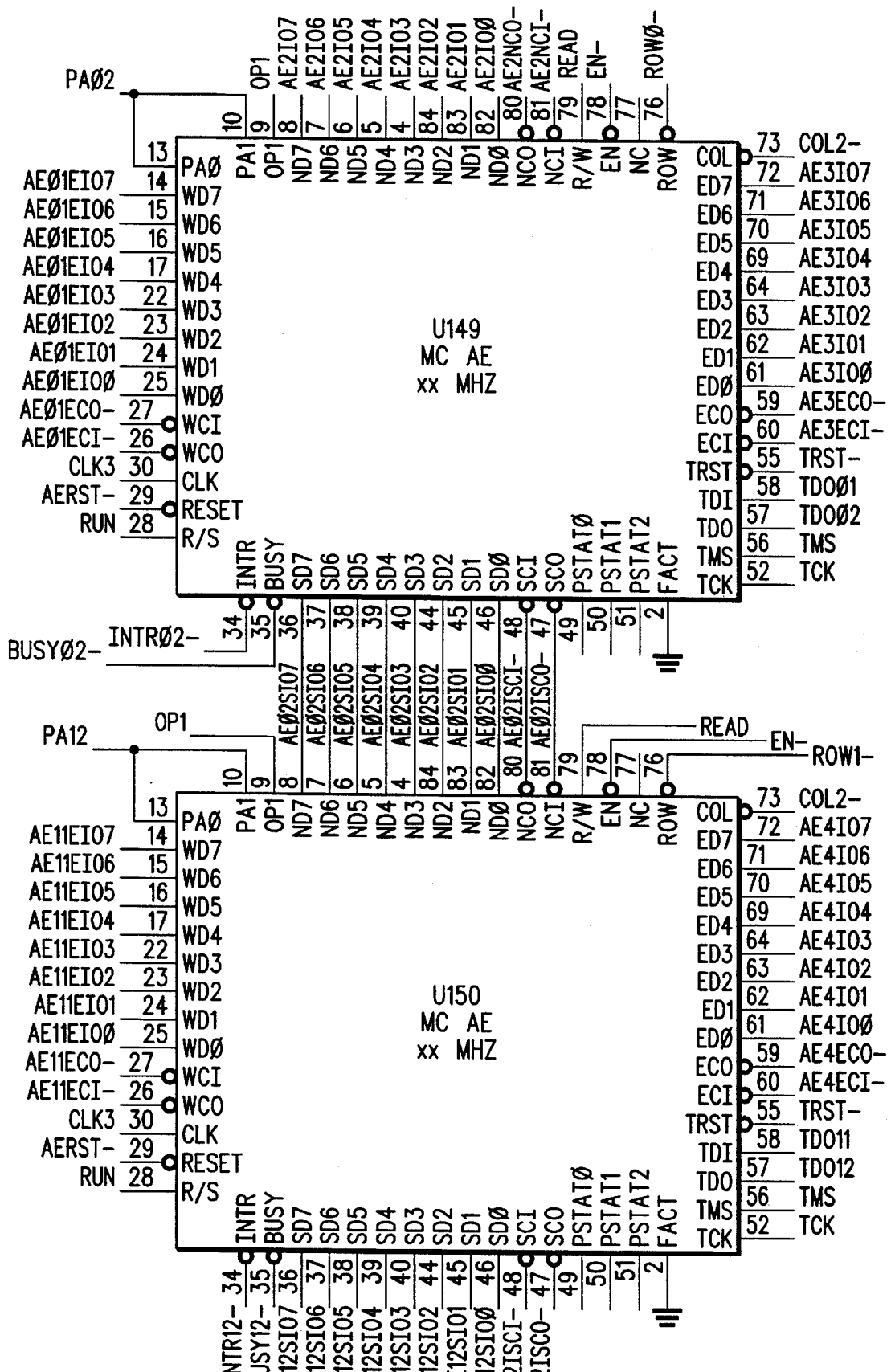
Figure 48A:
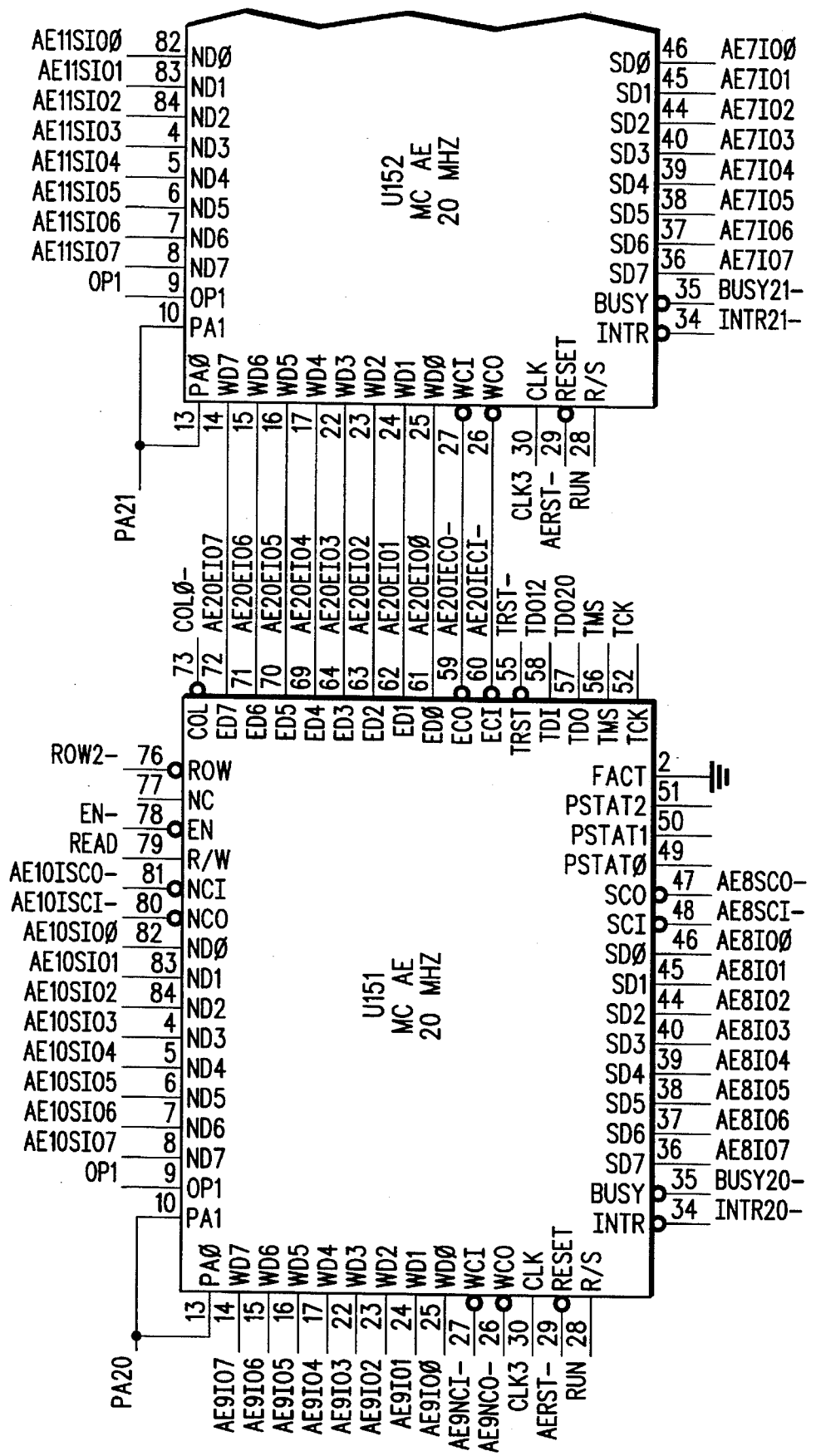
Figure 48B:
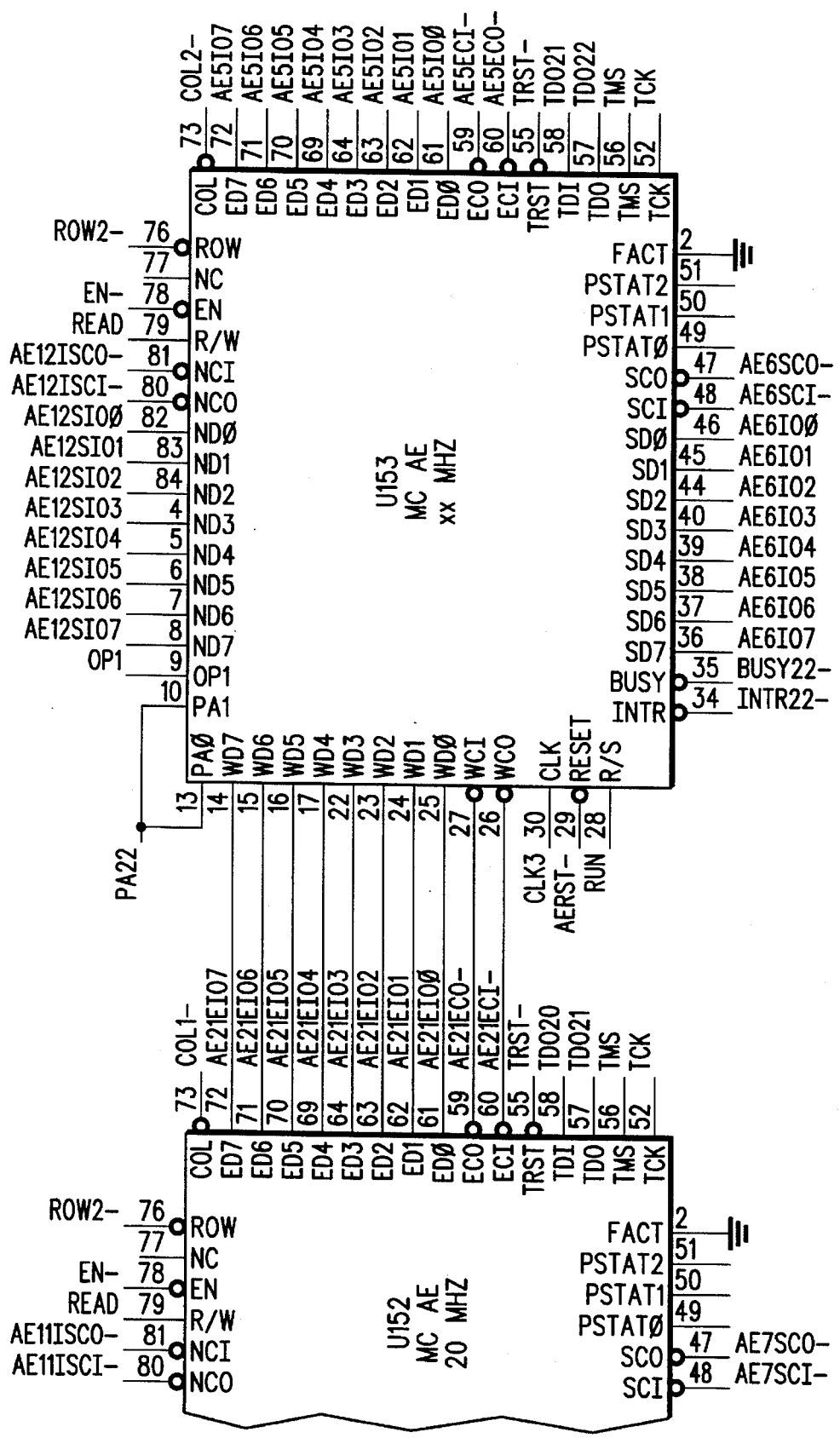
Figures 1A, 49:
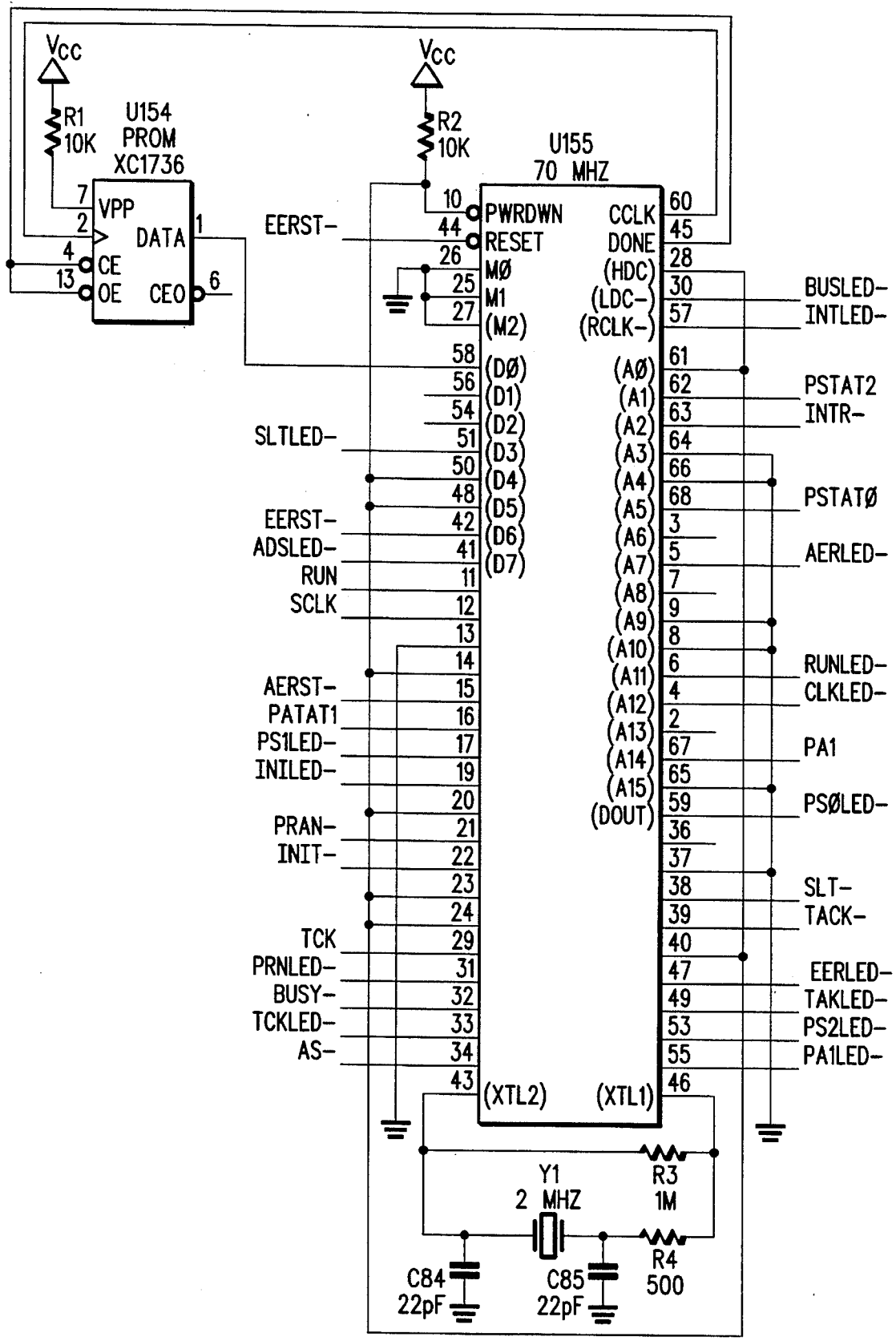
Figures 1B, 49:
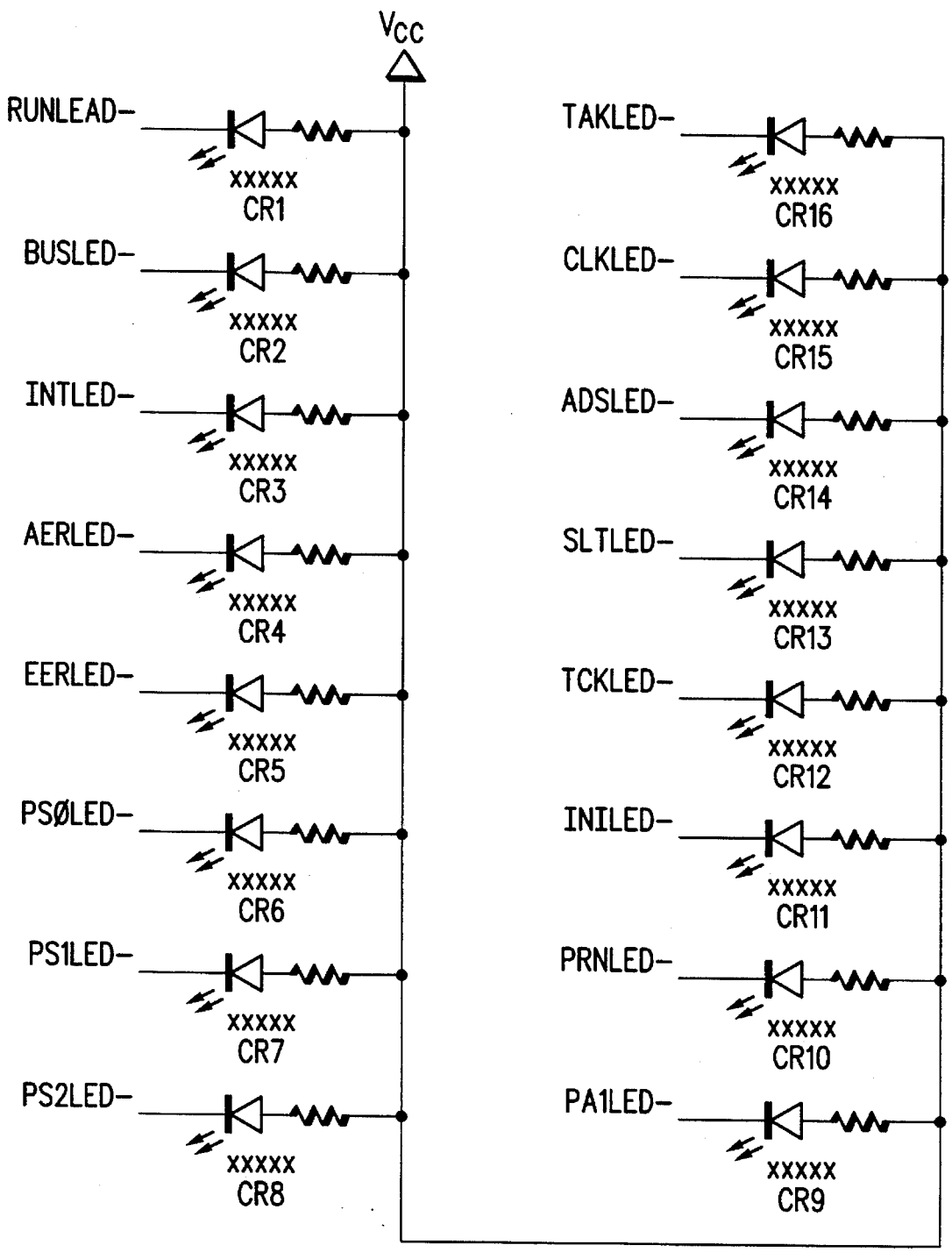
Figures 2, 49:
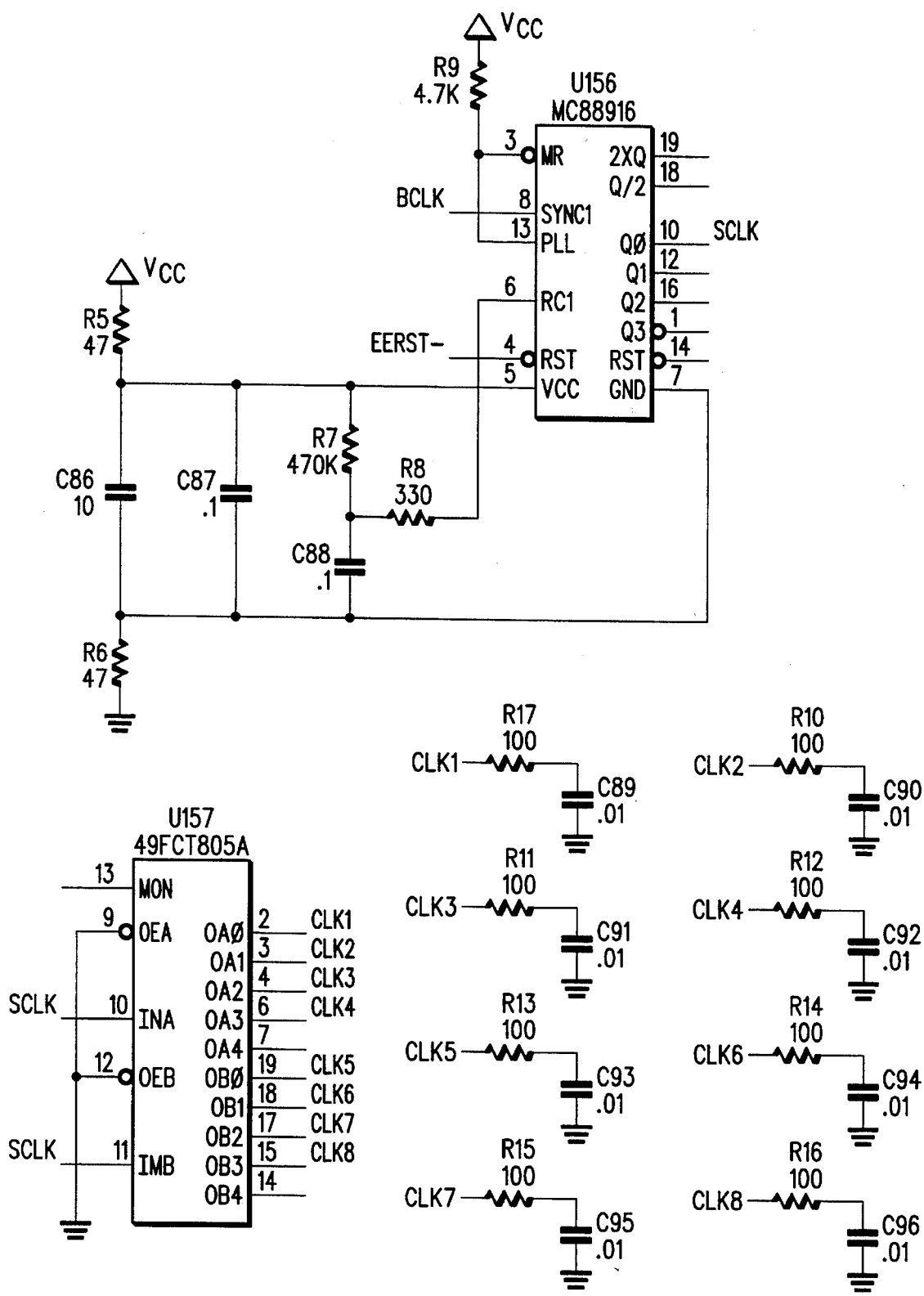

FIG. 12-1 illustrates one embodiment of bus protocol simulation logic circuits 270–272 of FIG. 11. Bus protocol simulation logic circuits 270–272 each have a memory circuit 290, a programmable logic device circuit (PLD) 292, a host address buffer circuit 294, a host data transceiver circuit 296, and an AE transceiver circuit 928, which are coupled as illustrated in FIG. 12-1. Note that each bus protocol simulation logic circuit 70–73 is coupled to one port of a corresponding one of the AE processors 50–65.

Note that in one embodiment of the present invention, the memory 290 is a 9-bit wide memory storing data bits[0:8], which is one bit more than the width of the data path between each AE processor 250–258. The extra bit is provided to programmable logic device 292. The programmable logic device 292 uses the extra bit as a control bit which is used to determine whether to assert or negate the "XCI" signal provided to the "XCI" input integrated circuit pin of the corresponding AE processor 250–258. Each location in memory 290 has a control portion 291 and a data portion 293. Although the control portion 291 in the illustrated embodiment of the present invention is one bit, alternate embodiments of the present invention may have a plurality of bits in the control portion 291. And although the data portion 293 is illustrated in FIG. 12-1 as having eight bits, alternate embodiments of the present invention may use any number of bits.

FIG. 12-2 illustrates one embodiment of a portion of memory 290 of FIG. 12-1. It is important to remember that data processing system 210 includes a plurality of memories 290. Data bit-8, labeled "D8", stores a single control bit which is provided to programmable logic device 292. In one embodiment of the present invention, programmable logic device 292 determines the proper timing and the proper conditions to allow the control bit D8 to be provided to the "XCI" input of the corresponding AE processor 250–258. When the proper conditions have been met, the programmable logic device 292 does not affect the value of the control bit D8 which is transferred to the corresponding AE processor 250–258.

Due to the bus protocol and timing required by the AE processors 250–258, the control bit D8 in address location "N" is associated with the data bits D0–D7 in address location "N+1". For example, the control bit %0 in address location $X00 is associated with the data value $21 in address location $X01. When the control bit D8 in address location "N" is asserted, the data bits D0–D7 in the address location "N+1" are transferred, at the proper time, from memory 290 to the data input integrated circuit pins of the corresponding AE processor 250–258 by way of AE transceiver 298. Note that the term "X" in addresses $X00 through $X09 is used as a variable indicating that the address space $X00 through $X09 may be located at any convenient location in a memory map.

As an example, in one embodiment of the present invention, %0 is the negated state of the control bit D8, %1 is the asserted state of the control bit D8, memory 290 is coupled to AE processor 250, and memory 290 stores the values as indicated in FIG. 12-2. The data value $20 in address location $X00 is not used. Control bit D8 from address location $X00 is transferred to programmable logic device 292. Because the control bit is %0, no transfer is initiated by the programmable logic device 292 and the data value $21 in address location $X01 is not used. Next, control bit D8 from address location $X01 is transferred to programmable logic device 292. Because the control bit is %0, no transfer is initiated by the programmable logic device 292 and the data value $22 in address location $X02 is not used.

Next, control bit D8 from address location $X02 is transferred to programmable logic device 292. Because the control bit is %1, a transfer is initiated by the programmable logic device 292. On a first bus cycle, the programmable logic device 292 asserts the XCI signal provided to the AE processor 250. On the second bus cycle, the data value $23 from address location $X03 is transferred to AE processor 250. Control bits within each AE processor 250, 253, and 256 determine the movement of the data value $23 through the processor array 212. Each AE processor, if it receives the data value $23, has the choice of either storing or not storing the data value. In addition, each AE processor, if it receives the data value $23, has the choice of whether or not to pass the data value $23 on, and if so, in which direction.

Note that one bus cycle is required to transfer a data value from one AE port to the opposite AE port. For example, if AE processor 250 receives the data value $23 during the second bus cycle, then AE processor 250, if configured appropriately, can provide the data value $23 at the south port during the third bus cycle. And if AE processor 253 receives the data value $23 during the third bus cycle, then AE processor 253, if configured appropriately, can provide the data value $23 at the south port during the fourth bus cycle.

Also during the second bus cycle, control bit D8 from address location $X03 is transferred to programmable logic device 292. Because the control bit is %1, a transfer is initiated by the programmable logic device 292. On the second bus cycle, the programmable logic device 292 asserts the XCI signal provided to the AE processor 250. On the third bus cycle, the data value $24 from address location $X04 is transferred to AE processor 250. Control bits within each AE processor 250, 253, and 256 determine the movement of the data value $24 through the processor array 212. Each AE processor, if it receives the data value $24, has the choice of either storing or not storing the data value. In addition, each AE processor, if it receives the data value $24, has the choice of whether or not to pass the data value $24 on, and if so, in which direction.

Again, one bus cycle is required to transfer a data value from one AE port to another AE port. For example, if AE processor 250 receives the data value $24 during the third bus cycle, then AE processor 250, if configured appropriately, can provide the data value $24 at the south port during the fourth bus cycle. And if AE processor 253 receives the data value $24 during the fourth bus cycle, then AE processor 253, if configured appropriately, can provide the data value $24 at the south port during the fifth bus cycle. Note that by storing the asserted value "1" of the control bit D8 in consecutive address locations, data can be streamed into the AE processors (e.g. AE processors 250, 253, and 256) which are in the same row or column as corresponds to the memory 290. And by storing the negated value "0" of the control bit D8 in an address location, a break can be made in the stream of data be transferred to the AE processors (e.g. AE processors 250, 253, and 256) which are in the same row or column as corresponds to the memory 290.

Various methods for transferring data in data processing system 10 will now be discussed. Note that in some embodiments of the present invention, the tap and switch circuitry (not shown) in each AE processor 50–65 may be programmed to modify the data movement among the AE processors 50–65 in the AE array 12.

FIG. 12-3 illustrates a transpose data movement pattern using data processing system 10. Although the transpose data movement pattern is illustrated using data processing system 10, the transpose data movement pattern may be used to transfer data on other data processing systems. The transpose data movement pattern is especially useful for performing matrix computations which require a transpose operation. In one embodiment of the present invention, the matrix operations may involve one or more matrices of data stored in the Coefficient Memory Arrays (CMAs) (not shown) of the AE processors 50–65. In the example illustrated in FIG. 12-3, data is transferred out of the south array port of AE array 12 and into the east array port of AE array 12.

An example of the transpose data movement pattern will now be discussed. A data value is stored in each of AE processors 62–65. The data value stored in AE processor 62 is transferred to and stored in a corresponding memory 90, the data value stored in AE processor 63 is transferred to and stored in a corresponding memory 90, the data value stored in AE processor 64 is transferred to and stored in a corresponding memory 90, and the data value stored in AE processor 65 is transferred to and stored in a corresponding memory 90. The corresponding memories 90 are located in interface circuit 14 (see FIGS. 3 and 4). In one embodiment of the present invention, each time that the four data values from each of the processor 62–65 are transferred, they are transferred in parallel.

From the corresponding memories 90, the four data values are transferred to the transpose buffers 100–103 in switch 18 (see FIG. 5). The data value from AE processor 62 is transferred to transpose buffer 100, from transpose buffer 100 to interface circuit 16, and from interface circuit 16 to AE processor 65 where it is stored. The data value from AE processor 63 is transferred to transpose buffer 101, from transpose buffer 101 to interface circuit 16, and from interface circuit 16 to AE processor 61 where it is stored. The data value from AE processor 64 is transferred to transpose buffer 102, from transpose buffer 102 to interface circuit 16, and from interface circuit 16 to AE processor 57 where it is stored. The data value from AE processor 65 is transferred to transpose buffer 103, from transpose buffer 103 to interface circuit 16, and from interface circuit 16 to AE processor 53 where it is stored.

In alternate embodiments of the present invention, the data values may be stored in more, fewer, and different circuits as they are transferred. The bus interface controller 22 (see FIG. 1) is used to select and control the transpose data movement pattern by way of control bus 36.

FIG. 12-4 illustrates a ping-pong data movement pattern using data processing system 10. Although the ping-pong data movement pattern is illustrated using data processing system 10, the ping-pong data movement pattern may be used to transfer data on other data processing systems. The ping-pong data movement pattern is especially useful for quickly transferring a significant amount of data between the AE array 12 and the host processor 30.

An example of the ping-pong data movement pattern will now be discussed. A plurality of data values is stored in host computer 30. In one embodiment of the present invention, a large number of data values are stored on a hard disk drive of computer 30. The SCSI circuit 26 controls the transfer of data from the host computer to the memories 90 in edge interfaces 14 and 16.

A first set of data values are transferred from host computer 30 to the memories 90 in edge interface 14 by way of SCSI connector 42, SCSI circuit 26, and data bus 32. Then while the AE processors 50–65 are receiving and optionally storing the first set of data values from edge interface 14, a second set of data values are transferred from host computer 30 to the memories 90 in edge interface 16 by way of SCSI connector 42, SCSI circuit 26, and data bus 32. Then while the AE processors 50–65 are receiving and optionally storing the second set of data values from edge interface 16, a third set of data values are transferred from host computer 30 to the memories 90 in edge interface 14 by way of SCSI connector 42, SCSI circuit 26, and data bus 32. Note that a set of data values may include one or more bytes of data. Note also that each memory 90 in edge interface 14 may receive data at the same time in parallel, and may likewise provide data at the same time in parallel.

Thus using the ping-pong data movement pattern, the SCSI circuit 26 alternates between transferring data to/from edge interface 14 and to/from edge interface 16. Likewise, the AE array 12 alternates between transferring data to/from edge interface 14 and to/from edge interface 16. However, when the SCSI circuit is transferring data to/from edge interface 14, the AE array 12 is transferring data to/from edge interface circuit 16; and when the SCSI circuit is transferring data to/from edge interface 16, the AE array 12 is transferring data to/from edge interface circuit 14. The bus interface controller 22 (see FIG. 1) is used to select the ping-pong data movement pattern; however, the SCSI circuit 26 controls the actual data transfer once the ping-pong data movement pattern has been selected and initiated by the bus interface controller 22.

FIG. 12-5 illustrates a checkerboard data movement pattern using data processing system 10. Although the checkerboard data movement pattern is illustrated using data processing system 10, the checkerboard data movement pattern may be used to transfer data on other data processing systems. The checkerboard data movement pattern is especially useful in allowing both edge interfaces 14 and 16 to burst data to the AE array 12. In other words, Stream Accesses, in Host Mode, can be made simultaneously in the south-to-north direction, and in the east-to-west direction.

An example of the checkerboard data movement pattern will now be discussed. The bus interface controller 22 (see FIG. 1) is used to select and control the checkerboard data movement pattern by way of control bus 36. The bus interface controller 22 must cause the proper control values to be stored in the appropriate control bits of each AE processor 50–65 in order to permit the checkerboard data movement pattern to be used. The bus interface controller 22 selects all rows and all columns in AE array 12 by asserting both the row integrated circuit pin $\overline{\text{ROW}}$ and the column integrated circuit pin $\overline{\text{COL}}$ of each AE processor 50–65. The bus interface controller 22 also configures each AE processor 50–65 to be in Host Stream Mode. In addition, the bus interface controller 22 must cause the appropriate values to be stored in the Host Stream Select Port bits (HSP[1:0]) in each AE processor 50–65

Note that in Host Stream Mode, the AE processors 50–65 can receive and store data, can pass on data without storing, and can act as the original source of data. The Host Stream Select Port bits (HSP[1:0]) (not shown) in each AE processor 50–65 determine the movement of the data through the processor array 212. For write accesses, each AE processor receives a data value, and based upon the value of the HSP control bits, has the choice of either storing or not storing the data value before passing on the data value. For read accesses, the HSP control bits in each AE processor 50–65 determine whether that particular processor acts as an original source of the data value, or merely passes on the data value. Note that the checkerboard data movement pattern allows data to be transferred between AE processors 50–65 in the west-to-east direction and the north-to-south direction concurrently.

In the example illustrated in FIG. 12-5, the AE processors which are cross-hatched, namely 51, 53, 54, 56, 59, 61, 62, and 64 all have a %10 stored in the Host Stream Select Port bits (i.e. HSP control bits) and thus transfer data out the east port. On the other hand, the AE processors which are not cross-hatched, namely 50, 52, 55, 57, 58, 60, 63, and 65, all have a %01 stored in the HSP control bits and thus transfer data out the south port.

As an example, for north-to-south data movement, a data value sourced by AE processor 50 would be transferred to AE processor 54, then AE processor 58, then AE processor 62, and then finally to interface circuit 14 (i.e. memory 90 coupled to AE processor 62). A data value sourced by AE processor 55 would be transferred to AE processor 59, then AE processor 63, and then finally to interface circuit 14 (i.e. memory 90 coupled to AE processor 63). For west-to-east data movement, a data value sourced by AE processor 51 would be transferred to AE processor 52, then AE processor 53, and then finally to interface circuit 16 (i.e. memory 90 coupled to AE processor 53). A data value sourced by AE processor 54 would be transferred to AE processor 55, then AE processor 56, then AE processor 57, and then finally to interface circuit 16 (i.e. memory 90 coupled to AE processor 57). The above example is an example of a fine-grain checkerboard data movement pattern.

The present invention may also be used to perform a coarse-grain checkerboard data movement pattern. As an example, AE processors 50–51, 54–55, 60–61, and 64–65 may all have a %10 stored in the Host Stream Select Port bits (i.e. HSP control bits) and thus may transfer data out the east port. On the other hand, the AE processors 52–53, 56–59, and 62–63 may all have a %01 stored in the HSP control bits and may thus transfer data out the south port.

For west-to-east data movement, a data value sourced by AE processor 50 would be transferred to AE processor 51, then AE processor 52, then AE processor 53, and then finally to interface circuit 16 (i.e. memory 90 coupled to AE processor 53). A data value sourced by AE processor 51 would be transferred to AE processor 52, then AE processor 53, and then finally to interface circuit 16 (i.e. memory 90 coupled to AE processor 53). For north-to-south data movement, a data value sourced by AE processor 52 would be transferred to AE processor 56, then AE processor 60, then AE processor 64, and then finally to interface circuit 14 (i.e. memory 90 coupled to AE processor 64). A data value sourced by AE processor 56 would be transferred to AE processor 60, then AE processor 64, and then finally to interface circuit 14 (i.e. memory 90 coupled to AE processor 64).

The checkerboard data movement pattern thus allows data to be transferred from the AE array 12 to interface circuit 14 at the same time that data is being transferred from the AE array 12 to interface circuit 16. Note that the Host Stream Select Port bits (i.e. HSP control bits) in each AE processor 50–65 also determine whether the AE processor 50–65 sources and passes data, or merely passes data. In one embodiment of the present invention, if the HSP control bits are either %01 or %10, the AE processor 50–65 both sources and passes on data. However, if the HSP control bits are either %00 or %11, the AE processor 50–65 does not source data, but merely passes on data.

Note that more than one AE processor 50–65 in a column and more than one AE processor 50–65 in a row may source data. For example, in the fine-grain checkerboard data movement pattern illustrated in FIG. 12-5, AE processors 52 and 60 both have a %01 stored in the HSP control bits and thus source data out the south port. AE processor 52 sources data first, while AE processors 56, 60, and 64 merely pass on the data sourced by AE processor 52. Then when AE processor 52 has finished sending data, AE processor 60 sources data, while AE processor 64 merely pass on the data sourced by AE processor 60.

While the present invention has been illustrated and described with reference to specific embodiments, further modifications and improvements will occur to those skilled in the art. It is to be understood, therefore, that this invention is not limited to the particular forms illustrated and that it is intended in the appended claims to cover all modifications that do not depart from the spirit and scope of this invention.

We claim:

1. A multi-processor data processing system, comprising:

a processor array comprising a plurality of processors, the processor array having a north array port, an east array port, a south array port, and a west array port;

first interface circuitry, coupled to the east array port;

second interface circuitry, coupled to the south array port;

an address bus, coupled to said first interface circuitry, to said second interface circuitry, to said north array port, and to said west array port;

a data bus, coupled to said first interface circuitry and to said second interface circuitry, but not coupled to said north array port and said west array port;

a control bus, coupled to said first interface circuitry, to said second interface circuitry, to said north array port, and to said west array port; and a bus interface controller, coupled to said address bus, to said data bus, and to said control bus, said bus interface controller initiating a first transfer of information in the multi-processor data processing system, wherein the multi-processor data processing system has a data transfer mode in which addresses are received by the processor array at the north and west array ports and not at the south and east array ports, and in which data corresponding to said addresses is received by the processor array at the south and east array ports and not at the north and west array ports, said addresses indicating a source or destination of the data within the processor array.

2. A multi-processor data processing system as in claim 1, further comprising:

a system memory, coupled to said address bus, to said data bus, and to said control bus.

3. A multi-processor data processing system as in claim 1, further comprising:

a data storage interface circuit, coupled to said address bus, to said data bus, and to said control bus, said data storage interface circuit transferring information between said data bus and a data storage element.

4. A multi-processor data processing system as in claim 1, further comprising:

a serial interface conductor, coupled to said bus interface controller and to a host device, said interface conductor transferring information between said bus interface controller and the host device.

5. A multi-processor data processing system as in claim 1, further comprising:

a daughter board electrical connector, coupled to the north array port and the west array port.

6. A multi-processor data processing system as in claim 1, further comprising:

switch means for selectively transferring information from the south array port to the east array port, said switch means being coupled to said first interface circuitry and to said second interface circuitry.

7. A multi-processor data processing system as in claim 1, wherein said first interface circuitry comprises:

a first plurality of memories, coupled to said address bus and to said data bus; and a first control circuit, coupled to said control bus, for providing first control signals to the east array port; and wherein said second interface circuitry comprises:

a second plurality of memories, coupled to said address bus and to said data bus; and a second control circuit, coupled to said control bus, for providing second control signals to the south array port.

8. A multi-processor data processing system as in claim 1, wherein the plurality of processors comprising said processor array is arranged in a plurality of rows and a plurality of columns.

9. A multi-processor data processing system as in claim 1, wherein a first one of the plurality of processors has a first processor port, a second processor port, a third processor port, and a fourth processor port, wherein a second one of the plurality of processors has a first processor port, a second processor port, a third processor port, and a fourth processor port, wherein the north array port comprises:

the first processor port of the first one of the plurality of processors; and the first processor port of the second one of the plurality of processors; and wherein the west array port comprises:

the fourth processor port of the first one of the plurality of processors.

10. A multi-processor data processing system, comprising:

a processor array comprising a plurality of processors, the processor array having a first array port, a second array port, a third array port, and a fourth array port;

first interface circuitry, coupled to the second array port;

second interface circuitry, coupled to the third array port;

an address bus, coupled to said first interface circuitry, to said second interface circuitry, to said first array port, and to said fourth array port;

a data bus, coupled to said first interface circuitry and to said second interface circuitry;

a control bus, coupled to said first interface circuitry, to said second interface circuitry, to said first array port, and to said fourth array port; and a bus interface controller, coupled to said address bus, to said data bus, and to said control bus, said bus interface controller initiating a first transfer of information in the multi-processor data processing system wherein each of the plurality of processors comprises:

a first processor port;

a second processor port;

a third processor port; and a fourth processor port, wherein the multi-processor data processing system has a data transfer mode in which addresses are provided to said processor array exclusively by way of the first and fourth array ports, in which addresses are received exclusively by the first and fourth processor port of each of the plurality of processors, in which data corresponding to said addresses is transferred to said processor array exclusively by way of the second and third array ports, and in which data corresponding to said addresses is received exclusively by the second and third processor port of each of the plurality of processors, said addresses indicating a source or destination of the data within the processor array.

11. A multi-processor data processing system as in claim 10, wherein each of the plurality of processors are substantially identical.

12. A multi-processor data processing system as in claim 10, wherein said first interface circuitry comprises:

a first plurality of memories, coupled to said address bus and to said data bus; and a first control circuit, coupled to said control bus, for providing first control signals to the second array port; and wherein said second interface circuitry comprises:

a second plurality of memories, coupled to said address bus and to said data bus; and a second control circuit, coupled to said control bus, for providing second control signals to the third array port.

13. A multi-processor data processing system as in claim 10, further comprising:

a system memory, coupled to said address bus, to said data bus, and to said control bus.

14. A multi-processor data processing system as in claim 13, further comprising:

switch means for selectively transferring information from the third array port to the second array port, said switch means being coupled to said first interface circuitry and to said second interface circuitry.

15. A multi-processor data processing system as in claim 14, further comprising:

a serial interface conductor, coupled to said bus interface controller and to a host device, said interface conductor transferring information between said bus interface controller and the host device.

16. A multi-processor data processing system as in claim 15, further comprising:

a daughter board electrical connector, coupled to the first array port and the fourth array port.

* * * * *